Jan. 30, 1951   F. E. HAMILTON ET AL   2,540,029
SELECTIVELY CONTROLLED RECORDING APPARATUS
Filed Feb. 6, 1948   58 Sheets-Sheet 1

INVENTORS
F.E. HAMILTON
M.F. HAYES
J.D. WOLFE
BY George D. Nicks
ATTORNEY

INVENTORS
F. E. HAMILTON
M. F. HAYES
J. D. WOLFE
BY George D. Nichs
ATTORNEY

Jan. 30, 1951   F. E. HAMILTON ET AL   2,540,029
SELECTIVELY CONTROLLED RECORDING APPARATUS
Filed Feb. 6, 1948   58 Sheets-Sheet 3
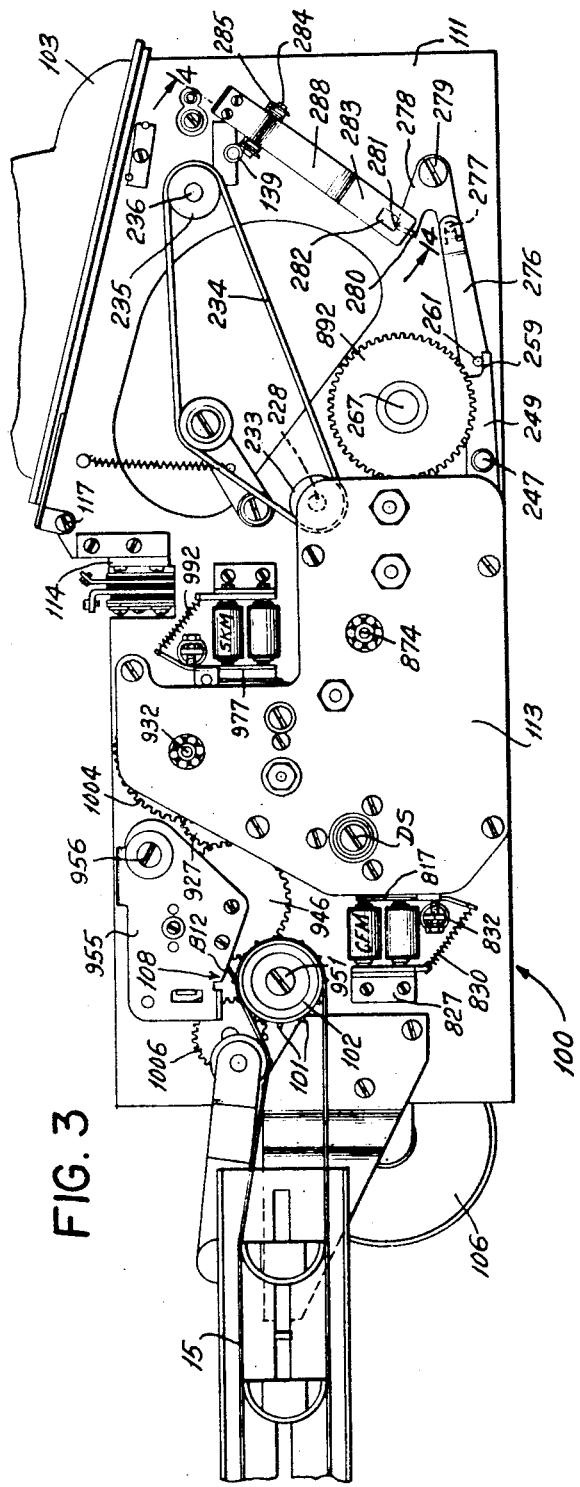
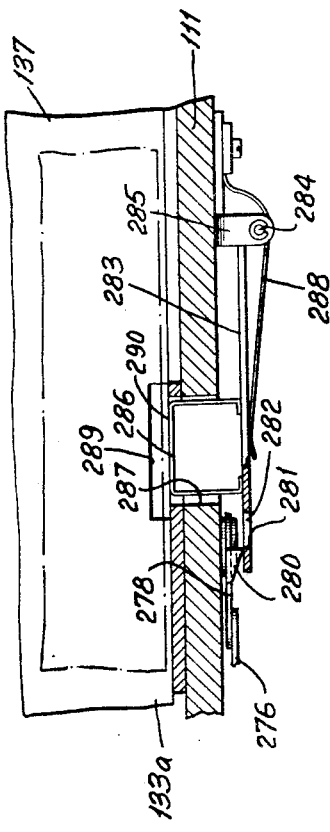
INVENTORS
F. E. HAMILTON
M. E. HAYES
J. D. WOLFE
BY George D. Hicks
ATTORNEY

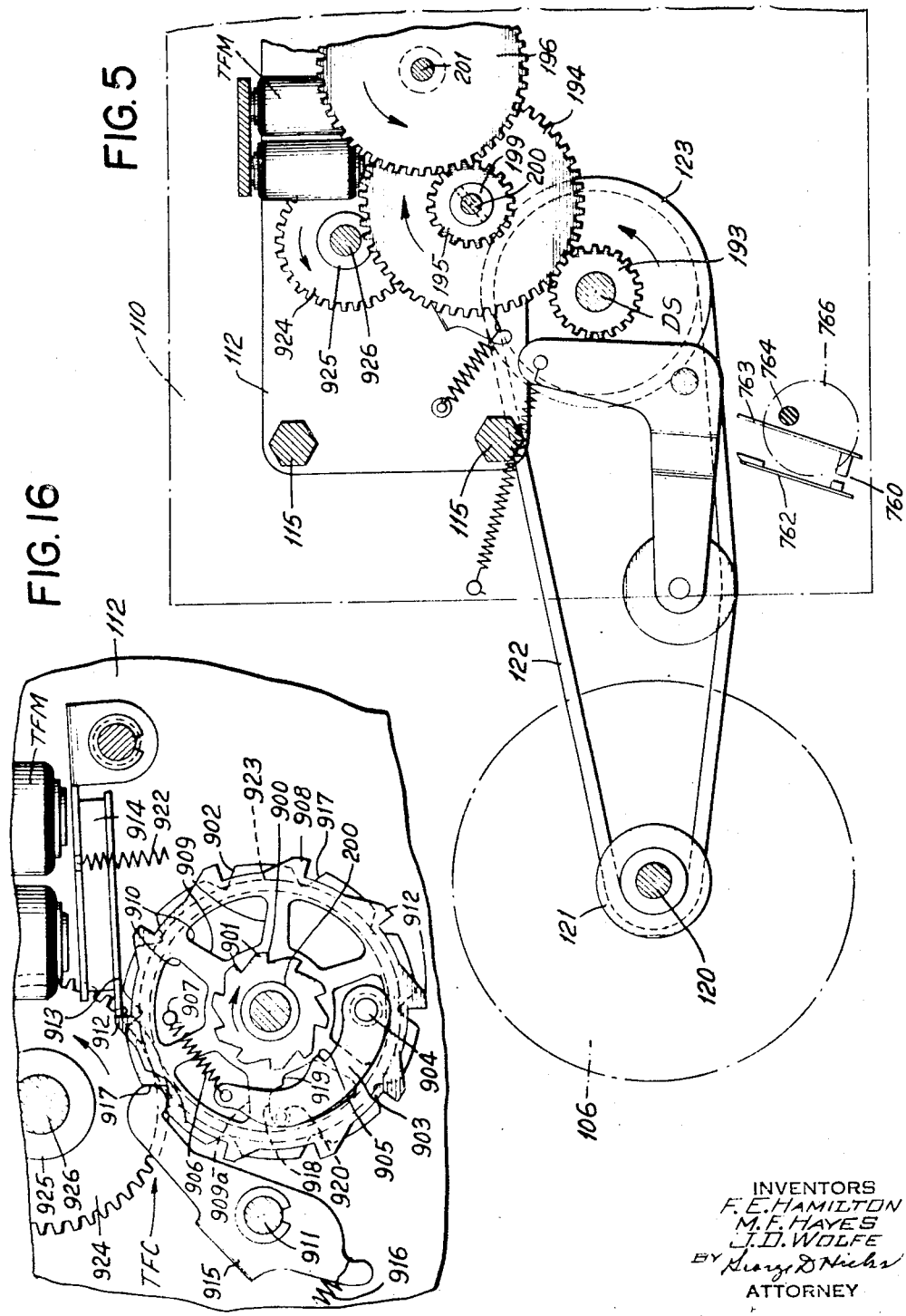

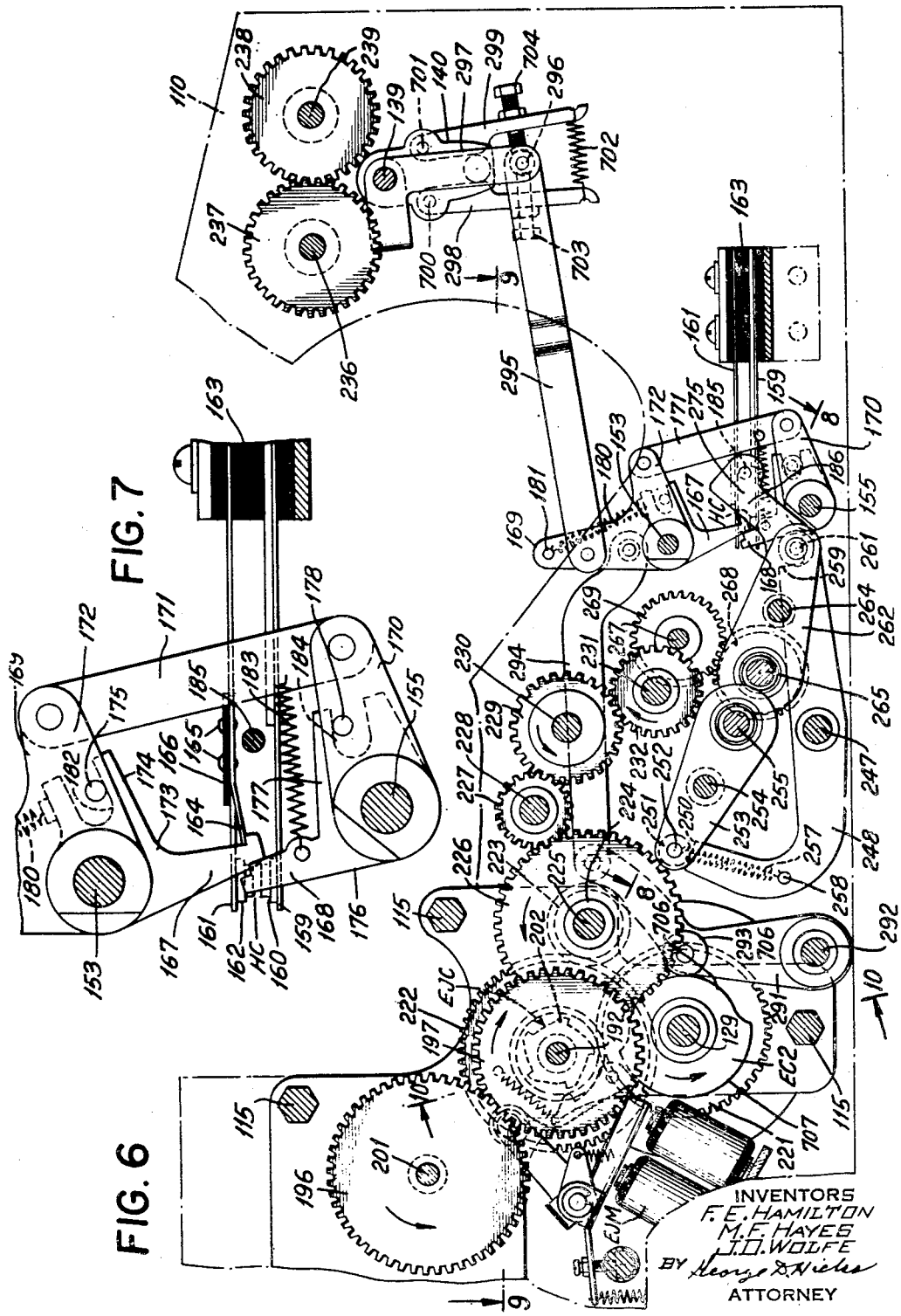

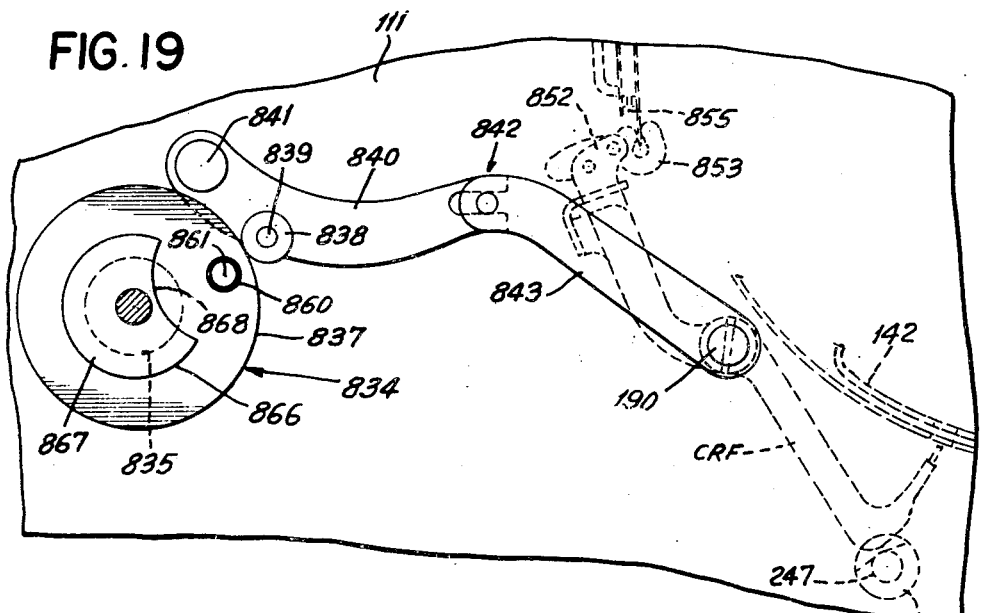
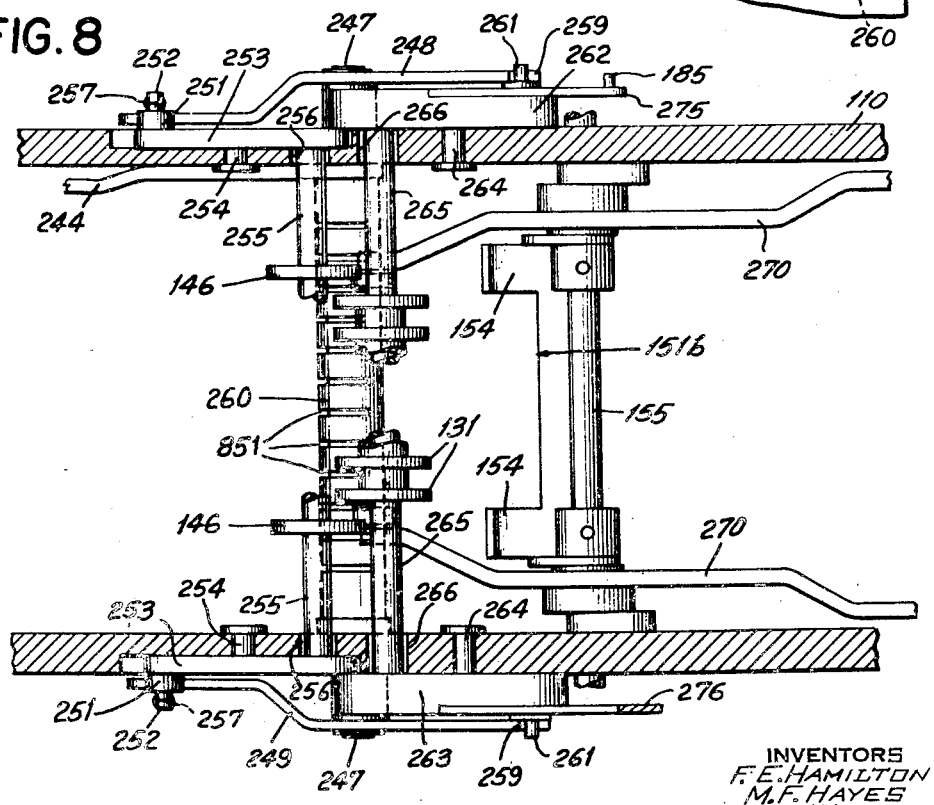

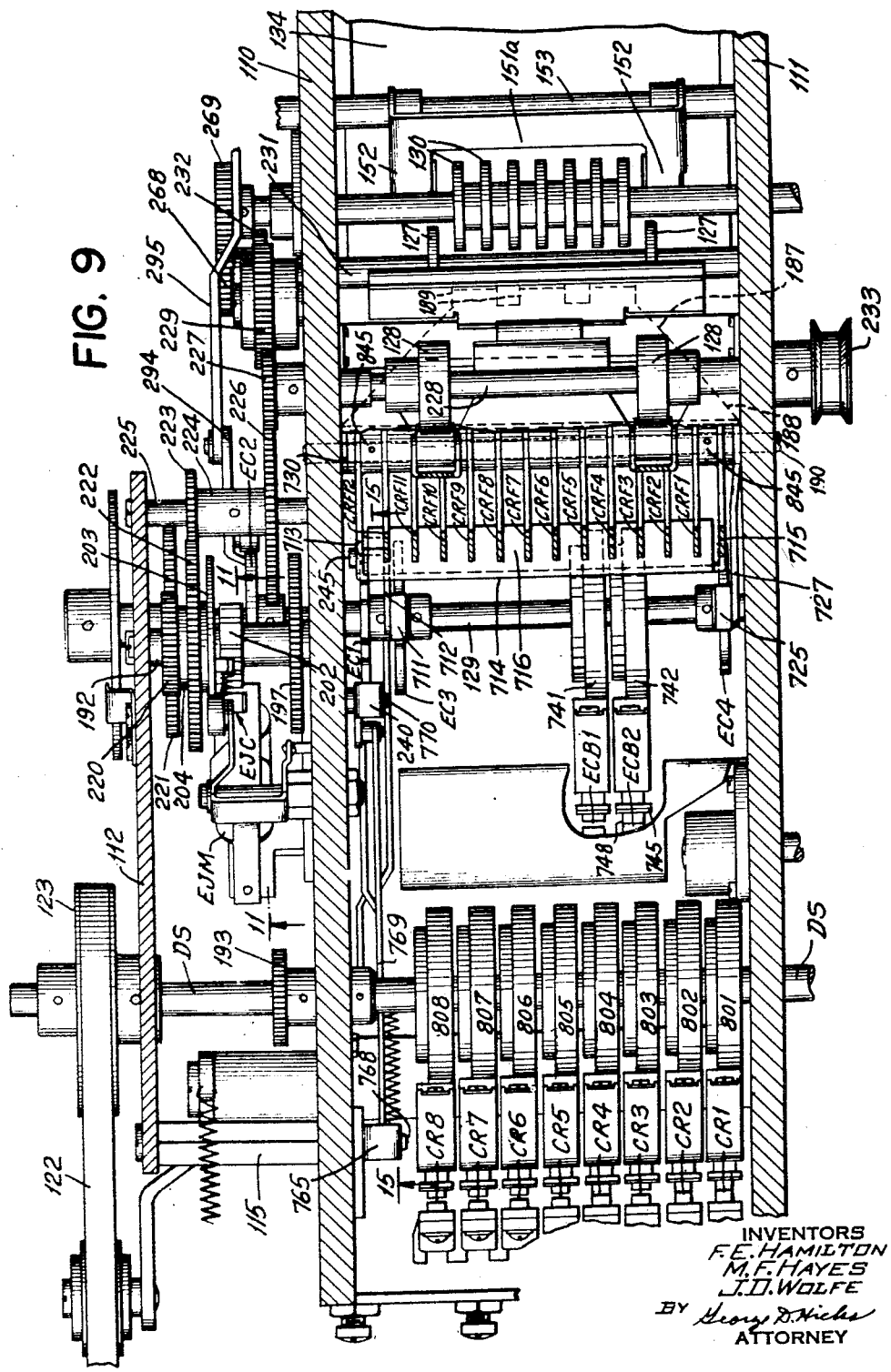

INVENTORS
F. E. HAMILTON
M. F. HAYES
J. D. WOLFE
BY George D. Nickel
ATTORNEY

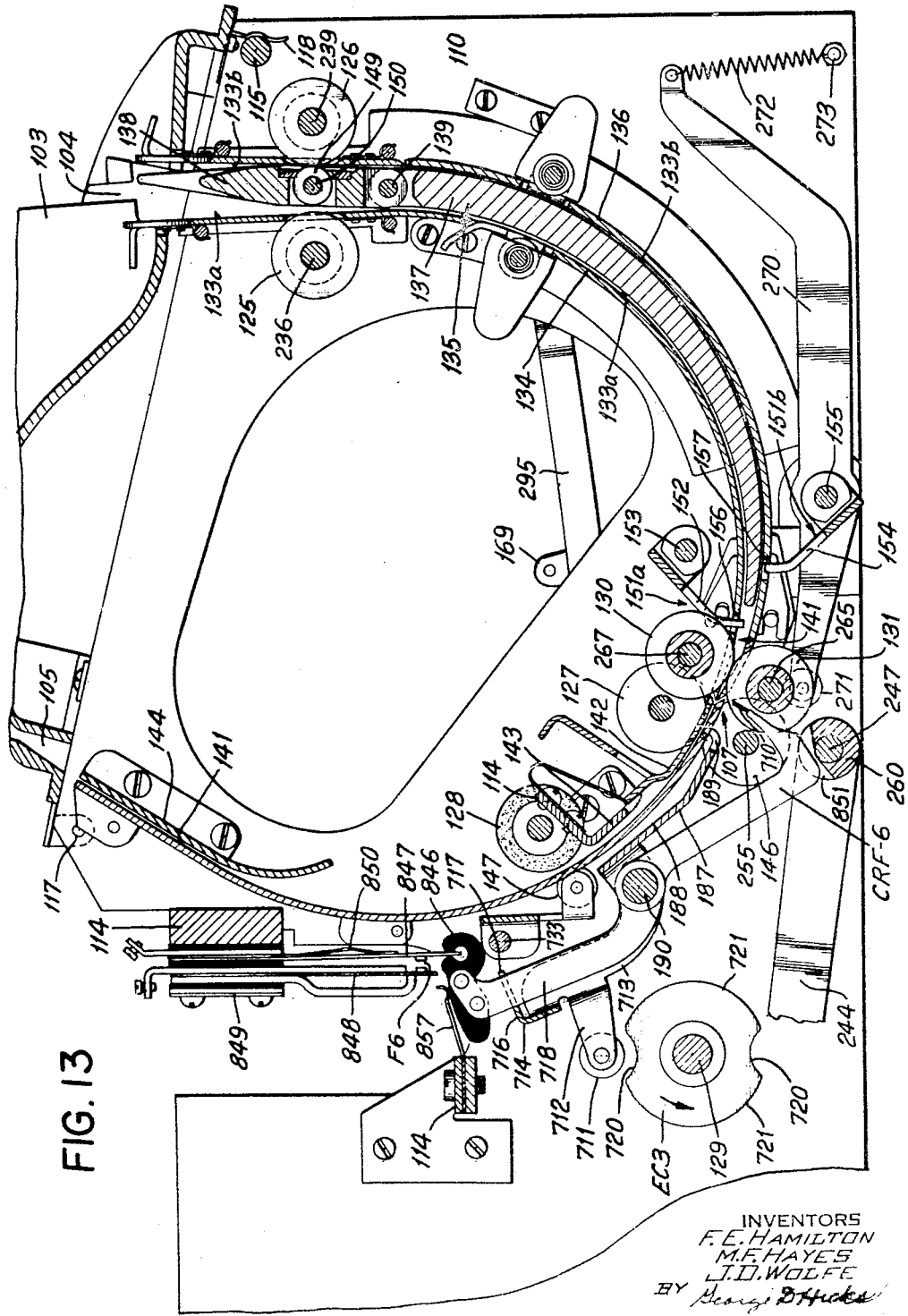

Jan. 30, 1951  F. E. HAMILTON ET AL  2,540,029
SELECTIVELY CONTROLLED RECORDING APPARATUS
Filed Feb. 6, 1948  58 Sheets-Sheet 10

INVENTORS
F. E. HAMILTON
M. F. HAYES
J. D. WOLFE
BY George D. Nichols
ATTORNEY

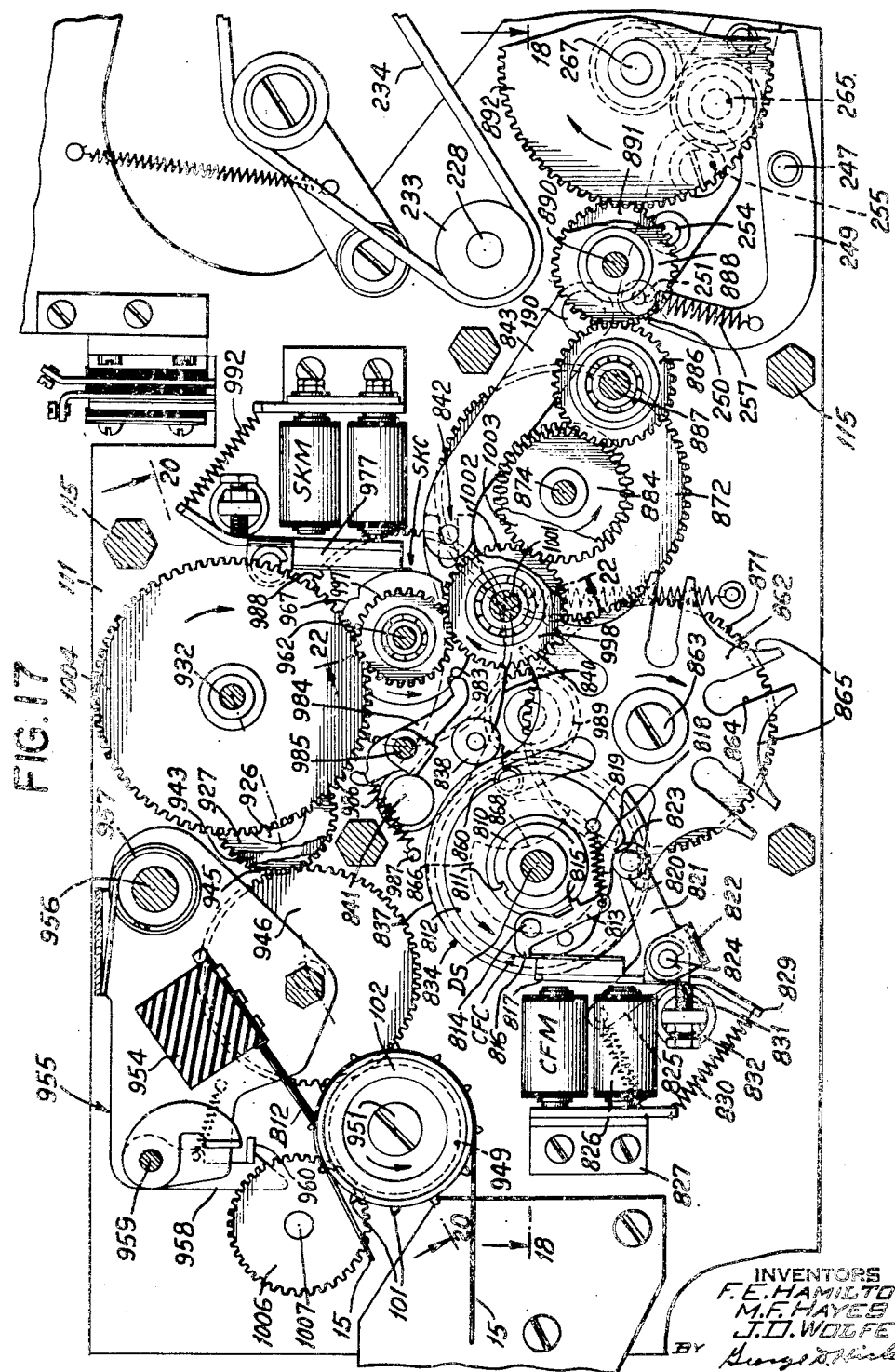

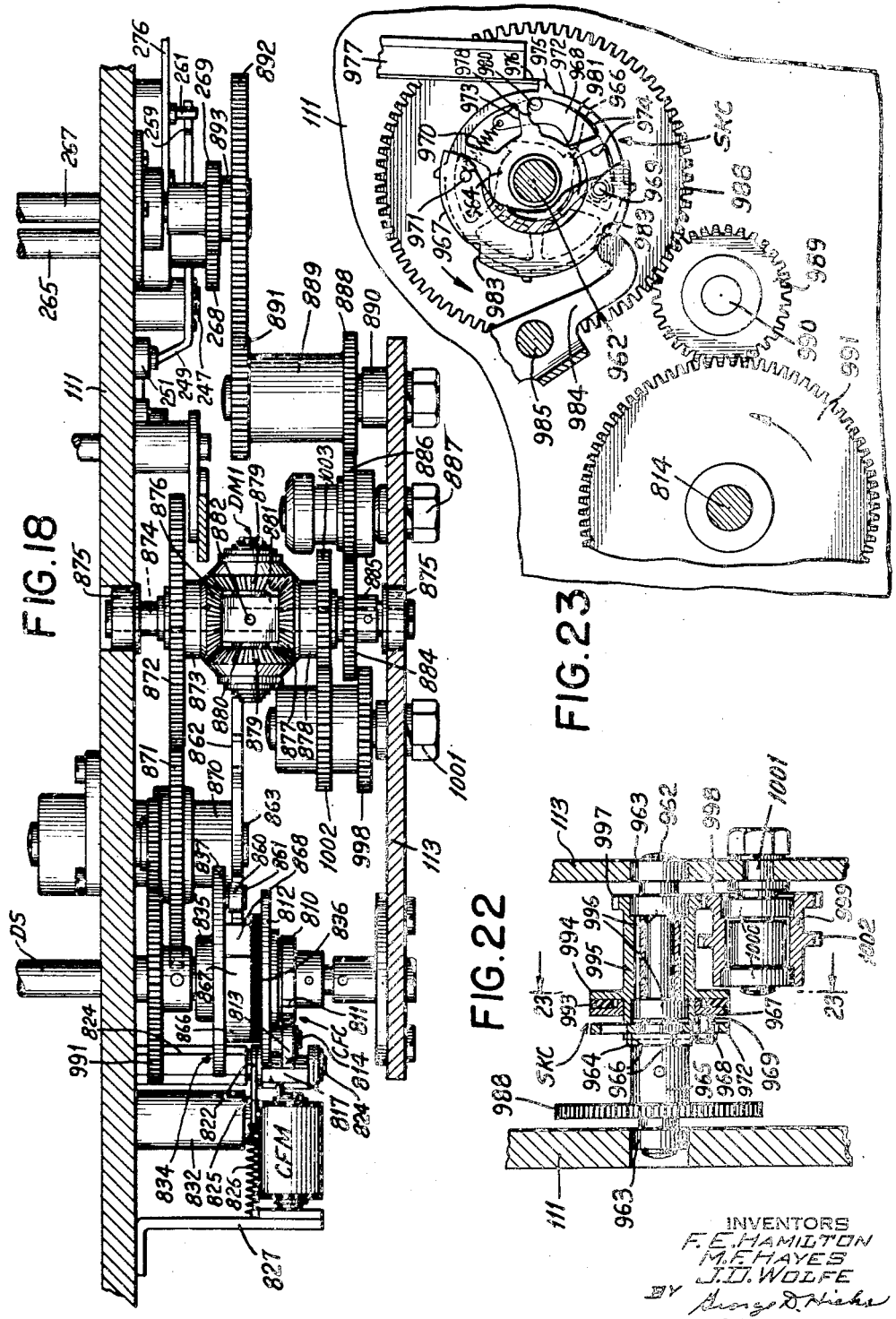

Jan. 30, 1951     F. E. HAMILTON ET AL     2,540,029
SELECTIVELY CONTROLLED RECORDING APPARATUS
Filed Feb. 6, 1948                                   58 Sheets-Sheet 13
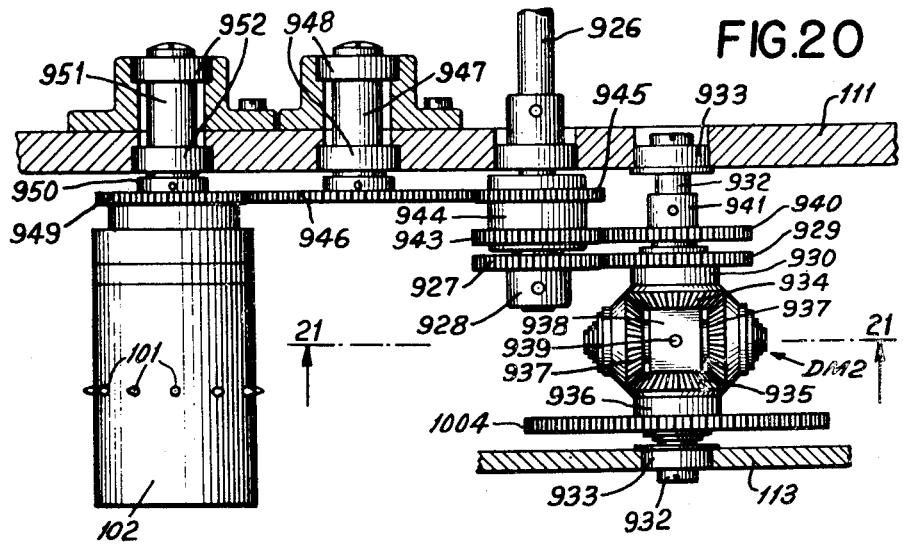
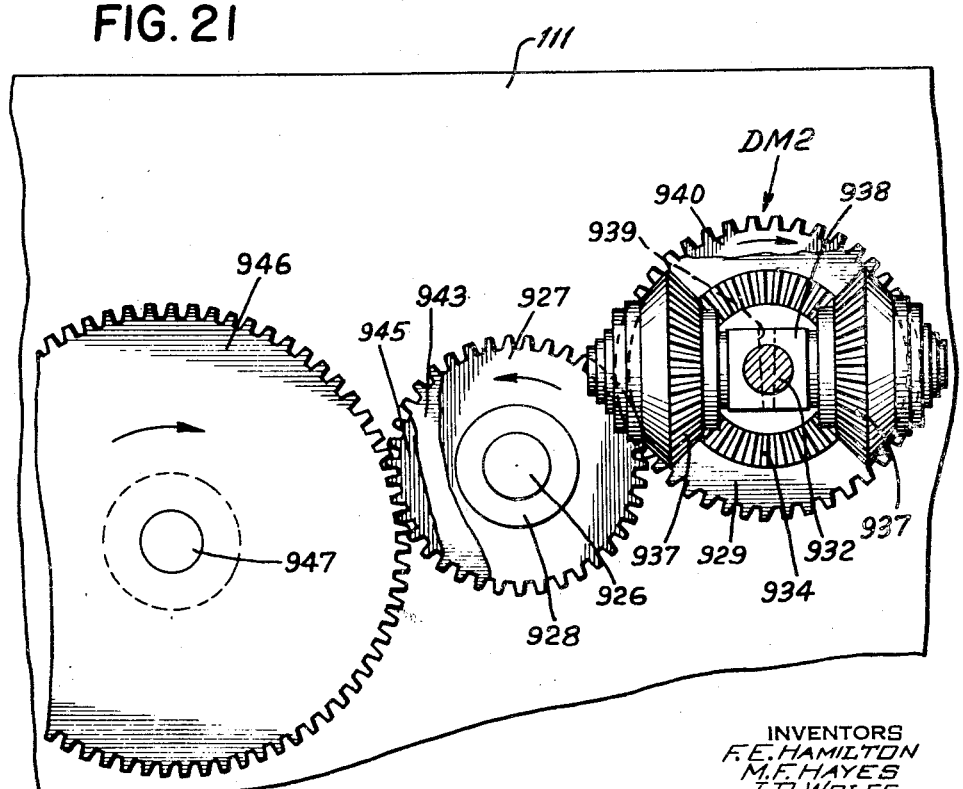
INVENTORS
F. E. HAMILTON
M. F. HAYES
J. D. WOLFE
BY George D. Hicks
ATTORNEY

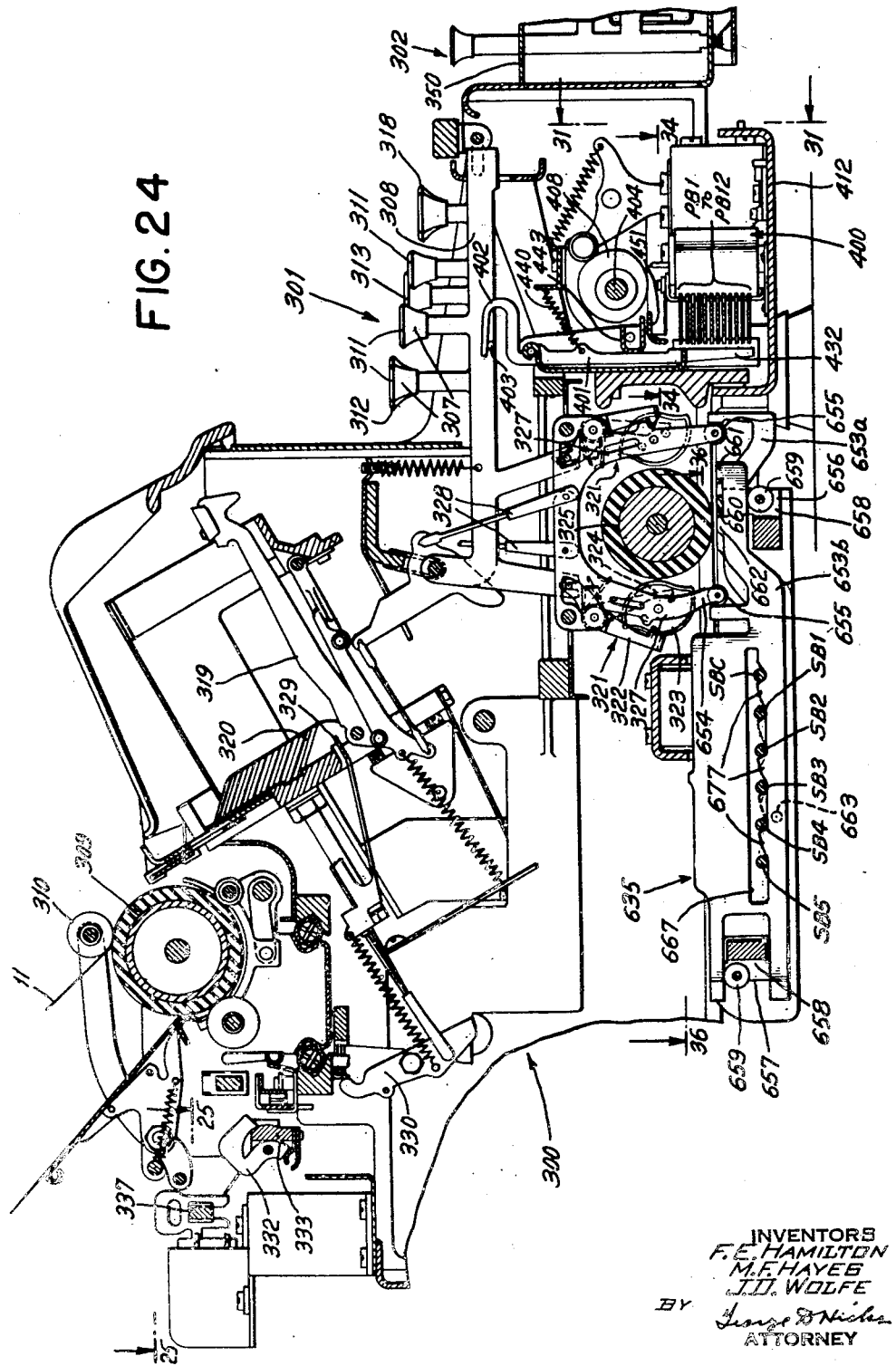

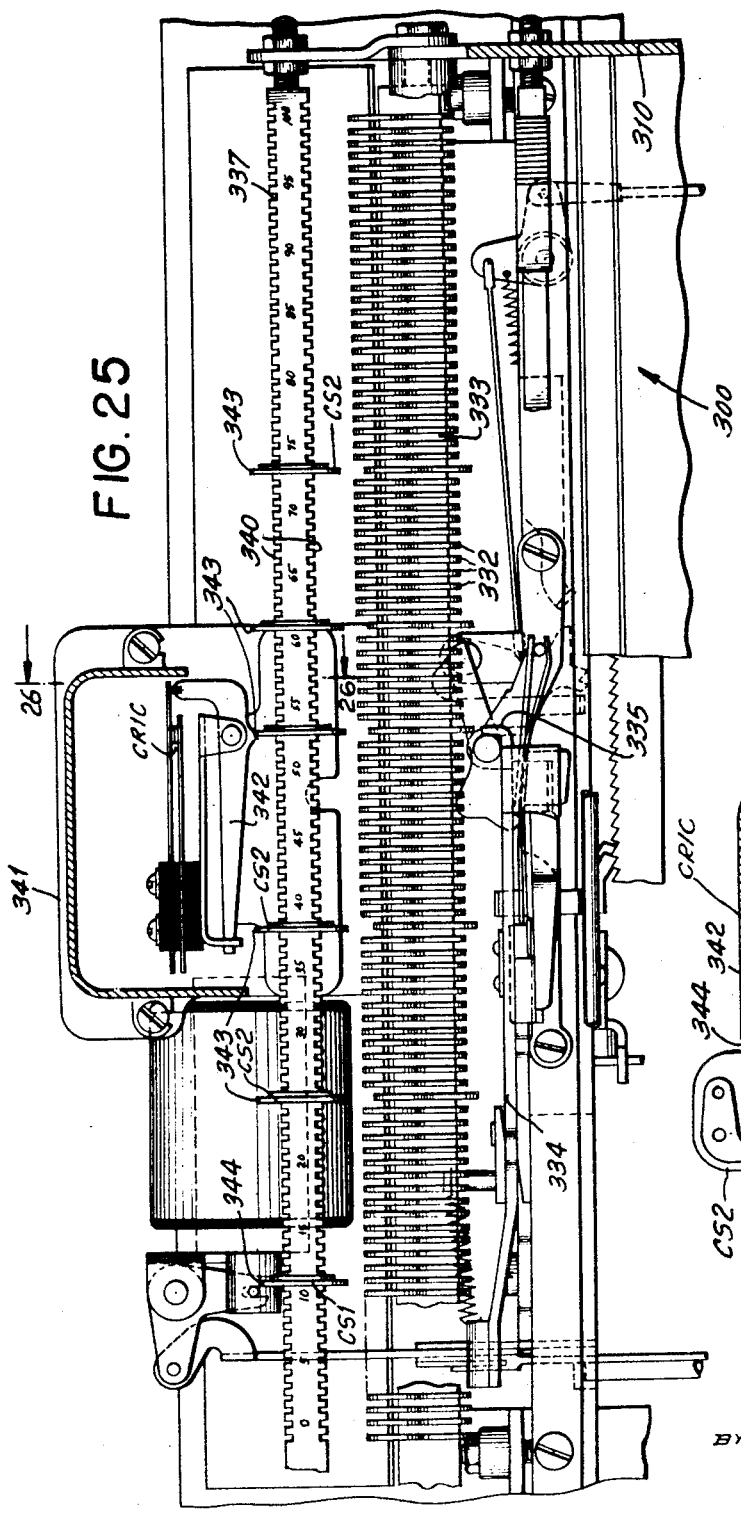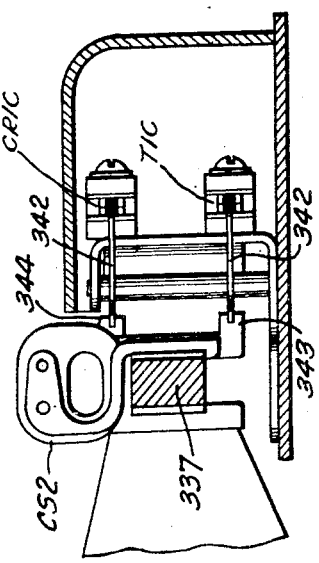

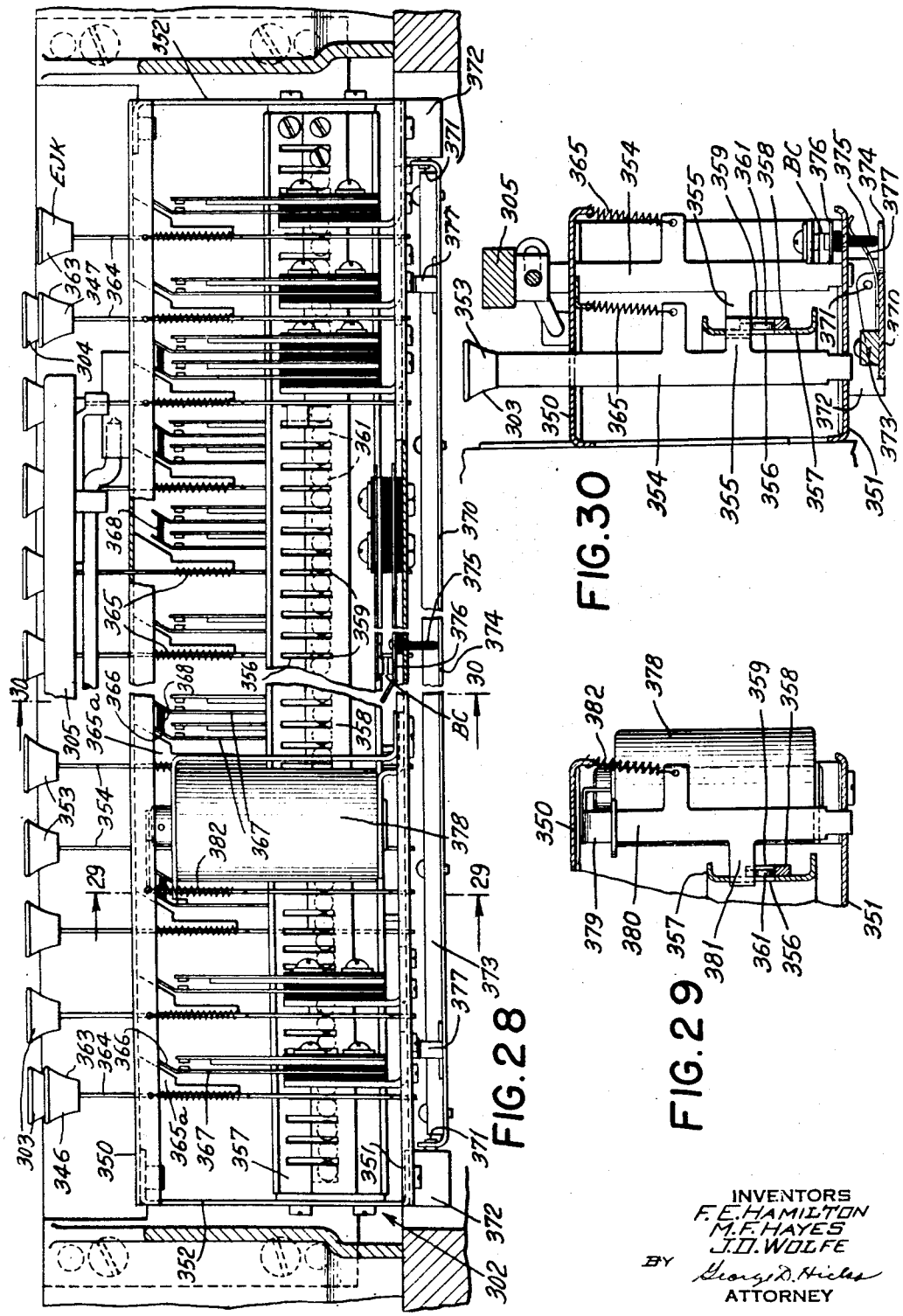

Jan. 30, 1951 F. E. HAMILTON ET AL 2,540,029
SELECTIVELY CONTROLLED RECORDING APPARATUS
Filed Feb. 6, 1948 58 Sheets-Sheet 18
FIG. 31
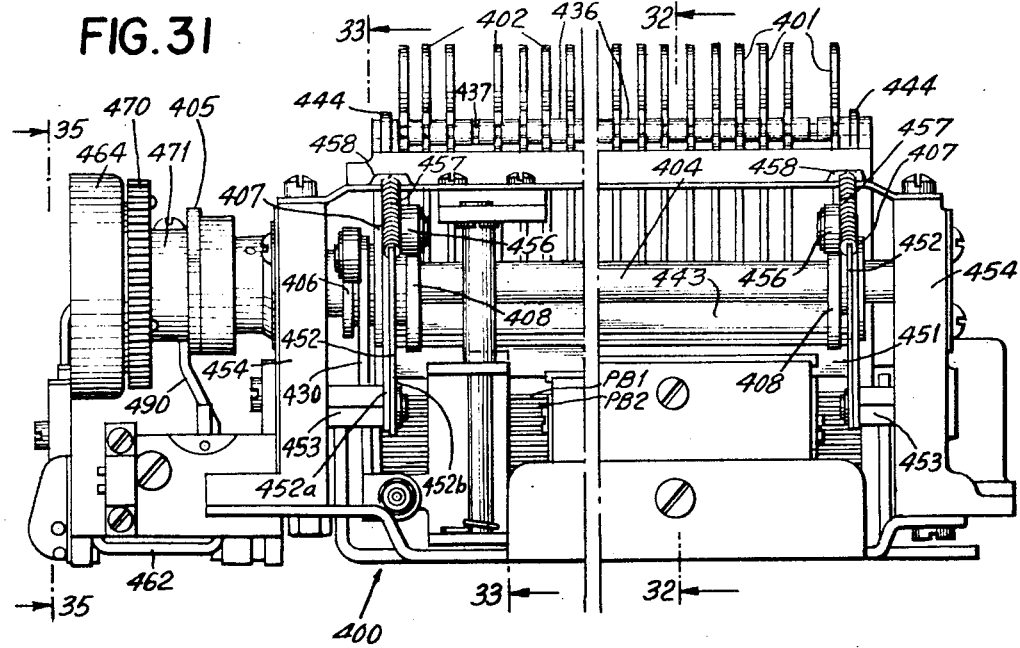
FIG. 32
FIG. 33
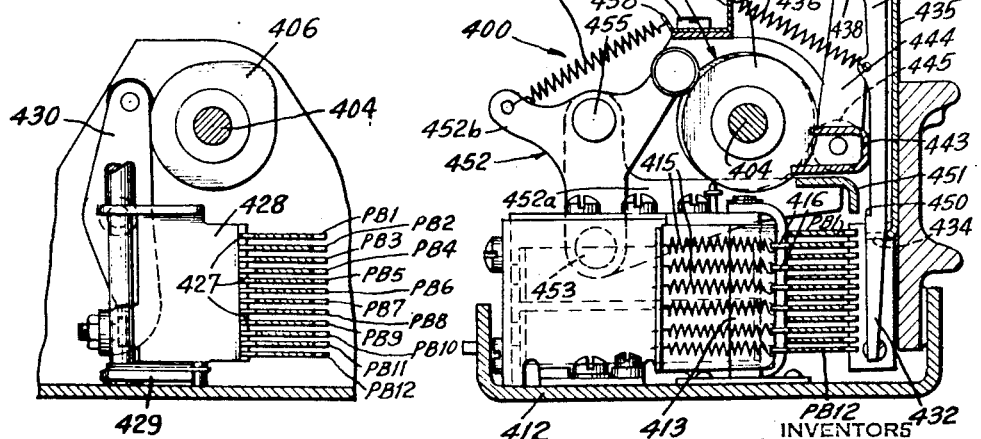
INVENTORS
F. E. HAMILTON
M. F. HAYES
J. D. WOLFE
BY George D. Hicks
ATTORNEY

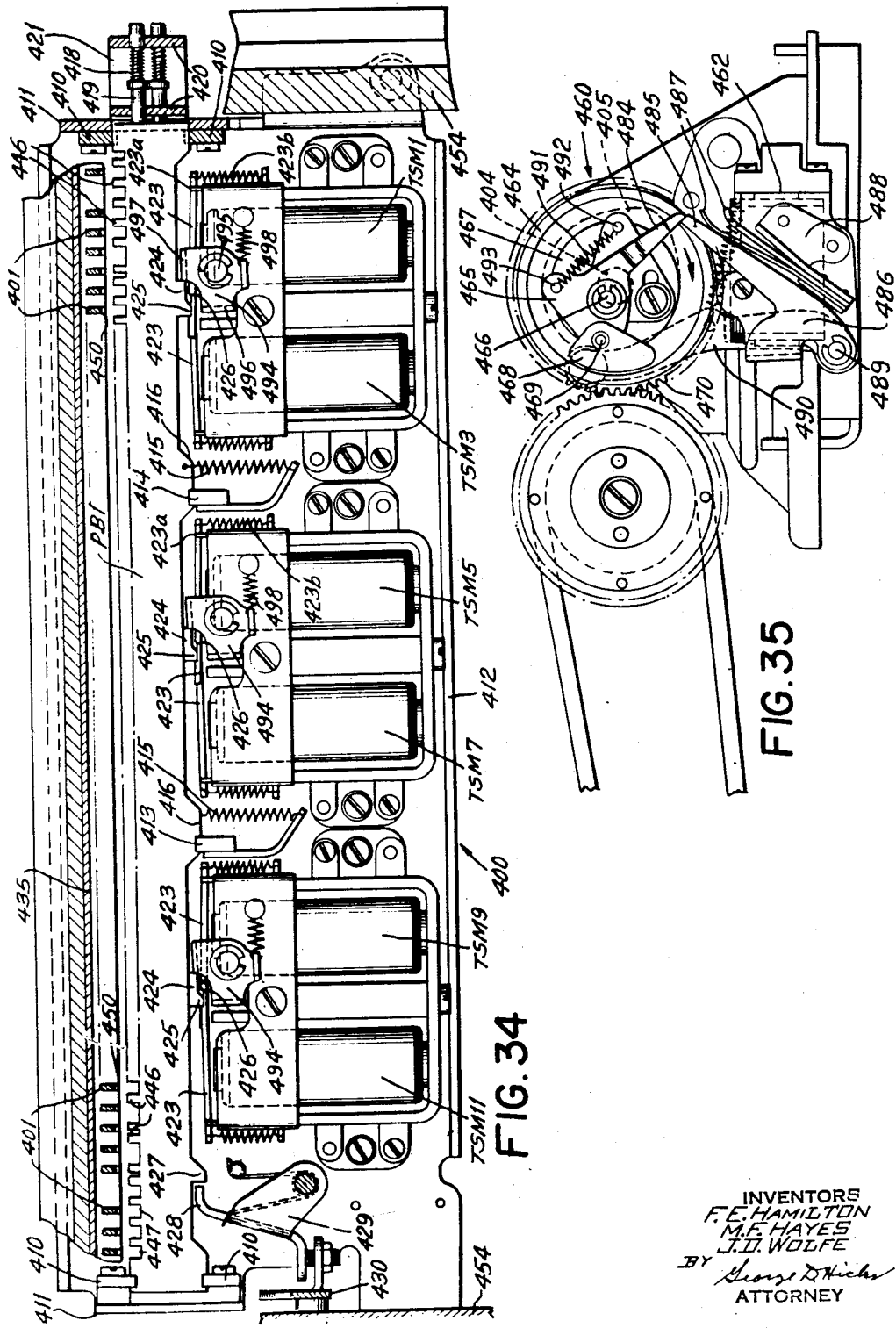

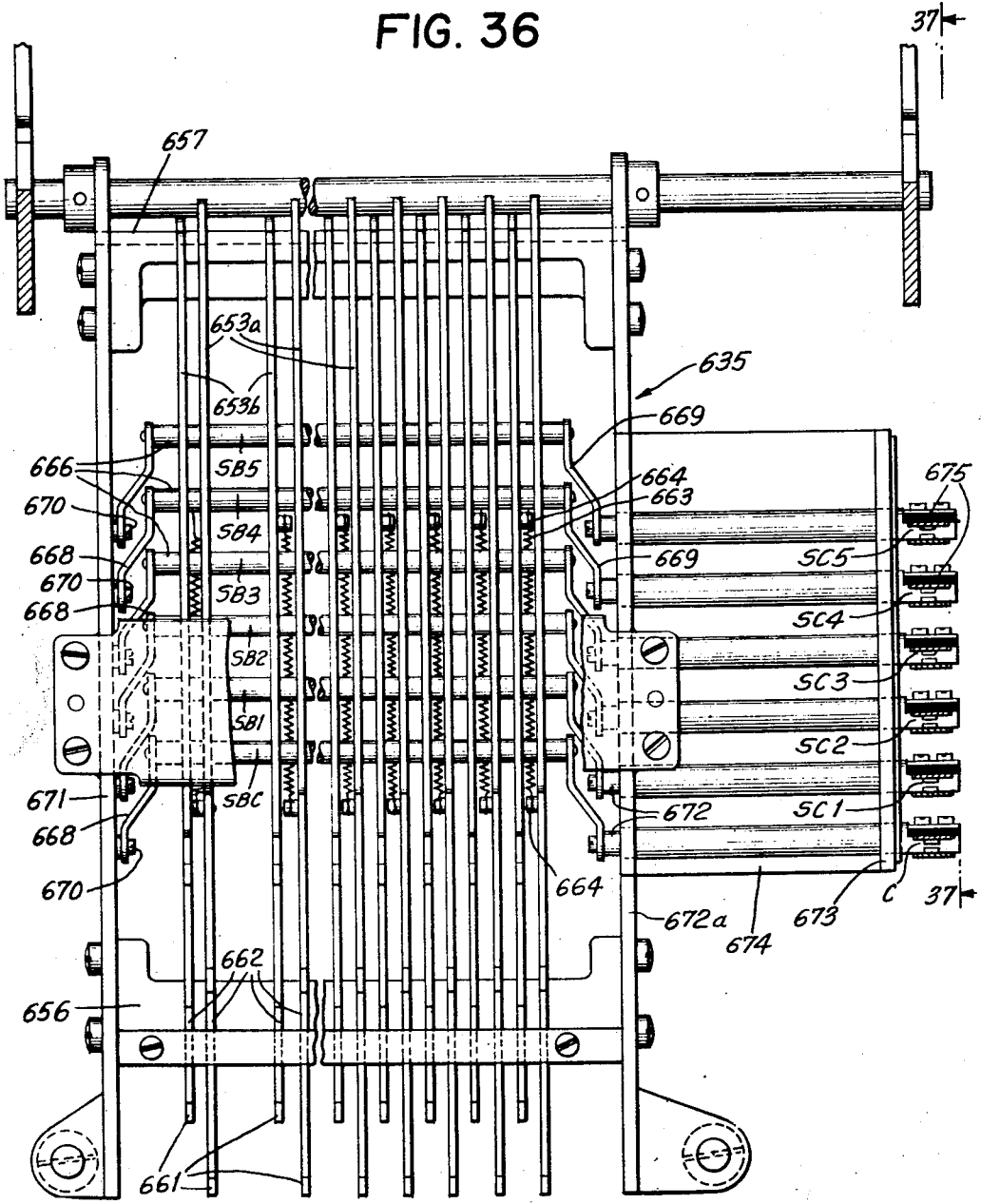

Jan. 30, 1951  F. E. HAMILTON ET AL  2,540,029
SELECTIVELY CONTROLLED RECORDING APPARATUS
Filed Feb. 6, 1948  58 Sheets-Sheet 22

INVENTORS
F. E. HAMILTON
M. F. HAYES
J. D. WOLFE
BY George D. Hicks
ATTORNEY

Jan. 30, 1951　　　F. E. HAMILTON ET AL　　　2,540,029
SELECTIVELY CONTROLLED RECORDING APPARATUS
Filed Feb. 6, 1948　　　　　　　　　　　58 Sheets-Sheet 24
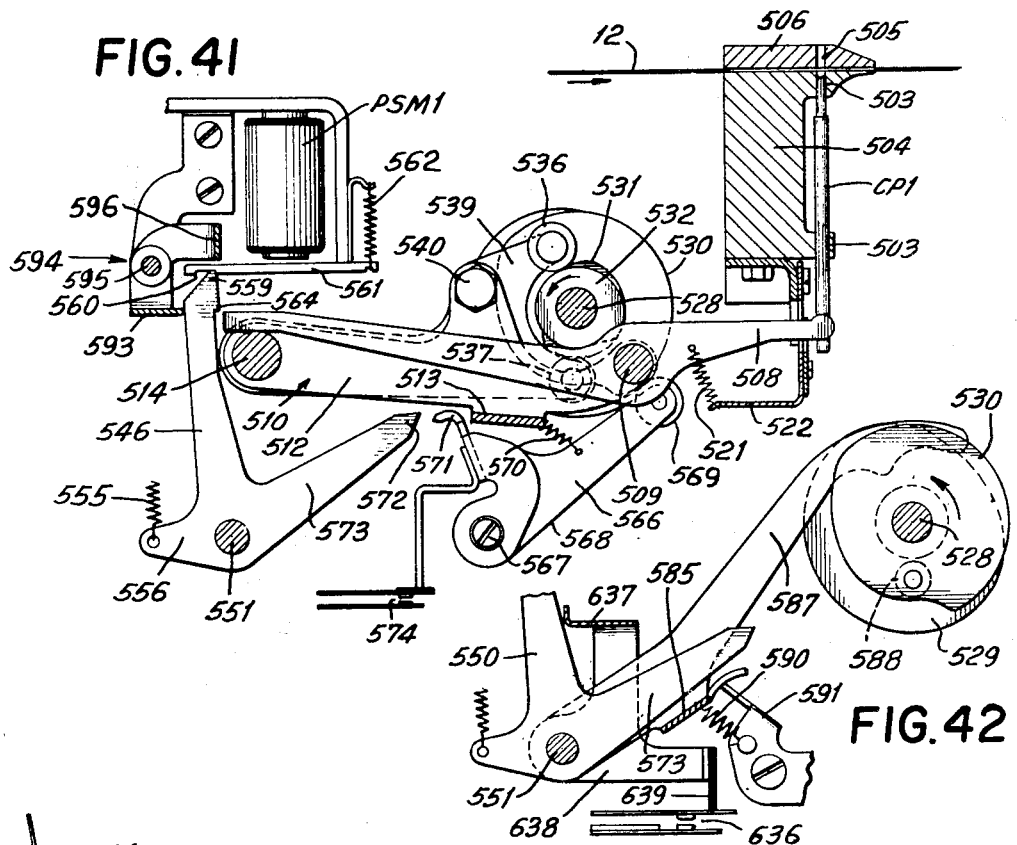
FIG. 41
FIG. 42
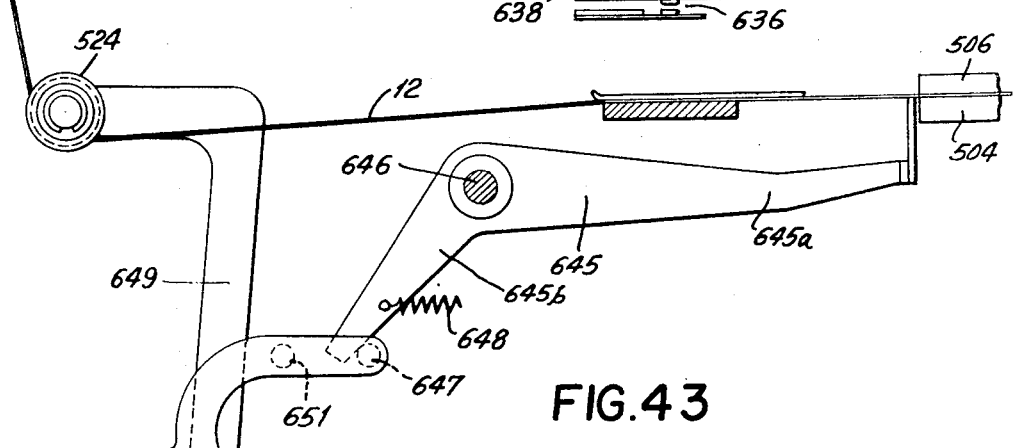
FIG. 43
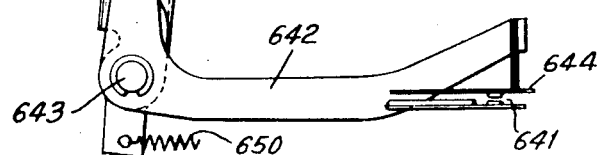
INVENTORS
F. E. HAMILTON
M. F. HAYES
J. D. WOLFE
BY George D. Nichols
ATTORNEY

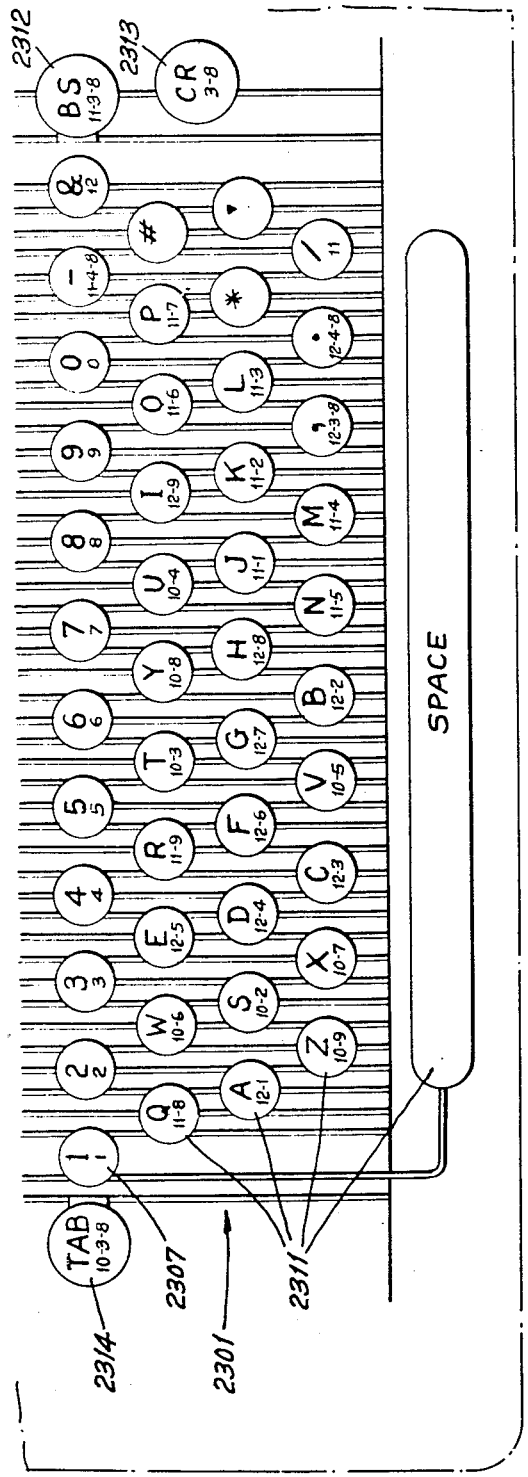
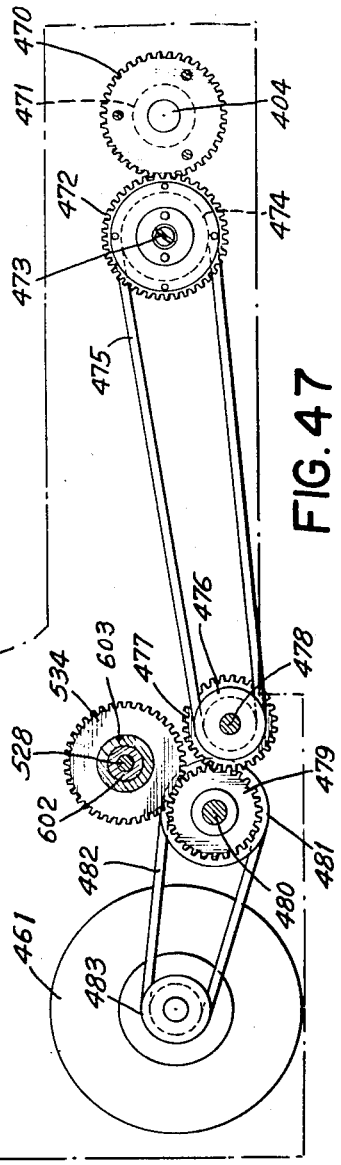

Jan. 30, 1951     F. E. HAMILTON ET AL.     2,540,029
SELECTIVELY CONTROLLED RECORDING APPARATUS
Filed Feb. 6, 1948                          58 Sheets-Sheet 27

INVENTORS
F. E. HAMILTON
M. F. HAYES
J. D. WOLFE
BY George D. Hicks
ATTORNEY

Figures 52, 53:
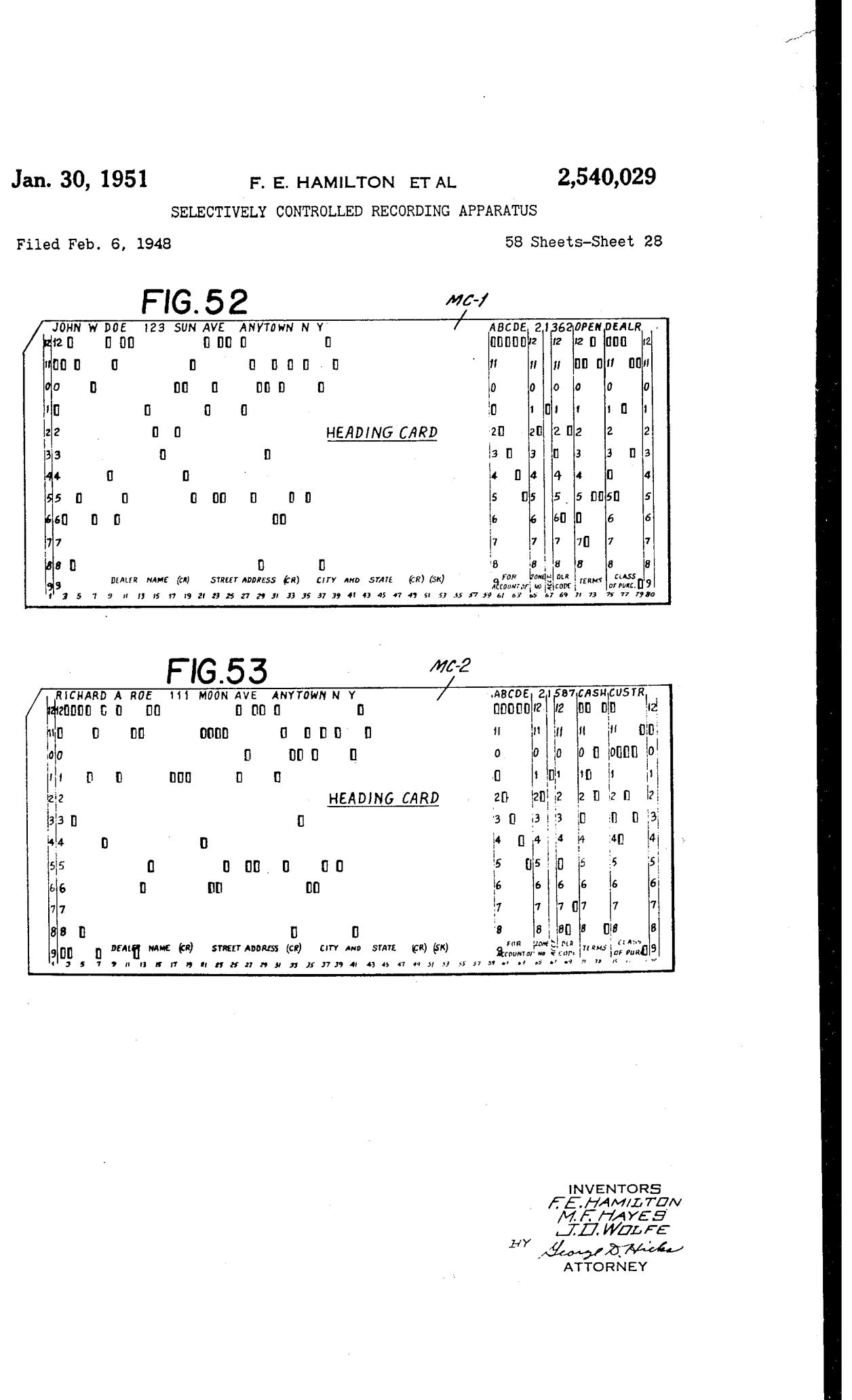

Jan. 30, 1951     F. E. HAMILTON ET AL     2,540,029
SELECTIVELY CONTROLLED RECORDING APPARATUS
Filed Feb. 6, 1948     58 Sheets-Sheet 28

INVENTORS
F. E. HAMILTON
M. F. HAYES
J. D. WOLFE
BY George D. Hicks
ATTORNEY

Figures 54, 55, 56:
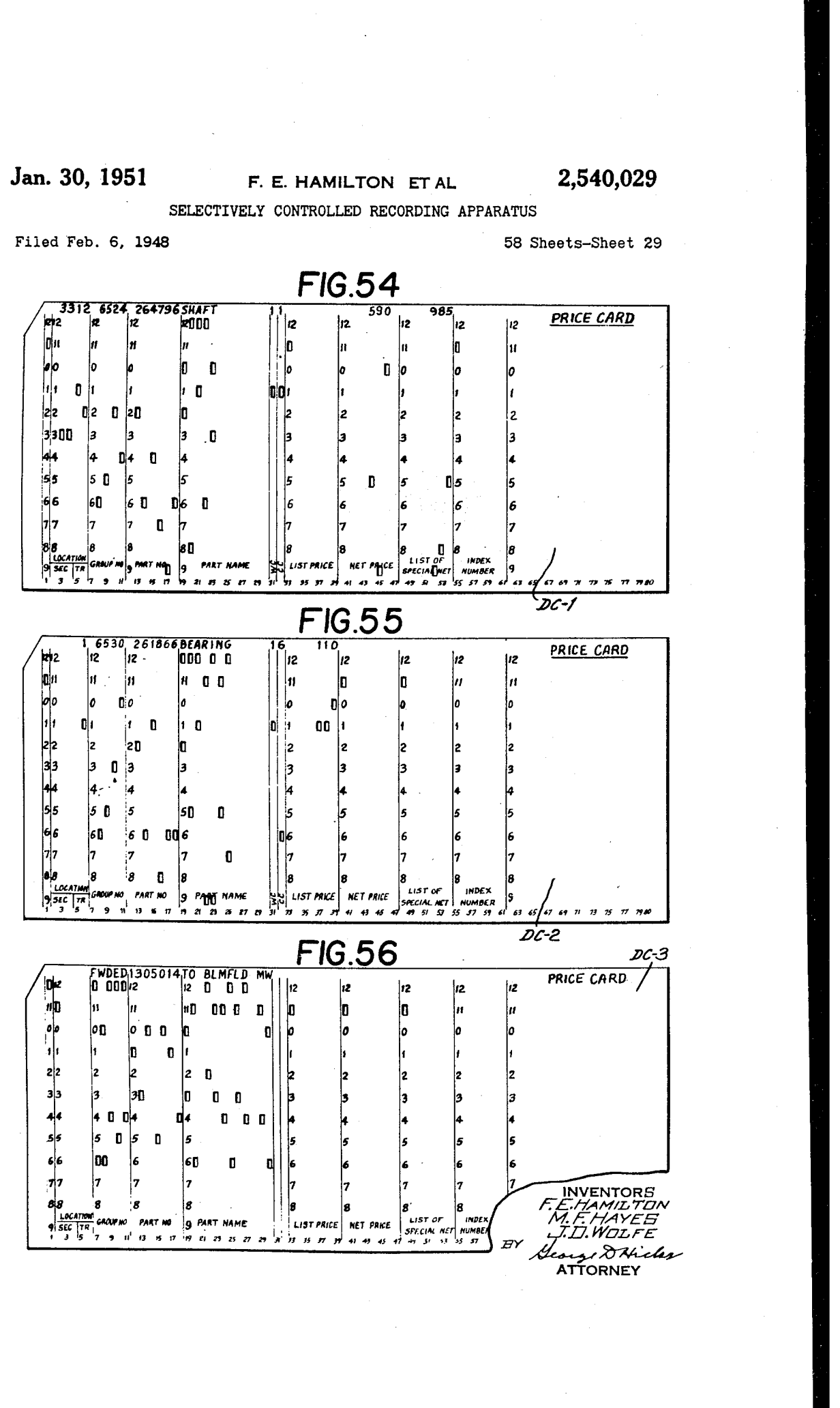

Jan. 30, 1951 F. E. HAMILTON ET AL 2,540,029
SELECTIVELY CONTROLLED RECORDING APPARATUS
Filed Feb. 6, 1948 58 Sheets-Sheet 29

INVENTORS
F.E. HAMILTON
M.F. HAYES
J.D. WOLFE
BY George D Hicks
ATTORNEY

Jan. 30, 1951    F. E. HAMILTON ET AL    2,540,029
SELECTIVELY CONTROLLED RECORDING APPARATUS
Filed Feb. 6, 1948                                58 Sheets-Sheet 30

FIG. 57

PARTS ORDER — INVOICE
XYZ CORPORATION
ANYTOWN, NEW YORK

MAILING COPY

CHARGE TO
JOHN W DOE                                SHIP TO
123 SUN AVE                               ADDRESS
ANYTOWN N Y

| FOR ACCT. OF | ZONE | ACCT. CD | DEALER CODE | TERMS | CLASS OF PUR. | ORDER NO. | PAGE NO. | SHIPPED WITH |
|---|---|---|---|---|---|---|---|---|
| ABCDE | 2 | 1 | 362 | OPEN | DEALR | 13 | 1 | |
| ORDER NO. & DATE | | DATE REC'D | DATE WRIT. | DATE SCHED. | ADD. DISC. | PPD.—COLL. | | SHIPPED VIA |
| 7/23 | | 7/25 | 7/26 | 7/31 | | | | |

| GROUP NO. | PART NO. | PART NAME | Wheel Code | Car Code | QUANTITY ORD'ED | B.O. | SHIP'D | UNIT PRICES LIST | NET | LIST OF SPEC. NET | INVO AMO |
|---|---|---|---|---|---|---|---|---|---|---|---|
| 6524 | 264796 | SHAFT | 1 | 1 | 1 | | | | 5 90 | 9 85 | |
| 6530 | 261866 | BEARING | 1 | 6 | 2 | | | 1 10 | | | |
| FWDED | 1305014 | TO BLMFLD MW | | | 2 | | | | | | |
| 6020 | 1394255 | KNUCKLE | 1 | 1 | 1 | | | | 5 20 | | |

| LOCATION SEC. | TR. | GROUP NO. | PART NO. | PART NAME |
|---|---|---|---|---|
| 33 | 12 | 6524 | 264796 | SHAFT |

| QUANTITY | PICKER | ORDER NO. | PAGE NO. |
|---|---|---|---|
| 1 | | 13 | 1 |

| LOCATION SEC. | TR. | GROUP NO. | PART NO. | PART NAME |
|---|---|---|---|---|
| 2 | 1 | 6530 | 261866 | BEARING |

| QUANTITY | PICKER | ORDER NO. | PAGE NO. |
|---|---|---|---|
| 2 | | 13 | 1 |

| LOCATION SEC. | TR. | GROUP NO. | PART NO. | PART NAME |
|---|---|---|---|---|
| 25 | 1 | 6020 | 1394255 | KNUCKLE |

| QUANTITY | PICKER | ORDER NO. | PAGE NO. |
|---|---|---|---|
| 2 | | 13 | 1 |

1234567890123456789012345678901234567890
11        20        30        40      50

INVENTORS
F. E. HAMILTON
M. F. HAYES
J. D. WOLFE
BY George D. Hicks
ATTORNEY

Jan. 30, 1951   F. E. HAMILTON ET AL   2,540,029
SELECTIVELY CONTROLLED RECORDING APPARATUS
Filed Feb. 6, 1948   58 Sheets-Sheet 32

| FUNCTION PERFORMED | RELAY ENERGIZED BY CR-5 | | | RELAY ENERGIZED BY CR-5 | FUNCTION PERFORMED |
|---|---|---|---|---|---|
| | | MASTER | DETAIL | | |
| | | | | R9 | CARD FEED OFF |
| | | | | R8 | CARD FEED ON |
| SKIP OFF | R32 | | | R32 | SKIP OFF |
| CARRIAGE RETURN | R224-R33 | | | R9 | CARD FEED OFF |
| CARD FEED ON-#1 TYPE. OFF | R137 | | | R19 | RESET CONTROL |
| #1 TYPEWRITER ON | R3 | | | R4 | #1 TYPEWRITER OFF |
| | | | | R64-R116 | UNIT NET PRICE-SKIP CONTROL |
| | | | | R8 | CARD FEED ON |
| | | | | R3 | #1 TYPEWRITER ON |
| CARD FEED OFF | R9 | | | | |
| | | | | R143 | DIAGONAL CONTROL |
| CARD FEED ON | R8 | | | R9 | CARD FEED OFF |
| PUNCH ON | R7 | | | R8 | CARD FEED ON |
| CARD FEED OFF | R9 | | | R32 | SKIP OFF |
| TABULATING | R221 | | | R3 | #1 TYPEWRITER ON |
| CARD FEED ON-PUNCH OFF | R136 | | | R9 | CARD FEED OFF |
| CARD FEED OFF-PUNCH ON | R129 | | | R221-R64 | NET PRICE TAB. CONTROL |
| PUNCH OFF | R237 | | | R137 | CARD FEED ON-#1 TYPE. OFF |
| CARD FEED ON | R8 | | | R3 | #1 TYPEWRITER ON |
| PUNCH ON | R7 | | | | |
| CARD FEED OFF | R9 | | | R143 | DIAGONAL CONTROL |
| TABULATING | R221 | | | R9 | CARD FEED OFF |
| CARD FEED ON-PUNCH OFF | R136 | | | R8 | CARD FEED ON |
| | | | | R32 | SKIP OFF |
| | | | | R9 | CARD FEED OFF |
| CARD FEED OFF | R9 | | | R138 | #1 TYPE.OFF-#2 TYPE.ON |
| | | | | R127 | READOUT ORDER NO.-5TH POS. |
| | | | | R126 | READOUT ORDER NO.-4TH POS. |
| CARD FEED ON | R8 | | | R125 | READOUT ORDER NO.-3RD POS. |
| | | | | R124 | READOUT ORDER NO.-2ND POS. |
| | | | | R123 | READOUT ORDER NO.-UNITS POS. |
| | | | | R122 | READOUT PAGE NO.-2ND POS. |
| CARD FEED OFF | R9 | | | R35 | READOUT PAGE NO. UNITS POS. |
| TABULATING | R221 | | | R3 | #1 TYPEWRITER ON |
| | | | | R224-R33 | CARRIAGE RETURN |
| #1 TYPEWRITER OFF | R4 | | | R135 | #1 TYPE. OFF-#2 TYPE OFF |
| STORAGE TEST | R2 | | | | |
| PUNCH ON | R7 | | | R15 | EJECT CYCLE CONTROL |
| #1 TYPE.ON-READOUT ORDER NO.-6TH.POS. | R132 | | | | |
| READOUT ORDER NO.-5TH POS. | R127 | | | | |
| READOUT ORDER NO.-4TH POS. | R126 | | | | |
| READOUT ORDER NO.-3RD POS. | R125 | | | | ORDER NO. 6TH POS. |
| READOUT ORDER NO.-2ND POS. | R124 | | | | |
| READOUT ORDER NO.-UNITS POS. | R123 | | | | |
| PUNCH OFF | R237 | | | | |
| STORAGE SHIFT | | | | | |
| READOUT PAGE NO.-2ND POS. | R122 | | | | |
| READOUT PAGE NO.-UNITS POS. | R35 | | | | |
| CARRIAGE RETURN | R224-R33 | | | | |
| CARD FEED ON-#1 TYPE OFF | R137 | | | | |
| MASTER CARD CLASS CONTROL | R113 | | | | |
| PROGRAM TAPE FEED OFF | R11 | | | | |
| PUNCH OFF | | | | | |
| HOMING CONTROL | | | | | HOMING CONTROL |

FIG. 59b

INVENTORS
F. E. HAMILTON
M. F. HAYES
J. D. WOLFE
BY George D. Hicks
ATTORNEY

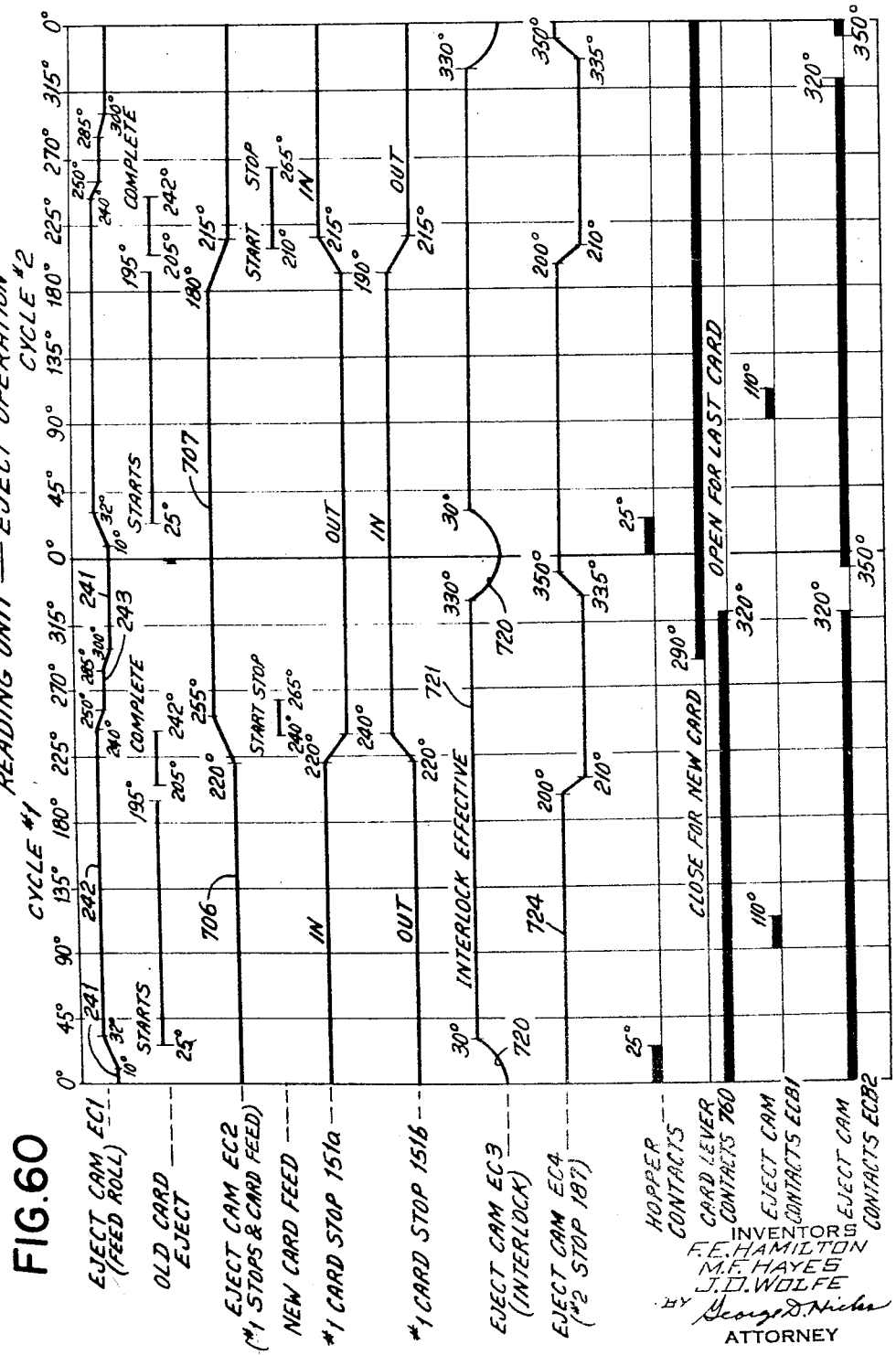

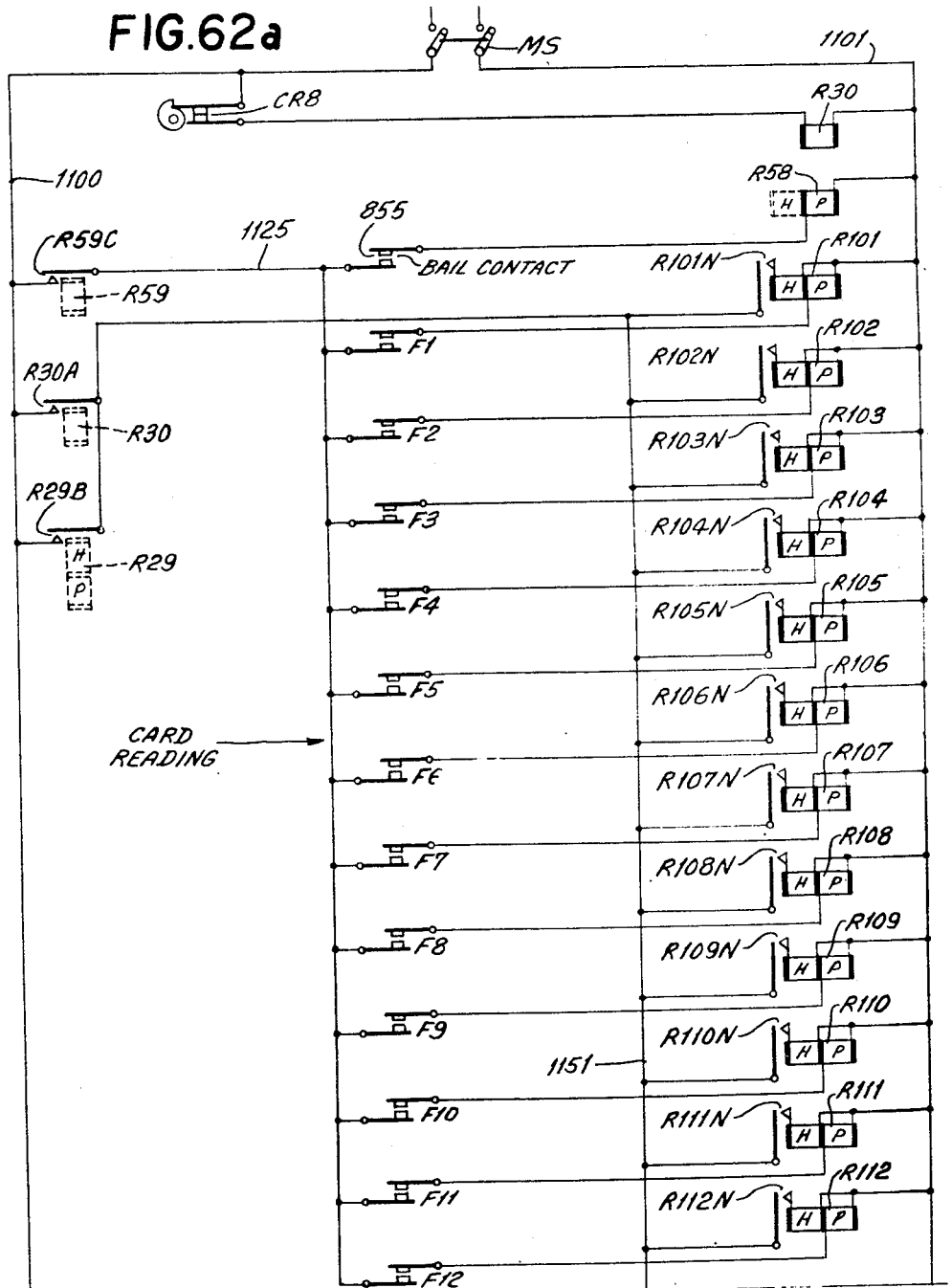

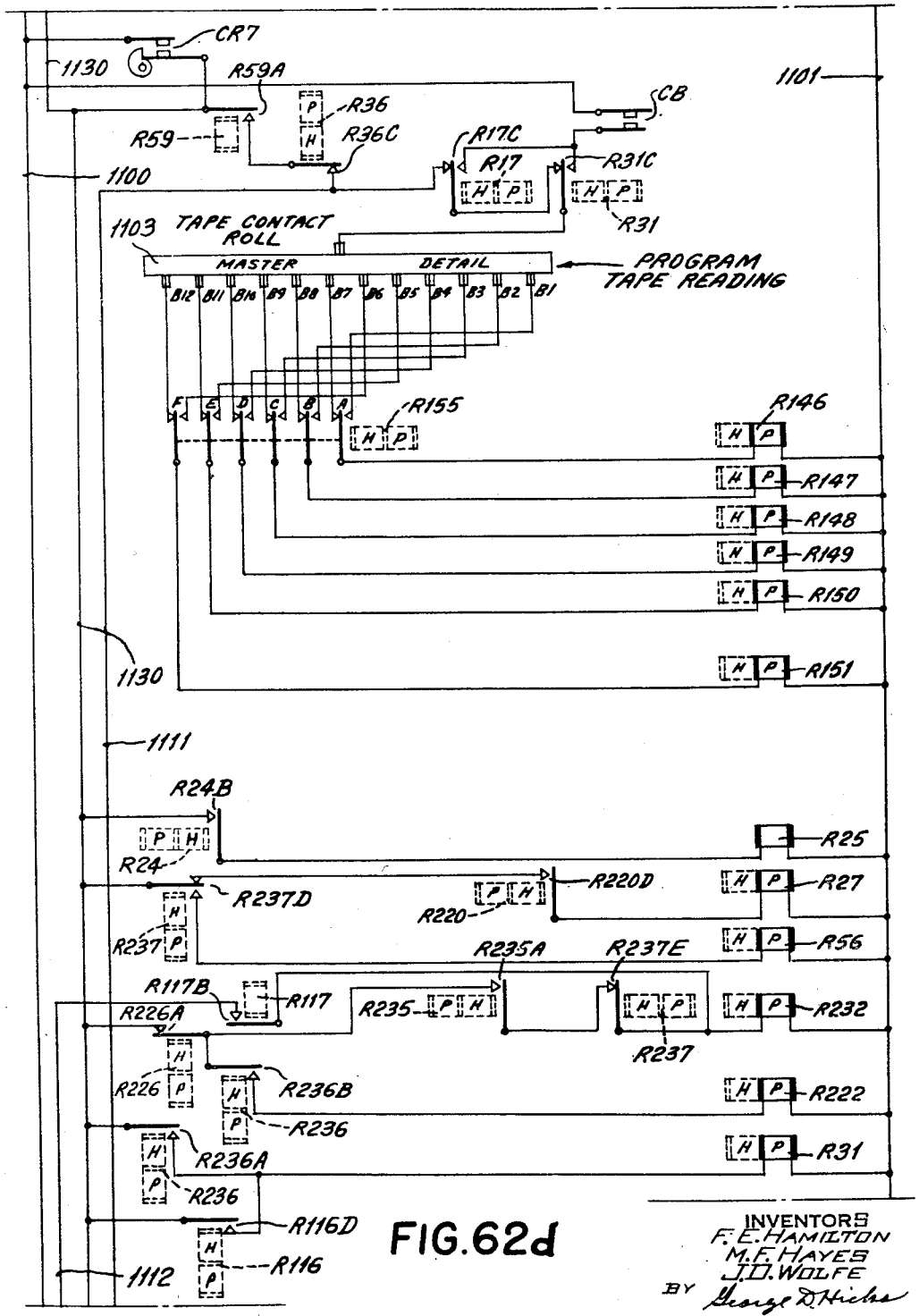

Jan. 30, 1951  F. E. HAMILTON ET AL  2,540,029
SELECTIVELY CONTROLLED RECORDING APPARATUS
Filed Feb. 6, 1948  58 Sheets-Sheet 44

INVENTORS
F. E. HAMILTON
M. F. HAYES
J. D. WOLFE
BY George D. Hicks
ATTORNEY

Jan. 30, 1951 F. E. HAMILTON ET AL 2,540,029
SELECTIVELY CONTROLLED RECORDING APPARATUS
Filed Feb. 6, 1948 58 Sheets-Sheet 58
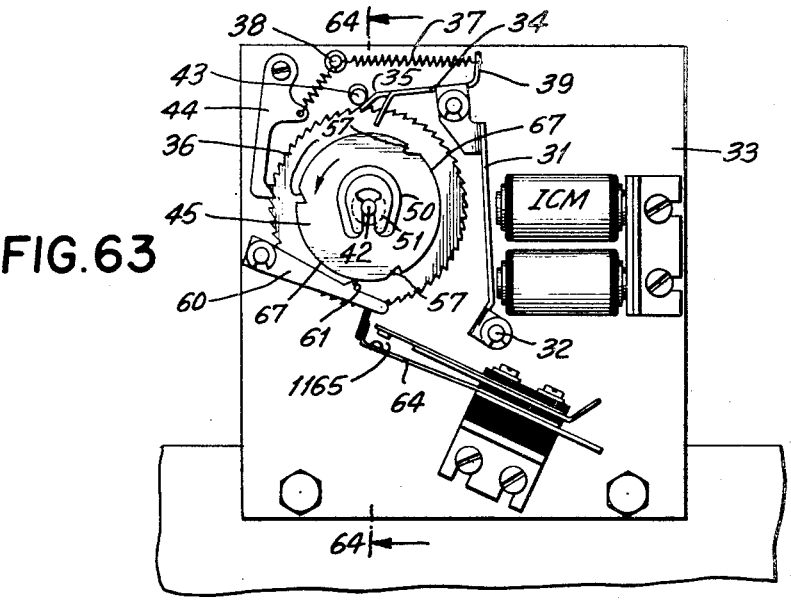
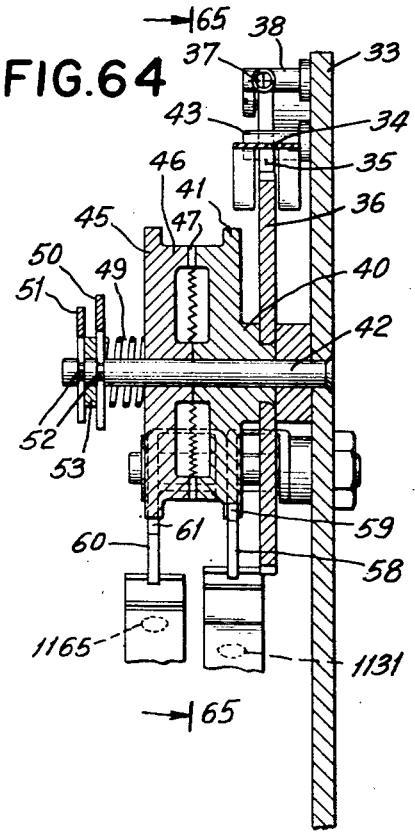
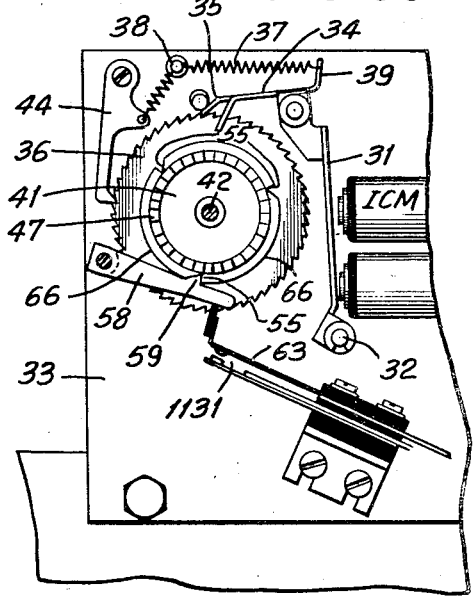
INVENTORS
F. E. HAMILTON
M. F. HAYES
J. D. WOLFE
BY George D. Wicks
ATTORNEY Patented Jan. 30, 1951

2,540,029

UNITED STATES PATENT OFFICE 2,540,029

SELECTIVELY CONTROLLED RECORDING APPARATUS

Francis E. Hamilton, Endicott, Maxwell F. Hayes, Poughkeepsie, and John D. Wolfe, Johnson City, N. Y., assignors to International Business Machines Corporation, New York, N. Y., a corporation of New York Application February 6, 1948, Serial No. 6,664

74 Claims. (Cl. 164—115)

This invention relates to recording apparatus and more particularly to apparatus for selectively recording data under the control of data-representing designations in a record source and it has for a general object to provide apparatus of this type which is of improved construction and arrangement of parts and which operates effectively to record the data in one or more preselected ways.

According to one preferred embodiment of the invention which is discolsed herein and which will be fully explained in detail hereinafter, the record source comprises the conventional statistical record card wherein is recorded, in successive columns thereof, code designations representing selected alphabetic and numeric data. According to such preferred embodiment, means is provided for successively reading the code designations in the record card and for recording such data by printing selected portions of the data on a plurality of copy sheets in a predetermined fashion and by punching code designations of selected portions of the source data in a record tape in accordance with a conventional 5-position code system. Also, in accordance with the preferred embodiment, a programming or sequencing means is provided for selectively controlling the operations of the several means which read the record card, print the data on the copy sheets, and punch the data in the record tape, so that the data is recorded in the preselected manner. In addition to the foregoing, means is provided for manually storing other data and for selectively recording the stored data at predetermined times by printing and punching the stored data under the control of the programming means.

More specifically stated, the preferred embodiment of the present invention may be advantageously used as a part of a composite billing and stock control system wherein the statistical record cards bear code designations identifying customers and their respective accounts and designations representing stocked items or parts ordered by customers and also bear designations representing different types of price data relating to the parts ordered. The data identifying a customer and his account is recorded in a master or heading card, and the data relating to each ordered item or part is recorded in a separate price or detail card. In the operation of the apparatus comprising the preferred embodiment, an invoice is prepared by a first printing machine, such for example, as a typewriter, and the invoice includes in addition to the name and address of the customer and other data identifying the customer and his account, a listing of the individual parts ordered which may include the part serial number, number of parts ordered, and the price of each part. At the same time, a stock picker tag is prepared by a second typewriter which identifies the customer's order number, the serial number of each ordered part, the location of such part in the seller's warehouse, and the number of such parts ordered. The picker tag is used by a stock room clerk in withdrawing the parts from stock for filling the customer's order. Concomitantly with the foregoing, a tape code punch is operated to record in a tape, data identifying each order, each ordered part and the quantity number of each part which is ordered. The tape may be used for preparing inventory cards in a well known manner not disclosed herein, which cards will be used to keep an inventory record for the warehouse. The selective control of the apparatus to provide the foregoing operation is effected jointly by predetermined code designations recorded in a program tape and by code designations recorded in the record cards.

A further and more specific object of the present invention is to provide an improved form of record controlled recording apparatus wherein data from a record source may be selectively recorded in a prescribed fashion on a plurality of copy sheets and under the control of a programming means.

A further object is to provide an improved form of data recording apparatus wherein data from a record source and data stored in a manually operable data storage unit is selectively recorded in a copy sheet under the control of a programming means.

A still further object is to provide data recording apparatus including a new and improved data storage unit and a new and improved data readout means.

A still further object is to provide a new and improved form of program sequencing means for data recording apparatus.

A still further object is to provide a record controlled recording apparatus having a new and improved means for selecting different classes of data from record source sheets.

A still further object of the present invention is to provide record controlled recording apparatus comprising a new and improved reading unit which operates effectively to read and feed a record card containing data-representing designations and also to read and feed a program tape containing, in successive record columns thereof, control designations for selectively controlling the operation of the reading unit and other elements of the record apparatus.

A further object is to provide record controlled recording apparatus comprising a new and improved reading unit wherein record cards may be fed step-by-step at a normal rate in successive operating cycles and may also be fed at a relatively fast rate for the purpose of skipping over selected record fields of the card.

A further object is to provide an improved form of card and tape reading and feeding unit wherein the card and tape may be selectively advanced in a normal step-by-step fashion during successive operating steps and may be advanced together at a relatively fast rate when it is desired to skip over groups of record columns in the card and tape.

A still further object is to provide improved record controlled recording apparatus wherein under the selective control of a programming means, a particular code character recorded in a source record provides for performing one desired function at one time in the operation of the apparatus and provides a different desired function at a different time in the operation thereof.

A still further object is to provide record controlled recording apparatus including a code tape punch wherein a figures-shift code designation is automatically inserted after a space designation and before a designation representing a figures case character.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 is a side elevation of the reading unit shown in Fig. 2, the cover for the card reading part being shown partially;

Fig. 4 is a fragmentary detail section taken on the line 4—4 of Fig. 3 and showing the manner in which a record card is aligned in the card receiving passage;

Figure 1:
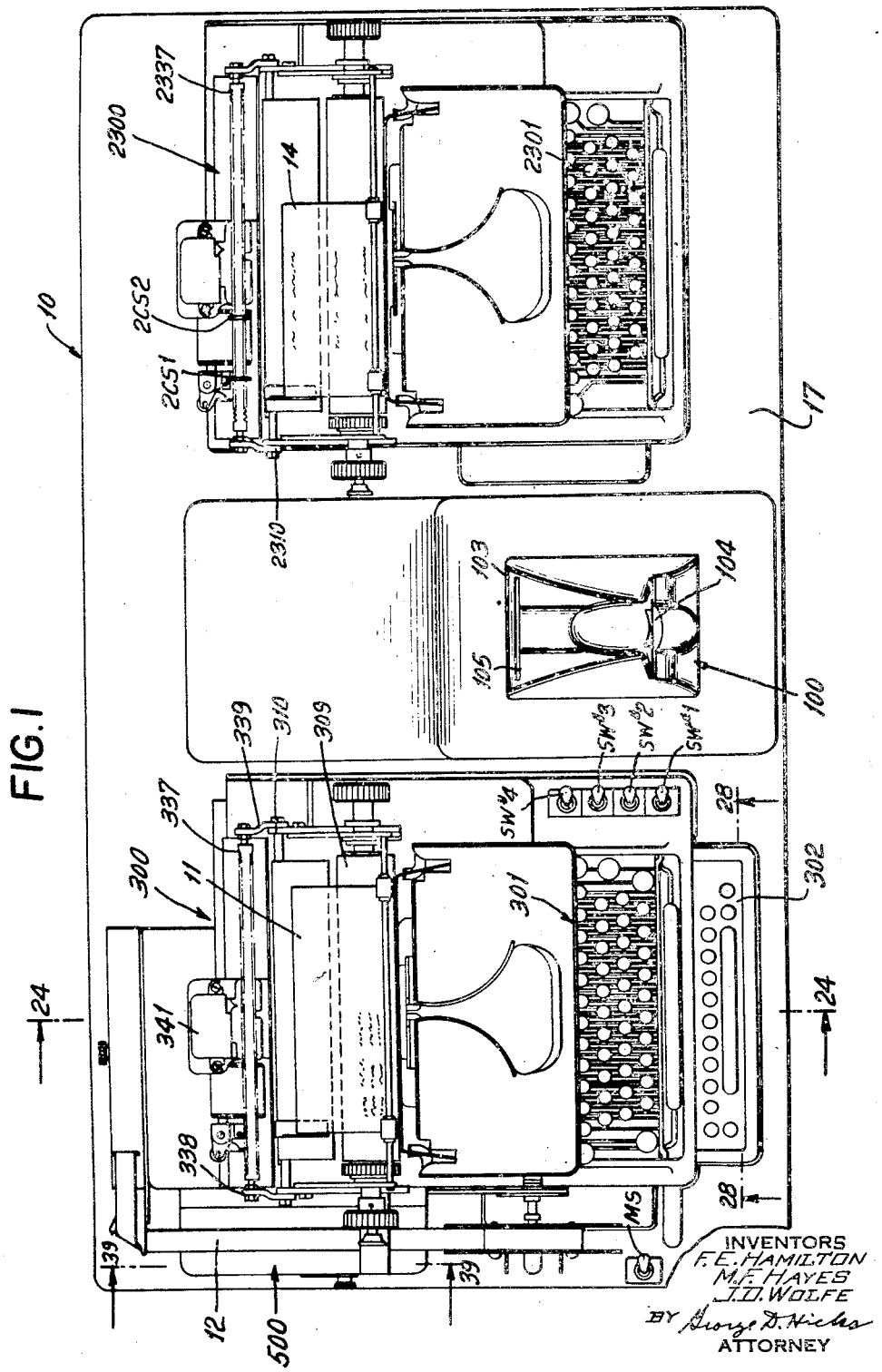
Fig. 1 is a plan view indicating generally the several units composing one preferred embodiment of the present invention disclosed herein.
Figure 2:
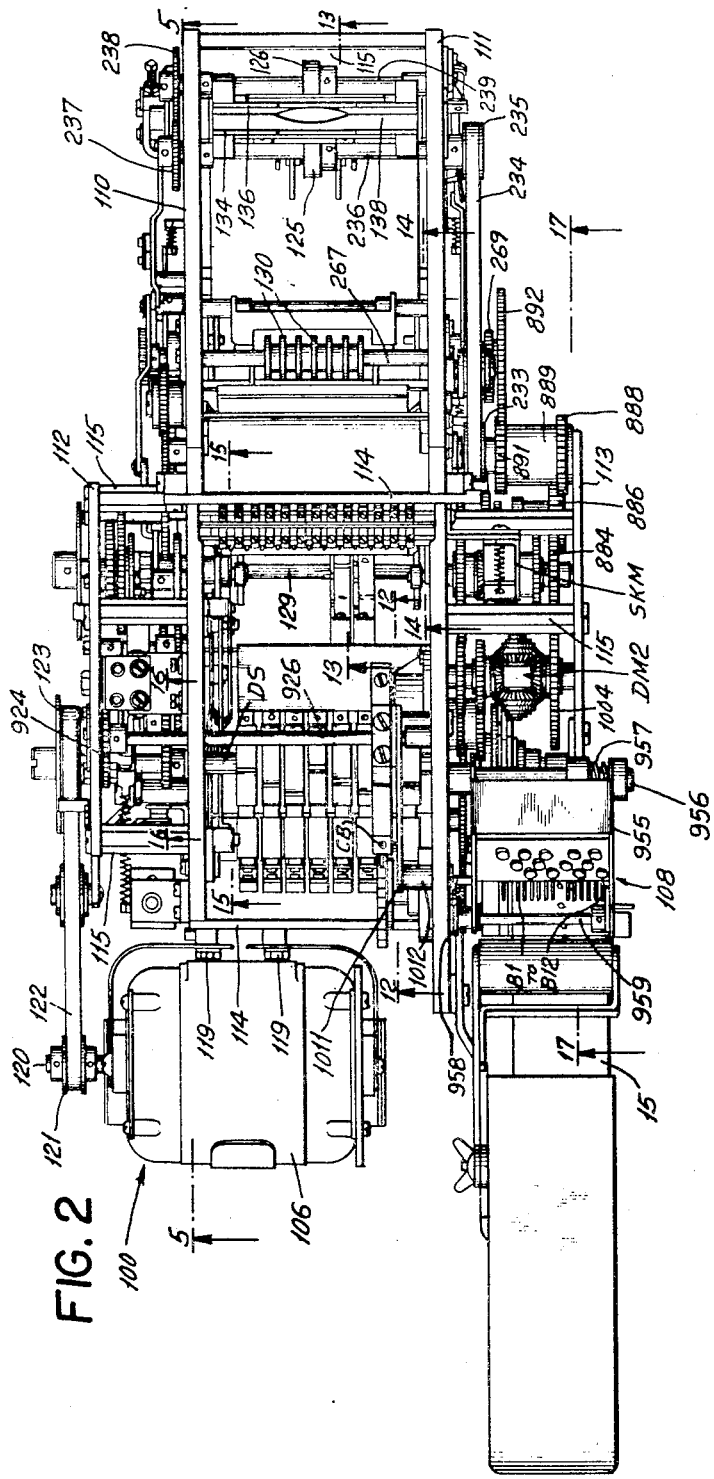
Fig. 2 is a plan view of a reading unit forming a part of the preferred embodiment, the reading unit being shown as it appears when removed from a desk on which it is normally mounted, and the cover for the card reading part of the reading unit being removed for the purpose of disclosing more clearly certain structural elements of the unit.
Figure 12:
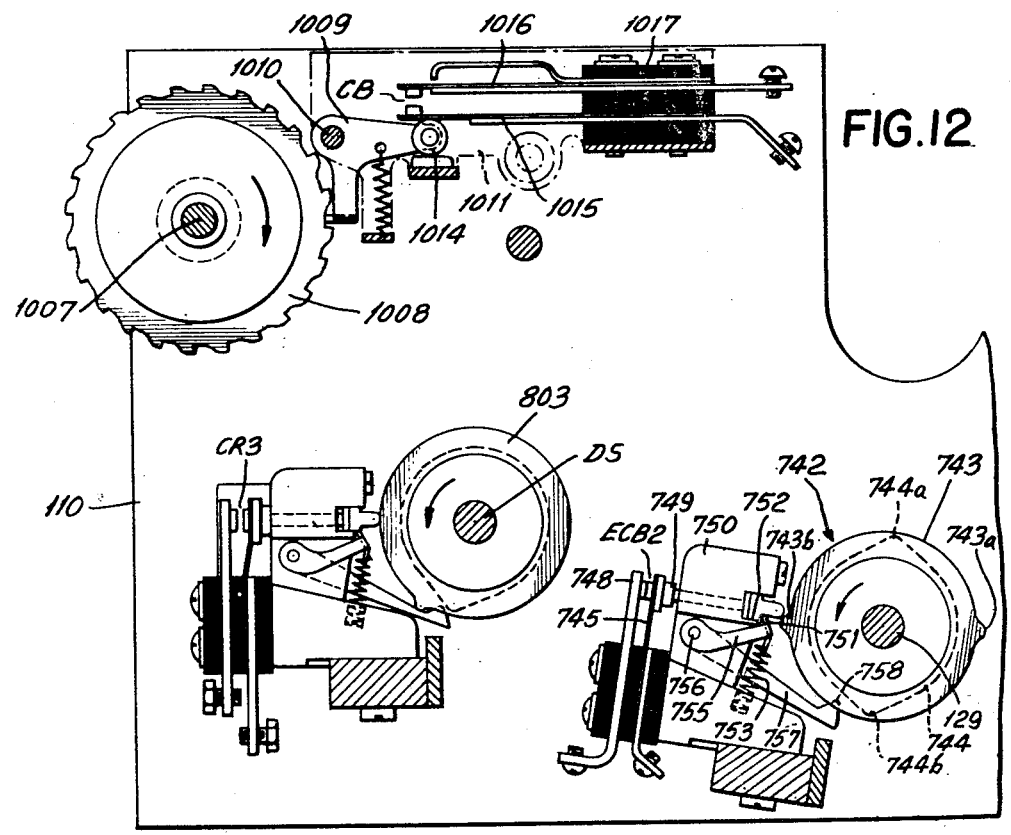
Figure 10:
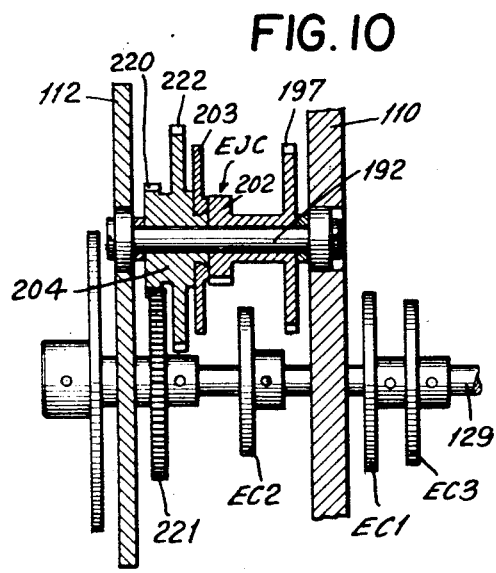
Figure 11:
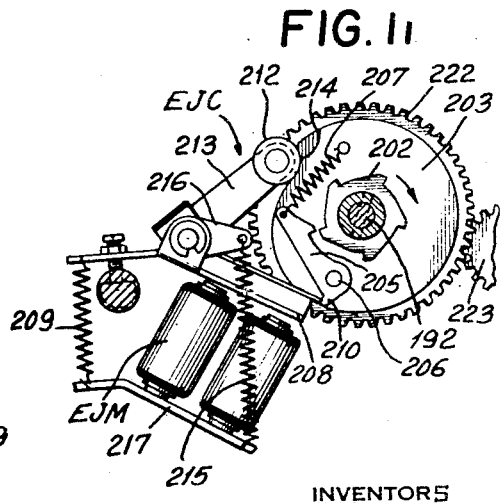
Figure 14:
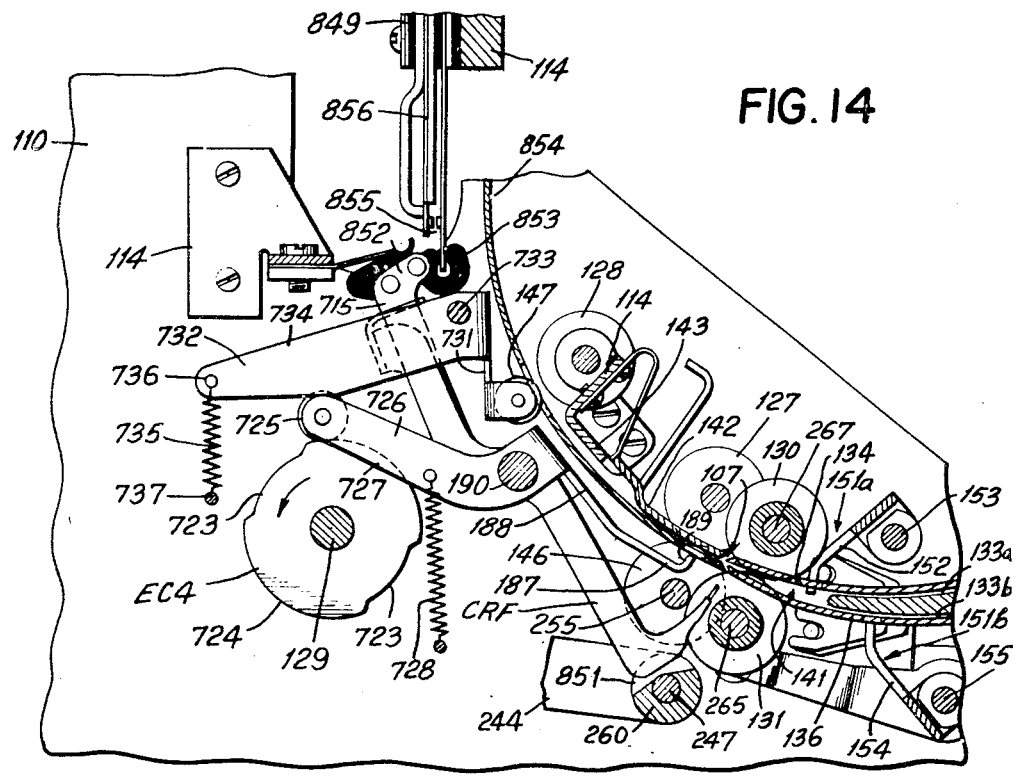
Figure 15:
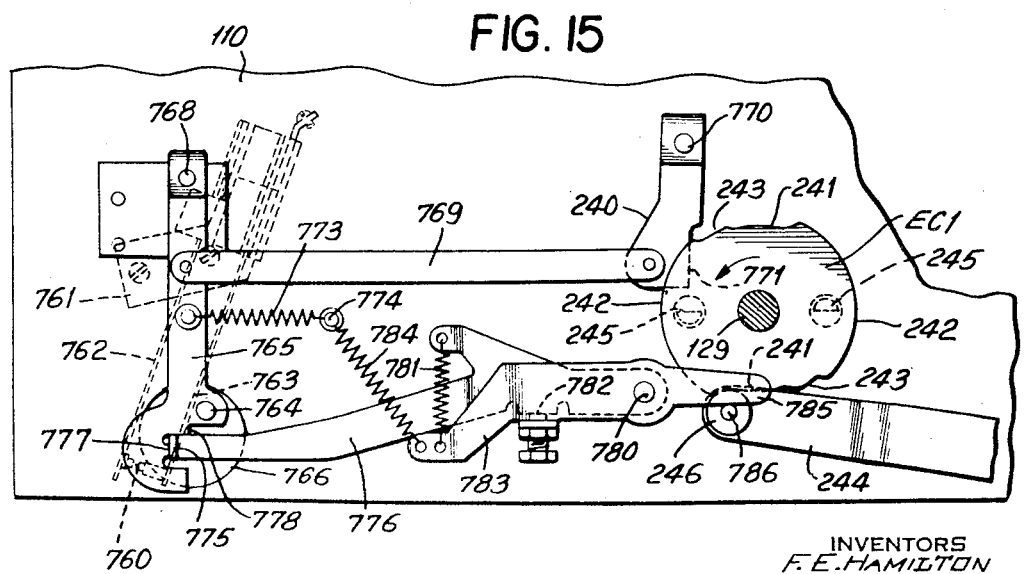
Figure 27:
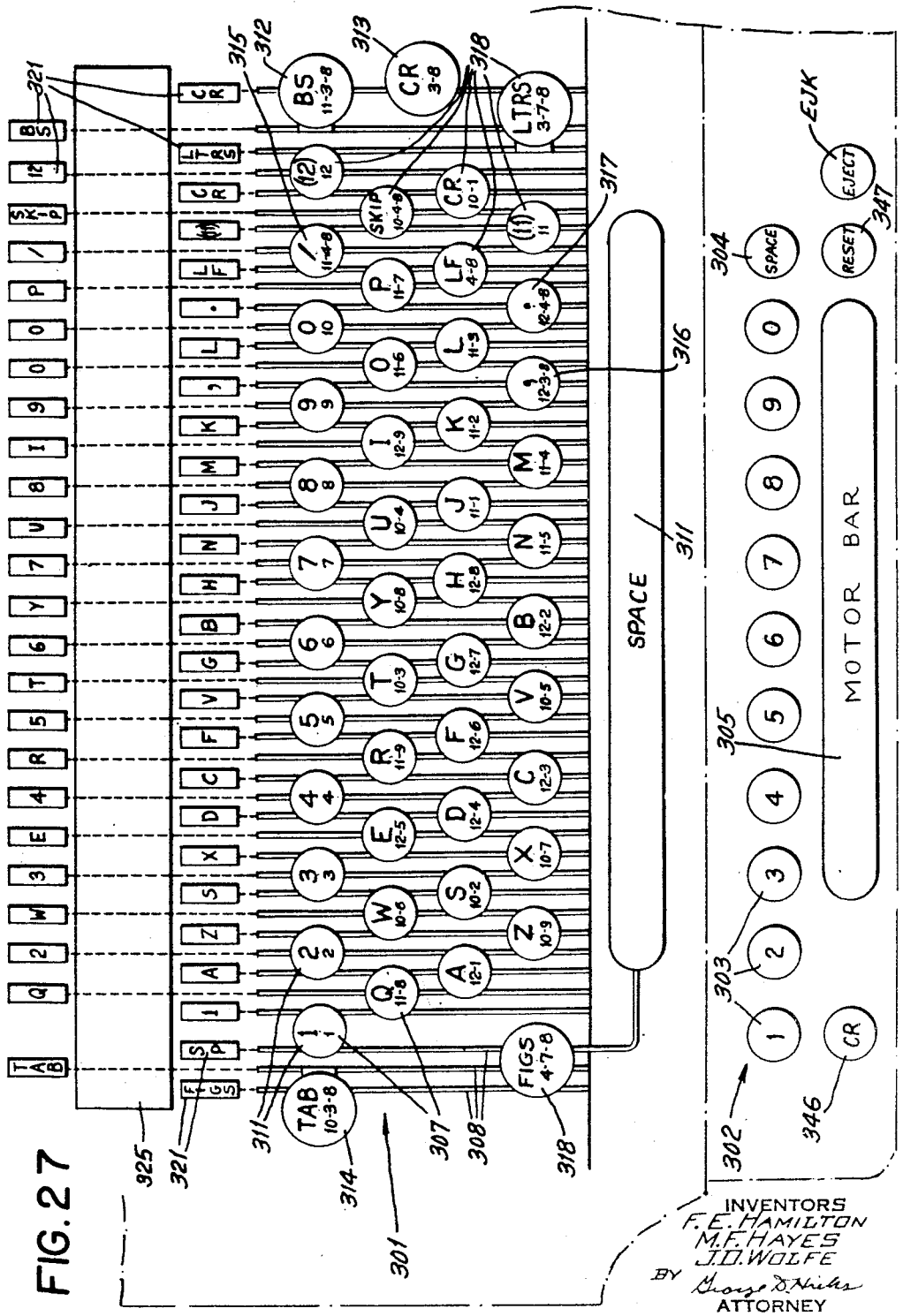
Figure 37:
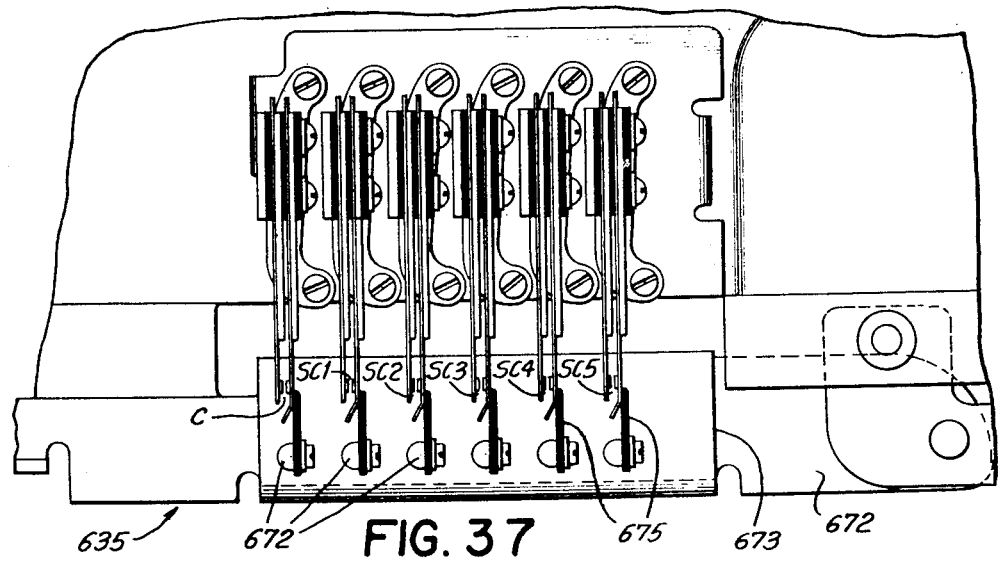
Figure 38:
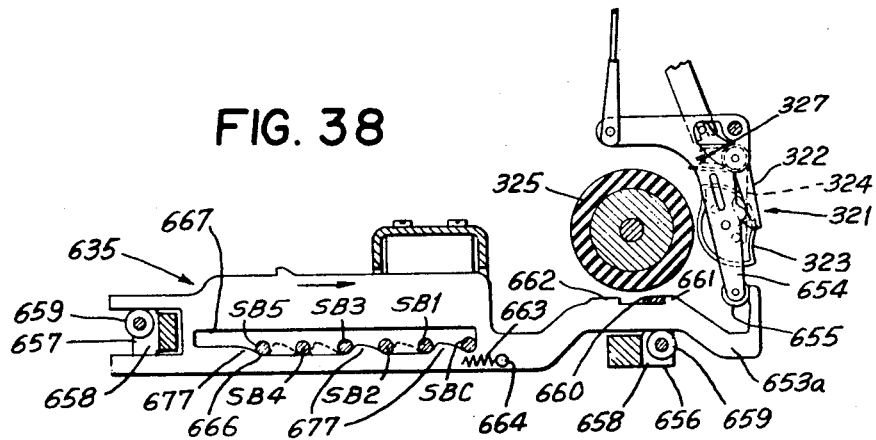
Figure 39:
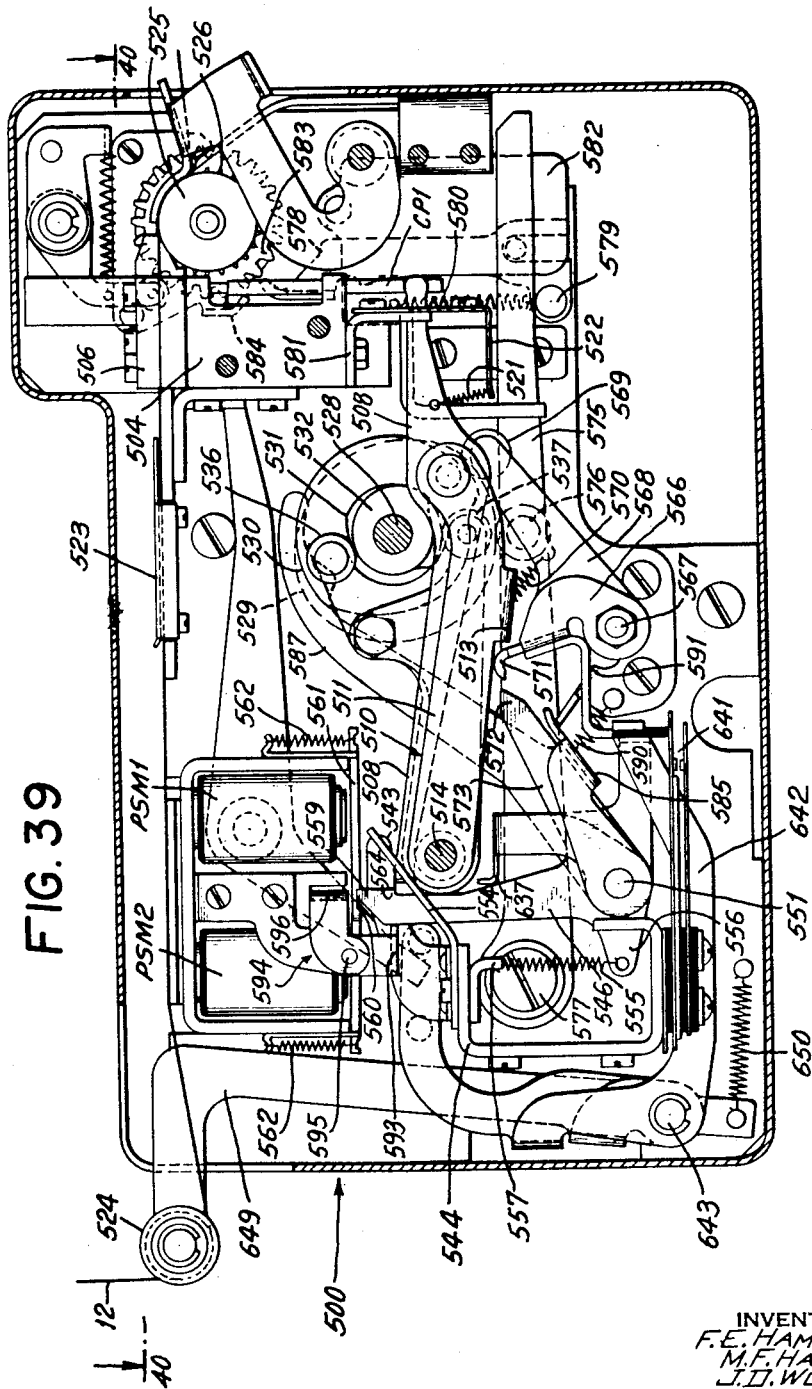
Figure 40:
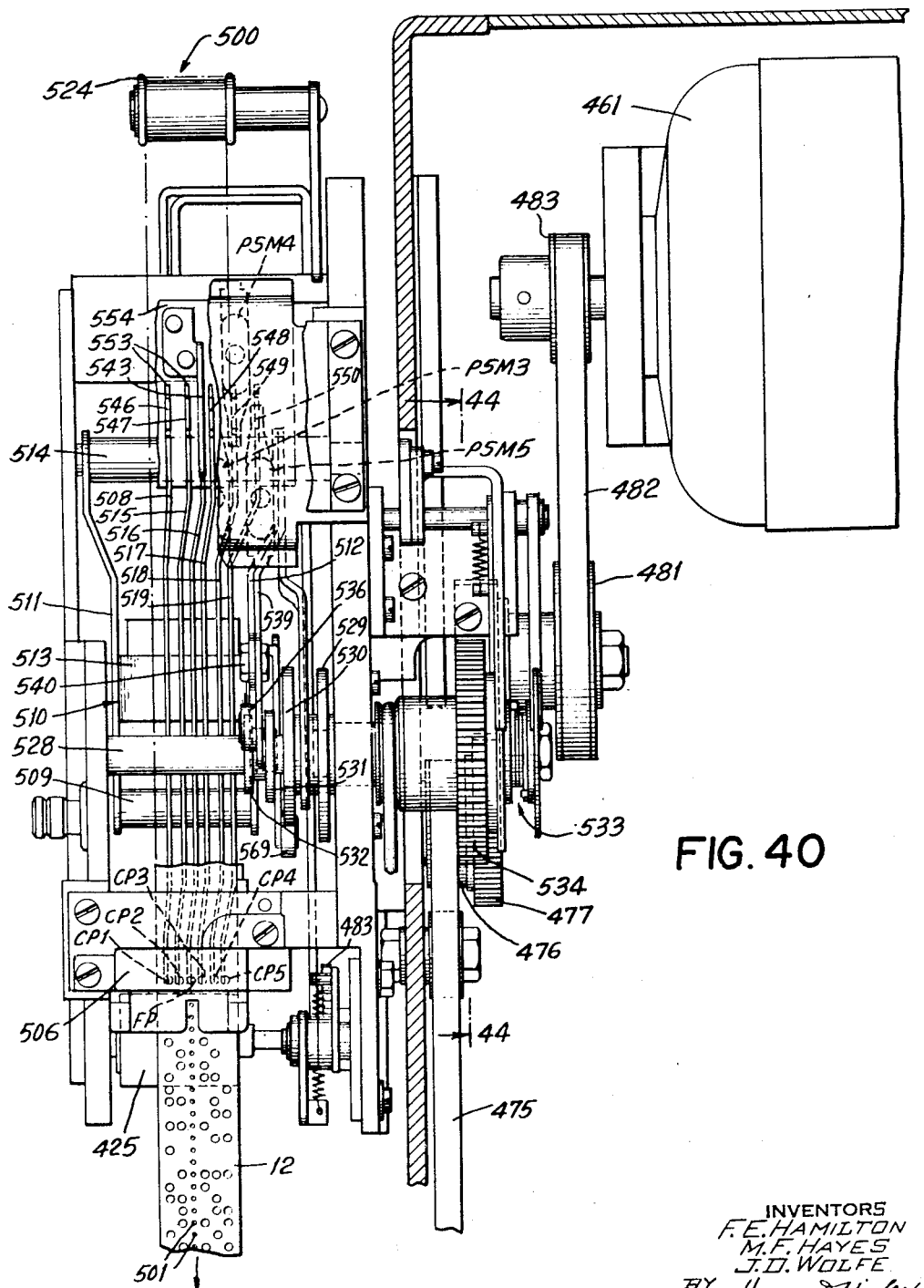
Figure 44:
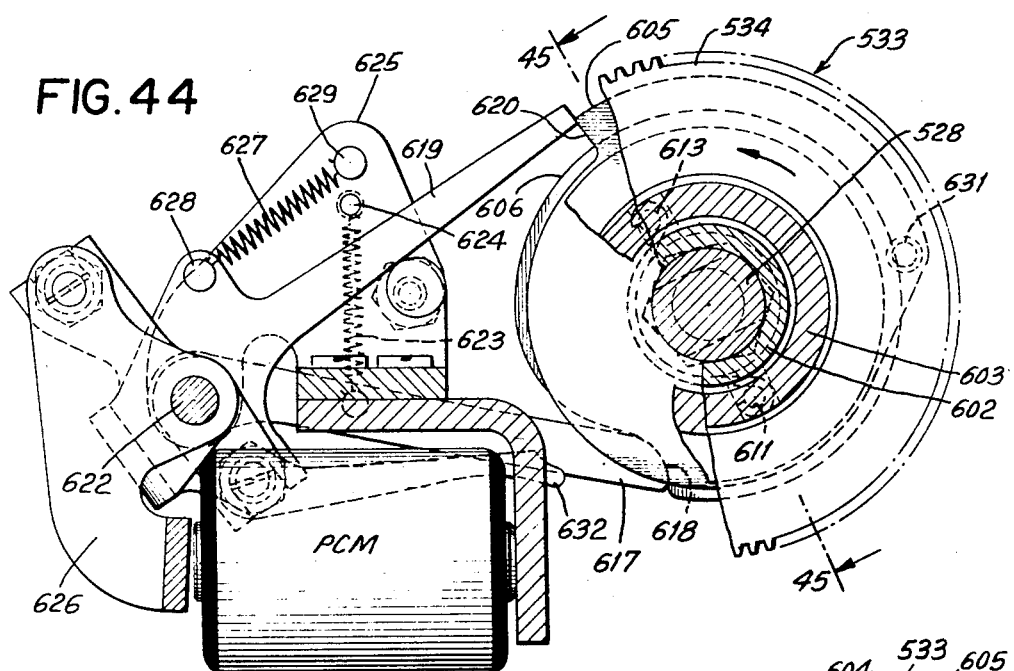
Figure 46:
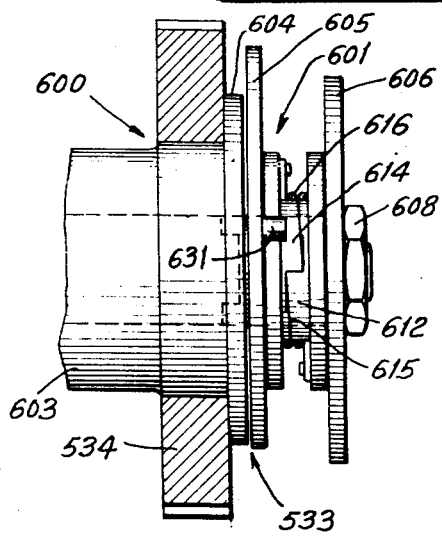
Figure 45:
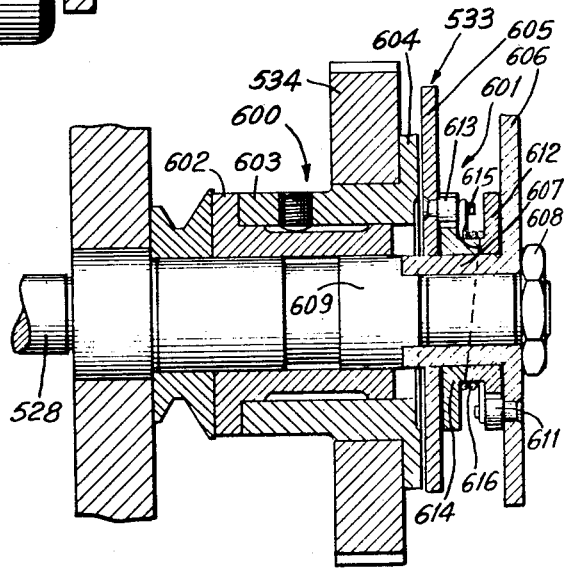
Figure 49:
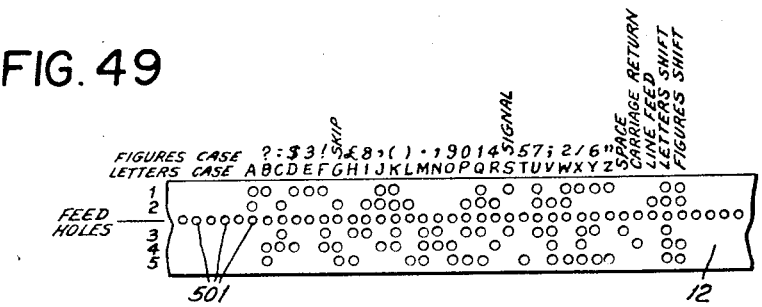

Figs. 5 and 6 when placed end-to-end with Fig. 5 at the left, comprise a longitudinal vertical sectional view of the reading unit which is taken on the line 5—5 of Fig. 2, the driving motor being indicated by dot-and-dash lines and the parts being shown on an enlarged scale;

Fig. 7 is an enlarged detail sectional view showing the manner of latching the hopper contacts;

Fig. 8 is a fragmentary plan section of the reading unit and showing the mechanism for operating the movable eject and movable feed rolls from an eject cam, the plane of the section being indicated generally by the line 8—8 of Fig. 6;

Fig. 9 is a fragmentary plan section showing a portion of the reading unit on an enlarged scale, the plane of the section being indicated by the line 9—9 of Fig. 6;

Fig. 10 is a fragmentary transverse vertical sectional view taken on the line 10—10 of Fig. 6 and showing the drive connection between the eject clutch and the eject cam shaft;

Fig. 11 is a fragmentary vertical section showing the eject clutch and its operating clutch magnet, the plane of the section being taken on the line 11—11 of Fig. 9;

Fig. 12 is an enlarged fragmentary vertical section taken on the line 12—12 of Fig. 2;

Fig. 13 is an enlarged fragmentary vertical section through the card reading and feeding part of the reading unit, the plane of the section being indicated by the line 13—13 of Fig. 2;

Fig. 14 is an enlarged fragmentary vertical section through the card feeding passage, the plane of the section being indicated by the line 14—14 of Fig. 2;

Fig. 15 is a fragmentary detail section showing the manner in which one of the eject cams operates the card lever contacts and the eject operating arm, the plane of the section being indicated by the line 15—15 of Fig. 9;

Fig. 16 is an enlarged fragmentary vertical section through the tape feed clutch, the plane of the section being indicated by the line 16—16 of Fig. 2;

Fig. 17 is an enlarged fragmentary vertical section showing driving mechanism for the card and for the program, or sequence control, tape, the plane of the section being indicated by the line 17—17 of Fig. 2;

Fig. 18 is a fragmentary plan section on the line 18—18 of Fig. 17;

Fig. 19 is an enlarged fragmentary detail view showing in side elevation the cam and linkage mechanism for operating the card reading fingers;

Fig. 20 is a fragmentary sectional view showing the differential drive mechanism for the program tape, the plane of the section being indicated by the line 20—20 of Fig. 17;

Fig. 21 is a fragmentary vertical section on the line 21—21 of Fig. 20;

Fig. 22 is a fragmentary vertical section showing portions of the skip clutch and driving connections therefor, the plane of the section being indicated by the line 22—22 of Fig. 17;

Fig. 23 is an enlarged fragmentary vertical section of the skip clutch and the driving means therefor, the section being indicated by the line 23—23 of Fig. 22;

Fig. 24 is a vertical transverse sectional view taken on the line 24—24 of Fig. 1 and showing on an enlarged scale the structure of one of the typewriters which forms a unit of the illustrated embodiment;

Fig. 25 is an enlarged fragmentary plan section of the back of the typewriter shown in Fig. 24, the general plane of the section being indicated by the broken line 25—25 of Fig. 24;

Fig. 26 is a fragmentary detail vertical section taken on the line 26—26 of Fig. 25 showing the manner in which interlock control contacts are operated by control stops on the typewriter of Figs. 24 and 25;

Fig. 27 is a diagrammatic view indicating in plan the main and auxiliary keyboards of the typewriter of Figs. 24 to 26, inclusive, and also indicating the power roll of the typewriter and the position of the operating cam units tripped by the actuation of the keys comprising the main keyboard;

Fig. 28 is a fragmentary vertical section taken on the line 28—28 of Fig. 1 and showing on an enlarged scale the auxiliary keyboard of the typewriter of Figs. 24 to 26, inclusive;

Fig. 29 is a fragmentary transverse vertical section showing the locking means for the auxiliary keyboard, the plane of the section being indicated by the line 29—29 of Fig. 28;

Fig. 30 is a fragmentary transverse vertical section on the line 30—30 of Fig. 28 and showing the manner in which a digit key of the auxiliary keyboard operates a pair of bail contacts;

Fig. 31 is a fragmentary vertical section showing a mechanical translator unit which is operated by a remote control source and which functions to actuate keys of the main keyboard of the typewriter of Figs. 24 to 26, inclusive, the plane of the section being indicated by the line 31—31 of Fig. 24;

Fig. 32 is a transverse vertical sectional view taken on the line 32—32 of Fig. 31 and showing details of the mechanical translator, the view showing the translator parts when looking in the direction opposite to that of Fig. 24;

Fig. 33 is a fragmentary vertical section showing a detail of the mechanical translator, the plane of the section being indicated by the line 33—33 of Fig. 31;

Fig. 34 is an enlarged plan section of the mechanical translator, the plane of the section being indicated by the line 34—34 of Fig. 24;

Fig. 35 is an end view of the clutch and drive for the mechanical translator, the plane of the view being indicated by the line 35—35 of Fig. 31;

Fig. 36 is an enlarged plan sectional view taken on the line 36—36 of Fig. 24, and showing a code selector unit which is operated by actuation of keys of the typewriter of Fig. 24 and which functions to control the operation of a tape punch to record according to a conventional 5-position code, the code designations representing the different character printing and functional operations of the typewriter;

Fig. 37 is a detail fragmentary end view showing the punch control contacts and their actuating shafts which are operated by the selector unit of Fig. 36, the plane of the view being indicated by the line 37—37 of Fig. 36;

Fig. 38 is a fragmentary transverse section showing the manner in which the front cam units of the typewriter of Fig. 24 operate their corresponding selector slides of the cole selector unit, the Fig. 24 showing the manner in which the back cam units operate their corresponding selector slides;

Fig. 39 is an enlarged vertical section showing a tape punch which records in a 5-position code certain selected data during the operation of the illustrated embodiment, the plane of the section being indicated by the line 39—39 of Fig. 1;

Fig. 40 is a fragmentary plan sectional view with parts broken away to show the interior working parts of the punch of Fig. 39 and also showing a portion of the typewriter frame and the motor for driving the punch, the plane of the section being indicated by the line 40—40 of Fig. 39;

Fig. 41 is a fragmentary detail sectional view showing the operating relationship of certain of the elements of the tape punch of Figs. 39 and 40;

Figs. 42 and 43 are also fragmentary detail sectional views showing the operating relationship of other parts of the tape punch of Figs. 39 and 40;

Fig. 44 is a fragmentary detail sectional view taken on the line 44—44 of Fig. 40 and showing on an enlarged scale certain of the elements of a clutch for operatively connecting the tape punch to a source of power;

Fig. 45 is a fragmentary detail sectional view taken on the line 45—45 of Fig. 44;

Fig. 46 is an outside view of the clutch parts shown in section in Fig. 45;

Fig. 47 is a detail view showing the mechanical driving mechanism for the punch of Figs. 39 to 46, inclusive, and for the translator of Figs. 31 to 35, inclusive;

Fig. 48 is a diagram illustrating in plan the keyboard of the second typewriter of the illustrated embodiment, which appears at the right in Fig. 1;

Fig. 49 shows a fragment of a record tape of the kind which is perforated by the punch of Figs. 39 to 46, inclusive, and showing all of the code designations of a well-known 5-position telegraphic code system which is used in the recording of selected data by the tape punch of Figs. 39 to 46, inclusive.

Figure 50:
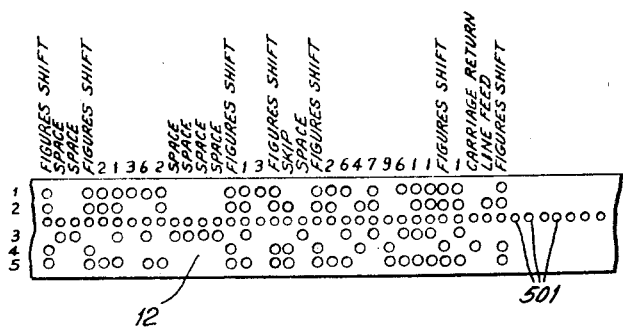
Figure 51:
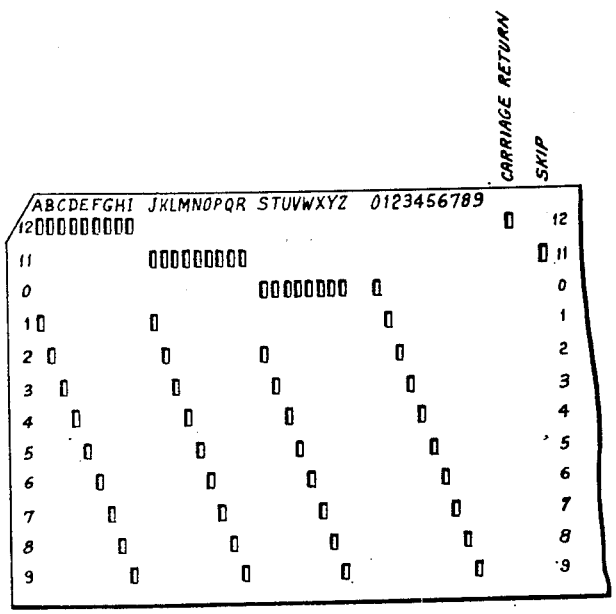
Figure 59A:
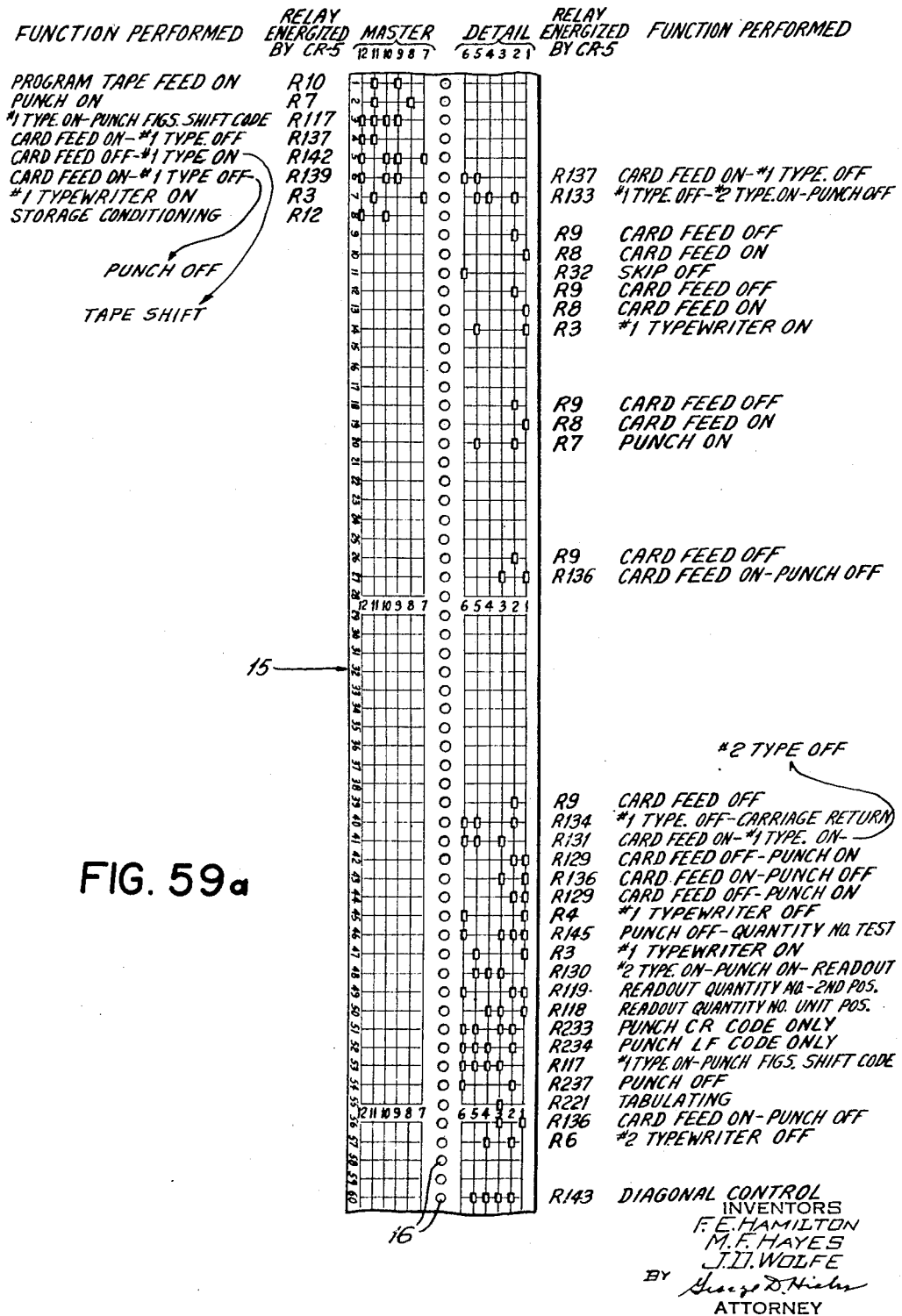
Figure 61:
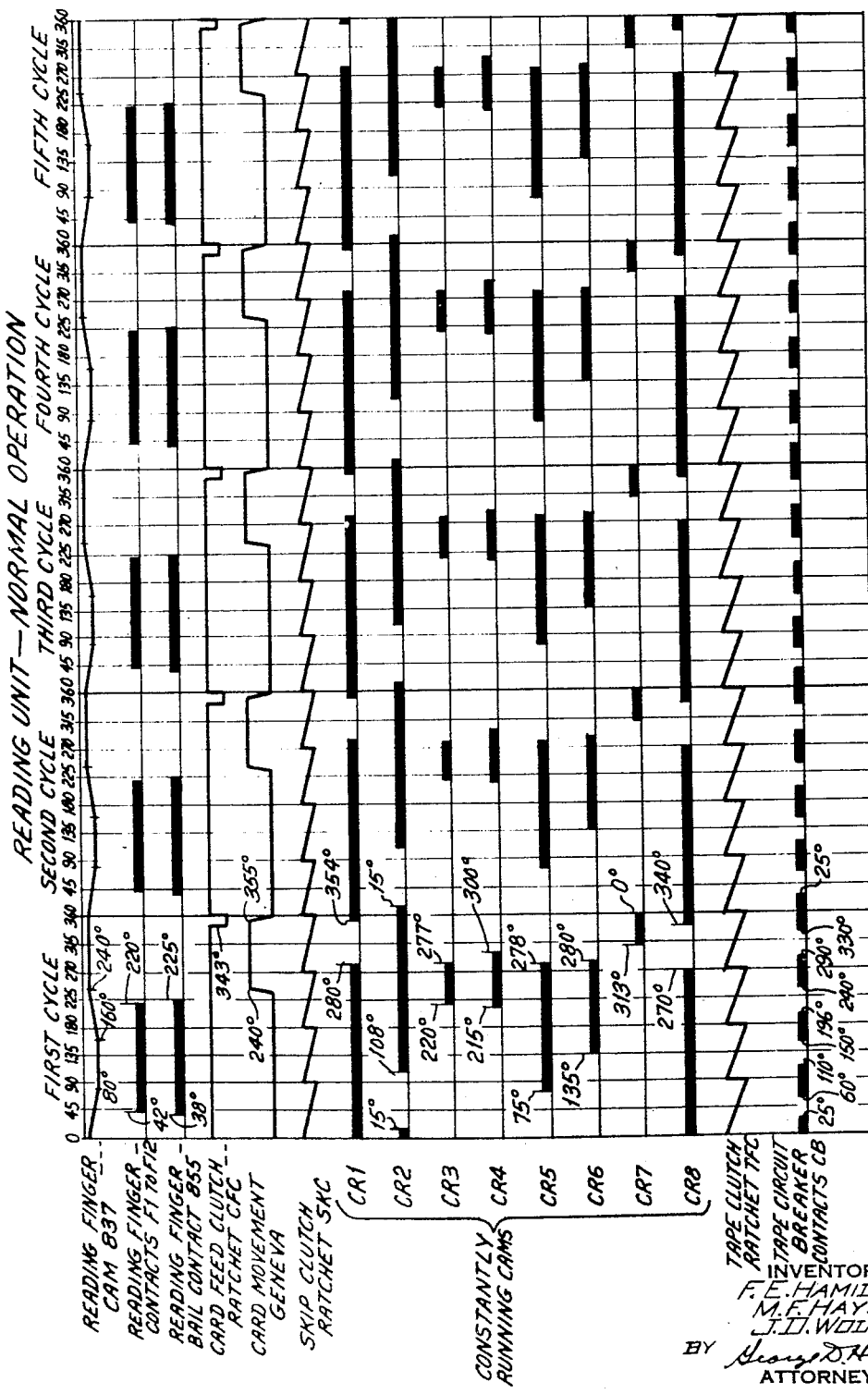
Figure 62B:
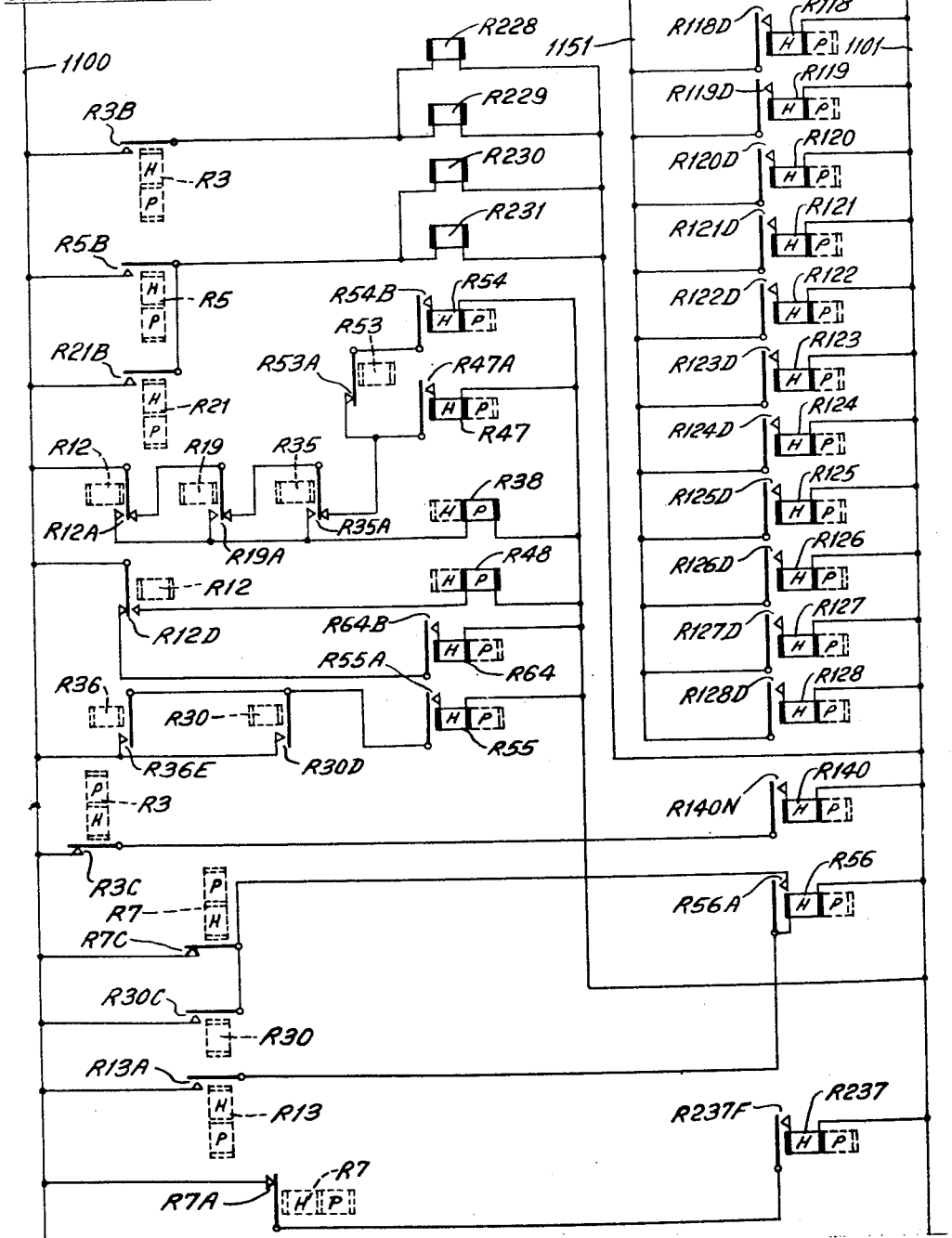
Figure 62C:
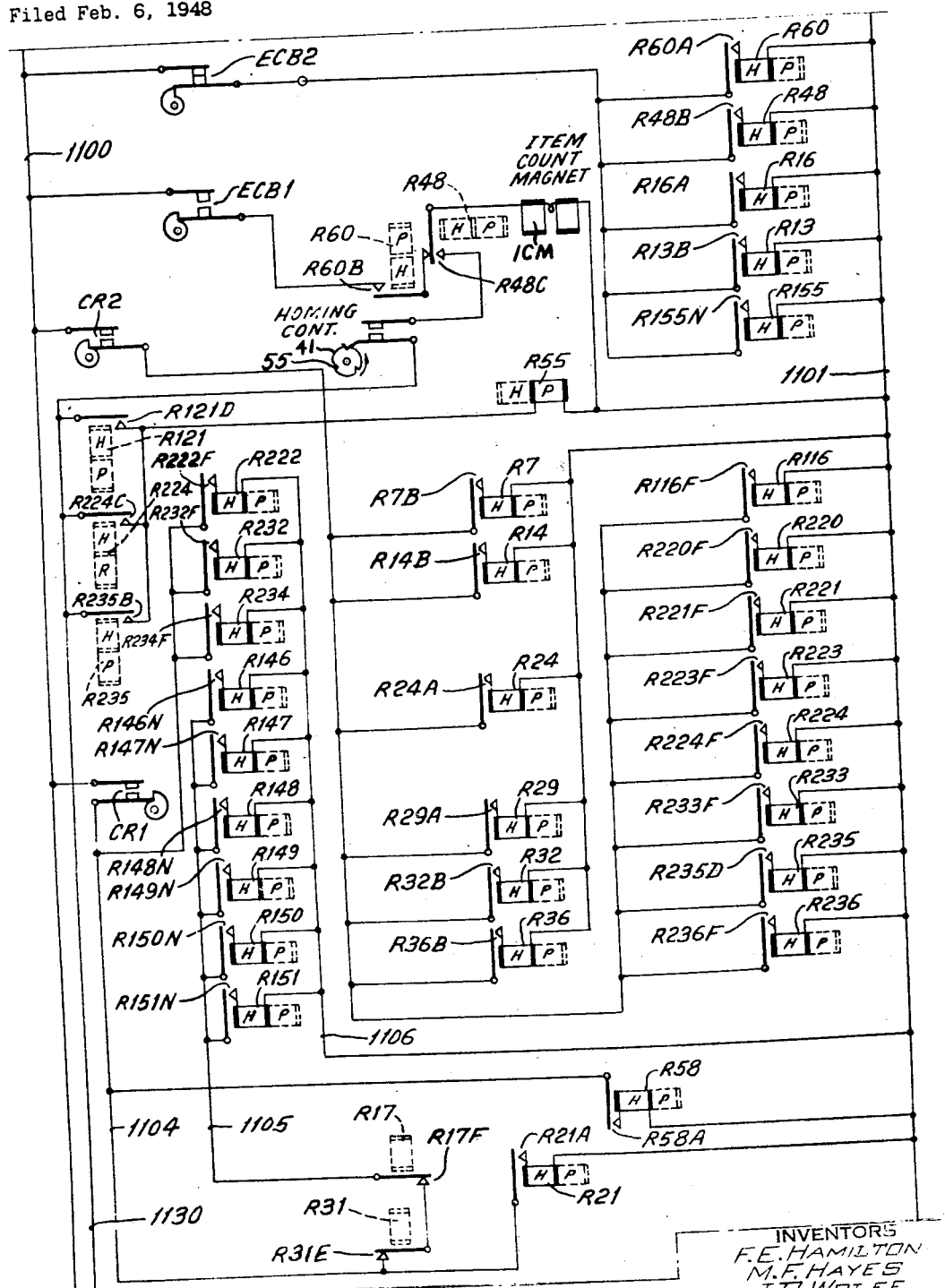
Figure 62E:
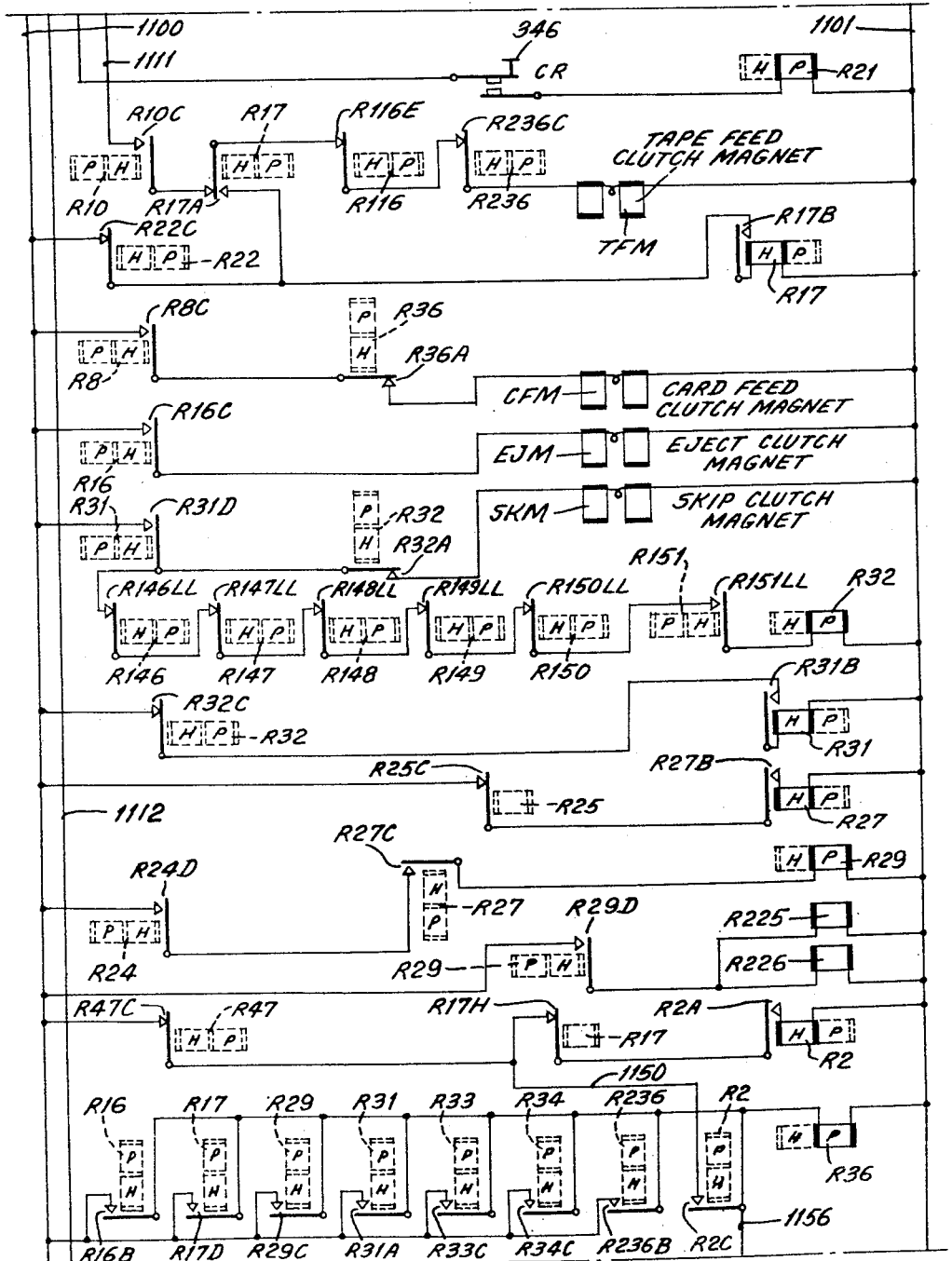
Figure 62F:
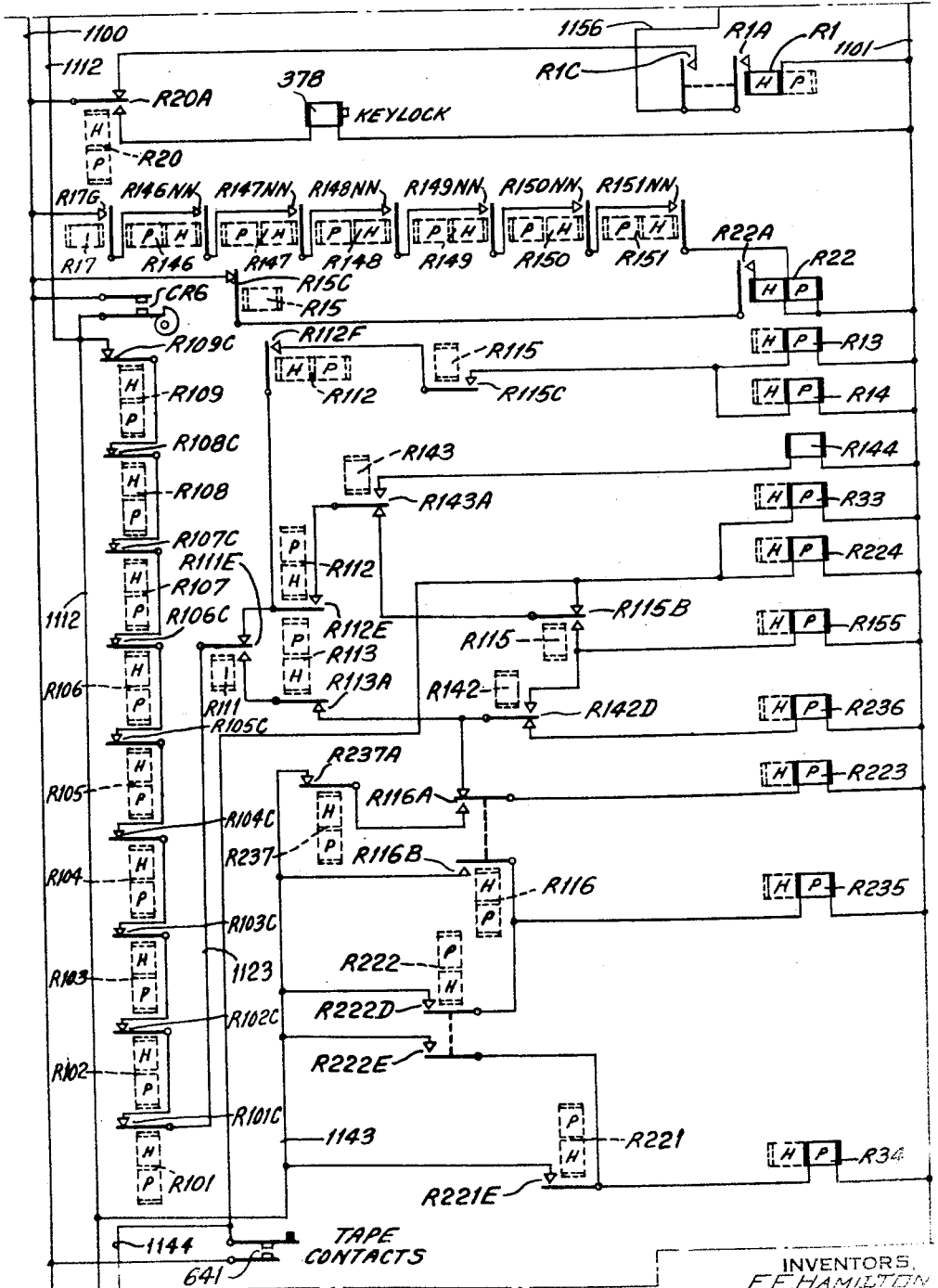
Figure 62G:
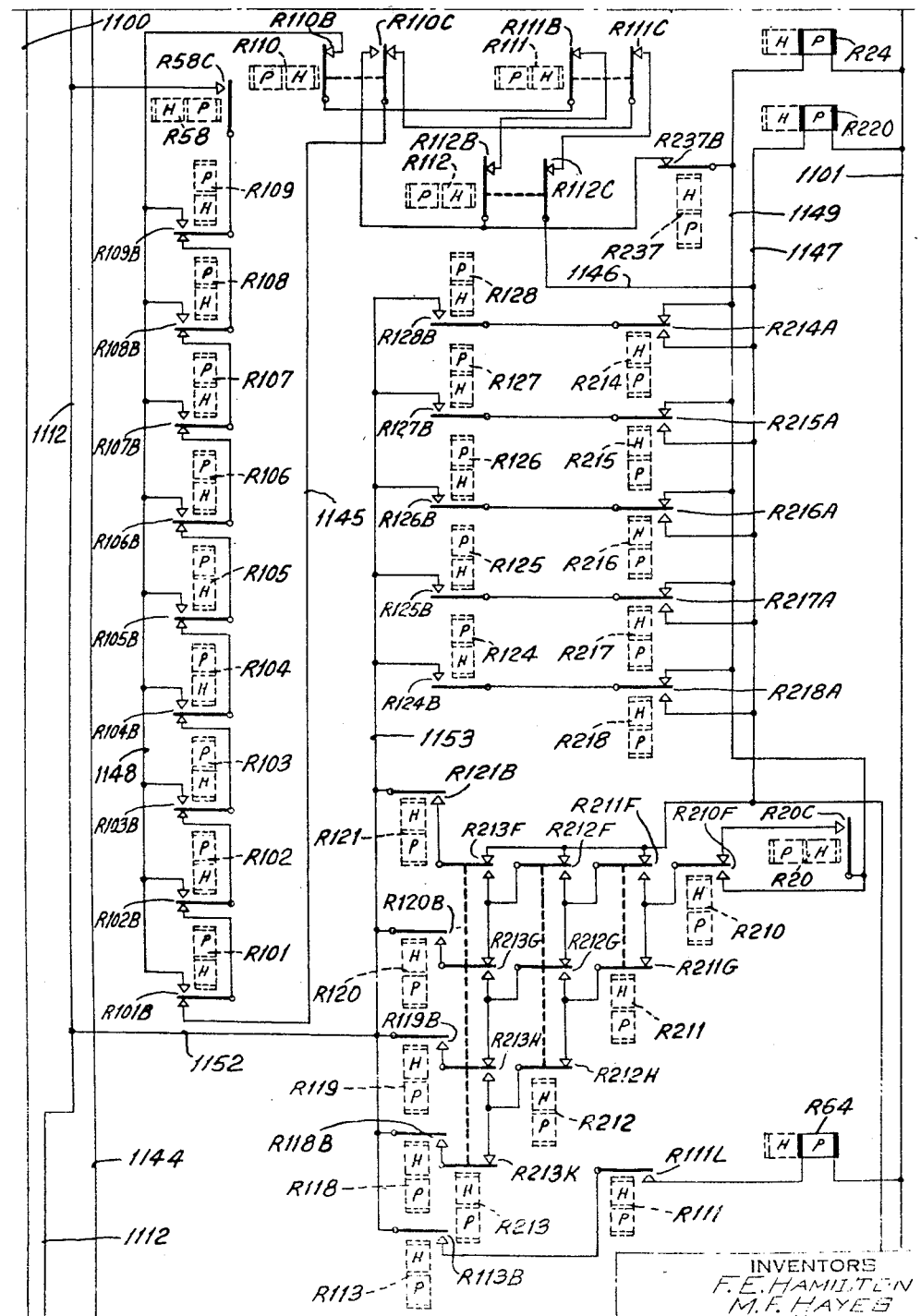
Figure 62B:
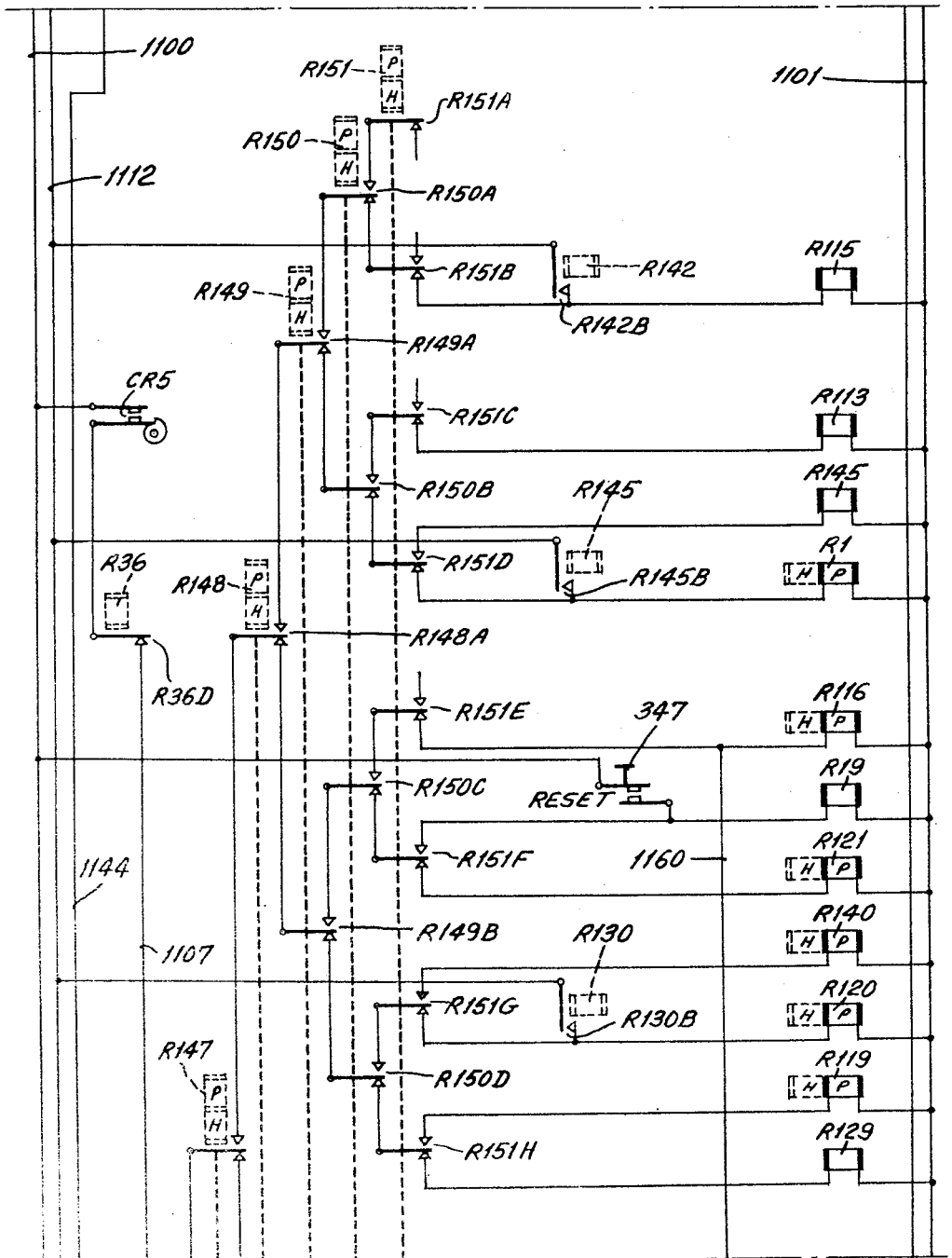
Figure 62I:
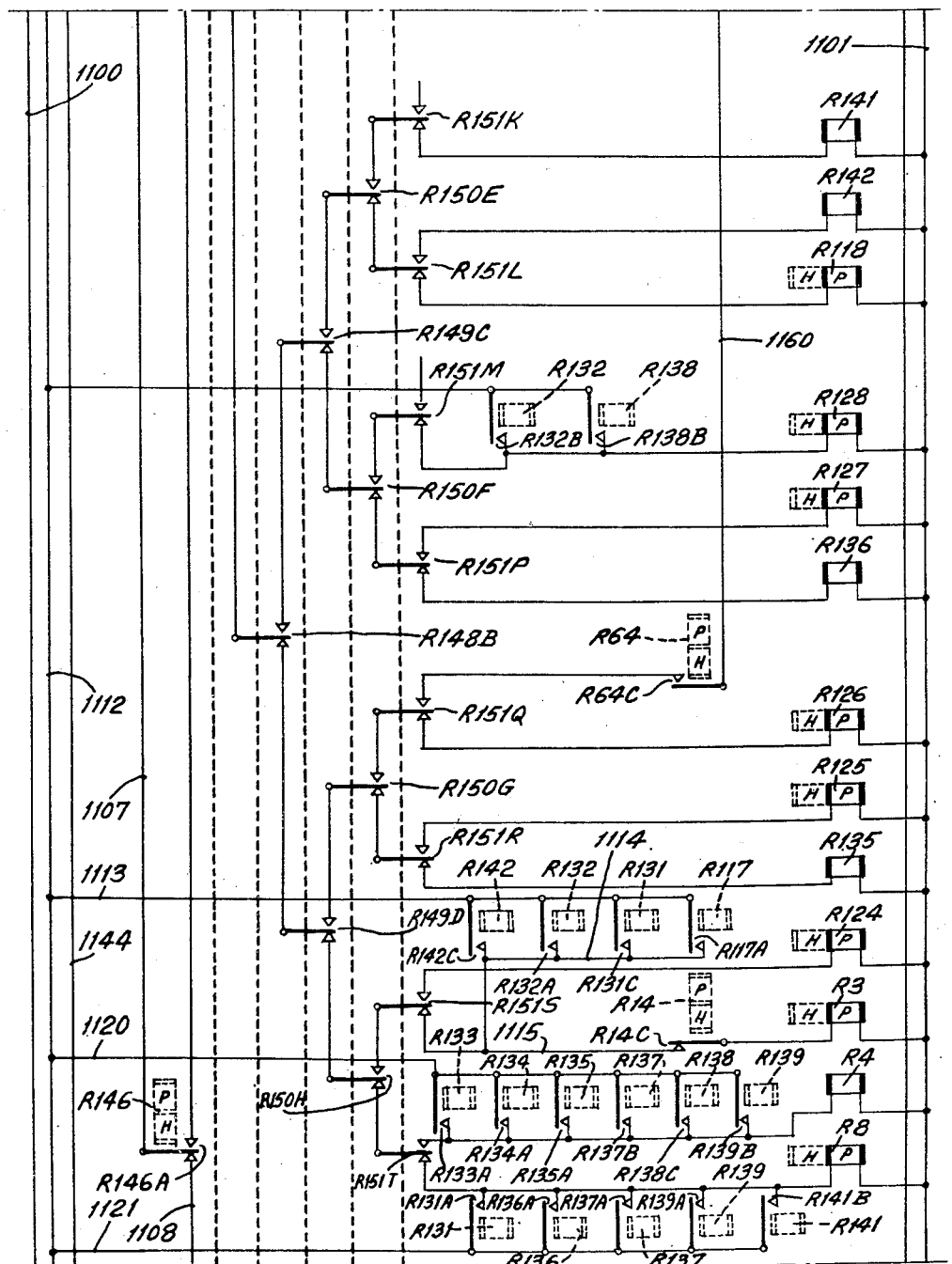
Figure 62J:
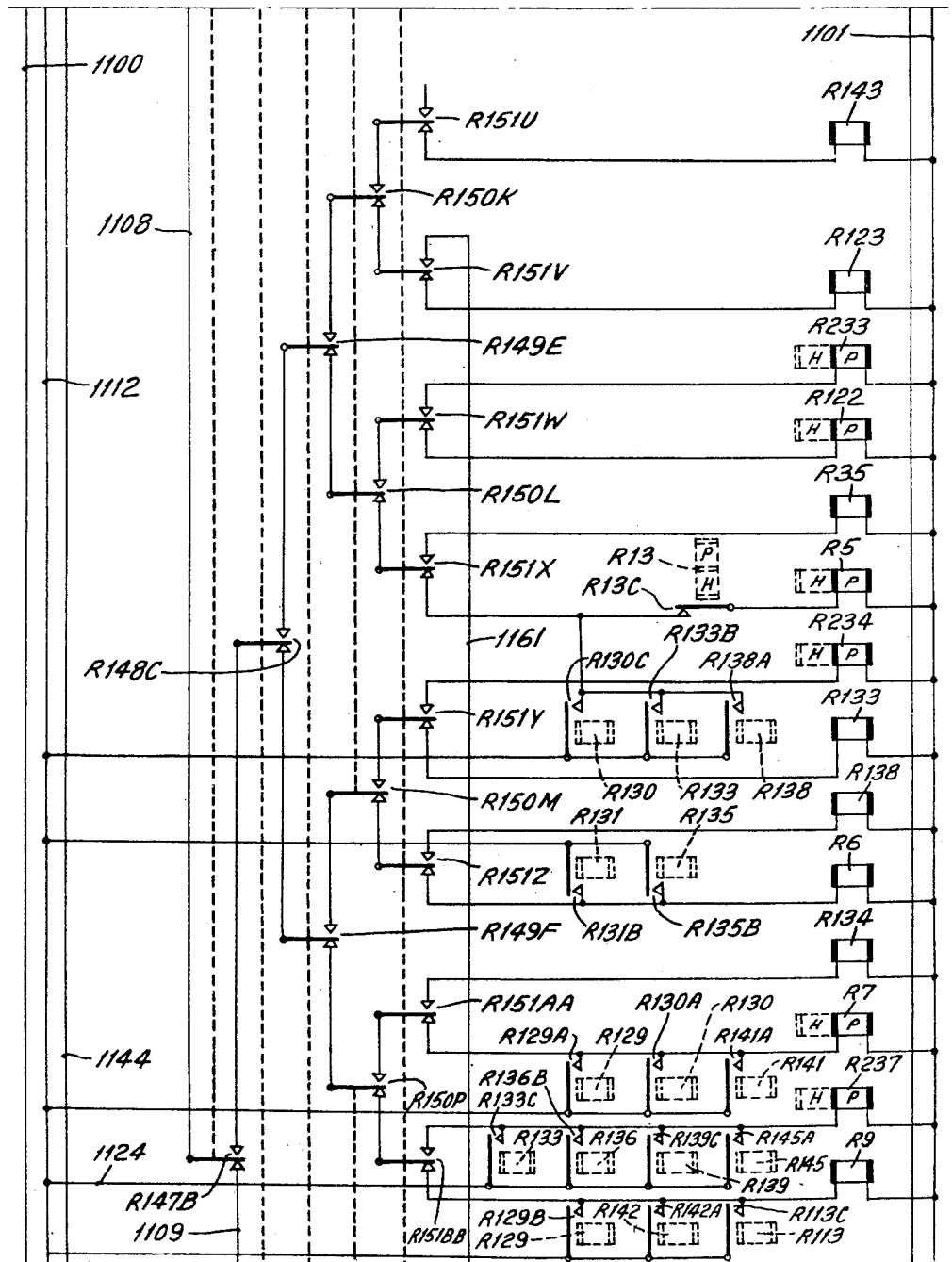
Figure 62K:
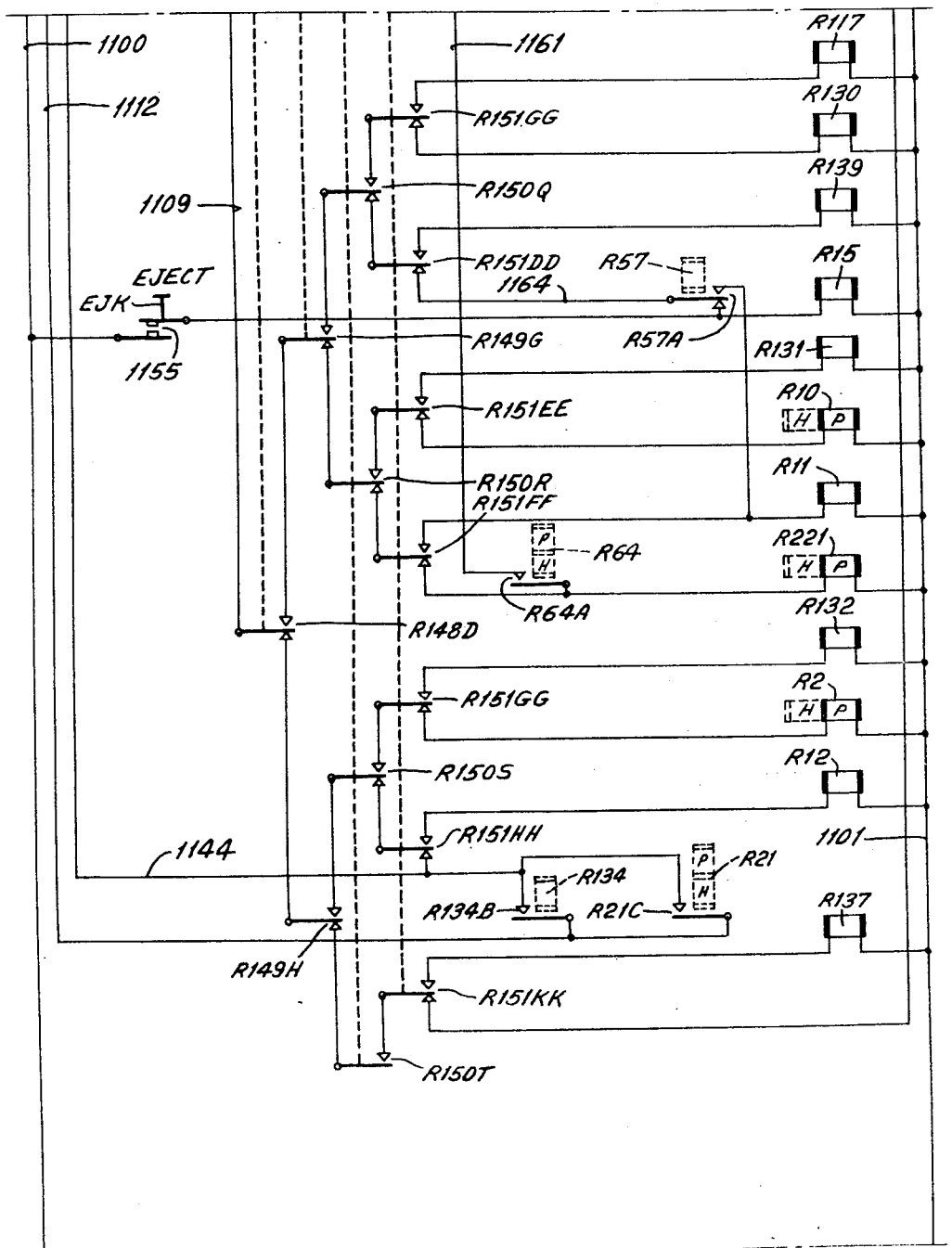
Figure 62L:
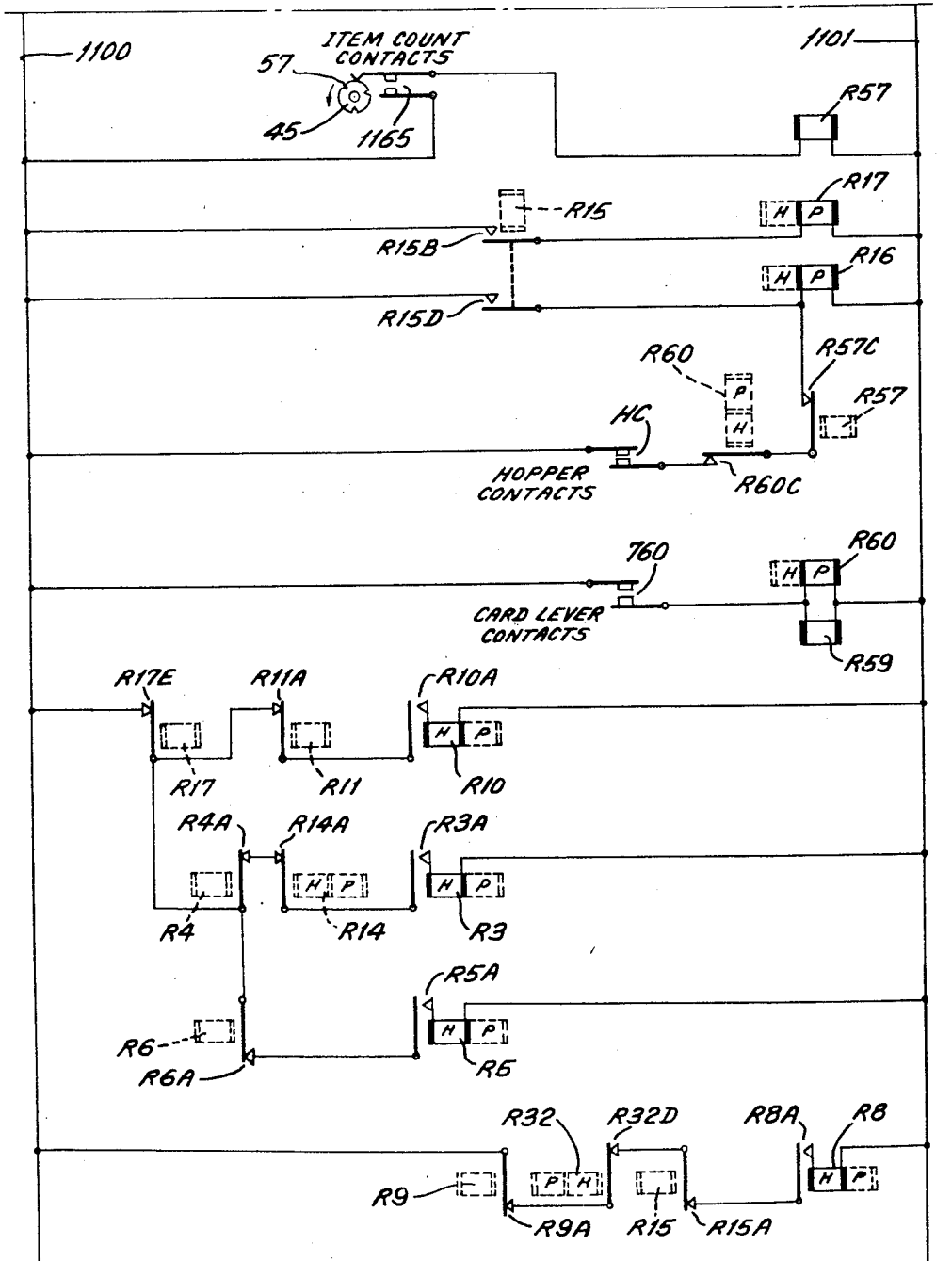
Figure 62M:
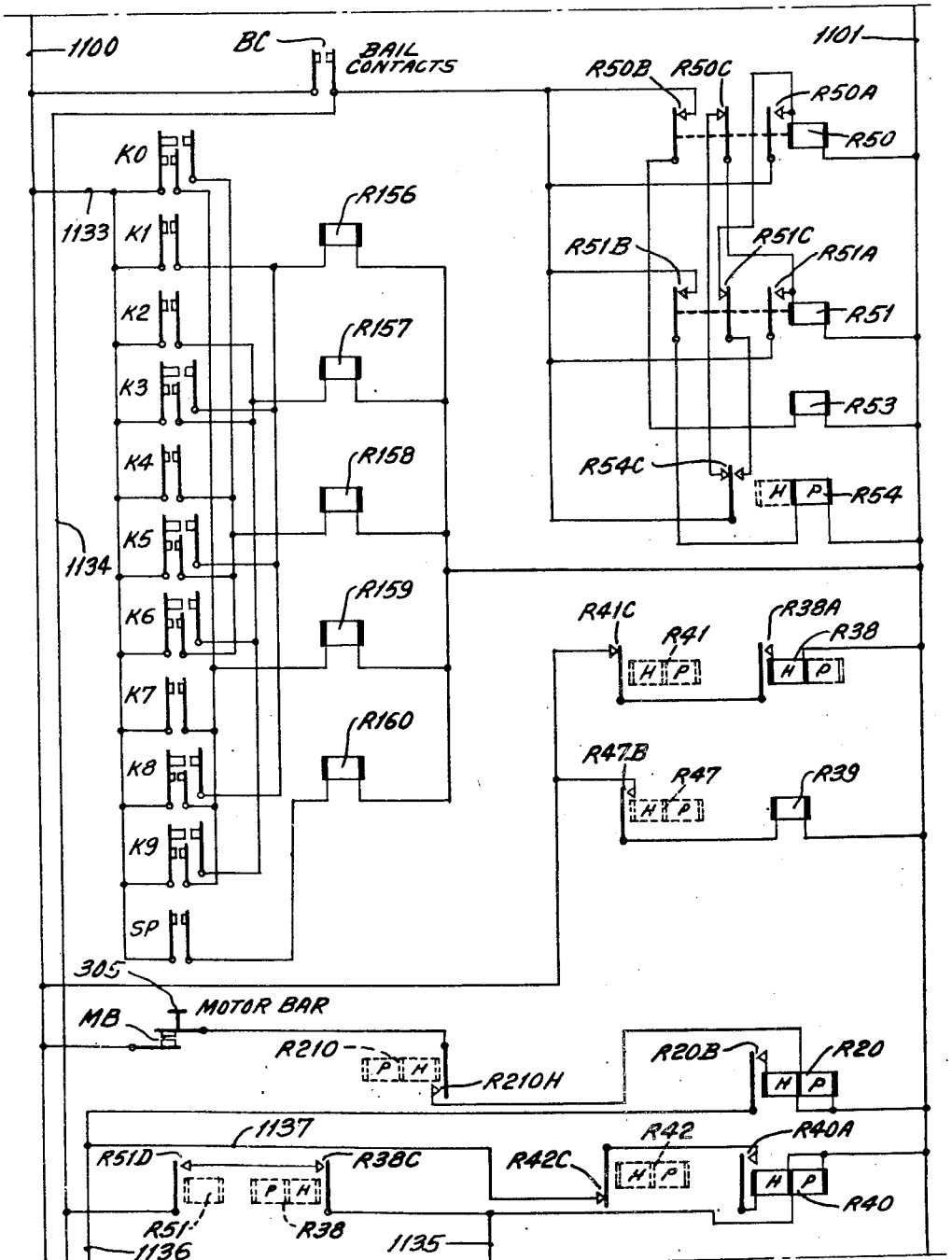
Figure 62N:
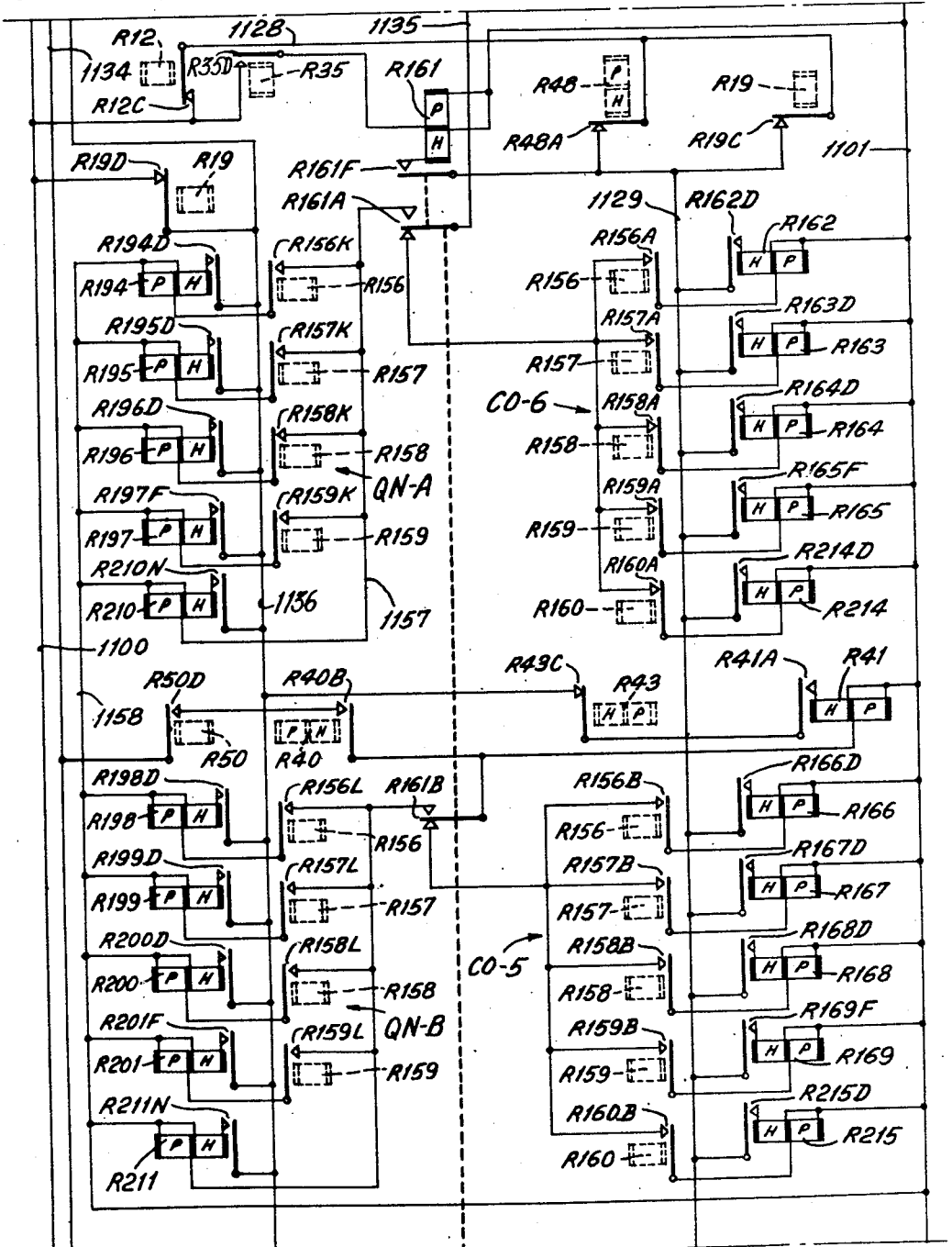
Figure 62O:
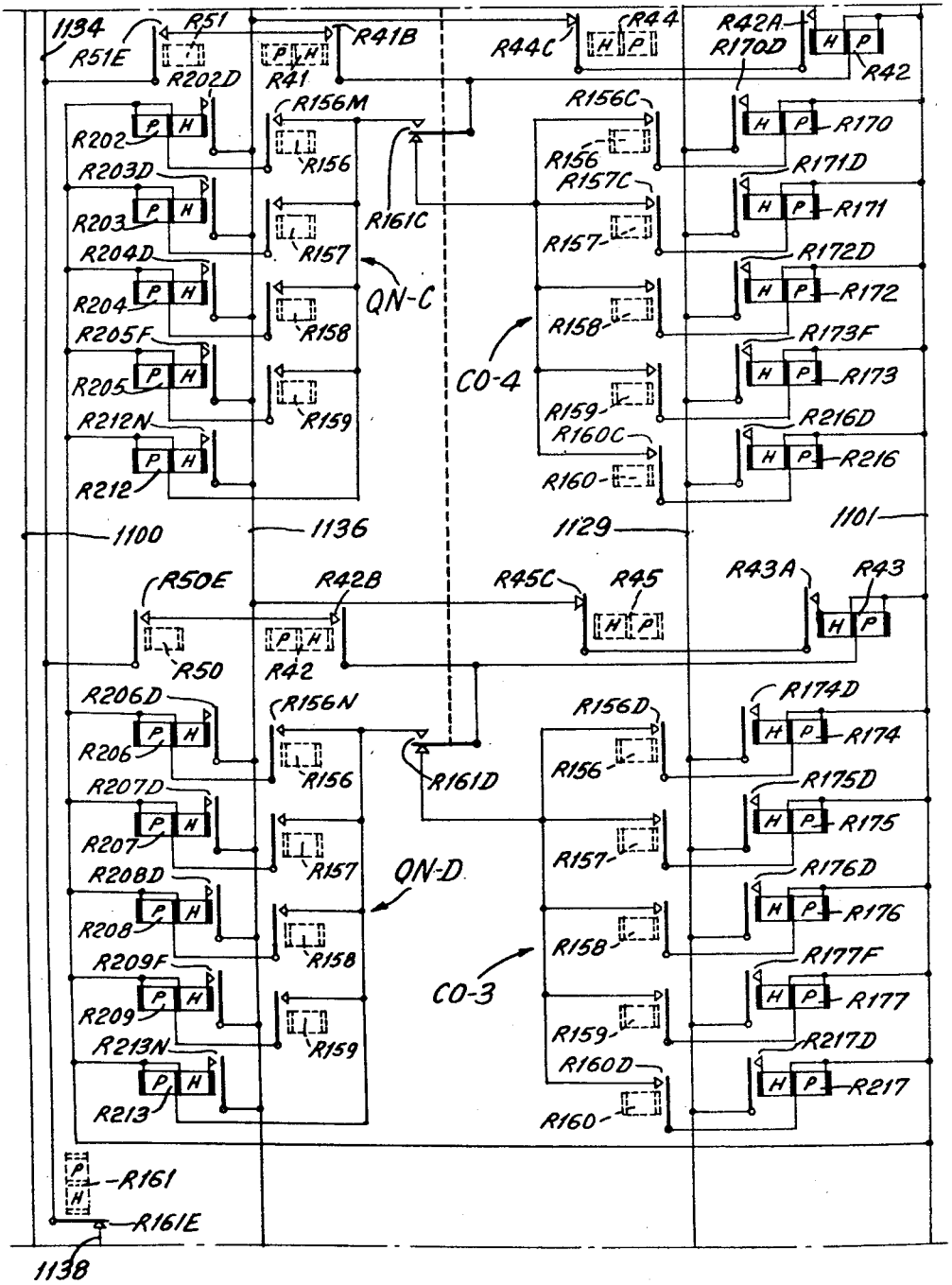
Figure 62P:
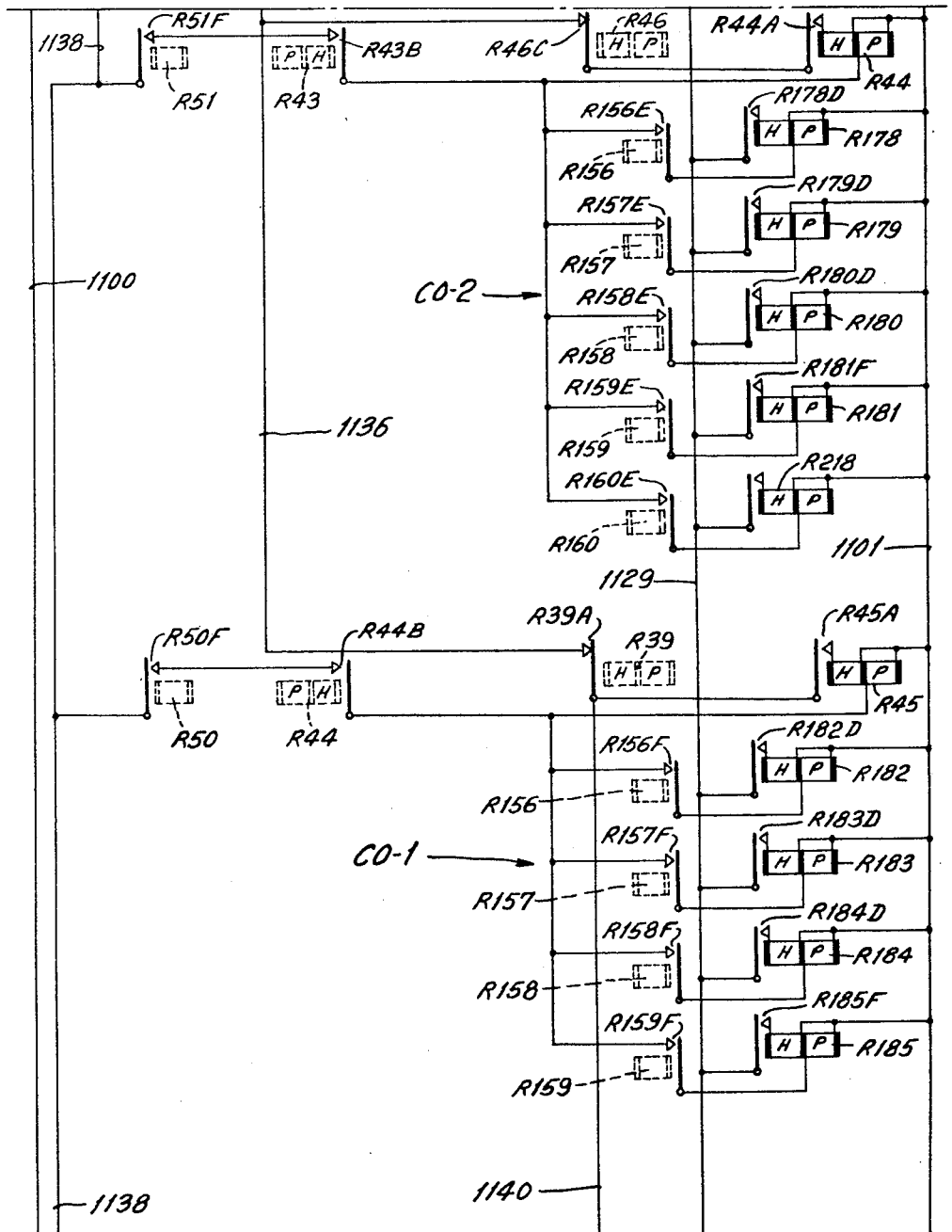
Figure 62Q:
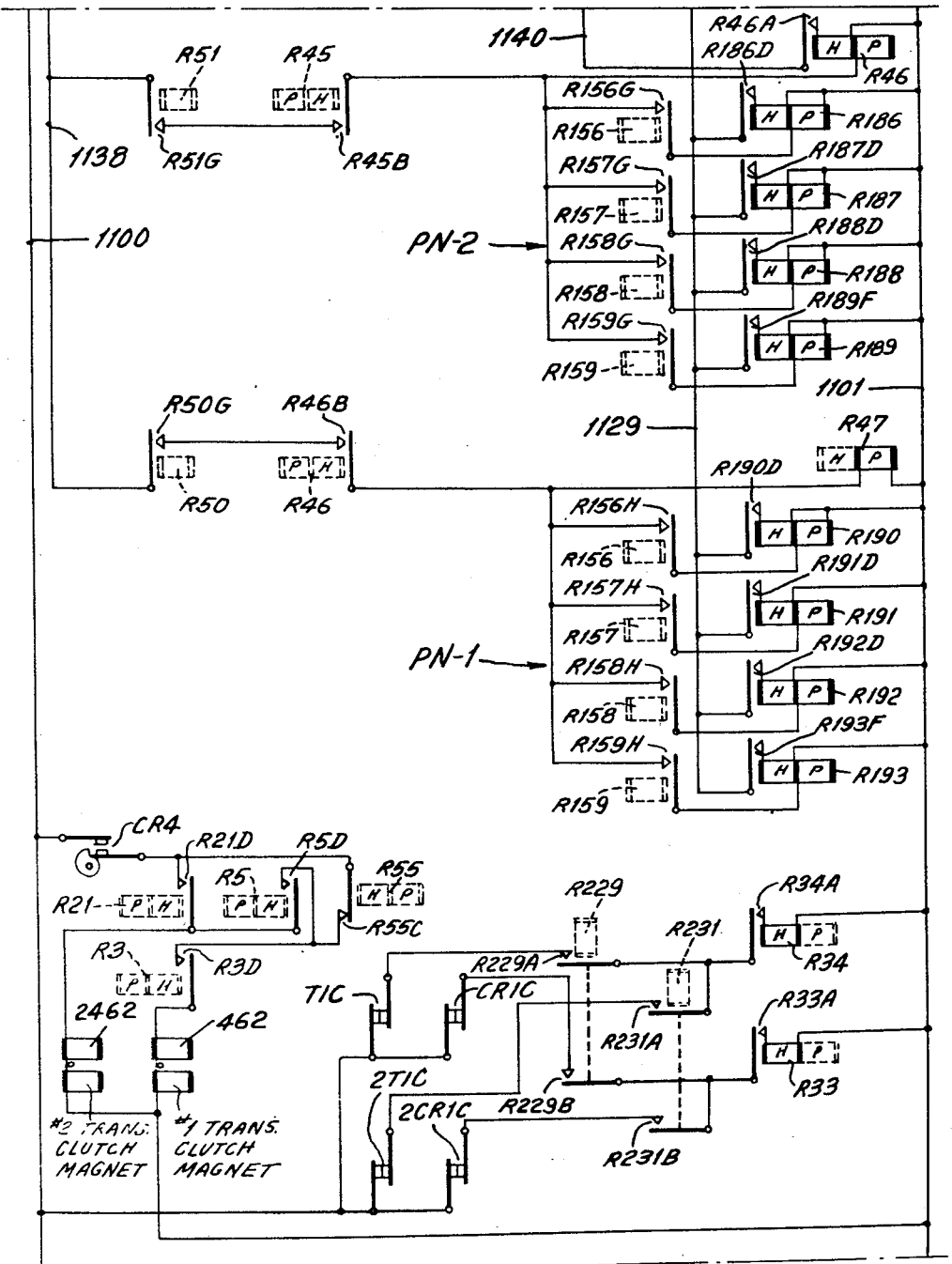
Figure 62R:
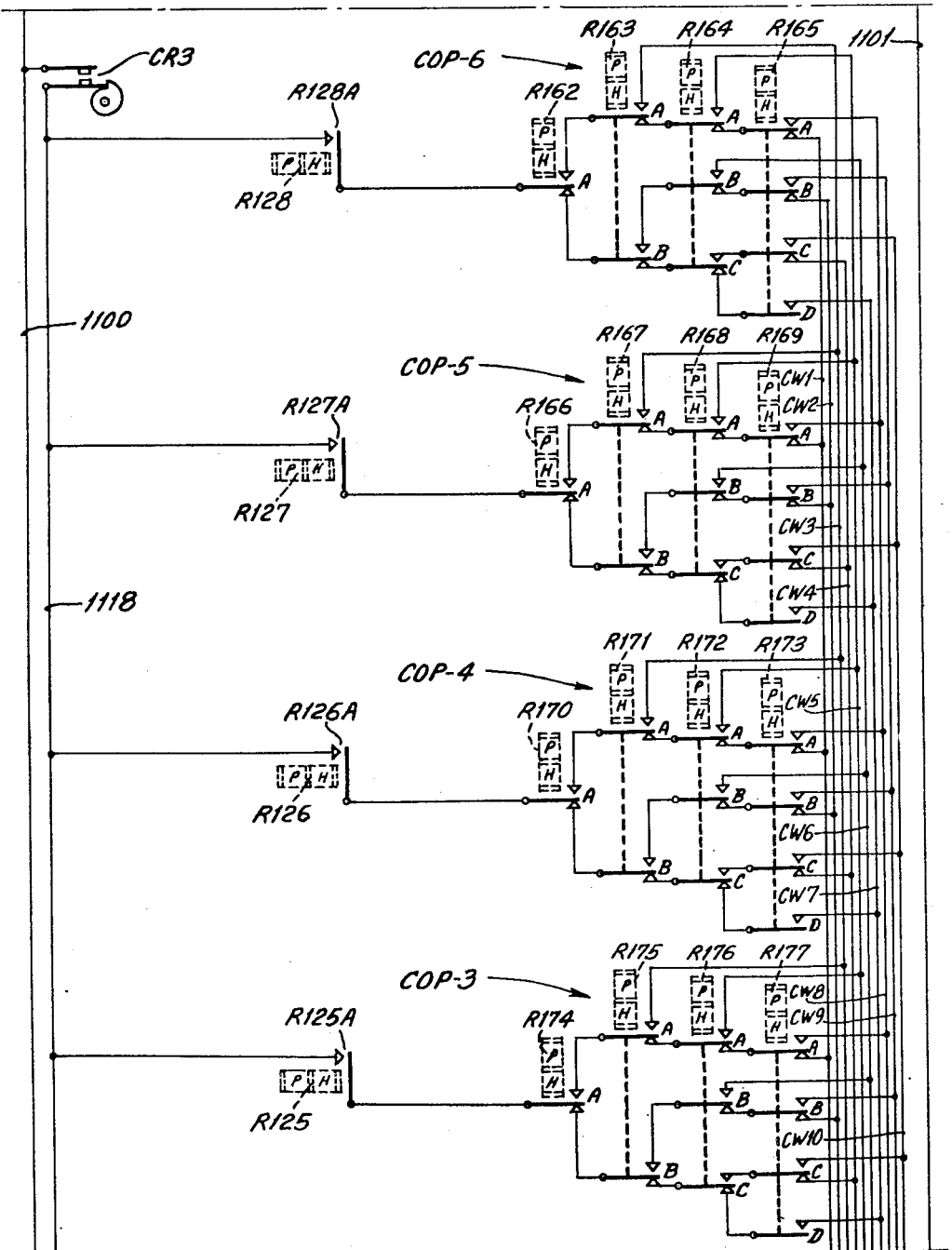
Figure 62S:
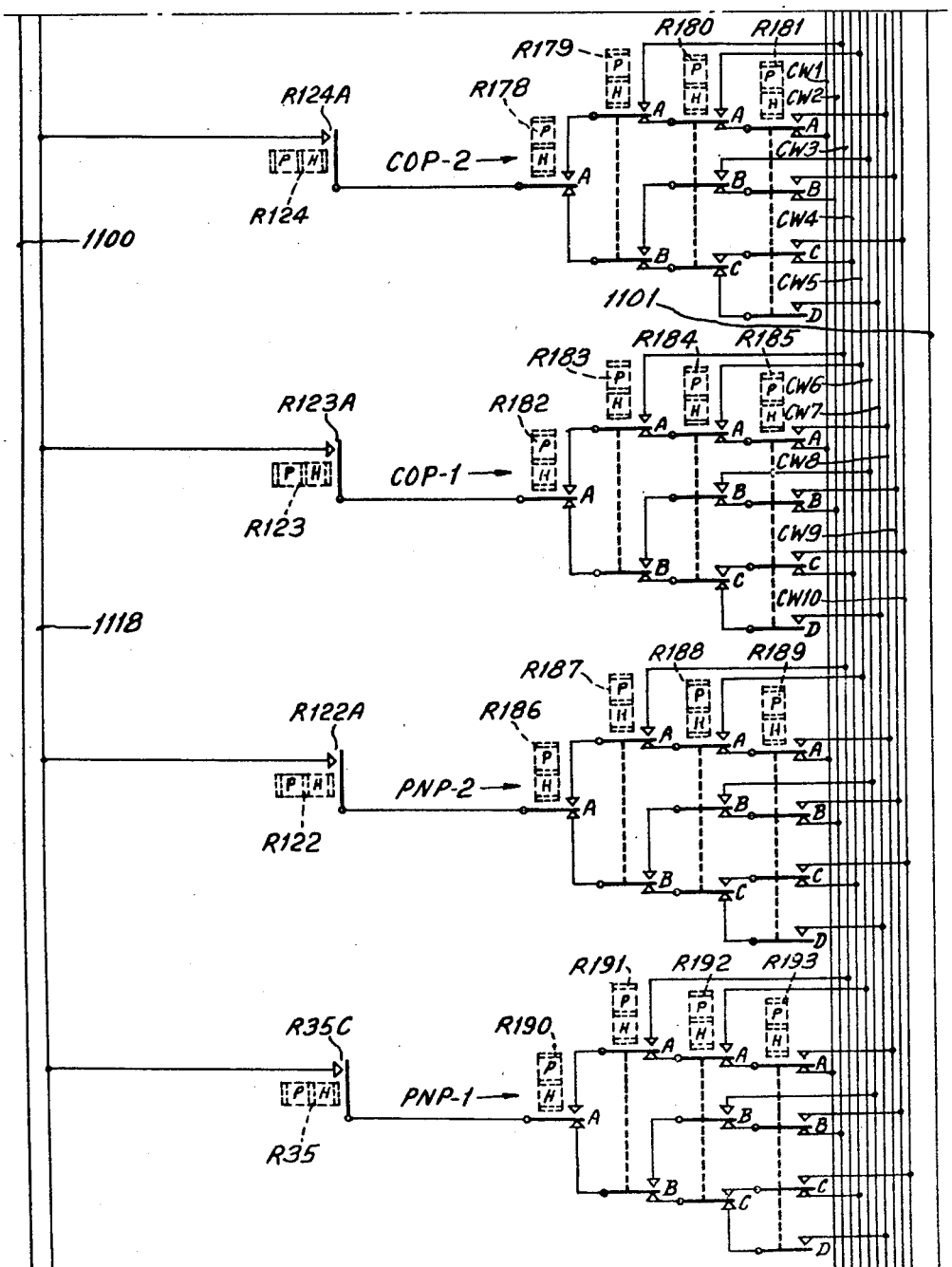
Figure 62T:
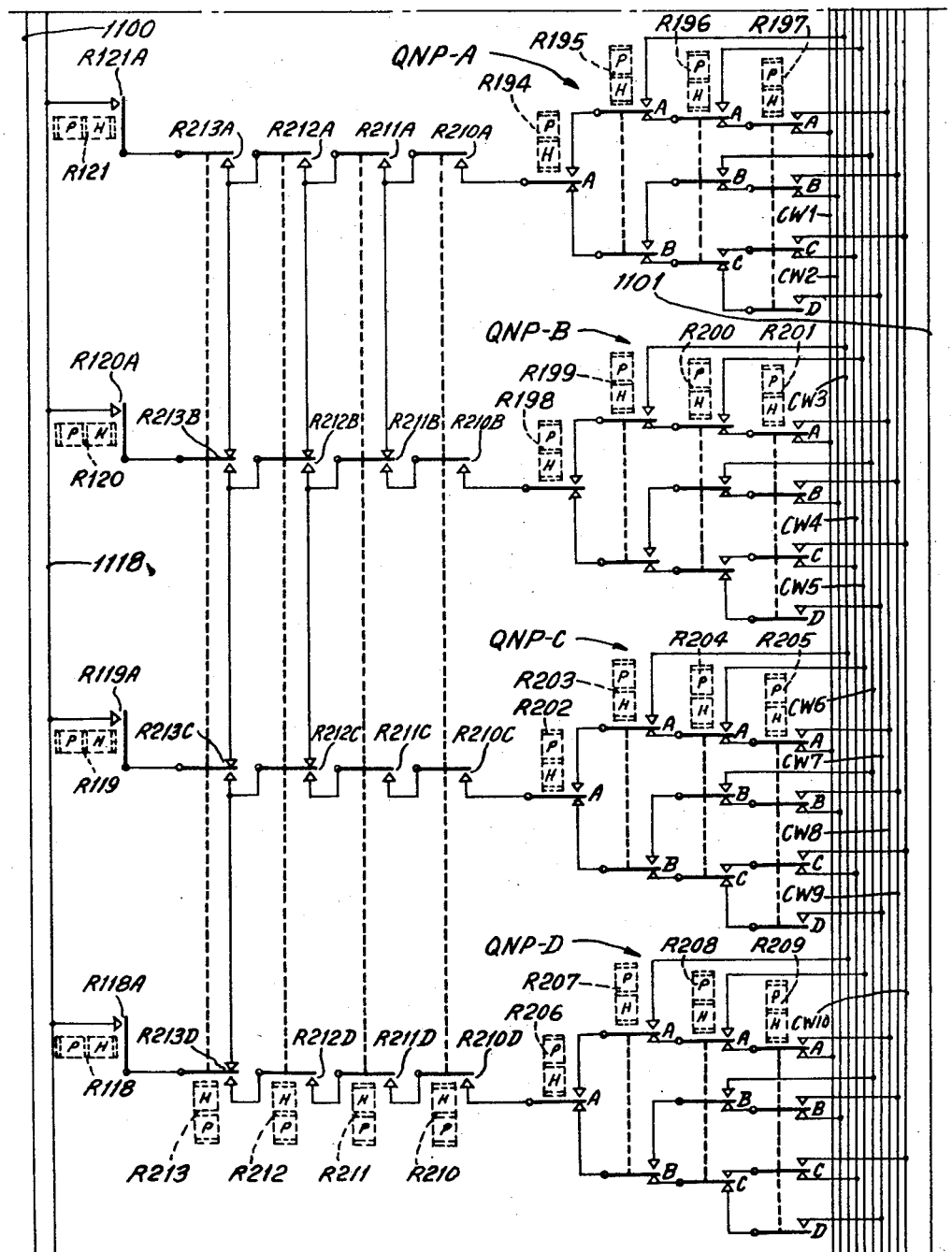
Figure 62U:
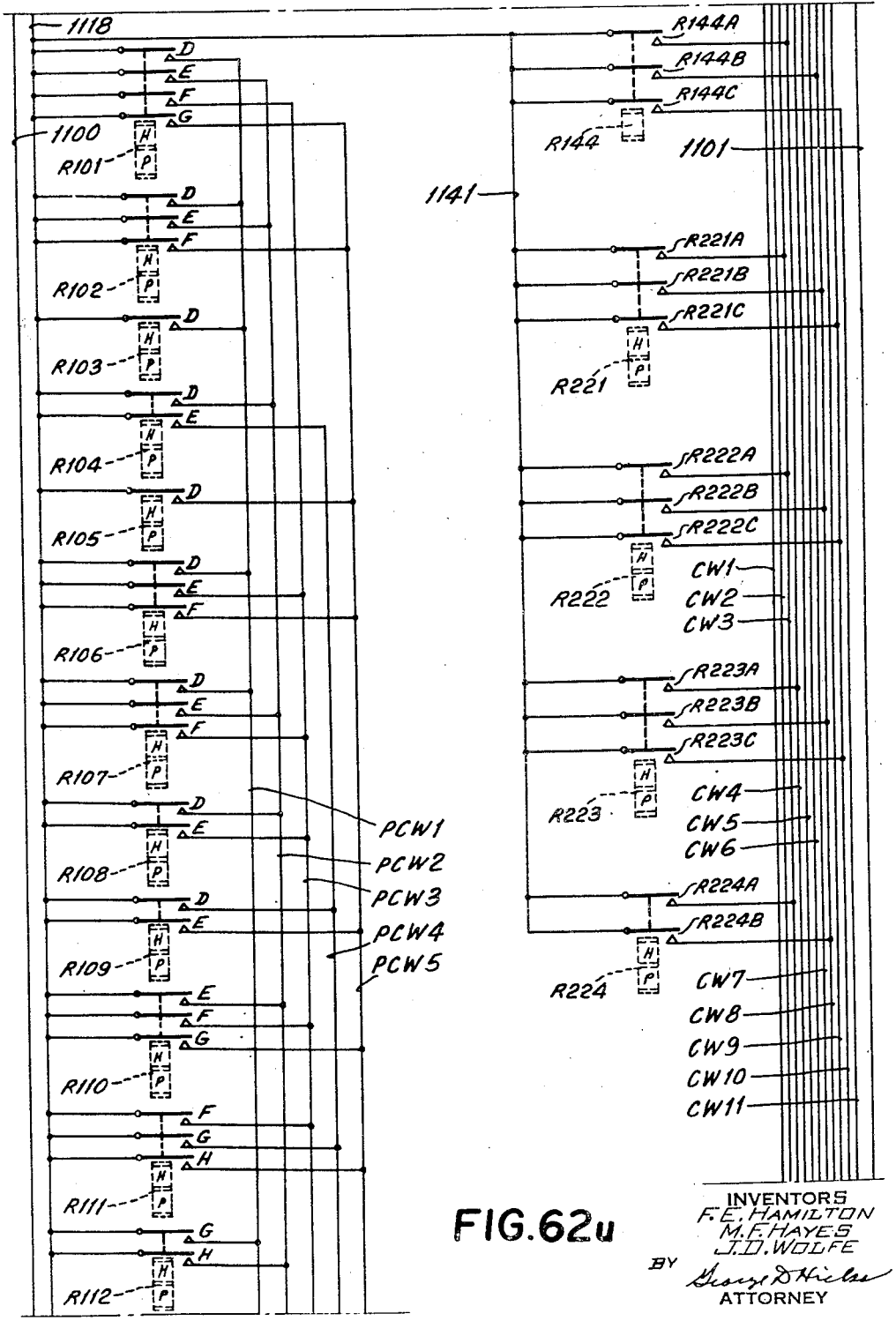
Figure 62V:
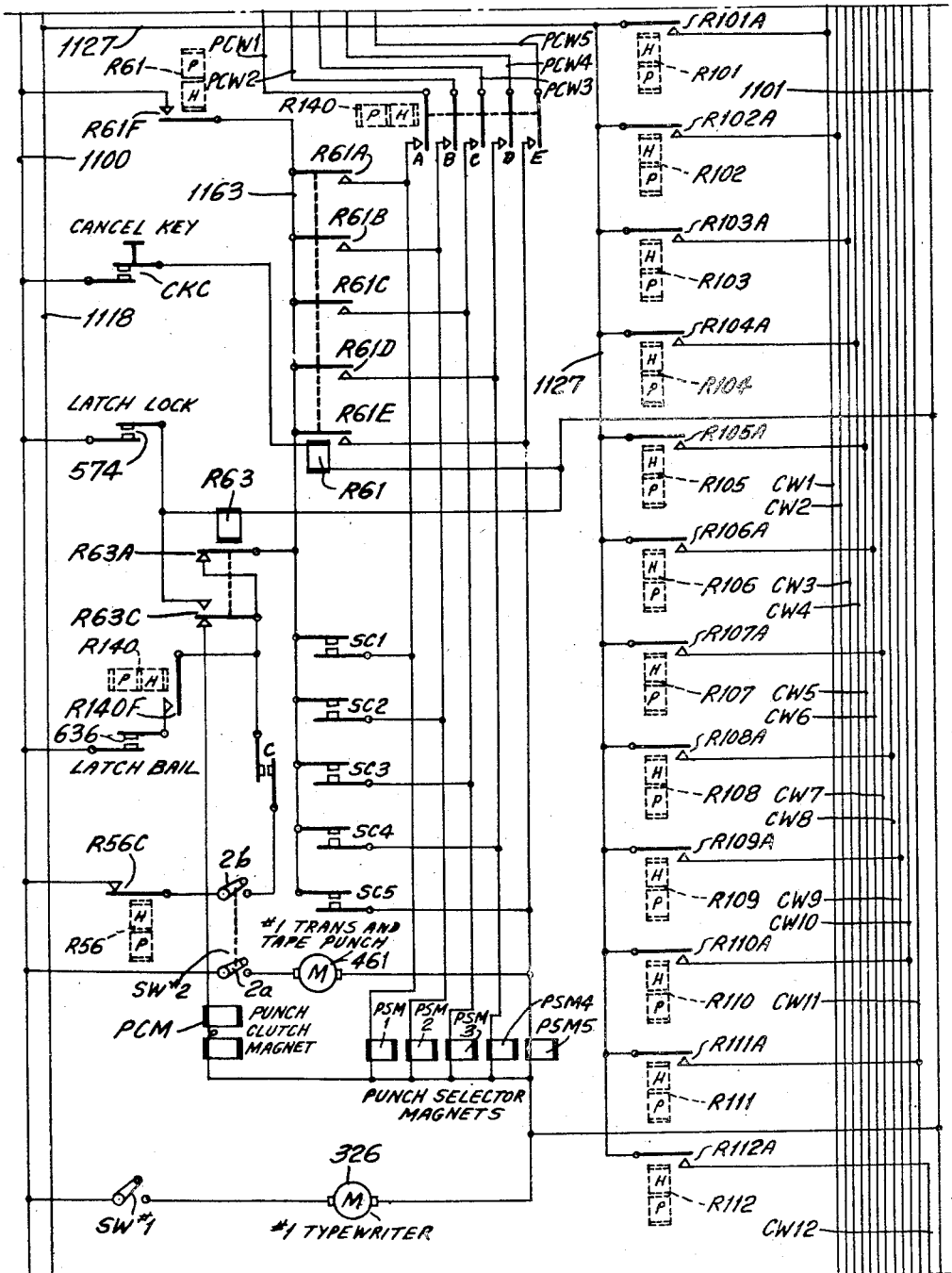
Figure 62W:
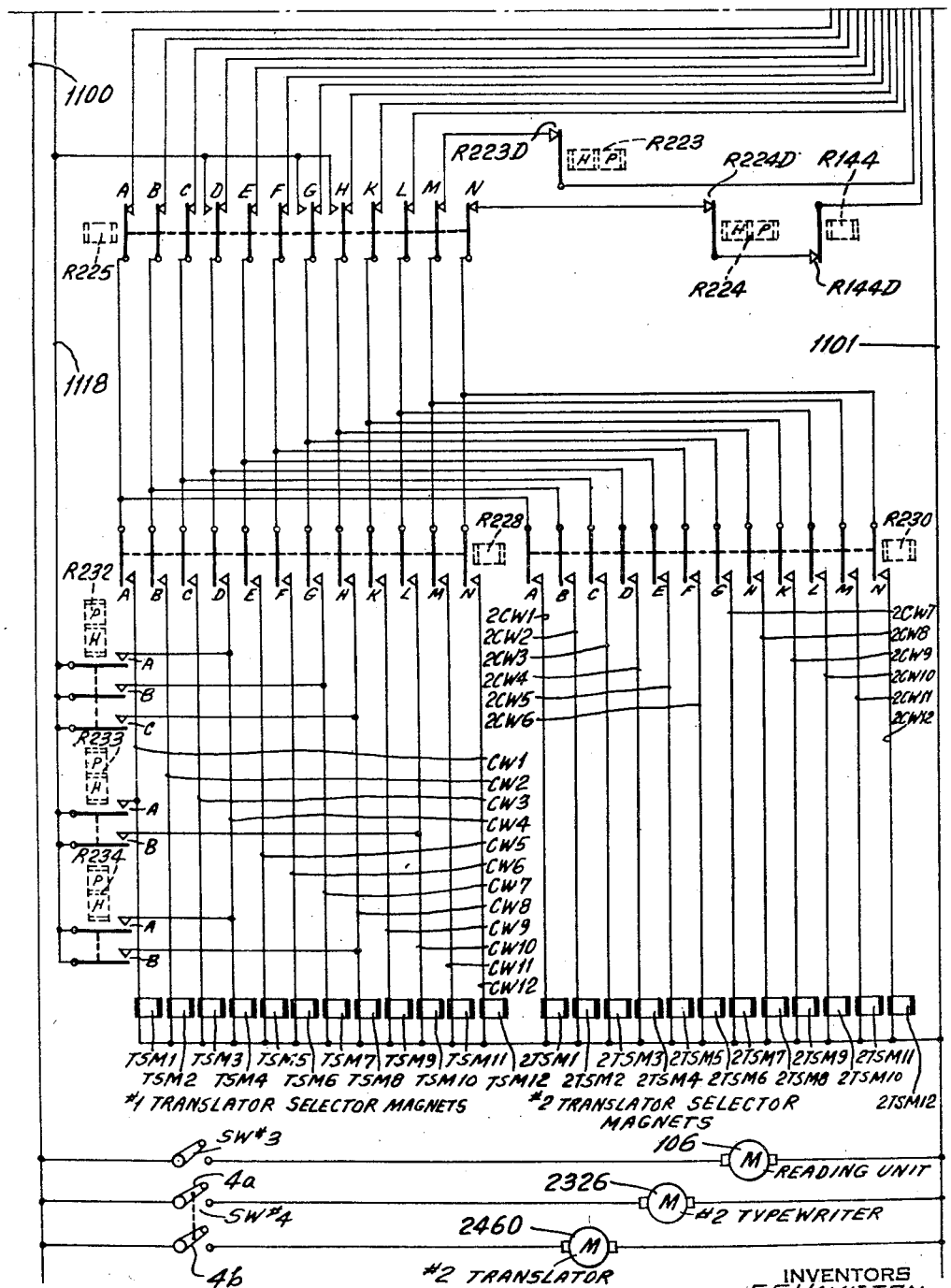

Fig. 50 is a fragment of a 5-position record tape, like that shown in Fig. 49, and containing the code designations which are recorded therein by the tape punch of Figs. 39 to 46, inclusive, when the illustrated embodiment is operated according to a typical example or problem disclosed herein;

Fig. 51 shows a fragment of a statistical record card of the type used in the reading unit of Figs. 2 to 23, inclusive, and wherein is recorded all of the code designations of a well-known 12-position statistical code system;

Figs. 52 to 56, inclusive, show examples of statistical record cards wherein is recorded, according to the code system of Fig. 51, certain selected data, the coded data designations of Figs. 52 to 56, inclusive, being used herein to explain the operation of the illustrated embodiment according to a selected typical problem or example;

Fig. 57 shows a typewritten record sheet or invoice wherein selected data is typed by the typewriter at the left of Fig. 1 when the illustrated embodiment is operated under the control of the record cards of Figs. 52, 54, 55, and 56 and the program tape of Figs. 59a and 59b;

Fig. 58 shows a fragment of a stock picker tag on which certain selected data is typed by a second typewriter appearing at the right in Fig. 1, when such typewriter is operated under the control of the cards of Fig. 52 and Figs. 54 to 56, inclusive, and the program tape of Figs. 59a and 59b;

Figs. 59a and 59b, when placed in end-to-end relation with Fig. 59a at the top, disclose a program tape wherein is recorded the code designations used for controlling the operation of the illustrated embodiment according to a typical example or problem to be explained herein;

Fig. 60 is a timing diagram showing diagrammatically the timing of certain of the operating parts of the reading unit of Figs. 2 to 23, inclusive, during two successive eject cycles;

Fig. 61 is a timing diagram showing diagrammatically the timing of operation of certain of the parts of the reading unit during five successive cycles when the latter is performing its normal function of reading and spacing the statistical record cards and the program tape;

Figs. 62a to 62w, inclusive, when placed sequentially and in end-to-end relation, disclose a composite wiring diagram wherein is shown all of the electrical instrumentalities of the illustrated embodiment and the manner in which these instrumentalities operate to effect the operation of the illustrated embodiment;

Fig. 63 is a detail view of an item count mechanism used in connection with the operating control of the illustrated embodiment;

Fig. 64 is a vertical section taken on the line 64—64 of Fig. 63; and

Fig. 65 is a vertical section taken on the line 65—65 of Fig. 64.

GENERAL DESCRIPTION

Referring now in detail to the construction illustrated and first to Fig. 1 of the drawings, the reference numeral 10 indicates a specially constructed desk on which is mounted the several elements composing one preferred embodiment of the invention disclosed herein. The illustrated embodiment comprises generally a reading unit 100 which functions to feed and read the statistical record cards, such as the ones shown in Figs. 52 to 56, inclusive, and to feed and read a program control tape such as the one shown in Figs. 59a and 59b. The reading unit 100 will be described in detail hereinafter under a separate heading. The embodiment also comprises a #1 typewriter 300 which is operated under the control of code designations in the record cards and in the program tape to type an invoice, an example of which is indicated by the reference character 11 in Fig. 57. The general construction and operation of the typewriter 300 will be described hereinafter under a separate heading. The #1 typewriter comprises a main keyboard 301 (Figs. 1, 24, and 27) composed of the customary character and functional keys, and also comprises an auxiliary keyboard 302 (see also Figs. 28, 29, and 30) which includes ten digit representing keys 303, a space key 304, and a motor bar 305. As will appear more fully hereinafter, the ten digit keys 303 and space key 304 may be manually operated to store desired numeric data in a relay storage unit. The latter unit is not shown in Fig. 1 as the elements thereof are mounted in the desk 10 and do not appear above the top wall thereof. As the relay storage unit is composed for the most part of electrical instrumentalities, it is more properly disclosed as a part of the wiring diagram of Figs. 62a to 62w, inclusive, and will be fully described hereinafter as a part of the detailed description of the operation of the illustrated embodiment. The illustrated embodiment also includes a tape code punch 500 which is mounted on the left side of the #1 typewriter (Fig. 1) and which is selectively operated by the actuation of certain keys of the main keyboard 301 of the #1 typewriter, to punch code designations in a known 5-position telegraphic code system, which designations represent selected data concerning the parts ordered which may be later used in another machine, not disclosed herein, to prepare record cards used in the keeping of inventory records of the seller's warehouse. An example of a 5-position tape which is punched during the operation of the illustrated embodiment is indicated at 12 in Fig. 50. The tape code punch 500 and its operation will also be fully disclosed hereinafter under a separate heading. The preferred embodiment also includes a #2 typewriter 2300 which is mounted on top of the desk 10 and at the right thereof and which is also selectively operated under the control of the record cards and program tape in the reading unit 100 to type selected data on a stock-control picker tag, which data identifies the individual parts ordered, the particular location of the parts ordered, and the customer's order number. An example of a picker tag prepared by the #2 typewriter is indicated at 14 in Fig. 58. A description of the #2 typewriter 2300 is also included hereinafter under a separate heading.

The illustrated embodiment also includes various electrical instrumentalities, such as relays, contacts, solenoids, magnets, connecting circuit wires, etc., which are not disclosed in Fig. 1, as they are mounted within the several units of the illustrated embodiment generally mentioned under this heading and in the desk 10 beneath the top thereof. Such electrical instrumentalities are more properly included as a part of the circuit wiring diagram of Figs. 62a to 62w, inclusive, and will be described fully hereinafter.

The statistical record card

As explained above, the reading unit 100 functions to read successively the record columns of selected statistical record cards which contain selected data recorded therein. Examples of such record cards are shown in Figs. 52 to 56, inclusive, and are indicated as MC—1, MC—2, DC—1, DC—2, and DC—3, respectively. It will be recognized by those skilled in this art that these record cards are of a well-known type used extensively in the accounting machine art and that data is recorded therein as code designations in accordance with a well-known 12-position statistical code system. Each of these record cards contains 80 vertical record columns indicated by corresponding numerals arranged in a horizontal row along the bottom of each card, and each such vertical column is composed of 12 equally spaced index point positions. The index point positions are indicated in some of the columns by corresponding numerals arranged in vertical rows on the cards. As will be apparent, each character is represented by a code hole punched in one or more of the index point positions of a record column according to the code system.

In Fig. 51, a portion of a record card is shown wherein is punched all of the code designations of the 12-position code system which are used in the cards of Figs. 52 to 56, inclusive, and which control the operation of the illustrated embodiment. At the top of each record column of the card in Fig. 51, appears a legend identifying the character or functional operation represented by the code designation recorded in such record column. The recorded character data is also interpreted along the top of the record columns in the cards of Figs. 52 to 56, inclusive.

The record card MC—1 of Fig. 52 and the record card MC—2 of Fig. 53 are referred to hereinafter as master or heading cards because, as will appear from the printing across the top of the cards, the code designations in each card record the name and address of a customer and also record other data relating to the customer's account. The record columns of each of the cards MC—1 and MC—2 are shown as grouped together to form different record fields for recording different types of data. Legends appearing along the lower part of each card denote the type of data recorded in the several fields. For example, the data appearing in columns 1 to 59, inclusive, of each card relates to the name and address of a customer. The manner in which these cards control the operation of the illustrated embodiment in preparing an invoice, such as the invoice 11 in Fig. 57, will be fully disclosed hereinafter under the general heading "Operation."

The record cards DC—1 of Fig. 54, DC—2 of Fig. 55, and DC—3 of Fig. 56, are referred to hereinafter as price or detail cards because, as will be apparent from the printed legends appearing across the top of these cards, they each contain recorded data relating to parts or items stocked by a seller and which may be ordered by a customer. The record columns of the price or detail cards, DC—1 and DC—2, are also grouped to form different record fields, and the types of data recorded in the different fields are indicated by appropriate legends along the lower part of the cards. The card DC—3 is also divided in the same manner as the cards DC—1 and DC—2, but data for the several fields is not recorded therein as the part represented by the card DC—3 is not carried in stock at the warehouse where the invoice is being prepared and must be ordered from the main warehouse. The card DC—3 is known as a direct order card as the recorded data therein indicates that the part must be ordered direct from the main warehouse. The data appearing in the first three lines in the body of the invoice 11 of Fig. 57 is typed under the control of the code designations in the three detail cards DC—1, DC—2, and DC—3, as will also be fully explained hereinafter in the description of the operation of the illustrated embodiment.

The program tape

The sequence of operations of the illustrated embodiment is controlled by code designations recorded in record columns of a program tape. The program tape is joined together at its ends to form a loop and is indicated generally by the reference numeral 15 in Figs. 2 and 3. As will appear more fully hereinafter, the tape 15 is mounted within the reading unit 100 and is read column-by-column by means within such unit. The Figs. 59a and 59b when arranged end-to-end with Fig. 59a at the top disclose one example of a program tape 15 wherein is recorded in successive record columns thereof, the code designations which effect a predetermined sequence of operations of the illustrated embodiment according to a comprehensive example or problem which will be described in detail hereinafter. As shown in Figs. 59a and 59b, the program tape 15 is divided longitudinally into a "Master" side at the left and a "Detail" side at the right. The tape is shown as containing one hundred and forty (140) transversely extending record columns which are indicated, respectively, by corresponding numerals arranged in a vertical row along the left-hand margin thereof. It will be appreciated that when controlling the operation of the illustrated embodiment, the tape 15 is suitably secured together at its ends by an adhesive or the like, to form the endless loop as shown in Figs. 2 and 3 and with its record column #1 following its record column #140. Each record column comprises 12 index point positions arranged in a transverse row and each row is divided equally into two sections with index point positions #1 to #6, inclusive, forming one section and being located on the right-hand or detail side of the program tape and with index point positions #7 to #12, inclusive, forming the other section and being located on the master side thereof. As will be explained hereinafter, only the code holes on one side of the tape are read during any one operating step. Thus, the master section and the detail section of each record column comprise in effect two separate record columns in transverse alignment. The functional operations of the elements of the illustrated embodiment are controlled, respectively, by corresponding code designations recorded in the two sections of the record columns according to a predetermined combinational hole code system. In Figs. 59a and 59b, the legends appearing along the left-hand, or master, side of the program tape 15 and in transverse alignment, respectively, with the cerod columns thereof, indicate the function, or functions, performed by the code designations recorded in the columns of the tape on the master side thereof which are in alignment with the respective legends. Similarly, the legends along the right-hand, or detail, side of the program tape identify the function, or functions, performed by the code designations appearing in the record columns aligned therewith and on the detail side of the tape. The vertical row of equally spaced holes in the center of the tapes are feed holes 16 which receive the teeth 101 of a feed sprocket 102 (Fig. 3) of the reading unit 100.

A chart showing all of the code designations of the predetermined code system used herein in connection with the program tape and showing the functional operation, or operations, performed by such code designations is included hereinbelow under this heading. As will be apparent, the code system used is a combinational hole code based on six index point positions with position #1 on the detail side of the tape corresponding to position #7 on the master side, position #2 corresponding to position #8, #3 to #9, #4 to #10, #5 to #11, and position #6 corresponding to position #12. For example, as indicated hereinbelow, the 1-5 code designation on the detail side of the tape (which is a code hole in the #1 index point position and a second code hole in the #5 index point position) is the equivalent of the 7-11 code designation on the master side of the tape, each such code designation providing, when sensed, for the turning on of the #1 typewriter. The complete code chart is as follows:

PROGRAM TAPE CODE SYSTEM

| Code Designations | | Functions Performed by Designations When Sensed |
|---|---|---|
| Master Side | Detail Side | |
| 7 | 1 | Card feed on |
| 8 | 2 | Card feed off |
| 9 | 3 | Tabulating |
| 10 | 4 | Carriage return |
| 11 | 5 | Space control |
| 12 | 6 | Skip off |
| 7-8 | 1-2 | Card feed off—Punch on |
| 7-9 | 1-3 | Card feed on—Punch off |
| 7-10 | 1-4 | #1 typewriter off—#2 typewriter off |
| 7-11 | 1-5 | #1 typewriter on |
| 7-12 | 1-6 | #1 typewriter off |
| 8-9 | 2-3 | #2 typewriter on |
| 8-10 | 2-4 | #2 typewriter off |
| 8-11 | 2-5 | Punch on |
| 8-12 | 2-6 | Punch off |
| 9-10 | 3-4 | Eject cycle control |
| 9-11 | 3-5 | Program tape feed on |
| 9-12 | 3-6 | Program tape feed off |
| 10-11 | 4-5 | Storage test |
| 10-12 | 4-6 | Storage conditioning |
| 11-12 | 5-6 | Card feed on—#1 typewriter off |
| 7-8-9 | 1-2-3 | Quantity number test |
| 7-8-10 | 1-2-4 | Readout quantity No.—4th position |
| 7-8-11 | 1-2-5 | Readout quantity No.—3rd position |
| 7-8-12 | 1-2-6 | Readout quantity No.—2nd position |
| 7-9-10 | 1-3-4 | Readout quantity No.—Units position |
| 7-9-11 | 1-3-5 | Readout order No.—6th position |
| 7-9-12 | 1-3-6 | Readout order No.—5th position |
| 7-10-11 | 1-4-5 | Readout order No.—4th position |
| 7-10-12 | 1-4-6 | Readout order No.—3rd position |
| 7-11-12 | 1-5-6 | Readout order No.—2nd position |

Program Tape Code System—Continued

| Code Designations | | Functions Performed by Designations When Sensed |
|---|---|---|
| Master Side | Detail Side | |
| 8-9-10 | 2-3-4 | Readout order No.—Units position |
| 8-9-11 | 2-3-5 | Readout page No.—2nd position |
| 8-9-12 | 2-3-6 | Readout page No.—Units position—Storage shift control |
| 8-10-11 | 2-4-5 | #1 typewriter off—#2 typewriter on—Punch off |
| 8-10-12 | 2-4-6 | #1 typewriter off—#2 typewriter on—Readout order No.—6th position |
| 8-11-12 | 2-5-6 | #1 typewriter off—Carriage return |
| 9-10-11 | 3-4-5 | #2 typewriter on—Punch on—Readout quantity No.—3rd position |
| 9-10-12 | 3-4-6 | Card feed on—#1 typewriter off—Punch off |
| 9-11-12 | 3-5-6 | Card feed on—#1 typewriter on—#2 typewriter off |
| 10-11-12 | 4-5-6 | #1 typewriter on—Readout order No.—6th position |
| 7-8-9-10 | 1-2-3-4 | Tape shift control |
| 7-8-9-11 | 1-2-3-5 | Punch off—Master card class control |
| 7-8-9-12 | 1-2-3-6 | Punch off—Quantity No. test |
| 7-8-10-11 | 1-2-4-5 | Tape skip on |
| 7-8-10-12 | 1-2-4-6 | Reset control |
| 7-8-11-12 | 1-2-5-6 | Punch operation only |
| 7-9-10-11 | 1-3-4-5 | Card feed on—Punch on |
| 7-9-10-12 | 1-3-4-6 | Card feed off—#1 typewriter on—Tape shift control |
| 7-10-11-12 | 1-4-5-6 | Unit net price skip control |
| 8-9-10-11 | 2-3-4-5 | Diagonal control |
| 8-9-10-12 | 2-3-4-6 | Net price—Tabulating control |
| 8-9-11-12 | 2-3-5-6 | Punch CR code only |
| 8-10-11-12 | 2-4-5-6 | Punch LF code only |
| 9-10-11-12 | 3-4-5-6 | Punch figures—Shift code only—#1 typewriter on |
| 7-8-9-10-11-12 | 1-2-3-4-5-6 | Homing control |

Reading unit

The details of construction of the reading unit 100 are fully disclosed in Figs. 1 to 23, inclusive. The reading unit 100 is suitably mounted on the desk 10 (Fig. 1) and the top 17 of the desk is so formed as to hide all parts of the unit except the cover 103 for the card reading and feeding part of the unit. Figs. 2 to 23 show the unit 100 as removed from the desk 10. It is also noted that the cover 103 has been omitted from the plan view of the unit 100 in Fig. 2, so that certain detail parts of the card feeding means may be shown therein. The cover 103 also appears partially in Figs. 3 and 13. As shown, the cover 103 is provided with a card entrance slot 104 into which the record cards to be read are manually inserted, one after the other, and the cover 103 also includes a card eject slot 105 from which the cards that have been read are partially ejected so that they may be removed by the operator.

The function of the reading unit 100 is to read successively and in step-by-step fashion the record columns of a record card in reading position, and also to read successively and in step-by-step fashion the record columns of the program tape 15. The reading unit 100 is cyclically operable by its own drive motor 106, and the unit comprises a card feeding means which when turned on feeds the cards in steps and column-by-column past a sensing station indicated at 107 (Fig. 13), the record column of the card at the sensing station being sensed with the card stationary and the card being then advanced a distance of one record column during each operating step of the reading unit. The reading unit also comprises a program tape feeding means which normally advances the program tape 15 in steps and column-by-column past a sensing station indicated at 108 (Fig. 3). The record column of the tape 15 in sensing position is sensed and the tape advanced one record column during each normal operating step of the unit 100. The reading unit also includes a means for feeding the program tape and record card together at a relatively fast rate of speed for the purpose of skipping over predetermined groups of record columns in the tape and card. As will later appear, this skipping operation is terminated by the reading of a significant code designation in a record column of the program tape when the tape is moving at the fast or skipping rate. Other designations in the tape passed over during the skipping operation, will not perform the functional operations represented thereby for reasons which will appear more fully hereinafter. The card sensing means does not function during the skipping operation. The reading unit 100 also functions either under manual control or under control of the program tape to feed a new record card into its #1 column sensing position and to eject an old record card from the unit, as will presently appear.

As shown in Figs. 2 and 3, the reading unit comprises two main side frame plates 110 and 111, respectively, and two supplemental frame plates 112 and 113 arranged, respectively, at the outer sides of the main plates 110 and 111. The four plates are rigidly secured together in parallel spaced relation, as shown in Fig. 2, by a plurality of transversely extending frame plate members 114 and by a plurality of spacing studs 115. The cover 103 is suitably hinged at its rear or left-hand end, as appearing in Figs. 3 and 13, by suitable pivot screws 117 attached to the main frame plates 110 and 111. A spring clip 118 secured to the right-hand underside part of the cover 103 detachably engages a spacing stud 115 and thereby holds the cover 103 in place.

The power for driving the reading unit 100 is furnished by a suitable electric motor 106 which is suitably secured by bolts 119 to a transverse frame member 114 extending across the left-hand ends of the main side frames 110 and 111, as shown in Fig. 2. The motor shaft 120 is provided with a driving pulley 121 which is operatively connected to a main drive shaft DS by means of a suitable belt 122 and a driven pulley 123 fixed to the main drive shaft DS. The main drive shaft DS extends transversely across the reading unit and is journalled within suitable bearings carried within aligned openings in the two main frame plates 110 and 111 and the supplemental frame plate 113.

The several operating functions of the reading unit 100 are effected by the engaging of corresponding clutches which, respectively, provide driving connections between the main shaft DS and related motion transmitting mechanisms to effect their different operating functions. An eject clutch EJC (Figs. 6, 9, 10, and 11), when engaged, connects the main drive shaft DS to motion transmitting mechanism for driving a pair of hopper feed rolls 125 and 126 (Fig. 13), two live eject rolls 127 and 128, and for driving an eject cam shaft 129 (Fig. 9) having mounted thereon four control cams, identified herein as eject cams EC1, EC2, EC3, and EC4, respectively, all of which provide for feeding a new record card into the reading unit and for ejecting an old record card therefrom. The eject clutch EJC is engaged by the energizing of the eject clutch magnet EJM. The eject operation will be described fully hereinafter under a separate sub-heading. The card feed clutch CFC which is controlled by a magnet CFM (Figs. 17 and 18), connects the main drive shaft DS with a motion transmitting chain terminating in a pair of card feeding rolls 130 and 131 (Figs. 2, 9, 13, and 14). The rolls 130 and 131 function when the clutch CFC is engaged to advance a record card a distance of one record column for each operating step of the reading unit. When the card feed clutch CFC is engaged, provision is also made for sensing a record column of the card during each such operating step of the unit. The sensing is effected by simultaneously moving twelve card reading fingers corresponding, respectively, to the twelve index point positions of each record column of the card, into sensing relation with respect to the particular record column which is at the sensing station 107 (Fig. 13) and consequently is in position to be sensed. The twelve card reading fingers are indicated, respectively, by the reference characters CRF1 to CRF12, inclusive. The card feeding and reading operation will also be described in detail hereinafter. The tape feed clutch TFC which is controlled by a magnet TFM (Fig. 16), provides for connecting the main drive shaft DS with a motion-transmitting mechanism terminating in the tape feeding sprocket 102 (Figs. 3, 17, and 20), and thereby functions to feed the program tape 15 past the tape sensing station indicated at 108 in Fig. 3. The manner in which the clutch TFC effects the feeding of the program tape will be described hereinafter under a separate sub-heading. The skip clutch SKC is controlled by its magnet SKM (Figs. 22 and 23) and provides, when engaged, for connecting the main drive shaft DS with two motion-transmitting trains including, respectively, the tape feed sprocket 102 and the card feed rolls 130 and 131 and thereby provides for feeding the tape and card at a substantially increased speed which, in the illustrated embodiment, comprises feeding the card and tape, in one revolution of the main drive shaft DS, four times the distance they are fed when the sprocket 102 is rotated in its normal manner through the clutch TFC and when the rolls 130 and 131 are rotated through the clutch CFC. This will also be explained fully hereinafter under a separate sub-heading.

The card reading and card feeding part of the reading unit 100 is shown in plan at the right-hand end of Figs. 2 and 9 and in vertical section in Figs. 13 and 14. With the parts in the position shown in Fig. 13, any one of the record cards of Figs. 42 to 46, inclusive, when inserted into the card entrance slot 104 in the cover 103, will be guided into an entrance passage 133a; the latter being defined at one side by the inner convex face of a curved plate 134 extending between the two main frame plates 110 and 111, and being defined at its other side by the concave face of a curved partition wall member 135 which also extends between the two main frame plates 110 and 111. A second card entrance passage 133b is arranged alongside the passage 133a and is defined at one side by the inner concave face of an outer curved plate 136 extending between the main frame plates 110 and 111, and is defined at its other side by the convex face of the curved partition wall member 135.

The partition wall 135 comprises a fixed lower part 137 and a movable upper part 138, the upper part 138 being fixed at its lower end to a transversely extending shaft 139. The shaft 139 is journalled within suitable bearings mounted within the two main frame plates 110 and 111, and one end of the shaft extends outwardly beyond the main frame plate 110 (Fig. 6) and an operating lever arm 140 is fixed to the outer end thereof. As will later appear, the shaft 139 may be rotated by the arm 140 to position the upper partition part 138 either at one side or the other side of the card entrance slot 104.

With the pivoted upper part 138 in the position shown in Fig. 13, the card entrance slot 104 is aligned with the card entrance passage 133a and either of the record cards of Figs. 42 to 46, inclusive, may be inserted therein by the operator. When the shaft 139 is rotated counterclockwise as viewed in Fig. 13, until the pivoted upper part 138 of the partition lies alongside the plate 134, the other card entrance passage 133b will be aligned with the card entrance slot 104 and can thereby receive an inserted record card.

The two card entrance passages 133a and 133b merge at their lower ends with a main card passage 141 which is defined at one side thereof by the outer curved plate 136 and is defined at the other side thereof by the lower part of the inner plate 134, a plate 142, a flange 143 of a transverse frame member 114 and by a plate 144 which also functions as a transverse frame member for tying the two main frame plates 110 and 111 together. The outer end of the main card passage 141 is aligned with the card eject slot 105 in the cover 103. In order to facilitate manufacture, assembly, and servicing, the plates defining the passages 133a, 133b and 141 may be formed in sections, and certain of the plates may be so constructed that they can be removed, when desired.

Coacting with a record card during its passage through the two entrance passages 133a and 133b and the main card passage 141 are the hopper feed rolls 125 and 126, the pair of main card feeding rolls 130 and 131, a first pair of eject rolls 127 and 146, and a second pair of eject rolls 128 and 147. The hopper feed rolls 125 and 126, the eject rolls 127 of the first pair and the eject rolls 128 of the second pair extend through suitable openings in the defining walls of the card passages 133a, 133b and 141, and are rotated continuously throughout an eject operating cycle. The eject rolls 146 of the first pair and the eject rolls 147 of the second pair are idler rolls which are moved, in a manner which will be presently explained, through adjacent openings in the outer wall plate 136 and into and out of feeding engagement with the card during different portions of the eject cycle so as to press the card against the live rolls 127 and 128 and thereby feed the card forwardly through the passage 141.

An idler roll 149 is mounted on a shaft 150 extending across and rotatably supported in the movable upper part 138 of the partition 135. When the movable upper part 138 occupies the position shown in Fig. 13, the idler roll 149 will engage the face of a record card in the entrance passage 133b and will thereby press such card against the live roll 126 with the result that the card will be fed through the entrance passage 133b until the forward end thereof is in the main passage 141 and between the main card feeding rolls 130 and 131, the forward movement of the card being limited by a stop 187 extending across the passage 141, as will be presently described. When the movable upper part 138 is shifted to its other position, adjacent the plate 134, the roll 149 will press a card in the entrance passage 133a against the live hopper roll 125 and will thereby feed such card through the passage 133a and until the forward end thereof is in the passage 141 and between the rolls 130 and 131 and its forward edge engages the stop 187. In the latter feeding operation, the rear end of the card does not quite clear the roll 126 and the latter will slip on the surface of the card when it engages the stop.

As explained hereinabove, the normal operation of the main card feeding rolls 130 and 131 provides for their rotation only when the card feed clutch CFC is engaged, and in such a manner that the card is advanced in the passage 141 one record column for each operating step of the reading unit 100. Also, the card feeding rolls 130 and 131 are rotated at four times their normal feeding rate when the skip clutch SKC is engaged so as to feed a card at the skipping rate. The main card feeding rolls 130 and 131 are not rotated during an eject cycle when an old record card is being removed from the card reading unit and a new card is fed into card reading position in the unit.

A first card-entrance stop 151a comprises a pair of spaced stop fingers 152 (Figs. 9 and 13) which is fixed to a shaft 153 and the latter is rotatably supported in any suitable manner by the two main plates 110 and 111 and extends outwardly beyond the plate 110 (see also Fig. 6). Partial rotation of the shaft 153 in opposite directions moves the outer ends of the stop fingers 152 through openings 156 in the plate 134 and into and out of card intercepting position with respect to the lower end of the entrance passage 133a. A second card-entrance stop 151b (Figs. 8 and 13) also comprises a pair of spaced stop fingers 154 fixed to a shaft 155 rotatably supported by the two plates 110 and 111 and also extending outwardly beyond the plate 110 as shown in Fig. 6. The outer ends of the fingers 154 move through openings 157 in the wall 136 when the shaft 155 is rotated and into and out of card intercepting position with respect to the lower end of the card entrance passage 133b.

The stops 151a and 151b are referred to hereinafter as the #1 card-entrance stops; and, as will be explained more fully, the operation of the #1 card-entrance stops 151a and 151b and the upper part 138 of the partition 135 is such that when the partition part 138 occupies the position shown in Fig. 13 where the card-entrance passage 133a is aligned with the slot 104 and may receive a new card, the fingers 152 of the card-entrance stop 151a extend through the openings 156 and are in position to be engaged by the lower or leading edge of an inserted card and thereby stop such card from further movement. Also, with the partition part 138 in the position shown, the #1 card-entrance stop 151b is out of intercepting relation with respect to a card in the passage 133b so that should there be a previously inserted card in such passage 133b, the card may be fed through such passage and into the main card passage 141 by the rolls 126 and 149, as previously explained. When the movable upper partition part 138 is moved counterclockwise as viewed in Fig. 13 to its other extreme position where the slot 104 and passage 133b are connected, the card-entrance stop 151a will move out of position across the entrance passage 133a and the card-entrance stop 151b will move into intercepting position across the entrance passage 133b.

From the foregoing, it is believed to be apparent that the arrangement of the two entrance passages 133a and 133b in side-by-side relation and the provision of the pivoted upper partition part 138 which alternately aligns the card-entrance slot 104 with the two entrance passages 133a and 133b, respectively, and the provision of the two #1 card-entrance stops 151a and 151b, which cooperate with the upper partition part 138 and the two passages 133a and 133b to stop a newly inserted card, all provide a highly compact and novel structural arrangement which permits the operator to insert a second card into position to be fed into the reading unit while a first card is being read and thereby eliminates a delay between successive card reading operations.

The hopper contacts HC, which are shown in Fig. 6 as being supported by the main frame plate 110, are closed by the leading edge of each newly inserted card in the card-entrance passages 133a and 133b when such leading edge engages either of the #1 card-entrance stops 151a and 151b. When there is no previously inserted card in the main card passage 141, the closing of the hopper contacts HC initiates an eject cycle, as will be fully explained hereinafter. As the opening and closing of the hopper contacts HC is closely related to the alternate positioning of the card-entrance stops 151a and 151b during alternate eject cycles, the contacts HC and their operation will be described in detail at this point. The hopper contacts HC are opened and latched open during each eject cycle and remain in the latter condition until the next new record card is fully inserted in one of the card-entrance passages 133a or 133b.

As shown in Figs. 6 and 7, the hopper contacts HC comprise a lower fixed blade 159 carrying a contact point 160 and an upper movable spring blade 161 carrying a contact point 162 and biased by the inherent spring force therein to move downward towards closed position. The blades 159 and 161 are suitably mounted in a block 163 and the latter is suitably fixed to the frame plate 110. A catch plate 164 extends laterally from the movable upper blade 161 in the same plane thereof and is suitably secured thereto by rivets 165 and an overlapping strip 166 of suitable insulating material. The left-hand end of the catch plate 164 as shown in Fig. 7 coacts with either the lower end of a latch finger 167 or the upper end of a latch finger 168 to hold the upper blade 161 in latched position where the contacts HC are open. The latch finger 167 is fixed to the end of the shaft 153 which carries the #1 card-entrance stop 151a, and the latch finger 168 is fixed to the end of shaft 155 which carries the other #1 card-entrance stop 151b.

Rotatably mounted on the shaft 153 is an operating bell crank 169 and rotatably mounted on the shaft 155 is an operating arm 170 which is connected by a link 171 to the outer end of one arm 172 of the bell crank 169. The latch finger 167 forms one arm of a bell crank 173 which includes a second arm 174 and the latter is connected to the arm 172 of the operating bell crank 169 by a lost-motion connection comprising a pin 175 fixed to the arm 172 and projecting into a slot formed by the bifurcated outer end of the arm 174. Likewise, the latch finger 168 forms one arm of a bell crank 176 which includes another arm 177 having a lost-motion connection with the operating arm 170 which comprises a pin 178 fixed to the arm 170 and extending within a slot formed by the bifurcated outer end of the arm 177. A tension spring 180 connecting the arm 174 and an arm 181 of the bell crank 169, constantly urges the bell crank 173, shaft 153, and stop 151a counterclockwise as shown in Figs. 6, 7, and 13, and to a point where the pin 175 is engaged by the side 182 of the slot in the arm 174. Thus with the parts in the position shown, the spring 180 normally holds the latch finger 167 in latching engagement with the underside of the catch plate 164 and holds the #1 card-entrance stop 151a (Fig. 13) in intercepting position across the entrance passage 133a. A tension spring 183 connects a mid portion of the latch finger 168 and the link 171 and thereby constantly urges the bell crank 176, stop shaft 155, and stop 151b clockwise as shown in Figs. 6, 7, and 13, and to a position where the side 184 of the slot in arm 177 engages the pin 178. The spring 183 thus urges the latch finger 168 towards latching position beneath the catch plate 164 and the #1 card-entrance stop 151b (Fig. 13) towards intercepting position across the card-entrance passage 133b.

With the operating bell crank 169 and arm 170 in the position shown, the latch finger 167 engages the catch 164 and thereby latches the hopper contacts HC open, and the other latch finger 168 is prevented from engaging the catch plate 164 due to the position of the operating arm 170 and the pin 178. As will later appear, during the next eject cycle to be effected, the bell crank 169, arm 170, and bell cranks 173 and 176 are each moved clockwise to a position where the finger 167 can not coact with the catch plate 164 and where the finger 168 can coact with the plate 164; and, during the eject cycle following said next eject cycle, the parts named will be restored to the position shown in Figs. 6 and 7.

Summarizing the foregoing, the construction and arrangement is such that with the upper partition part 138 in the position shown in Fig. 13 where the entrance passage 133a is open to receive an inserted record card, the #1 card-entrance stop 151a is across the lower end of the passage 133a and the latch finger 167 is beneath the catch plate 164 and holding the contacts HC latched open; and, with the partition plate 138 shifted from the position shown in Fig. 13 to the position where the card-entrance passage 133b is aligned with the entrance slot 104, the #1 card-entrance stop 151b will be in intercepting position across the lower end of the passage 133b and the latch finger 168 will be in latching position beneath the catch plate 164.

The lost-motion connection provided by the pin 175 and slot in the arm 174 permits clockwise movement of the #1 card-entrance stop 151a and latch finger 167 with respect to the arm 172, within limits permitted by the width of such slot. Similarly, the lost-motion connection provided by the pin 178 and the slot in the arm 177 permits counterclockwise movement of the #1 stop 151b and latch finger 168 with respect to the operating arm 170. Thus, with the parts shown in the drawings, the insertion of a new record card fully in the passage 133a will cause the lower end thereof to engage the #1 card-entrance stop 151a and move the latter clockwise as viewed in Fig. 13, and such movement will cause the stop shaft 153 to move the latch finger 167 clockwise (Fig. 7) against the force of the spring 180 and out of engagement with the catch plate 164 and permit the hopper contacts HC to close due to the inherent spring force of the blade 161. From the foregoing, it is believed that it will also be apparent that with the latch 168 in latching position beneath the catch plate 164 and the #1 card-entrance stop 151b in intercepting position across the passage 133b, the full insertion of a record card in the passage 133b will move the stop 151b, the shaft 155, and bell crank 176 counterclockwise against the force of the spring 183 an amount permitted by the width of the slot in the arm 177 and such movement is sufficient to move the latch 168 from beneath the catch plate 164 and thereby permit the releasing of the latter and the consequent closing of the contacts HC. As explained, the closing of the hopper contacts HC by a new card, initiates an eject cycle, if there is no old record card in the reading unit 100. As will presently appear, a stud 185 on the end of an arm 186 is raised to reopen the hopper contacts HC during each eject cycle; and, while the contacts are thus held open, the respective positions of the operating bell crank 169 and arm 170 are shifted (either clockwise from the position shown, or back to the position shown, depending upon their position at the beginning of the particular eject cycle) and in so doing one of the latch fingers, 167 or 168, will move beneath the catch plate 164. Later on during the eject cycle, the arm 186 will be restored to the position shown and the stud 185 thereby lowered to a point where the blade 161 moves the catch plate 164 into engagement with the particular latch finger, 167 or 168, then in latching position.

In a manner which will be fully explained hereinafter, a #2 card-positioning stop 187 (Fig. 13), comprising a plate 188 carrying fingers 189 (Fig. 9), is rotatably supported on a shaft 190 and the stop 187 is adapted to be moved into intercepting position across the main card passage 141 during each eject cycle for the purpose of stopping each new card fed into the unit in a position where its #1 record column is at the sensing station 107 and therefore in position to be sensed by the card reading fingers CRF. The #2 stop 187 is moved out of intercepting position at the end of each eject operation.

*Card eject mechanism and operation.*—With no record card in the reading unit, an eject operation is effected for the purpose of feeding the first record card into card reading position within the unit 100. After the first card has been thus fed into the unit, a subsequent eject operation provides for ejecting the old card from the unit and for feeding the next new card into card reading position. The initial eject operation is effected by the closing of hopper contacts HC (Figs. 6 and 7) which, as will later appear, provides for energizing the eject clutch magnet EJM (Figs. 7, 9 and 11). As explained above, the hopper contacts HC are closed by the insertion of each new card into the card receiving slot 104 and into the then open card entrance passage, 133a or 133b, until the lower edge of such card engages the particular entrance #1 stop, 151a or 151b, which is across the lower end of such passage. The closing of the hopper contacts can effect an eject operation only when there is no old card in the unit, as will later appear. With an old card in the unit, an eject operation is effected by the manual actuation of an eject key EJK (Figs. 1 and 27) on the auxiliary keyboard 302 of the #1 typewriter 300, which results in the closing of the eject key contacts EJC (Fig. 62k) and the latter then provide for the energizing of the eject clutch magnet EJM (Figs. 6, 11 and 62e) in a manner which will be described hereinafter. Also, with an old card in the main passage 141 of the unit 100 an eject operation may be effected by the reading of a significant code designation in the program tape which will energize the magnet EJM as will be described hereinafter.

The energizing of the eject clutch magnet EJM trips the eject clutch EJC (Figs. 6 and 11) and thereby effects an eject cycle of operation during which the following functional operations are performed:

(a) The normal card feeding rolls 130 and 131 are separated to permit the old card to be ejected and the new card to be fed therebetween.

(b) A new card in a card-entrance passage, 133a or 133b, is aligned therein.

(c) The hopper contacts HC (Fig. 6) are moved to open position.

(d) The idler eject roll 146 is moved into feeding relation with respect to the live eject roll 127 and thereby initiates ejecting of the old card, if there be one in the passage 141.

(e) The #2 card stop 187 which positions the new card in its #1 column reading position (Fig. 13) is moved into intercepting position across the main passage 141 after the old card has cleared the eject rolls 127 and 146.

(f) The eject idler roll 147 is moved into card feeding relation with respect to the live eject roll 128 and thereby completes the ejecting of the old card.

(g) The position of the upper partition part 138 is shifted to press the idler roll 149 against one of the live hopper feed rolls, 125 or 126, and concurrently therewith the particular #1 entrance stop, 151a or 151b, which is across the passage containing the new card is moved out of intercepting position and the other #1 entrance stop is moved into intercepting position, with the result that the new card is fed into the unit until the forward edge thereof engages the #2 positioning stop 187. The #1 card column of the new card will then be in position to be sensed. Concomitantly with the foregoing one of the latch fingers, 167 or 168, is moved into latching position beneath the catch plate 164.

(h) The idler eject roll 146 is moved out of card feeding relation with respect to the live roll 127 and the feeding roll 131 is moved back into feeding relation with respect to the new card and the feeding roll 130; and, at the same time, the movable blade 161 of the hopper contacts HC is lowered to a point where it is engaged by the particular latch finger, 167 or 168, which was previously moved into latching position.

(i) The #2 stop 187 is moved out of intercepting relation with respect to the new card now in position to have its #1 column sensed.

(j) The eject idler roll 147 is moved out of card feeding relation with respect to the live roll 128.

The manner in which the above functions are performed during an eject cycle will now be described in detail. As shown in Figs. 5 and 6, the main drive shaft DS is operatively connected to a constantly running eject clutch shaft 192 by means of a train of spur gearing. The eject clutch shaft is journalled within aligned bearings provided in openings in the main frame plate 110 and supplemental plate 112. The gear train comprises the gears 193, 194, 195, 196, and 197. The small gear 193 is fixed to the main drive shaft DS (Fig. 5) and meshes with the large gear 194 mounted on a sleeve 199 fixed to a shaft 200 which is suitably journalled within bearings in the main plate 110 and supplemental plate 112. The small gear 195 is also fixed to the sleeve 199 and meshes with the large gear 196 fixed to a shaft 201 (see also Fig. 6) which is also journalled for rotation in the main and supplemental frame plates 110 and 112, respectively. The gear 196 meshes with the gear 197 fixed to the eject clutch shaft 192 (see also Figs. 9, 10, and 11). The gear ratio is such that the eject clutch shaft 192 rotates at one-fifth (⅕) of the speed of the main drive shaft DS.

The eject clutch EJC (Figs. 10 and 11) comprises a ratchet 202 which is formed integral with the drive gear 197 and is thereby continuously rotated by the main drive shaft DS through the gear train just described. The eject clutch also comprises a clutch disk 203 fixed to the hub of a double gear 204 which is in turn journalled on the shaft 192. A clutch pawl 205 is pivoted on a stud 206 extending from the side of the disk 203 and is constantly urged by a spring 207 into clutching engagement with the ratchet 202. The eject magnet EJM includes a pivoted armature 208 urged by a spring 209 away from the poles of the magnet coil and into intercepting position with respect to a tail portion 210 formed on the clutch pawl 205. In Fig. 11, the parts are shown in their declutched position where the outer end of the armature 208 engages the tail 210 and thereby holds the pawl 205 out of clutching engagement with the ratchet 202 and against the force of the spring 207. The parts are held in this position by means of a detent roll 212 mounted on the outer end of an arm 213 and cooperating with a notch or recess 214 in the outer periphery of the clutch disk 203. The detent roller 212 is constantly urged into engagement with the periphery of the disk by means of a suitable tension spring 215 which connects the outer end of an arm 216, movable with the arm 213, to the fixed mounting plate 217 of the eject magnet EJM. Thus, when the eject magnet is energized, its armature 208 is attracted and moves out of engagement with the tail 210 of the pawl 205 to trip the clutch EJC. The spring 207 then pivots the pawl 205 into engagement with the constantly running clutch ratchet 202 and thereby provides a driving connection between the ratchet 202 and the pawl 205 carried by the clutch disk 203. As will appear hereinafter, the energizing circuit for the eject clutch magnet EJM is broken before the clutch disk 203 completes a revolution, and thereby deenergizes the clutch magnet coil and permits the spring 209 to move the armature 208 into intercepting position with respect to the tail 210 of the pawl 205 before the latter reaches its home or starting position shown. The tail 210 of the pawl will therefore engage the outer end of the armature 208, with the result that the pawl 205 is pivoted out of engagement with the clutch ratchet 202 and against the force of the spring 207 and at the same time the detent roller 212 fits within the notch 214 of the clutch disk 203 and thereby holds the driven parts of the clutch in their disengaged position which is the position shown in Fig. 11.

The eject operating cycle is effected during the one revolution of the clutch disk 203 and during such cycle all of the operations listed hereinabove in the indented paragraphs "a" to "j," inclusive, are performed. As stated, the clutch disk 203 is staked on the hub of the double gear 204 which in turn is journalled on the shaft 192. The double gear 204 comprises a small spur gear element 220 which meshes with a large gear 221 fixed to the eject cam shaft 129. The speed ratio of the gears 220 and 221 is such that the eject cam shaft 129 is rotated one-half of a revolution each time the eject clutch EJC is engaged and rotates the gear 204 one revolution.

The double gear 204 also comprises a relatively large spur gear element 222 (Figs. 6 and 9), which meshes with a small gear 223 fixed to one end of a sleeve 224 which is in turn fixed to a shaft 225 suitably journalled in the plates 110 and 112. A large gear 226 is fixed to the other end of the sleeve 224 and meshes with a small gear 227 fixed to a shaft 228 on which the live eject rolls 128 (see also Fig. 13) are mounted. The speed ratio between the gear 222 and gear 227 is such that the eject roll shaft 228 makes approximately seven revolutions for one revolution of the gear 222. The gear 227 also meshes with an idler gear 229 suitably journalled on a stud 230 extending from the main frame plate 110. The idler 229 also meshes with a gear 232 fixed to the shaft 231 on which the live eject rolls 127 are mounted. The gear 232 and shaft 231 also rotate approximately seven revolutions for each revolution of the gear 222.

As shown in Figs. 3, 9, and 17, the eject roll shaft 228 extends outward beyond the frame plate 111 and a drive pulley 233 is fixed to the outer end thereof. The pulley 233 is operatively connected by a suitable belt 234 to a pulley 235 fixed to an outer end of the shaft 236 which carries the live hopper feed roll 125 (see Fig. 13). As shown in Figs. 2 and 6, the shaft 236 extends beyond the frame plate 110 and a gear 237 fixed to the outer end thereof meshes with a gear 238 fixed to the outer end of the shaft 239 which carries the other live hopper feed roll 126. The hopper feed rolls 125 and 126 are thus driven approximately seven revolutions for each revolution of the gear 222 driven through eject clutch EJC. The increase in speed of the live eject rolls 127 and 128 and hopper rolls 125 and 126 over the eject clutch gear 222 is such as to provide a sufficient number of revolutions of the live eject rolls and hopper feed rolls to effect the ejecting of the old card from the card reading unit and to feed a new card into its #1 column sensing position during each eject cycle.

The eject cam shaft 129 appears in Figs. 6, 9, 10, 12, 13, 14, and 15. As stated, the four eject cams EC1, EC2, EC3, and EC4, respectively, are fixed to the shaft 129. The timing of these eject cams is diagrammatically indicated in the eject timing chart of Fig. 60. There are two eject cycles shown as the eject cam EC2 and the feeling of the new card has slightly different timing on alternate eject cycles. Each 360° indicated in this chart comprises one eject cycle and corresponds to one revolution of the eject clutch disk 203 and gear elements 220 and 222, and to one-half revolution of the eject cam shaft 129 and the eject cams mounted thereon. As explained, the eject cycle is initiated by the energizing of the eject clutch magnet EJM and is terminated by the latching up of the clutch at the end of one revolution of the shaft 192.

The eject cam EC1, which appears in side elevation in Fig. 15, is also referred to herein as the feed roll cam. When the clutch EJC is tripped, the cam EC1 makes one-half revolution from the position shown and in the direction of the arrow (Fig. 15). As shown, the cam EC1 comprises two diametrically opposed low dwell portions 241 of the same arcuate length, two diametrically opposed high dwell portions 242 of equal length and two diametrically opposed intermediate dwell portions 243 of equal length. Thus, the configuration of the cam is symmetrical and will operate a follower arm 244 (see also Fig. 8), which engages the periphery thereof, in the same manner for each one-half of a revolution. Pins 245 on diametrically opposed parts of the side of the cam EC1 will also engage and move the pivoted arm 240 counterclockwise at the same time for each one-half revolution.

The follower arm 244 is provided at one end with a suitable roller 246 which engages the periphery of the cam EC1 and the arm 244 is fixed at its other end on a sleeve 260 fixed to a shaft 247 (Figs. 6, 8, and 15), the latter being suitably journalled in aligned bearings (not shown) carried within openings in the two main frame plates 110 and 111, respectively. The two ends of such shaft 247 extend outwardly beyond the two plates 110 and 111. Thus, as the eject cam EC1 starts to rotate counterclockwise from the position shown in Fig. 15, the follower arm 244 is moved downwardly and thereby rocks the shaft 247 counterclockwise as viewed in Figs. 6 and 13.

Fixed to the outer ends of the shaft 247 are a pair of similarly formed levers 248 and 249, respectively, (Figs. 2, 6, and 8). One end 250 of each lever 248 and 249 engages a roller 251 mounted on a stud 252 projecting from one end of a lever 253, there being two such levers 253 and they being located, respectively, at the outer sides of the plates 110 and 111 and pivotally supported, respectively, on studs 254 projecting outwardly from the plates 110 and 111. The two pivot pivot studs are axially aligned as shown in Fig. 8. The ends of the two levers 253 which are remote from the rollers 251 have bearings mounted therein which rotatably support the two ends of a shaft 255 which carries the idler eject rolls 146. The two frame plates 110 and 111 are provided, respectively, with enlarged openings 256 axially aligned with one another and through which the ends of the shaft 255 extends, thereby permitting movement of the shaft 255 and rolls 146 with respect to the main frame plates.

As shown in Fig. 6, a tension spring 257 is connected at one end to the stud 252 and is attached at its other end to a stud 258 projecting from the related one of the levers 248 and 249. Both levers 248 and 249 are connected to their related levers 253 in this manner. Thus, when the levers 248 and 249 are rocked counterclockwise, as viewed in Fig. 6, by the eject cam EC1 at the beginning of each eject cycle, the springs 257 will rotate the levers 253 counterclockwise, as viewed in Figs. 6 and 13, and thereby move the shaft 255 and idler eject rolls 146 upward into card feeding relation with respect to the live eject rolls 127.

The ends of the two levers 248 and 249 remote from the ends 250 are notched as indicated at 259 and engage, respectively, studs 261 extending outwardly from a pair of levers 262 and 263, respectively. The levers 262 and 263 are arranged, respectively, at the outer sides of the frame plates 110 and 111 and are each pivotally supported by a stud 264 extending outwardly from the adjacent frame plates. The ends of the two levers 262 and 263 remote from the studs 261 rotatably support, respectively, the two ends of a shaft 265 which carries the lower normal card feed roll 131. The two frame plates 110 and 111 are provided with enlarged openings 266 through which the ends of the shaft 265 extend. The openings 266 permit movement of the shaft 265 and roll 131 with respect to the frame plates 110 and 111 and the other or upper normal card feed roll 130 (Fig. 13). The shaft 267 carrying the upper roll 130 is suitably mounted within aligned bearings (not shown) in the two frame plates 110 and 111 and is thereby supported for rotation about a fixed axis.

Thus, when the two levers 248 and 249 are rocked counterclockwise as viewed in Fig. 6 by the cam follower roller 246 (Fig. 15) moving onto the high dwell portion 242 of the eject cam EC1, as stated above, the notched ends 259 of such levers which engage the studs 261, rock the two levers 262 and 263 counterclockwise and thereby move the shaft 265 and lower normal feed roll 131 away from and out of card feeding relation with the upper feed roll 130. The two feed roll shafts 265 and 267 are operatively connected at both of their ends by a pair of meshing spur gears 268 and 269, respectively. The just described movement of the shaft 265 and lower feed roll 131 is sufficient to separate the two feed rolls 131 and 130 so that a record card can be freely moved therebetween, but such movement is not enough to completely demesh the gears 268 and 269 at either end thereof.

As shown in Figs. 8 and 13, a pair of similar levers 270 are rotatably supported intermediate their respective ends upon the shaft 155 which carries the #1 card-entrance stop 151b. A roller 271 is pivotally mounted on one end of each lever 270 and bears against the shaft 265 carrying the movable card feed roll 131. The other end of each lever 270 is attached to a tension spring 272 which is in turn connected at its other end to a stud 273 projecting inwardly from a main frame plate. It will be apparent that each spring 272 constantly urges its related lever 270 clockwise as viewed in Fig. 13, so that the roller 271 thereon presses upward against the feed roll shaft 265 and thereby opposes movement of the feed roll 131 away from the feed roll 130.

From the foregoing, it is apparent that as the eject cam EC1 begins to rotate at the start of an eject cycle, the idler eject roll 146 is brought into card feeding relation with respect to the live eject roll 127 and the normal feed roll 131 is moved out of card feeding relation with respect to its related roll 130. This initiates the ejecting of an old card and permits the feeding of a new card between the card feed rolls 130 and 131. As shown in the eject time chart (Fig. 60), the cam EC1 begins to move the follower arm 244 and shaft 247 counterclockwise at about 10° of each eject cycle and completes such movement at about 32° of such cycle. This will cause the normal feed roll 131 to move out of card feeding relation with respect to the roll 130 at about 15°. When there is a card in the main card passage 141 at the start of an eject cycle, such card will start being ejected due to the coaction of the eject rolls 127 and 146 at about 25° of such eject cycle. The cam follower roller 246 will engage the high dwell 242 of eject cam EC1 until about 240° of each eject cycle and will occupy the intermediate dwell 243 from about 250° to 285° and will return to the low dwell 241 at about 300°. When the follower roller 246 moves to the intermediate dwell 243, the idler eject roll 146 is moved out of card feeding relation with respect to the live eject roll 127 and the normal card feeding roll 131 is returned toward its related roll 130 by the levers 248 and 249 and springs 272, but the rolls 130 and 131 are held in slightly spaced relation by the intermediate dwell 243 of the cam so as to permit the new card to move therebetween to its #1 column reading position. When the follower roller 246 again engages the low dwell 241, the rolls 130 and 131 are returned to their normal card feeding relation shown on the drawings. Thus, the idler eject roll 146 and the feed rolls are both returned fully to their positions shown in Fig. 13 at 300° of each eject cycle.

As shown in Fig. 6, the stud 185, previously described as being moved upward to open the hopper contacts HC during an eject cycle, is carried by an extension 275 of one arm of the lever 262. The stud 185 moves upward to open the hopper contacts at 25° of each eject cycle and will be returned to the position shown after 245° of each eject cycle (see also Fig. 60).

Means is provided for aligning the new record card in either card entrance passage, 133a or 133b, at the beginning of an eject cycle. As shown in Figs. 3, 4, and 8, the feed roll operating lever 263, which is at the outer side of the main frame plate 111, is provided with an extension 276 which is connected by a pin-and-slot connection 277 with one arm of a bell crank 278, the latter being pivoted on a stud 279 extending outward from the frame plate 111. The bell crank 278 comprises a second arm having a right angle flange at its outer end, which flange varies in width from one end to the other thereof, to provide a wedge-shaped outer edge forming a sloping cam 280 and cooperating with an edge 281 of a slot 282 formed in the outer end of a card-aligning arm 283. The arm 283 is pivoted at its opposite end by a pin 284 carried by a U-shaped bracket 285 suitably fixed to the frame plate 111. A card-aligning abutment member 286 is fixed to the arm 283 and projects inward through an opening 287 in the frame plate 111. A curved leaf spring 288 is anchored at one end to the bracket 285 and engages at its other end the outer face of the arm 283. It will be apparent from an examination of Fig. 4, that the leaf spring 288 constantly urges the arm 283 inward toward the plate 111 and the abutment 286 through the opening 287 and that such inward movement of the arm 283 and abutment is limited by the surface of the sloping cam 281 formed on the flange of the bell crank 278. Fig. 4 shows a fragment of the fixed part 137 of the partition wall 135 which, as explained, defines by its two opposite faces one wall of each of the card-entrance passages 133a and 133b (Fig. 13). The edge of the partition wall 137 which is adjacent the opening 287 in the frame plate 111 is notched, as indicated at 289, so as to permit the abutment 286 to be projected into both card-entrance passages and engage with its flat inner face 290 the lateral edge of a new card in either passage. The face 290 of the abutment 286 is of sufficient width to extend across both passages 133a and 133b. As explained previously, the lever 249 is rocked counterclockwise by the follower roller 246 (Fig. 15) moving from the low dwell 241 to the high dwell 242 of the eject cam EC1 and such movement begins at 10° of an eject cycle (Fig. 60). Thus, the extension 276 (Fig. 3) of lever 263 is also moved counterclockwise, and, through the pin-and-slot connection 277 moves the bell crank 278 clockwise. This causes the sloping cam 280 to be moved to a position where its lowest point engages the edge 281 of the opening 282 in the arm 283. As a result, the follower spring 288 moves the arm 283 and abutment 286 inward into engagement with the lateral edge of a new card occupying either passage 133a or 133b and thereby moves such card across its passage so that its other lateral edge will lie flat against the other lateral side of such passage. As a result, the new card is thereby aligned in the entrance passage occupied thereby so that it will be fed straight through such passage and into the main passage 141. A record card is indicated by dot-and-dash lines in Fig. 4 as being in the passage 133a. When the roller 246 (Fig. 15) moves from the high dwell 242 of eject cam EC1 at 240° (Fig. 60) of the eject cycle, the abutment 286 is moved by the sloping cam 280 out of engagement with any card occupying either entrance passage 133a or 133b.

The eject cam EC2 (Fig. 6) is mounted on the eject cam shaft 129 between the frame plates 110 and 112 (Fig. 9) and the function thereof is to shift the position of the #1 card stops 151a and 151b and to shift the upper movable part 138 of the partition 135 (Fig. 13) from one extreme position to the other extreme position for the purpose of feeding a previously inserted new card along one of the card-entrance passages, 133a or 133b, into position where its #1 record column may be read and to connect to the other of such card-entrance passages to the slot 104 for receiving the next new card to be inserted. As the cam EC2 shifts the stops 151a and 151b, it also coacts through the latch fingers 167 and 168 with the stud 185 under the control of the eject cam EC1 to relatch the hopper contacts HC in open position.

As shown in Fig. 6, a cam follower in the form of a lever arm 291 is pivoted to a fixed stud 292 projecting from the main frame plate 110 and is provided with a roller 293 carried by a mid-portion of the lever arm 291 and engaging the face of the eject cam EC2. The upper end of the follower arm 291 is connected by a link 294 with the arm 181 of the bell crank 169 previously described as functioning to shift the positions of the #1 card-entrance stops 151a and 151b. The arm 169 is connected by a link 295 to a stud 296 extending from the lower end of an arm 297 rotatably mounted on the shaft 139 to which is fixed the lower end of the upper movable part 138 of the partition wall 135 (Fig. 13). As described previously, an arm 140 is fixed to the end of the shaft 139 and extends downward as shown in Fig. 6. A pair of parallel arms 298 and 299 are pivoted on pins 700 and 701, respectively, at opposite sides of the arm 140 and are drawn together by a tension spring 702 connecting their lower ends. Set screws 703 and 704 extend through the arms 298 and 299, respectively, and bear on opposite sides of the stud 296 to which the link 295 is connected. The construction of the two arms 298 and 299, set screws 703 and 704, and tension spring 702 provides an adjustable resilient operating connection between the stud 296 and the arm 140 fixed to the support shaft 139.

As shown in Fig. 60, the timing of the eject cam EC2 is such that the follower roller 293 (Fig. 6) moves from a low dwell portion 706 of the cam EC2 to the high dwell 707 beginning at 220° of one eject cycle and ending with 255° of such cycle, and such roller 293 moves from the high dwell 707 back to the low dwell 706 beginning at 180° of the next following eject cycle and ending with 215° of such next cycle. From the foregoing, it will be apparent that as the roller 293 moves from the low dwell 706 to the high dwell 707, the lever 291 and link 294 are moved to the right as viewed in Fig. 6, and the bell crank 169 is rocked clockwise to move the #1 card-entrance stop 151a (Fig. 13) out of intercepting position with respect to passage 133a and to move through link 171 and arm 170, the #1 stop 151b into intercepting position with respect to passage 133b. The timing of the #1 stops 151a and 151b is also shown in Fig. 60. Simultaneously with the just described movement of the #1 stops, the link 295 and stud 296 are also moved to the right as viewed in Fig. 6; and, through the resilient connection provided by the arms 298 and 299, screws 703 and 704 and the spring 702, the stud 296 moves the arm 140 and shaft 139 counterclockwise to shift the upper pivoted part 138 (Fig. 13) of the partition 135 to its other extreme position against the plate 134. This will also move the idler roller 149 into card feeding relation with respect to the live hopper roll 125 in the manner previously described and will thereby feed any card in passage 133a into the main passage 141 where its leading edge engages the #2 card stop 187. The #1 stops 151a and 151b and partition part 138 will remain in this position until the next eject cycle when the follower roller 293 (Fig. 6) moves from the high dwell 707 to the low dwell 706 beginning at 180° and thereby returns the #1 stops and movable partition to their positions shown in the drawings. Obviously, the timing for the eject cam EC2 and the elements controlled thereby for the next following eject cycle, or third eject cycle, will be the same as that shown for the first eject cycle described. The timing of the feeding of the new card and the shifting of the #1 stops during alternate eject cycles will be apparent from an examination of Fig. 60 and need not be explained further. The reason why a new card moves further when fed during the second eject cycle described, cycle #2 on the chart, than when fed during the first eject cycle, or cycle #1, is because the curvature of the passage 133b (Fig. 13) is based on a longer radius than that of the passage 133a and the passage 133b is therefore longer than 133a.

It is noted that the timing of the eject cam EC1 and the eject cam EC2 is such that during each eject cycle the #1 stops are shifted by the cam EC2 to move a latch finger, 167 or 168 (Fig. 6), beneath the catch plate 164 on the upper movable blade 161 of the hopper contacts HC, before the stud 185 is returned by the cam EC1 to the position shown, with the result that in any eject cycle the contacts HC will be latched in open position. It is also noted that in each eject cycle the new card is fed while the lower movable normal feed roll 131 is out of card feeding relation with respect to the upper normal feed roll 130, such card feeding relation being provided only when the follower roller 246 engages the low dwell 241 of the eject cam EC1 (Fig. 15).

The eject cam EC3 is shown in Fig. 13 and functions during each eject cycle as an interlocking means which prevents the sensing tips 710 on the lower ends of each of the twelve card reading fingers CRF1 to CRF12, inclusive (see also Fig. 9), from moving into the main card feeding passage 141 at the sensing station 107.

A cam follower roller 711 coacts with the interlock cam EC3 and is rotatably mounted on the outer end of an arm 712 and the latter is formed integral with an arm 713 fixed at its lower end to the shaft 190 at points adjacent the frame plate 110 (Fig. 9). The arm 713 forms a part of a reading finger bail 714 which also includes a second arm 715 fixed to the shaft 190 at points adjacent the frame plate 111 and includes a bail element 716 extending across all of the reading fingers CRF1 to CRF12, inclusive, and integrally joined at its two ends to the two arms 713 and 715. The bail element 716 is formed with twelve equally spaced slots 717 which receive, respectively, the upper arms 718 of the twelve card reading fingers. The card reading fingers are normally held in the position shown where they engage the base of their respective slots 717. As will appear more fully hereinafter, the card sensing is effected during normal operation of the unit 100 by the movement of the shaft 190 and bail 714 clockwise during each normal operating cycle, and so as to permit the sensing tips 710 to enter the passage 141. As shown in Fig. 13, the cam EC3 is provided with two diametrically opposed notches or low dwell portions 720 separated by high dwell portions 721. The notches 720 are identical in shape and permit movement of the bail 714 and reading fingers CRF1 to CRF12, counterclockwise when the eject cam EC3 is in its normal position shown where a notch 720 is beneath the roller 711. The cam EC3 occupies such a position at all times except during an eject cycle. As shown in Fig. 60, the cam EC3 moves to a point where its high dwell portion 721 is fully beneath the roll 711 at 30° of each eject cycle and the next notch 720 moves beneath the roller beginning at 330° of each eject cycle. With a high dwell 721 of the eject cam EC3 beneath the roller 711, the reading finger bail 714 and the reading fingers can not be moved counterclockwise further than that permitted by the small space between the roller 711 and high dwell 721 and such limited movement is insufficient to permit the sensing tips 710 of the reading fingers to the main card feeding passage 141. Thus, the eject cam EC3 prevents the sensing tips 710 from entering the passage 141 during each eject cycle and thereby prevents the tips from being damaged and from interfering with the movement of a record card through the passage 141.

The eject cam EC4 is best shown in Fig. 14 and functions during each eject cycle to move the eject idler roll 147 into and out of card feeding relation with respect to the live eject roll 128 and to move the #2 card-positioning stop 187 into and out of intercepting position across the main card feeding passage 141. The eject cam EC4 is symmetrical in shape and is formed with two low dwell portions 723 of equal length at opposite sides of the cam and separated by two high dwell portions 724 of equal length. A follower roller 725 rotatably mounted on an arm 726 of a follower lever 727 is held in engagement with the face of the cam EC4 by a tension spring 728 connecting a stud on the arm 726 with a fixed stud on the frame plate 111. The lever 727 is loosely mounted on the shaft 190 and includes an arm comprising the plate 188 and stop fingers 189, previously described as comprising the #2 card-positioning stop 187. The plate 188 has a hub 730 formed thereon and loosely engaging the shaft 190 adjacent the plate 110 (see Fig. 9). The idler eject roll 147 is rotatably mounted on one arm 731 of a lever 732, and the latter is pivoted on a rod 733 suitably supported at its ends by the frame plates 110 and 111. The lever 733 also includes an arm 734 bearing on the left-hand end of the follower arm 726 and is held thereagainst by a tension spring 735 connecting a stud 736 on the arm 734 with a fixed stud 737 on the frame plate 111.

The timing of the eject cam EC4 is shown in Fig. 60. As shown, the roller 725 moves from the high dwell 724 of eject cam EC4 to the low dwell 723 beginning at 200° and ending at 210° of each eject cycle and the follower roller moves from the low dwell to the high dwell beginning at 335° and ending at 350° of each eject cycle. Thus, the #2 stop 187 is moved into intercepting position across the main passage 141 shortly after 200° of each eject cycle which is after the old card being ejected has cleared the eject rolls 127 and 146, the latter occurring at about 195° of each eject cycle, and the #2 stop is moved out of intercepting position across the passage 141 shortly after 335° of each cycle. As shown, the feeding of the new card begins at 240° of one cycle and at 210° of the following cycle, both points being after the positioning of the #2 stop 187. The new card stops at 265° of all eject cycles when it engages the #2 stop and this is before 335° when the #2 stops 187 are withdrawn from the passage 141. Thus, the #2 stop does not interfere with the ejecting of any old card from the main passage 141 and stops the new card fed into the main passage so that the card is properly positioned thereby with its #1 record column in position to be sensed by the card reading fingers CRF1 to CRF12, inclusive, and the #2 stop is then withdrawn from the passage 141 at the end of each eject cycle. Simultaneously with the just described in-and-out movement of the #2 stop 187, the spring 735 and the cam EC4 (Fig. 14) move the idler eject roll 147 into card feeding relation with respect to the live eject roll 128 and then return the roll 147 to the position shown in Fig. 14 at the end of each eject cycle. The latter will provide for completing the ejecting movement of an old card from the main passage 141. The old card will be fed partially through the eject slot 105 (Fig. 13) where the operator may remove the same by hand. As shown in Fig. 60 the old card begins its movement by the eject rolls 147 and 128 at 205° and completes such movement at 242°.

During each eject cycle, eject cams contacts ECB1 and ECB2 are also operated for the purpose of controlling certain electrical circuits as will be fully explained hereinafter under the heading "Operation." The contacts are controlled by eject cams 741 and 742, respectively, which are shown generally in plan in Fig. 9. The eject cam 742 and the contacts ECB2 operated thereby are shown more completely in Fig. 12. As both cams 741 and 742 and their operated contacts operate in the same manner, except for their timing, a mechanical description of 742 and ECB2 will suffice for both. The timing of the eject cam contacts is disclosed in Fig. 60. The eject cams 741 and 742 and their operated contacts are of the same general type and operate in a manner similar to that shown in the U. S. Patent to Cunningham No. 2,384,802, granted September 18, 1945. That is to say, a first cam element 743 of the cam 742 functions to latch the contacts ECB2 in closed position and a second cam element 744 functions to unlatch the contacts ECB2 and thereby permits the contacts to open by the inherent spring force of a movable spring blade 745 thereof. The two cam elements 743 and 744 are mounted in side-by-side relation and may be adjusted angularly with respect to one another and to their operating shaft 129 for the purpose of varying the time of opening and closing. The first cam element is formed as a disk having diametrically opposed contact latching lobes 743a and 743b and the second cam element 744 is also in the form of a disk and includes a pair of diametrically opposed unlatching lobes 744a and 744b. As the eject cam shaft 129 makes only one half of a revolution during each eject cycle, one of the contact latching lobes and one of contact unlatching lobes come into operation during each cycle. The cam contacts ECB2 are shown as being latched in their closed position. The contacts comprise a fixed contact blade 748 and the movable spring blade 745 which is urged by its inherent spring force to move toward the right and to their open position, as viewed in Fig. 12. The movable blade 745 is shown as being held against such movement by a pin 749 slidably mounted in a supporting block 750 and held latched in the position shown by a spring pressed catch element 751 engaging behind a shoulder 752 on the pin 749. A compression spring 753 engaging the catch element 751 at one end and a fixed part of the mounting block 750 at its other end urges the catch element against the pin 749 and thereby holds the pin in its latched condition. The catch element 751 is fixed to the outer end of an arm 755 which is fixed at its other end to a shaft element 756 rotatably mounted in the block 750. A second arm 757 is fixed to the shaft 756 and is provided on its outer end with a follower element 758 which is in the path of the lobes 744a and 744b on the unlatching cam element 744. The parts are shown in the home or the 0° position and the cam 742 rotates in the direction indicated by the arrow. During the next eject cycle the unlatching lobe 744a will engage the follower 758 and thereby rock the arm 757, shaft 756, and catch element 751 clockwise, thereby disengaging the element 751 from the shoulder 752 and releasing the pin 749 which will then move to the right under the force of the spring blade 745 to open the contacts ECB2. As shown in Fig. 60, the latter will occur at 320° of each eject cycle. As the eject shaft 129 rotates one-half of a revolution during each eject cycle, the lobe 744a is therefore located 160° counterclockwise from the follower 758. Upon the contacts ECB2 being thus opened, the right-hand end of the pin 749 will then lie in the path of the lobe 743a of the latching cam element 743 and will be engaged thereby so as to move the pin 749 and blade 745 back toward the left to contact closed position and until the catch element 751 is again forced by the compression spring 753 into latching position behind the shoulder 752. The contacts ECB2 will reclose at 350° of each eject cycle and will remain closed until they are unlatched at 320° of the following eject cycle in the manner explained.

As stated, the eject cam contacts 7CB1 and cam 741 are constructed and operate in the same manner as contacts ECB2 and cam 742 described above. As indicated by the timing chart (Fig. 60), the cam disks of 741 are so adjusted that the contacts ECB1 are open at the 0° position and are latched closed at 90° of each eject cycle and are again opened at 110° of each such cycle.

A pair of card lever contacts 760 (Figs. 5, 15, and 62L) are provided for detecting the presence of a record card in sensing position during each eject cycle. These contacts 760 are closed when the first record card fed into the unit 100 reaches its #1 column reading position and the contacts 760 will not open between cards as long as a second card is fed into sensing position during the same eject cycle the old card is ejected from the unit. As shown in Fig. 15, the card lever contacts 760 are supported by a bracket 761 fixed to the outside face of the main frame plate 110 and the contacts comprise a fixed spring blade 762 carrying one contact point and a movable spring blade 763 carrying the other contact point. The movable spring blade 762 is biased toward open position and is moved to closed position by a stud 764 carried by the lower end of an arm 765 and extending through an opening 766 in the main frame plate 110. The arm 765 is arranged at the inner face of the plate 110 and is pivotally supported by a stud 768 projecting inwardly from the plate 110. A link 769 connects the arm 765 and the follower arm 240 pivoted on a stud 770 carried by the plate 110. A portion 771 of the arm 240 is normally disposed in the path of the two pins 245 previously described as being fixed to the side of the eject cam EC1 and disposed thereon at diametrically opposite points. A tension spring 773 connecting the arm 765 and a fixed stud 774 on the frame plate 110, urges the arm 765, link 769, and follower arm 240 toward the right as viewed in Fig. 15 and such movement to the right is limited by the flanged left-hand end 775 of an interposer lever 776 when it engages either the step 777 or the step 778 formed on the lower end of the arm 765. The interposer lever 776 is pivotally supported on a stud 780 projecting from the frame plate 110 and is constantly urged by a tension spring 781 against an adjustable abutment 782 formed on a follower lever 783 which is also pivoted on the stud 780. The lever 783 is biased to move clockwise as viewed in Fig. 15 by a tension spring 784 connecting the stud 774 and the left-hand end of the lever 783 and such clockwise movement is limited by engagement with the lever 776 and also by engagement of the right-hand end 785 of the follower lever 783 with the stud 786 on which the follower roller 246 is rotatably mounted.

With no card between the normal card feeding rolls 130 and 131 (Figs. 13, 8, and 6) the roller 246 engages the low dwell portion 241 of the eject cam EC1 at the home or 0° position and the elements described are in their respective positions shown in Fig. 15. When an eject cycle is initiated in the manner previously explained, the movement of the roller 246 onto the high dwell 242 of the eject cam EC1 causes the stud 786 to move out of engagement with the right-hand end 785 of the follower lever 783. The lever 783 is prevented from clockwise movement under the force of the spring 784 at the start of the eject cycle because the abutment 782 engages the under surface of the arm 776 and the flanged end 775 thereof is prevented from moving upward due to its engagement with the underside of shoulder or step 778. During the eject cycle one of the cam pins 245 engages the part 771 of the follower arm 240 and moves the latter to the left and the link 769 and arm 765 move to the left with the arm 240 and against the force of the spring 773. The leftward movement of the lower end of the arm 765 is sufficient for the flanged end 775 to clear the step 778 and be positioned to the right of the latter. This permits clockwise movement of the arm 776 and follower lever 783 by means of the spring 784 and effects a latching engagement between the flanged end 775 and the step 778. The arm 765 is thus held in the new position. In reaching such position, the stud 764 has moved the spring blade 763 to the left and has thereby closed the card lever contacts 760. The contacts are thus held closed. If no new card is fed between the card feed rolls 130 and 131 (Fig. 13) during the eject cycle, the roll 131 will reengage the roll 130 at the end of the eject cycle and the follower roller 246 will thus be permitted to reengage the low dwell 241 of the cam EC1. This will cause the follower lever 783 to move counterclockwise as viewed in Fig. 15 and through the spring 781 move the arm 776 counterclockwise therewith and thereby move the flanged end 775 downward out of contact with the step 778. The spring 773 will then return the arm 765 to the position shown where the step 777 engages the flanged end 775; and in so doing, the card lever contacts 760 will be returned to their normal open position. If a new card is fed into position between the card feed rolls 130 and 131 during the eject cycle, the presence of such card between the rolls will prevent the roll 131 from moving back into engagement with the roll 130 and consequently because of the mechanical connection previously described between the roll 131 and the arm 244, the follower roller 246 (Fig. 15) can not move back into engagement with the low dwell portion 241 of the eject cam EC1 at 285° of the cycle. The stud 786 and follower arm 783 will thereby be stopped in a position where the flanged end 775 of the arm 776 is not moved out of engagement with the step 778 and the card lever contacts 760 are thus latched in their closed position. This condition will continue as long as a new card is fed into position between the normal feed rolls 130 and 131 during the eject cycle.

*Normal card reading and feeding mechanism.*—With a new card fed into its #1 column reading position by an eject operation in the manner previously explained, normal card feeding and reading operations are effected by the energizing of the card feed clutch CFC. As stated hereinabove, during each normal operating step of the reading unit 100, the card feed clutch CFC (Figs. 17 and 18), when engaged, provides for sensing the record column of the card in sensing position and also provides for advancing such record card into position where its next succeeding record column can be read during the next operating step. Also, as stated, each sensing operation is effected by the simultaneous movement of twelve card reading fingers CRF1 to CRF12, inclusive, (Figs. 9 and 13) into sensing relation with respect to the corresponding twelve index point positions composing the record column of the card in sensing position. The normal card advancing operation is effected by indexing the normal card feed rolls 130 and 131 sufficiently to feed the record card a distance of one record column. For the purpose of this description, it will be assumed that during a previous eject cycle a record card of the type shown in Figs. 52 to 56, inclusive, has been fed from the entrance passage 133b and partially into the main passage 141 so that its #1 record column is opposite the openings in the defining walls of the passage 141 through which the sensing tips 710 of the card reading fingers move during a sensing operation. The mechanism for sensing and normally feeding the record card and the manner in which such mechanism operates will now be described in detail.

As stated hereinabove, the main drive shaft DS rotates constantly as long as the motor 106 is running, and the drive shaft extends across the unit 100 and is journalled in aligned bearings in the two main frame plates 110 and 111 and the supplemental frame plate 13 (Figs. 2, 3, 9, 17, and 18). The chart of Fig. 61 shows the timing of the operating parts for five successive machine cycles and the 360° of each machine cycle corresponds to one revolution of the main drive shaft DS. The 0°, or 360°, position of the drive shaft is the position occupied thereby at the point of engagement of the card feed clutch CFC. In Figs. 9 and 17, the drive shaft DS is shown arbitrarily in the position occupied thereby at approximately 280° of a machine cycle. In Fig. 9 there are shown eight constantly running cams identified, respectively, as 801 to 808, inclusive, which are mounted on and driven by the main drive shaft and these eight cams operate, respectively, eight cam contacts identified herein as CR1 to CR8, inclusive. Each constantly running cam and its related cam contact is identically the same, except for the timing of its opening and closing, as the previously described eject cam 742 and its operated contacts ECB2 and consequently there is no need of repeating herein a detailed description of the structure and operation of this type of cam. The timing diagram in Fig. 61 shows the timing of opening and closing during each machine cycle, of the several constantly running cam contacts CR1 to CR8, inclusive.

The card feed clutch CFC (Figs. 17 and 18) comprises a constantly running driving disk 810 suitably fixed to the drive shaft DS and having a single notch 811 cut in its periphery, and the clutch also comprises a driven clutch disk 812 suitably journalled on the drive shaft DS and carrying a clutch pawl 813 pivoted on a stud 814 projecting from the side of the disk 812. The pawl 813 includes a clutch tooth 815 adapted to engage within the notch 811 of the driving disk 813 to thereby effect engagement of the clutch CFC and the pawl also includes a tail portion 816 adapted to be engaged by the outer end of an armature 817 of the clutch magnet CFM when the latter is deenergized so as to hold the pawl 813 in the disengaged or declutched position. A tension spring 818 connecting the pawl 813 and a stud 819 on the driven disk 812 normally urges the pawl toward clutching engagement with the driving member 810. A detent roller 820 carried by the outer end of one arm 821 of a detent lever 822 and engaging a notch or recess 823 formed in the periphery of the driven clutch disk 812 serves to hold the disk 812 and pawl 813 in their home or declutched position shown. The detent lever 822 is rotatably mounted on the outer end of a stud 824 projecting from the frame plate 111 and includes a second arm 825 which is connected by a tension spring 826 with a fixed bracket 827 carried by the frame plate 111. Thus the spring 826 constantly urges the detent lever 822 counterclockwise as viewed in Fig. 17 and thereby holds detent roller 820 in engagement with the periphery of the driven clutch disk 812. The coils of the clutch magnet are fixed to the bracket 827 and the armature 817 is pivoted to the stud 824. A tension spring 830 connects a tail portion 829 of the armature 817 to the fixed bracket 827 and thereby urges the armature to its deenergized position shown. An adjustable stop 831 engaged by the armature 817 and carried by the outer end of a stud 832 projecting from the frame plate 111, limits the outer position of the armature. As will be apparent to those skilled in this art from the foregoing description, the energizing of the card feed magnet CFM attracts its armature 817 and thereby releases the pawl 813. The spring 818 will then pull the pawl counterclockwise as shown in Fig. 17 and the tooth 815 will engage the notch 811 in the driving disk 810 at the 0° position of a machine cycle and thereby operatively connect the driven clutch disk 812 to the driving disk 810 for rotation in unison by the main drive shaft DS. The clutch CFC remains engaged as long as it is desired to read successively the record columns of the card in the main passage 141 (Fig. 13), one record column being read and the card being advanced one column for each machine cycle determined by the revolution of the drive shaft DS. When it is desired to stop card reading and feeding operations, the card feed magnet CFM is deenergized and the spring 830 will then move the armature 817 clockwise (Fig. 17) to the position shown where the outer end thereof is in the path of the tail 816 of the pawl 813. The tail 816 will strike the armature and consequently the pawl tooth 815 will be moved out of engagement with the notch 811 of the driving disk 810 and against the force of the spring 818; and, at the same time, the detent roller 820 engages the recess 823 and holds the driven clutch disk 812 in the declutched or home position shown. The declutching will occur at the 360° point of a machine cycle.

During each machine cycle while the card feed clutch CFC is engaged in the manner just explained, the twelve card reading fingers CRF1 to CRF12, inclusive (Figs. 9, 13, 14 and 19), are moved into sensing relation with the corresponding twelve index point positions composing the record column of the record card in sensing position. A driven member 834 including a hub 835 suitable journalled on the drive shaft DS, is suitably secured to the side of the driven clutch disk 812 by a rubber bonding indicated at 836. The driven member 834 includes, as a part thereof, an eccentric or cam disk 837 which, as will presently appear, operates the card reading fingers and is referred to hereinafter as the "reading finger cam." As shown more clearly in Fig. 19, a follower roller 838 rotatably mounted on a stud 839 projecting from the side of a follower arm 840, engages the peripheral cam surface of the disk 837. The follower arm 840 is pivotally mounted on a stud 841 projecting from the main frame plate 111 and is connected by a pin-and-slot connection, indicated at 842, to the outer end of a second arm 843 which is in turn fixed to an outer extension of the reading finger operating shaft 190, on which is loosely mounted the card reading fingers CRF1 to CRF12, inclusive. Thus, during each machine cycle the clutch CFC is engaged, the reading finger cam 837, through the linkage just described, first rocks the operating shaft 190 counterclockwise and then clockwise back to the position shown. The chart of Fig. 61 shows the timing of the reading finger cam 837.

Fixed to the reading finger operating shaft 190 between the main frame plates 110 and 111 is the reading finger bail 714 previously described (Figs. 9 and 13). The bail 714 comprises a pair of hub portions 845 fixed, respectively, to the shaft 190 at points adjacent the plates 110 and 111. As previously described, the bail 714 also comprises the arms 713 and 715 which extend upwardly, respectively, from the hubs 845 and are joined together at their outer ends by the bail element 716 having the twelve spaced slots 717 receiving, respectively, the upper arms of the twelve card reading fingers CRF1 to CRF12, inclusive.

Each card reading finger controls the operation of a related code contact. In Fig. 13, the card reading finger CRF6, for sensing the sixth index point position, is shown as controlling the opening and closing of a pair of related reading finger code contacts F6. The remaining pairs of reading finger or code contacts do not appear structurally in the drawings as they are duplicates of the reading finger contacts F6. The twelve pairs of reading finger contacts appear diagrammatically as a part of the wiring diagram in Fig. 62a and are respectively identified therein as F1 to F12, inclusive. Secured to the upper end of the upper arm 718 of each reading finger is a U-shaped clip member 846 formed of a suitable insulating material and receiving the lower end of a movable spring blade 847 of its related pair of reading finger contacts. Each pair of reading finger contacts also comprises a fixed blade 848, and the two blades carry contact points, as shown. The blades 847 and 848 are supported at their upper ends by a mounting block 849 which is secured to the side of a transverse frame member 114. The movable spring blade 847 is constantly urged toward closed position by its inherent spring force and also by means of an additional leaf spring 850 fixed at its upper end to the mounting block 849 and engaging at its lower extreme end the outer face of the movable blade 847. The movable blade 847 and leaf spring 850 of each pair of reading finger contacts constantly urge the related reading finger counterclockwise as viewed in Fig. 13 and against the base of the related slot 717 in the bail element 716 of the reading finger bail 714. Thus, when the operating shaft 190 is moved counterclockwise by the reading finger cam 837 (Fig. 19) and the linkage previously described, the bail 714 (Fig. 13) is also moved counterclockwise and the movable spring blades 847 and leaf springs 850 of the related finger contacts cause the reading fingers to follow the bail and move their lower ends counterclockwise so that their related sensing tips 710 move into sensing relation with respect to the card in the main passage 141. The reading fingers CRF1 to CRF12, inclusive, and their related contacts F1 to F12, inclusive, are so adjusted that when a sensing tip 710 of any particular reading finger passes through a code hole in a corresponding index point position of a card record column, the upper end of such reading finger moves far enough to the left to close its related contacts, and so that when a sensing tip 710 of a reading finger engages the surface of the record card due to the absence of a code hole in its corresponding index point position, the upper end of such finger does not move far enough to the left to close its related contact. As shown in Fig. 13, the lower end of each card reading finger moves within a related slot 851 formed in the sleeve 260 mounted on the shaft 247, previously referred to. The slots 851 thus serve to guide the lower ends of the card reading fingers during their movement into and out of sensing relation with respect to the record card in the passage. As shown in Fig. 14, the arm 715 of the bail 714 is formed with an upper extension 852, and a U-shaped clip 853 of insulating material is attached thereto and receives the lower end of the movable spring blade 854 of a pair of bail contacts 855. The contacts 855 also include a fixed blade 856, both blades being fixed at their upper ends to the mounting block 849. Thus, each time the bail 714 is moved counterclockwise, to effect a sensing operation, as previously described, the bail contacts 855 are also closed.

When the shaft 190 is rocked clockwise as viewed in Fig. 13, back to the position shown, the reading finger bail 714 is also rocked clockwise and opens the bail contacts 855 and also moves the twelve reading fingers CRF1 to CRF12, inclusive, clockwise and back to their position shown and thereby opens any reading finger contacts of the group F1 to F12, inclusive, which were closed as a part of the sensing operation. As shown in the timing chart of Fig. 61, the shape and timing of the reading finger cam 837 (Fig. 19) is such that the reading finger contacts F1 to F12 (Fig. 62a) are closed by the presence of code holes in corresponding index point positions of the sensed record column, at 42° of each machine cycle and are reopened at 220° of each such cycle. Also, the reading finger bail contacts 855 close at 38° of each machine cycle a card sensing operation is effected and open at 225° of such cycle.

As will appear more fully hereinafter in the description of the operation, the twelve reading finger contacts F1 to F12, inclusive, control respectively the energizing of twelve related card code set-up relays R101 to R112, inclusive (Fig. 62a). Thus, these twelve relays are energized singly and in combination according to the code designation recorded in each sensed record column of the card, and they control operations of the illustrated embodiment in a manner which will be fully explained.

The above described movement of the card reading fingers into sensing relation with the card and back to their normal or home position shown, is made smoother by twelve spring fingers 857 frictionally engaging, respectively, at their outer ends the upper edge surfaces of the U-shaped clips 846 carried by the twelve card reading fingers. The upper edge surfaces of the clips 846 are so formed that the fingers 857 urge the reading finger contacts and bail contacts into closed position and thereby minimize bouncing of the contacts. The fingers 857 are fixed at their inner ends to a transverse frame plate 114.

During each machine cycle while the card feed clutch CFC is engaged, in the manner previously described, the normal card feeding rolls 130 and 131 (Fig. 13) are rotated an angular distance sufficient to advance a record card therebetween a distance equal to the space between two adjacent record columns, so as to bring the next record column into sensing position at the sensing station. The rolls 130 and 131 are rotated intermittently from the driven member 834 (Figs. 17 and 18) of the card feed clutch CFC through a well known form of Geneva drive mechanism and a gear train and at a time in each machine cycle when the card reading fingers CRF1 to CRF12, inclusive, are out of sensing position. As shown in the timing chart of Fig. 61, the feeding movement of the card begins at about 240° of each machine cycle and ends at about 355° of such cycle and this period is after the card reading fingers have moved out of sensing relation with respect to the record card.

As shown in Figs. 17, 18, and 19, the Geneva drive mechanism comprises a driver in the form of a roller 860 mounted on a stud 861 carried by the side of the reading finger cam 837, and a driven member in the form of the conventional Geneva star wheel 862 rotatably mounted on a stud 863 which is carried by the frame plate 111. The wheel 862 is formed with six radially disposed slots 864 located 60° apart and adapted to operatively receive the driving roller 860. Adjacent slots 864 are separated by arcuate surfaces 865 having equal radii of curvature. The Geneva drive also includes the usual locking disk 866 which is herein shown as being formed integral with the side of the reading finger cam 837 and is rotatable therewith. As shown in Fig. 19, the locking disk 866 is formed with a locking sector 867 and a cut-away or clearance portion 868. The peripheral surface of the locking sector 867 has the same radius of curvature as the arcuate surfaces 865 of the wheel 862. The locking sector 867 is adapted to engage the arcuate surfaces 865 as shown in Fig. 17 so as to hold the driven star wheel 862 stationary when the roller 860 is out of driving engagement with any of the slots 864. The clearance portion 868 of the locking disk 866 is centrally disposed opposite the driving roller 860 and thereby permits movement of the driven star wheel 862 when the roller 860 is within a slot 864.

The intermittent drive provided by this type of Geneva mechanism is well known to those skilled in this art. In Fig. 17, the roller 860 is shown at the outer end of a slot 864 and this is the position occupied by the roller when the card feed clutch CFC is disengaged. Upon engagement of the clutch CFC the roller 860 moves counterclockwise from the position shown until it enters and operatively engages the next slot 864, and during such movement the peripheral arcuate surface of the locking sector 867 will engage the correspondingly curved surface 865 of the wheel 862 and thereby hold the driven star wheel stationary. When the roller 860 enters the outer end of the next slot 864, further rotation thereof will impart clockwise movement to the wheel 862 and such movement will be permitted because of the location at that time of the cut-away portion 868 of the locking wheel 866 opposite the roller 860 and opposite the end of the slot 864 engaged thereby. Thus, for each revolution of the roller 860 and main drive shaft DS, the driven wheel 862 is rotated one-sixth of a revolution or 60°. As shown in Fig. 61, the Geneva wheel 862 moves between 240° and 355° of each machine cycle and is stationary for the rest of such cycle.

As shown in Fig. 18, the star wheel 862 is an integral part of a hub 870 suitably journalled on the stud 863. A gear 871 is also formed on the hub 870 and meshes with a gear 872 having a hub 873 journalled on a shaft 874, the latter being rotatably supported at its two ends by suitable bearings 875 mounted in aligned openings in the main frame plate 111 and supplemental frame plate 113. A bevel gear 876 is also formed on the hub 873 and comprises one sun wheel of a differential drive mechanism indicated generally as DM1. The mechanism DM1 comprises a second bevel sun gear 877 formed on a hub 878 which is also journalled on the shaft 874 and a pair of bevel planet gears 879 meshing with both sun gears 876 and 877 and journalled, respectively, on the two outer ends of a planet arm 880. The latter is formed at its mid-portion as a squared section 881 having an opening therethrough (not shown) and through which the shaft 874 extends at right angles to the axis of the planet arm 880. The squared portion 881 and shaft 874 are suitably locked together by a pin 882.

It is noted that at the time the card feed clutch CFC is engaged and the star wheel 862 of the Geneva drive is indexed once for each machine cycle in the manner previously explained, the sun gear 877 of the differential gear mechanism DM1 is held stationary in a manner which will be explained more fully hereinafter in the description of the mechanism that operates as a result of the engagement of the skip clutch SKC. Thus, with the sun gear 877 held stationary and with the sun gear 876 driven from the star wheel 862 by the gears 871 and 872, the planet gears 879 will be rotated about the axis of the shaft 874 at one-half the rate of the sun gear 876 and will thereby rotate the shaft 874 at the one-half rate.

A gear 884 is formed on a hub 885 which is suitably fixed to the shaft 874 and meshes with a gear 886 suitably journalled on a stud 887 carried by the frame plate 113. The gear 886 also meshes with a gear 888 formed on one end of a hub element 889 which is suitably journalled on a stud 890 carried by the supplemental plate 113. A second gear 891, formed on the other end of the hub 889, meshes with a large gear 892 mounted on a hub 893 which is fixed to the shaft 267 on which the normal card feed rolls 130 are mounted. The previously described gear 269 is fixed to the hub 893 and meshes with the gear 268 which is fixed to the shaft 265 on which the other normal card feed rolls 131 are mounted.

From the foregoing, it will be apparent that for each revolution of the main drive shaft DS, the shafts 267 and 265 are rotated through the Geneva drive mechanism and the gear train previously described. The construction is such that for each revolution of the main drive shaft DS, the normal card feed rolls are rotated one seventeenth of a revolution which is the amount required to advance a record card a distance equal to the space between two record columns thereon. Thus, as long as the card feed clutch CFC is engaged, the card reading fingers CRF1 to CRF12, inclusive, will be moved into sensing relation with the record column of the card at the sensing station and will be then moved back to their normal position shown in the drawings during the first part of each machine cycle and during the latter part of each such cycle, the normal card feed rolls 130 and 131 are rotated one seventeenth of a revolution to advance the record card therebetween and thereby present the next succeeding record column thereon into sensing position.

*Program tape feeding mechanism.*—As explained hereinabove, one of the principal features of the present invention is the provision of a program or sequence control for the various operations of the apparatus while reading the statistical record cards and operating the two typewriters 300 and 2300 (Fig. 1) and the tape punch 500, and such program control is effected in the illustrated embodiment by the program tape 15 (Figs. 2, 3, 59a and 59b) having the control code designations recorded therein according to a predetermined plan. With a new record card fed into sensing position in the passage 141, the sequence control of the apparatus is initiated by the energizing of the tape feed magnet TFM (Figs. 5, 16, and 62e) which effects engagement of the tape feed clutch TFC. With the tape feed clutch TFC (Fig. 16) engaged, the tape feed sprocket 102 (Fig. 3) is rotated to move the program tape past the sensing station. As will presently appear, the normal operation is to pulse the tape feed magnet TFM once during each machine cycle so that the clutch TFC will be engaged for only a part of such cycle and while thus engaged will feed the program tape 15 the distance of one record column so as to bring the next succeeding record column into sensing position at the sensing station.

The tape feed clutch TFC is of a well known type, the clutch parts being of somewhat the same general construction and operating in a manner similar to the clutch parts disclosed in the U. S. patent to Lake et al. No. 2,328,653, granted September 7, 1943. The clutch TFC is disclosed in Fig. 16 of the drawings and comprises generally a constantly running driving ratchet wheel 900 fixed to the shaft 200 previously described, and having ten clutch teeth 901, and also comprises a driven clutch disk 902 rotatably mounted on the shaft 200, and a clutch pawl 903 pivoted at one end on a stud 904 projecting from the side of the clutch disk 902 and having a clutch tooth 905 formed thereon and constantly urged into clutching engagement with the driving ratchet 901 by a tension spring 906 connecting the other end of the pawl 903 with a stud 907 also projecting from the clutch disk 902. Interposed between the driving ratchet wheel 901 and the driven clutch disk 902 is a latching disk 908 rotatably mounted on the shaft 200 and being formed with radial spokes 909 providing openings 910 therebetween and through which the pivot stud 904 and stud 907 extend, the clutch pawl 903 being disposed on the same side of latching disk 908 as the ratchet wheel 901 and the clutch disk 902 being disposed at the opposite side of the disk 908 and relative movement between the latching disk 908 and clutch disk 902 being permitted by the openings 910. The periphery of the latching disk 908 is formed with ten equally spaced latching teeth 912 corresponding, respectively, to the ten ratchet teeth 901 and adapted, respectively, to engage the outer end 913 of the armature 914 of the tape feed magnet TFM when the magnet is deenergized and thereby stop movement of the latching disk 908 at any one of ten angular positions thereof. A detent 915 is pivoted on a fixed stud 911 and urged into engagement with the periphery of the driven clutch disk 902 by a suitable tension spring 916. The detent 915 coacts with ten equally spaced notches 917 on the periphery of the disk 902 to hold the latter at any one of ten angular positions. The lower edge face of one of the spokes 909a as appearing in Fig. 16, provides a cam surface 918. The surface 918 coacts with a pin 920 on the pawl 903 to control clutching and declutching movement of the pawl 903, as will presently appear.

With the clutch parts in the position shown in Fig. 16 of the drawings, the latching disk 908 is held against clockwise movement by the end 913 of the armature 914 engaging a tooth 912; and, in such position, the outer part of the cam surface 918 engaging the pin 920 holds the pawl 903 and its tooth 905 out of clutching engagement with the ratchet 900 and against the force of the spring 906. When the magnet TFM is energized, its pivoted armature 914 will move upward and thereby be disengaged from the tooth 912 and release the latching disk 908. Then, the spring 906 will, through the pawl 903 and pin 920 and cam surface 918, move the latching disk 908 clockwise with respect to the clutch disk 902. As this occurs, the pin 920 will move inward along the surface 918 until the tooth 905 engages a tooth of the ratchet and thereby effects clutching engagement therewith. Inward movement of the pin 920 is limited by its engagement with the ledge portion 919. Thus, the driven clutch disk 902 is locked to the driving ratchet 900 and they then rotate clockwise in unison. When the magnet TFM is deenergized, its armature 914 is moved downward by a suitable tension spring 922 and the outer end 913 is thereby moved into the path of the teeth 912 on the latching disk 908. A tooth 912 engaging the end 913 stops movement of the disk 908, with the result that the disk 902 continues rotating and the cam surface 918 cams the pin 920 outward and thereby forces the pawl 903 outward about its pivot stud 904 and thereby effects disengagement of the clutch TFC and the positioning of the driven parts thereof in their declutch position shown in Fig. 16.

A gear 923, indicated by the dash lines in Fig. 16, is fixed to the driven clutch disk 902 in any suitable manner (not shown) and meshes with a gear 924 (see also Figs. 2 and 5) which is formed on a hub 925 suitably fixed to a shaft 926 (see also Fig. 20) which extends transversely across the reading unit 100 and is journalled at its ends in suitable journal bearings carried in aligned openings formed in the supplemental frame plate 112 and the main frame plate 111. As shown in Figs. 20 and 21, a gear 927 carried on a hub 928 which is fixed to the end of the shaft 926, meshes with a gear 929 formed on a hub 930 which is rotatably mounted on a shaft 932. The shaft 932 is shown as being rotatably mounted in suitable bearings 933 fitting within aligned openings formed in the main frame plate 111 and supplemental frame plate 113. A bevel gear 934 is also formed on the hub 930 and comprises one sun gear of a differential gear mechanism indicated generally by the reference character DM2. The other elements of the differential gear mechanism DM2 comprise a second bevel sun gear 935 formed on a hub 936 which is journalled on the shaft 932, and a pair of planet bevel gears 937 meshing with the sun gears 934 and 935 and rotatably mounted on the ends of a planet arm member 938, the latter having an opening in its center through which the shaft 932 extends. A pin 939 serves to secure the arm 938 to the shaft 932.

From the foregoing, it will be apparent that when the tape feed clutch TFC is engaged, the driven clutch disk 902 (Fig. 15), by means of the gear train just described, will rotate at a predetermined rate the sun gear 934 (Figs. 20 and 21) of the differential mechanism DM2. As will be explained hereinafter in connection with the description of a skipping operation, the sun gear 935 is rotated only when the skip clutch SKC is engaged. Consequently, the gear 935 is now held stationary. With the sun gear 935 stationary and the sun gear 934 rotated, due to the engagement of the tape feed clutch, the planet pinions 937 will be rotated about the axis of the shaft 932 and will thereby rotate the latter at one-half the speed of rotation of the sun gear 934. A gear 940 is formed on a hub 941 which is fixed to the shaft 932 and meshes with a gear 943 formed on one end of a hub 944 which is rotatably mounted on the shaft 926. A second gear 945 is formed on the hub 944 and meshes with a gear 946 mounted on a shaft 947 which is suitably journalled in bearings 948 carried by the plate 111, and the gear 946 also meshes with a gear 949 formed on a hub 950 which is fixed to a tape feed shaft 951. The tape feed shaft is rotatably mounted in suitable bearings 952 carried by the main frame plate 111 and the tape sprocket wheel 102 is fixed in any suitable manner to such shaft.

Referring to Fig. 5, it is noted that the driving shaft 200 for the tape feed clutch TFC is constantly rotated by the large gear 194 which meshes with the small gear 193 fixed to the main drive shaft DS. The gears 194 and 193 are of such a relative size that the shaft 200 rotates four tenths (.4) of a revolution for each revolution of the main drive shaft DS which, as previously explained, corresponds to one machine cycle shown in the timing chart of Fig. 61. Consequently, as the latching disk 908 and ratchet 900 each have ten teeth corresponding, respectively, to one another, four latching teeth 912 move past the end 913 of the armature and four corresponding ratchet teeth 901 move past the end 913 during each machine cycle the clutch TFC is engaged. The position of the ratchet teeth with respect to each machine cycle is indicated in the timing diagram of Fig. 61. For normal tape reading and feeding operations where the program tape 15 is advanced one record column for each machine cycle, the energizing of the tape feed magnet TFM (Figs. 5, 16, and 62e) is controlled by the constantly running cam contacts CR7 (Figs. 9 and 62d). This will be fully explained hereinafter under the heading "Operation." As shown in the timing chart of Fig. 61, the contacts CR7 close at 313° of each machine cycle and open at 360°. The tape feed magnet TFM will thus be energized soon after 313° and the pawl tooth 905 will engage a clutch ratchet tooth 901 at 360°. The magnet TFM is deenergized by CR7 at 360° and the driven clutch disk 902 will be disengaged by the tooth 912 on the latching disk 908 which corresponds to the ratchet tooth following the one which is engaged. Thus, as shown in Fig. 61, disengagement of the clutch will occur at 90° of the next machine cycle. From this it is apparent that normal movement of the program tape 15 will occur during the first 90° of the machine cycle following the cycle when CR7 closed and the tape 15 will remain stationary for the rest of such following cycle. The gear ratio of the transmission mechanism described between the main drive shaft DS and the tape feed shaft 951, is such that the tape 15 will move the space of one record column for each 90° a machine cycle.

As will appear more fully hereinafter in the description of the operation, it is sometimes desirable to feed the tape by itself at a faster rate. In order to effect the latter, the magnet TFM is energized by means other than CR7 so that the magnet is held energized throughout a machine cycle. Consequently, the tape 15 will then move for the full 360° of each machine cycle which will amount to four record columns or four times the normal speed when the magnet TFM is controlled by CR7.

At the tape sensing station 108 (Figs. 2, 3, and 17) are located twelve sensing brushes B1 to B12, inclusive, which are also indicated diagrammatically in Fig. 62d of the wiring diagram. As shown in Figs. 2 and 17, the brushes B1 to B12, inclusive, are mounted in a block 954 which is carried by a frame 955. The frame 955 is pivoted on a stud 956 projecting from the frame plate 111 and is biased to move clockwise as shown in Fig. 17 and out of the sensing position shown by a coil spring 957 surrounding the stud 956 and anchored at its ends to the stud 956 and frame 955, respectively. The frame 955 is held latched in the sensing position by a pawl 958 on a rod 959 of the frame 955 engaging beneath a catch 960 projecting from the plate 111. These twelve sensing brushes B1 to B12 are so positioned with respect to the program tape 15, that they sense the correspondingly numbered twelve index point positions composing each transverse record column of the program tape 15, which were fully described hereinabove under the heading "The program tape" and are shown in the tape 15 of Figs. 59a and 59b. As explained, either the group of six index point positions on the master side or the group of six on the detail side of the tape are used at any one time to control the operation of the illustrated embodiment. As will be fully explained hereinafter under the heading "Operation," when a tape shift relay R155 (Fig. 62d) is in its normal or deenergized condition, it connects, through its six transfer contacts A to F, inclusive, the six tape sensing brushes B7 to B12, inclusive, on the master side of the program tape to six tape code set-up relays R146 to R151, inclusive; and, when the tape shift relay R155 is energized, its contacts A to F, inclusive, connect, respectively, the six sensing brushes B1 to B6, inclusive, on the detail side of the tape to the six tape code set-up relays R146 to R151, inclusive. Thus, the sensing of code designations in the record columns of the tape provides for energizing the set-up relays R146 to R151, inclusive, singly and in combination according to the designation sensed, and in a manner which will be fully explained. These tape code set-up relays function to control the programming of the operations of the illustrated embodiment.

*Card and tape skipping mechanism.*—As stated hereinabove, the skip clutch SKC (Figs. 17, 22, and 23), provides, when engaged, for a skipping operation which comprises the simultaneous feeding of the record card and the program tape at a relatively fast rate, as compared with the normal card and tape feeding rate described hereinabove. The rate of feed for a skipping operation is four times the rate of feed for the card and tape when fed separately at their normal rate which was explained above. As will appear more fully hereinafter, a skipping operation is used to save operating time when it is desired to simultaneously skip over predetermined record columns of the card and tape. The record columns of the card can not be read when moving at the fast rate as the card feed clutch CFC is then disengaged. As will be fully dedescribed hereinafter, the skipping operation is terminated by the sensing of a skip-off code designation in the program tape while moving at the fast rate.

As shown in Figs. 22 and 23, the skip clutch SKC is of substantially the same construction as the tape feed clutch TFC described in detail hereinabove. A skip clutch shaft 962 is rotatably mounted in journal bearings 963 carried within aligned openings in the main frame plate 111 and the supplemental frame plate 113. The skip clutch SKC comprises a driving ratchet wheel 964 mounted on a hub 965 which is suitably fixed to the shaft 962 and having four clutch teeth 966. The clutch SKC also comprises a driven clutch disk 967 rotatably mounted on the shaft 962, and a clutch pawl 968 pivoted at one end thereof to a stud 969 fixed to the clutch disk 967 and urged into clutching engagement with the ratchet 964 by a tension spring 970 connecting the other end of the pawl 968 and a stud 971 which projects from the clutch disk 967. The clutch also comprises a latching plate 972 interposed between the disk 967 and ratchet 964 and formed with radial spokes 973 providing openings 974 therebetween. The latching plate 972 is provided with four peripheral latching teeth 975 spaced equal distances and adapted to engage the outer end 976 of the armature 977 of a skip magnet SKM. The four latching teeth 975 correspond, respectively, to the four ratchet teeth 966. One spoke 973 of the latching disk 972 is formed with a cam surface 978 which coacts with a pin 980 on the pawl 968 to control the engagement and disengagement of a pawl tooth 981 with the teeth 966 of the driving ratchet wheel 964 of the clutch. The periphery of the driven clutch disk 967 is formed with four equally spaced detent notches 983 which coact with the end of a detent lever 984 to hold the clutch in disengaged condition at any one of four positions. As shown in Fig. 17, the detent lever 984 is pivoted on a stud 985 carried by the main frame plate 111 and is urged into operative engagement with the peripheries of the clutch disk 967 by means of a tension spring 986 connecting the detent lever 984 and a stud 987 carried by the main frame plate 111.

Also mounted on the driving hub 965 of the skip clutch ratchet 964, is a driving gear 988 which meshes with a gear 989 (Fig. 23) rotatably mounted on a stud 990 carried by the main frame plate 111. The gear 989 also meshes with a gear 991 mounted on a hub which is fixed on the main drive shaft DS. The gear ratio between the main drive shaft DS and the skip clutch shaft 962 is 1:1. Thus, the driving ratchet wheel 964 of the skip clutch rotates at the same speed as the main drive shaft DS.

When the skip clutch magnet SKM is energized, it attracts its pivoted armature 977 and the outer end 976 thereof is disengaged from a latching tooth 975 of the latching disk 972. The spring 970 will then move the pawl 968 and rotate the latching disk 972 slightly counterclockwise as viewed in Fig. 23, due to the coaction of the pin 980 on the pawl with the cam surface 978, and will thereby effect clutch engagement of the pawl tooth 981 with a ratchet tooth 966. When the skip clutch magnet SKM is deenergized, a tension spring 992 (Fig. 17) moves the pivoted armature 977 back to the position shown in Fig. 23 where it is engaged by the next tooth 975 of the latching disk 972. The consequent stopping of the latching disk 972 will, through the cam surface 978 and pin 980, move the pawl out of clutching engagement with the ratchet 964 and the clutch parts will then be restored to their normal deenergized position shown.

The driven clutch disk 967 is shown in Fig. 22 as being connected by a suitable rubber bonding indicated at 993 to a flange 994 on a sleeve 995 and the latter is rotatably mounted on the skip clutch shaft 962 by means of suitable journal bearings 996. Also mounted on the sleeve 995 is a gear 997 which, as shown in Fig. 22, meshes with a gear 998 formed as a part of a sleeve 999, which is journalled by suitable bearings 1000 and 1001 fixed to the supplemental frame plate 113. Also formed on the sleeve 999 is a second gear 1002 which meshes with a gear 1003 (Figs. 17 and 18) which is formed integral with the hub 878 on which the sun gear 877 of the differential drive mechanism DM1 is also mounted. As the card feed clutch CFC is now disengaged, the other sun gear 876 of the differential mechanism DM1 is held stationary, as will be apparent from the previous description. With the gear 876 stationary and with the sun gear 877 driven through the gear train just described, by the skip clutch disk 967, the planet gears 879 and the output shaft 874 of the differential DM1 will be rotated at one-half the speed of the sun gear 877. The shaft 874 will then drive the card feed roll shafts 130 and 131 through the gears 884, 886, 888, 891, 892, 269 and 268, previously described. As shown in Fig. 17, the gear 997, which is mounted on the sleeve 995 and is thereby driven by the skip clutch disk 967, also meshes with a large gear 1004 (see also Fig. 20) which is rigid with the hub 936 on which sun gear 935 of the differential mechanism DM2 is mounted. As the tape feed clutch TFC is now disengaged, the outer sun wheel 934 is now stationary. Thus, with the sun gear 935 being driven from the skip clutch disk 967 by the gears 997 and 1004, the planet gears 937 and output shaft 932 of the differential mechanism DM2 will be rotated at one-half the speed of the gear 935 and will thereby rotate the tape feed shaft 951 through the gears 940, 943, 945, 946 and 949, previously described. The gear ratio between the driven skip clutch disk 967 and the card feed rolls 130 and 131 and the gear ratio between the disk 967 and the tape feed sprocket shaft 951 are such that for each revolution of the main drive shaft DS, the card feed rolls 130 and 131 move the record card four record columns and the shaft 951 and sprocket 102 move the program tape 15 four record columns.

*Circuit breaker contacts.*—A pair of circuit breaker contacts CB (Figs. 2, 12, and 62d) are provided for the purpose of effecting control of the illustrated embodiment by code designations in the program tape 15 when the latter is being moved at its fast rate which, as explained hereinabove, comprises moving the tape during one machine cycle a distance equal to four times the distance the tape is moved in one cycle for a normal tape feeding and reading operation. As also explained, movement of the tape 15 at the fast rate is effected either by holding the tape feed clutch TFC engaged throughout a machine cycle or by effecting engagement of the skip clutch SKC. The manner in which the circuit breaker contacts CB effect this control will be fully explained hereinafter under the sub-heading "Operation #M64—Skip off" and under the heading "Manual eject operation" wherein is described how a skipping operation is terminated by the skip-off designation in column #64 of the program tape 15 (Fig. 59b) and on the master side thereof, and how the homing control designation in column #140 of the program tape 15 stops movement of the tape as a result of an eject operation which ejects the old card and feeds a new card into its #1 column sensing position.

As shown in Fig. 17, the gear 949 indicated in dotted lines on the tape feed shaft 951 meshes with a gear 1006 mounted on a short shaft 1007 extending through and rotatably supported in the main frame plate 111. In Fig. 12, the portion of the shaft 1007 at the inner side of the frame plate 111 is shown, and fixed to such shaft is a circuit breaker cam 1008 coacting with a follower 1009 which is pivoted on a stud 1010 projecting from the side of a mounting plate 1011. Thus, the circuit breaker cam 1008 is rotated with the tape feed sprocket 102. The plate 1011 is supported in spaced relation with respect to the frame plate 111 by spacing studs 1012. The cam follower 1009 is in the form of a bell crank having a roller 1014 engaging the under face of a movable spring blade 1015 carrying one contact point of the circuit breaker contacts CB. The other point of the contacts CB is carried by a blade 1016 which has limited upward movement and both blades 1015 and 1016 are suitably mounted in a supporting block 1017 carried by the side of the support plate 1011. The operation of the circuit breaker contacts CB will be obvious from an examination of Fig. 12. The timing of the contacts CB with respect to the machine cycle is shown in Fig. 61.

*The #1 typewriter*

As stated previously, provision is made for selectively manifesting coded data recorded in record cards by printing such selected data in a predetermined fashion on one or more copy sheets. In so far as the broader aspects of the present invention are concerned, the printing may be effected by any well known form of printing mechanism, or mechanisms, such, for example, as a typewriter. In the illustrated embodiment, the selective printing of a portion of the data on one copy sheet is effected by the #1 typewriter 300 which will be recognized by those skilled in this art as being basically similar to a well known commercial form of power driven typewriter. The general principles of operation and features of construction of this kind of typewriter are fully disclosed in a number of U. S. patents, among which are Patent No. 1,777,055, granted September 30, 1930, and No. 1,873,512, granted August 23, 1932. As will be apparent as the description proceeds, the #1 typewriter 300 includes certain changes and additions over the commercial form referred to, which were made so as to suit the requirements of the illustrated embodiment.

The structural features of the #1 typewriter are disclosed in Figs. 1, 24, and 25 and the key arrangement of its main keyboard 301 and auxiliary keyboard 302 is shown somewhat diagrammatically in Fig. 27. The keys composing the main keyboard each comprise a key cap 307 mounted on a related key lever 308 and each key may be actuated by manually depressing its related key cap, and, it may also be selectively operated by a mechanical type translator under the selective control of code designations in a record card of the type shown in Figs. 52 to 56, inclusive, and in a program tape of the type shown in Figs. 59a and 59b. The mechanical translator for operating the #1 typewriter is referred to hereinafter as the #1 translator and is indicated by the reference character 400 and is shown in Fig. 24 as being formed as a unit and mounted on the frame of the #1 typewriter and beneath the main keyboard 301 thereof. The structure and operation of the mechanical translator 400 will be fully described hereinafter under a separate sub-heading.

There are three different classes of keys composing the main keyboard 301. One class of keys is referred to generally as character keys as they effect, when actuated, the printing of corresponding characters on an invoice sheet 11 held in printing position by a rotatable platen 309 which is mounted on a laterally movable carriage 310. For simplicity, each of these character keys is indicated on the drawings by the reference numeral 311 and by a significant legend on the key cap, and each such key is identified hereinafter by the numeral 311 followed by a hyphen (-) and then the particular character which is printed when such key is actuated. For example, the key 311 which will effect printing of the character "A," is also identified hereinafter as "311-A." The space key is also considered as belonging to the same class as the character keys and will also be referred to hereinafter as the key "311-space."

In a manner which will be fully explained hereinafter, each of the character keys and the space key 311-space may, under the selective control of a code designation in the program tape 15, provide for operating the tape punch 500 (Fig. 1), in addition to effecting its function of printing the corresponding character on the invoice 11 and the spacing of the carriage 310. Thus, the tape punch 500 will punch in a tape 12 (Figs. 49 and 50) a code designation in a well known 5-position code, representing the character printed on the invoice.

A second class of keys composing the main keyboard effects operation of the #1 typewriter alone, i. e., keys of the latter class can not provide for operation of the tape punch. This second class of keys comprises the back space key 312, the carriage return key 313, the tabulating key 314, the slanting line key 315, the comma key 316, and the period key 317.

Keys of the third class comprising the main keyboard, provide, when actuated, for operating the tape punch 500 and do not effect either printing or functional operations of the #1 typewriter. The keys of this third class are indicated on Fig. 26 by the reference numeral 318 and by appropriate legends on the key caps, and are separately identified hereinafter by the numeral 318 followed by the hyphen (-) and the character or function represented by the code designation punched as a result of the actuation of the keys. For example, the figures-shift code designation is punched in the 5-position code tape by the depressing of the key 318 bearing the legend "Figs." and identified hereinafter as "318-Figs."; the skip code designation by depressing the key 318 bearing the legend "Skip" and identified hereinafter as "318-skip"; the carriage return designation by depressing the key 318 which bears the legend "CR" and is also identified hereinafter as "318-CR"; etc.

The type bars 319 of the #1 typewriter, one of which appears in Fig. 24, are pivotally mounted in a type basket 320 and each bar carries type of only one case. Consequently, no provision is made herein for shifting the type basket to print characters in different case. Each time a character key is depressed, for example, the key 311-Y (Fig. 24), a corresponding cam unit 321 is operated by releasing a latch 322 from a cam 323, thereby permitting a spring-pressed lever 324 to move the cam 323 against the periphery of a continuously rotating motor-driven power shaft 325. The motor for rotating the power shaft 325 is not shown structurally herein, but is shown diagrammatically in Fig. 62V and is indicated therein by the character 326. The cam 323 is then rotated by frictional contact with the shaft 325 thereby causing the carrier 327 of the cam to rock in a direction for pulling a link 328 which, through a suitable link-and-lever arrangement, propels the corresponding type bar 319 toward the platen 309 to effect printing of the character "Y" on the invoice 11. During the final increment of movement of the type bar 319, it strikes a universal bar 329 to actuate, through suitable linkage, an escapement lever 330 for releasing the escapement mechanism and thereby to effect a spacing movement of the carriage 310.

Depression of the space bar 311-space similarly results in downward movement of a key lever 308 to effect operation of a cam unit 321 and thereby operate suitable linkage for actuating the escapement lever 330 to cause a character space operation. The linkage and the escapement mechanism operated by the lever 330 are not disclosed in detail herein as they do not per se form a part of the present invention. They are fully disclosed in the above mentioned Patent No. 1,873,512.

Depression of the back space key 312 operates a cam unit 321 to effect the backward spacing of the typewriter carriage 310 one character space position and in a manner not disclosed herein, but which is fully disclosed in U. S. Patent No. 1,873,553, granted August 23, 1932.

The carriage return mechanism is operated by depressing the key 313 and is of the type disclosed in U. S. Patent No. 2,104,559, granted January 4, 1938, and No. 1,753,450, granted April 8, 1930. As is usual in the power driven typewriter shown, the carriage return movement is accompanied by a line spacing operation. After the carriage has been returned and a single line spacing operation effected as an incident thereto, a repeated depression of the carriage return key 313 merely causes an additional line space operation.

The tabulating mechanism operated by key 314 is such as shown in U. S. Patent No. 1,935,436, granted November 14, 1933, and includes the usual settable tab stops 332 which are pivotally mounted on a rack bar 333 extending across the back of the machine 300 (Fig. 25). As is disclosed fully in the last-mentioned patent, the depressing of the tab key 314 effects movement of a tab lever 334 to an operated position where the end 335 thereof lies in the path of the pre-set tab stops 332. The movement of the tab lever also releases the escapement mechanism to permit tabulating movement of the carriage 310. When the carriage 310 reaches the character space position where a regular tab stop 332 has been pre-set, the end 335 of the tab lever 334 is engaged by the pre-set stop 332 and thereby stops the carriage 310 and restores the tab lever 334 to its normal position at such character space position.

As shown in Figs. 1, 25, and 26, a special or extra rack bar 337 is mounted on the back of the carriage 310 for movement therewith, and is fixed at its two ends to rearwardly extending support plates 338 and 339, respectively, which are suitably fixed to the two end plates of the carriage 310. As shown, the special rack bar 337 is formed with a plurality of pairs of vertical grooves 340, 340, each pair being formed on opposite sides, respectively, of the bar 337 and extending in a common transverse vertical plane. The several pairs of grooves 340 correspond, respectively, to the character-space positions of the carriage, the same as the regular settable tabular stops 332 previously described. Each of the pairs of grooves 340 is adapted to receive either one of two kinds of controls stops, indicated, respectively, by the reference characters CS1 and CS2. Each of these control stops functions when the carriage 310 reaches the character-space position corresponding to the pair of grooves 340 where such control stop has been placed, to open a related pair of interlock contacts mounted within a contact assembly 341 fixed to the rear portions of the typewriter frame. As will appear more fully hereinafter in the description of the operation in connection with the circuit diagram appearing in Figs. 62a to 62w, inclusive, there is a separate pair of interlock contacts actuated by each of the two kinds of control stops CS1 and CS2 and such contacts are located in interlock circuits for controlling certain operations of the apparatus disclosed herein.

As shown in Figs. 25 and 26, the contact assembly 341 comprises a pair of tab interlock contacts TIC and a pair of carriage return interlock contacts CRIC, and these pairs of contacts are both break contacts and are of similar construction. Each pair of contacts is actuated by a separate related lever 342 when the latter is engaged by a contact actuating tab formed on its related control stop. As shown in Fig. 26, the control stop CS2 is provided with a tab 343 in alignment with the lever 342 for actuating the pair of break interlock contacts TIC, so that, when the carriage reaches the character space position corresponding to a pair of grooves 340 where a control stop CS2 has been set, the related contacts TIC are opened by such stop. Also, a lever 342 is shown as being in alignment with a tab 344 on a control stop CS1 shown behind the stop CS2 in Fig. 26. The stop CS1 and its tab 344 appear in Fig. 25. The interlock contacts CRIC will thus be opened by the tab 344 and lever 342 when the carriage 310 reaches the character space position occupied by the control stop CS1.

In Fig. 25, the character space positions of the typewriter which correspond, respectively, to the different pairs of grooves 340 are indicated on the rack bar 337 by corresponding numerals. The control stops CS1 and CS2 are located in the pairs of grooves 340 of the rack 337, they will occupy when the apparatus in the illustrated embodiment is operated to effect the automatic typing of the data appearing on the invoice 11 shown in Fig. 57 and under the control of the master or heading card MC—1 of Fig. 52 and the detail cards DC—1, DC—2, and DC—3 of Figs. 54, 55, and 56, respectively, and under the control of the program tape 15 of Figs. 59a and 59b. A full description of the operation of these control stops and related interlock contacts appears hereinafter under the heading "Operation."

*The auxiliary keyboard.*—As stated hereinabove, under the heading "General description," the auxiliary keyboard 302 of the #1 typewriter 300 is arranged at the front of the main keyboard 301 and comprises ten digit keys 303, a space key 304, and a motor bar 305, which may be manually operated to store numeric values in a relay storage unit in a manner which is shown fully in the wiring diagram of Figs. 62a to 62w, inclusive, and which will be fully explained hereinafter under the heading "Operation." The auxiliary keyboard 302 appears in plan in Figs. 1 and 27 and is shown in the sectional views, Figs. 28, 29, and 30. In addition to the keys named, the auxiliary keyboard comprises certain functional control keys which are identified in Fig. 27 as follows: a carriage return key 346 (see also Fig. 62e), a re-set or error key 347 (Fig. 62h) and an eject key EJK (Fig. 62k), the operation of which will all be explained under the heading "Operation." Each digit key is indicated hereinafter by the general character 303 followed by a hyphen (-) and a legend identifying the particular key. For example, the key for entering the numeral "1" is identified hereinafter as 303—1.

The auxiliary keyboard 302 is suitably fixed to the frame of the #1 typewriter 300 and comprises a top frame plate 350 and a bottom frame plate 351 joined together by end plates 352. Each digit-representing key 303 and the space key 304 comprises a key cap 353 mounted on a vertically movable bar 354 which extends through aligned openings in the top and bottom plates 350 and 351, respectively. An integral projection 355 extends laterally from each bar 354 and is slidable within a related slot 356 formed in a guide comb plate 357, the latter being fixed at its ends to the end plates 352. A bar 358 is fixed across the front of the comb plate 357 and is provided with transverse vertical slots 359 aligned respectively with the slots 356 of the comb plate 357 and the bar 358 is also provided with a recess extending for the length thereof and filled with a multiplicity of interlock rollers 361 as shown in Fig. 28. As is well known, the number of rollers 361, their dimension, and the length of the recess in the bar 358 are such that when any key is depressed, the projection 355 moves to the bottom of its aligned slots 356, 359; and, in so doing, the rollers 361 are displaced laterally of the recess in the bar 358, so that a roller 361 will then extend across each of the other slots 356, 359, and will thereby prevent any of the other keys having projections 355 from being depressed until the key previously depressed is restored to its normal or inactive position shown. The motor bar 305 is mounted on two such vertically slidable bars 354, but only one of such bars 354 is provided with a projection 355 extending into a slot 356 of the comb plate 357 and an aligned slot 359 in the bar 358. Each of the keys 346, 347, and EJK also comprises a key cap 363 and a vertically slidable bar 364, but the bars 364 thereof are not provided with interlocking projections like the one 354. Tension springs 365 serve to return all keys of the auxiliary keyboard 302 to their upper or normal positions shown when such keys are released by the operator.

Each key and the motor bar of the auxiliary keyboard 302 closes one or more pairs of related key contacts when such key is depressed. As shown in Fig. 28, a contact actuating wedge 365a is fixed to a side of each of the bars 354 and 364 of the keys and to the right-hand bar 354 of the motor bar 305. As each key and the motor bar is depressed, its wedge 365a engages the upper inclined end 366 of a movable spring contact blade 367 and thereby cams such movable blade to the right to close a related pair of contacts. As shown in Fig. 28, some of the keys simultaneously close two pairs of contacts and this is effected by a block of insulation 368 connecting the movable spring blades 367 of both pairs of contacts so that when the wedge 365a moves the one spring blade 367 to close its pair of contacts, the block 368 simultaneously moves the other spring blade 367 to close its pair of contacts. The contacts closed by the ten digit keys 303-1 to 303-9, inclusive, and 303-0 are indicated, respectively, in Fig. 62m by the reference numerals K1 to K9, inclusive and K0. The contacts closed by the actuation of the space key 304 are indicated in Fig. 62m by the character SP and the motor bar contacts by the character MB.

A pair of bail contacts BC are also closed each time one of the digit keys 303 is closed and each time the space key 304 is closed. To this end a bail plate member 370 extends lengthwise beneath the bottom frame plate 351 and is pivoted at its end, as indicated at 371, to spaced blocks 372 fixed to the bottom plate 351. A bar 373 is mounted on the bail plate member 370 and extends beneath the lower ends of each of the bars 354 of the digit keys 303 and the space key 304. A tab 374 is formed integral with the bail plate 370 and extends beneath a contact actuating pin 375 which is fixed to the lower movable blade 376 of the pair of bail contacts BC. Thus, when any one of the keys 303 or the key 304 is depressed, the lower end of its bar 354 engages the top surface of the bar 373 and thereby moves the bail 370 counterclockwise as viewed in Fig. 30 so that the tab 374 moves the pin 375 upward and thereby moves the blade 376 upward to close the contacts BC. Leaf spring 377 fixed to the bail member 370 and engaging the under side of the bottom frame plate 351 return the bail member 370 to the position shown in Fig. 30, when the keys are released, and thereby permit the contacts BC to open due to the inherent spring force of the blade 376.

Means is provided for locking the digit keys 303, the space key 304, and the motor bar 305 so that they cannot be depressed. This means is shown in Fig. 29 as being in the form of a solenoid 378 including an armature 379 to which is attached a bar 380 like the bars 354 of the keys 303, 304, and 305. The bar 380 includes a projection 381 movable within aligned slots 356, 359. Thus, when the solenoid 378 is energized, its projection 381 is moved downward in its slots 356, 359 and thereby displaces the interlock rollers 361 laterally and, as a result, none of the keys 303, 304 or bar 305 can then be depressed. A tension spring 382 serves to restore the bar 380 and armature 379 when the locking magnet 378 becomes deenergized. As will be fully explained hereinafter, the key lock solenoid 378 is energized as a result of the actuation of the motor bar.

*The #1 translator.*—As explained hereinabove, the keys composing the main keyboard 301 of the #1 typewriter 300 are selectively actuated by means of the #1 translator 400 and under the control of code designations recorded in the columns of the record card at the sensing station 107 within the reading unit 100 and the code designations recorded in the columns of the program tape 15 at the sensing station 108 in the reading unit 100.

The #1 translator is of the type known in this art as a mechanical translator; i. e., the key levers of the #1 typewriter are mechanically operated from a power shaft, and the selection of the key lever to be operated is made by the relative positioning of longitudinally slidable permutation members. The relative positioning of the permutation members is controlled electrically by the sensed code designation in the record cards and program tape. The #1 translator is disclosed in detail in Figs. 24 and 31 to 35, inclusive.

The #1 translator comprises generally twelve code or permutation bars corresponding, respectively, to the twelve positions of a predetermined code system and indicated, respectively, by the reference characters PB1 to PB12, inclusive. The translator 400 also comprises twelve selector magnets TSM1 to TSM12 controlling, respectively, the relative positioning of the twelve permutation bars PB1 to PB12, and a plurality of seeker members 401 corresponding, respectively, to the keys composing the main keyboard 301 of the #1 typewriter and functioning to actuate their respective keys, each seeker member 401 comprising an upper hooked end 402 engaging a stud 403 on the side of its corresponding key lever 308 and being adapted to be pulled down to operate such key lever. The translator 400 also includes an operating or power shaft 404 having control cams 405, 406, 407 and 408, mounted thereon, and the translator also comprises mechanism operated by the cams for effecting a cycle of operation during which the selected key lever 308 of the #1 typewriter is actuated and the parts then restored to a normal or inactive position.

As shown, the twelve permutation bars PB1 to PB12, inclusive, are arranged horizontally and extend transversely beneath the main keyboard 301 and in spaced parallel relation with respect to one another. The permutation bars are supported at their two ends for limited longitudinal sliding movement by vertically disposed end comb plates 410 (Fig. 34) suitably fixed to side flange members 411 of a main frame plate 412 and being guided intermediate their ends by vertical comb plates 413 and 414 also suitably fixed to the frame. Suitable tension springs 415 serve to hold integral projections 416 of the bars against the bottom of the guide slots of the intermediate comb plates 413 and 414. Each permutation bar is normally urged to move to the left as viewed in Fig. 34 by a corresponding compression spring 418 surrounding an operating pin 419 which is slidably mounted in spaced flanges 420 of a fixed bracket 421, each such pin 419 engaging the right-hand end of its corresponding permutation bar. Fig. 34 shows the bar PB1 and its corresponding compression spring 418 and pin 419. It will be appreciated that the remaining permutation bars are each slidably mounted and are each normally urged to move toward the left by corresponding operating pins and springs in the same manner as PB1. Each permutation bar of the group PB1 to PB12, inclusive, is normally held in an inactive or latched position against the force of its related compression spring 418 by means of a corresponding armature 423 of a corresponding selector magnet of the group TSM1 to TSM12, inclusive. The permutation bars are shown in the drawings in their inactive or latched positions where they are at the end of their movement toward the right as viewed in Fig. 34. In the latter view, the bar PB1 is shown as provided with an integrally formed lug 424 having a latching point 425 engaging the left-hand end of a groove 426 formed in the outer end of the pivoted armature 423 of its related selector magnet TSM1. It will be appreciated that each of the other permutation bars is provided with a similar latching lug 424 which engages a similar groove 426 in the armature 423 of its related translator selector magnet. From the foregoing, it will be apparent that when any one of the selector magnets of the group TSM1 to TSM12 is energized, its related armature is attracted, thereby releasing its related permutation bar of the group PB1 to PB12, inclusive, and each such released bar is then moved longitudinally toward the left as viewed in Fig. 34 by its related compression spring 418 and until a lug 427 formed thereon engages a normally stationary restoring bail 428. All released permutation bars are returned at the end of each operating cycle of the translator to their latched positions by means of the restoring bail 428, the latter being mounted on a lever 429 and being operated by a follower lever 430 engaging the cam 406 on the power shaft 404 (Figs. 33 and 34). The manner in which the permutation bars are returned and relatched will be presently described in detail.

There are fifty of the seeker members 401 shown in the illustrated embodiment, there being one seeker for each of the key levers 308 of the main keyboard. As shown in Figs. 24 and 32, the seeker members 401 extend downwardly from their related key levers and the straight lower ends 432 thereof are arranged transversely of the twelve permutation bars PB1 to PB12, inclusive, and the seekers are disposed at the sides of the bars which are opposite to that occupied by the translator selector magnets TSM1 to TSM12, inclusive. The seeker members 401 are maintained against movement in a direction extending lengthwise of the permutation bars by spaced upper and lower comb plates 433 and 434, respectively, which are formed as integral flanges of a rigid frame plate 435 extending transversely beneath the main keyboard 301 of the typewriter. The upper comb plate 433 is bent over as indicated at 436 to provide a means for holding a rod 437 which extends transversely of and beneath the key levers 308 and serves both as a fulcrum and as a retaining means for the upper ends of the seeker members 401, each of the seeker members being formed with a lug 438 which is adapted to engage the underside of rod 437 and thereby limit upward movement of such seeker member 401. A tension spring 440 connects each seeker member 401 with a flange 441 of a fixed frame plate 442 and thereby constantly urges its related seeker member 401 against a seeker positioning bail 443, the latter extending transversely across all of the seeker members and being connected at its two outer ends, respectively, to the lower ends of a pair of arms 444 which are in turn pivotally supported at their upper ends to the ends of the fixed support rod 437. There are two cams 407 (Fig. 31) identical with one another, and they are carried, respectively, on opposite ends of the power shaft 404 and at points adjacent the two arms 444. Each of the arms 444 carries a follower roller 445 (Fig. 32) which is held in continuous engagement with a related one of the cams 407 by the tension springs 440 holding the seeker members 401 against the positioning bail 443. The two cams 407 function as positioning cams for the bail 443 and the seeker members 401. In the normal or inactive position of the #1 translator, the cams 407 hold the positioning bail 443 in the position shown in Figs. 24 and 32, thereby holding the lower straight ends 432 of the seekers 401 out of seeking relation with respect to the permutation bars PB1 to PB12, inclusive.

As indicated by the showing of permutation bar PB1 in Fig. 34, the longitudinal edge thereof facing the seeker members 401 is formed as a series of tabs 446 which before assembling may be removed by a suitable tool; and, when so removed, provide permutation slots 447. The remaining permutation bars are similarly formed. Each seeker member is disposed opposite either a tab 446 or a slot 447 in each permutation bar, when such bar is both in its latched and in its released position. In a manner which is well known in this art, the tabs 446 of the twelve permutation bars are permutatively removed according to a predetermined plan so that for each positional relationship of the twelve permutation bars, the lower straight edge 432 of only one of the seeker members 401 will be opposite a slot 447 in each of the twelve bars and such one seeker member is the one for actuating the key of the typewriter which is represented by the code designation which effects such positional relationship of the bars. The code designations used in the illustrated embodiment for effecting the different relative positions of the permutation bars for operating the typewriter keys appear in Fig. 27 as relatively small characters on the lower parts of the corresponding key caps, the legends identifying the several keys being relatively large characters on the upper parts of such key caps. As an example, it is noted that the key cap for the key 311-A bears in small characters the code designation "12-1." This means that when the permutation bar PB12 and the bar PB1 are released by the energizing of their related selector magnets TSM12 and TSM1, respectively, and with all other permutation bars remaining in their latched position, the lower edge 432 of the seeker member attached to the key lever 308 for actuating the key 311-A will be opposite a slot 447 in each of the twelve permutation bars, and no other seeker member will be opposite a continuous vertical row of such slots. It is noted that with all permutation bars remaining latched, a continuous row of slots will be opposite the edge 432 of the seeker member 401 for actuating the key 311-space. It is also noted that the code designations appearing on the lower part of the key caps for all the character keys 311 in Fig. 27 are the same as those representing such characters in the 12-position statistical code shown punched in the record card of Fig. 51; but, that the code designations for actuating the other keys of the main keyboard are not included in Fig. 51.

At a selected point in each cycle of operation of the #1 translator, the cams 407 and springs 440 will provide for movement of the positioning bail 443 to the left as viewed in Fig. 32 and so that the seeker members 401 will pivot about the rod 437 and the lower ends 432 thereof will move into seeking relationship with respect to the twelve permutation bars. The seeker member 401 which is opposite a continuous vertical row of slots 447 in the permutation bars will then move into such vertical row of slots and all other seekers will be stopped by a tab 446 in one or more of the permutation bars. The selected seeker member 401 which moves into the continuous row of slots, moves far enough for a ledge portion 450 thereon to be beneath and in the path of an operating bail 451.

The operating bail 451 extends across all of the seeker members 401 and is fixed at its two outer ends, respectively, to a pair of operating bail levers 452. The two bail levers 452 are pivoted, respectively, on fixed studs 453 projecting inwardly from frame members 454. Each bail lever 452 is composed of two parts (Fig. 32), one part 452a carrying the operating bail 451 and the other part 452b being adjustably secured by a suitable means indicated at 455 to the part 452a and carrying a follower roller 456 engaging an operating cam 408. As shown in Fig. 31, there are two such cams 408 engaged, respectively, by the two rollers 456 of the two bail levers 452 and each bail lever 452 is kept in engagement with its related operating cam by a tension spring 457 connecting an extension of each part 452b and a flange 458 of the fixed transverse frame plate 442.

From the foregoing, it will be apparent that during each revolution of the power shaft 404, which comprises an operating cycle of the translator, and after the cams 407 have positioned a selected seeker member 401 beneath the operating bail 451, the cams 408 and springs 457 will provide for moving the bail levers 452 clockwise as viewed in Fig. 32 and during such movement the operating bail 451 will engage and pull down the selected seeker member 401 and thereby pull down the key lever 308 to which such selected seeker is attached. From the foregoing description of the #1 typewriter, it will be apparent that such downward movement of the related key lever 308 will result in actuating the related key by tripping its related cam unit 321 (Fig. 24).

In the illustrated embodiment, the cams 407, through the springs 440 and positioning bail 443, move the seekers 401 into seeking relationship with the twelve permutation bars at approximately 47° of each operating cycle of the translator shaft 404 and move such seekers out of seeking relationship at approximately 203° of each such cycle. Also, the operating bail cams 408 start moving the selected seeker member 401 downward at approximately 89° of each translator operating cycle, and the operating bail 451 is restored to its inactive position at approximately 350° of each such cycle. The positioning bail 443 disconnects the selected seeker 401 from the operating bail 451 when the seekers are engaged by the bail 443 beginning at approximately 203° of each such cycle.

Each operating cycle of the #1 translator is initiated by engaging the #1 translator clutch 460 shown in Figs. 31 and 35. When the clutch 460 is engaged, it connects a power source in the form of a constantly running electric motor 461 (Figs. 40 and 47), mounted at the back of the #1 typewriter, with the power shaft 404 of the #1 translator. The power shaft 404 is rotated for one revolution and is then disconnected from the power source by disengagement of the clutch 460. As stated, each revolution of the power shaft 404 provides for one operating cycle of the #1 translator. The clutch 460 is engaged by the energizing of the #1 translator clutch magnet 462 (see also Fig. 62q).

As will appear more fully hereinafter in the description under the heading "Operation," when the #1 typewriter is turned on, the circuit for energizing the #1 translator clutch magnet 462 is under the control of the constantly running cam contacts CR4 (Fig. 62q). As shown in Fig. 61, contacts CR4 close at 215° of each revolution of the main drive shaft DS of the reading unit 100, and such contacts open at 300° of each such revolution. Also, the circuits for controlling the selective energizing of the #1 translator selector magnets TSM1 to TSM12 inclusive (Fig. 62w), are controlled by the cam contacts CR3 (Fig. 62r) which close at 220° and open at 277° of each revolution of the main drive shaft DS.

The clutch 460 comprises a constantly running driving member in the form of a cylinder or drum 464 (Fig. 35) and a driven member in the form of a clutch pawl 465 which is pivoted on a stud 466 carried by a plate 467 and the latter is fixed to the end of the power shaft 404. The pawl 465 carries a friction shoe 468 which is pivoted at 469 on the pawl 465 and is adapted to frictionally engage the inner surface of the cylinder 464 to effect engagement of the clutch 460 when the pawl 465 is released by the energizing of magnet 462.

The cylinder 464 is fixed to a gear 470 (Figs. 31 and 47) mounted on a sleeve-like hub 471 and the latter is suitably journalled on the power shaft 404. The gear 470 meshes with a gear 472 rotatably mounted on a stub shaft 473 suitably carried by the frame of the #1 typewriter. A pulley 474 is fixed to the side of the gear 472 and is engaged by a drive belt 475. The belt 475 also engages a pulley 476 fixed to the side of a gear 477 and the two are rotatably mounted on a stub shaft 478 suitably carried by the typewriter frame. The gear 477 meshes with a gear 479 mounted on a shaft 480 carried by the typewriter frame. A pulley 481 is fixed to the gear 479 (see also Fig. 40) and a driving belt 482 operatively connects the pulley 481 with a pulley 483 mounted on the end of the operating shaft of the motor 461. Thus, the drum 464 is constantly rotating at a fixed rate by the electric motor 461.

With the #1 translator clutch magnet 462 deenergized, the clutch 460 is disengaged and the parts are in their inactive positions shown in Figs. 31 and 35 of the drawings. In the inactive position, the outer end 484 of the pawl 465 engages the outer end 485 of a pivoted armature 486 of the #1 translator clutch magnet 462, the latter being held in its unattracted position by a pair of leaf springs 487 fixed to a bracket 488 suitably secured to the frame of the translator. The armature 486 is pivoted on a stud 489, and a knock-off arm 490 is also fixed with respect to the armature and extends upwardly and engages the cam 405 fixed to the shaft 404.

As shown in Fig. 35, the pivot pin 466 for the pawl 465 is eccentrically located with respect to the axis of the cylinder 464, which is the same as the axis of the shaft 404, so that the friction shoe 468 is out of engagement with the inner surface of the cylinder 464 in the latched or inactive position of the clutch parts. A tension spring 491 connecting a pin 492 rigid with the plate 467 and a pin 493 on the pawl 465, normally urges the pawl 465 clockwise as viewed in Fig. 35. Thus, when the magnet 462 is energized and the armature 486 thereby attracted, the pawl 465 is released and the spring 491 rotates the pawl clockwise and thereby effects frictional clutching engagement of the shoe 468 and cylinder 464. The pawl 465 and shaft 404 are then locked to the cylinder 464 and therefore rotate with the latter.

The magnet 462 is deenergized by the opening of the cam contacts CR4 (Fig. 61) at 300° of the main drive shaft DS of the reading unit 100. This will occur at about 30° of a revolution of the translator shaft 404. Ordinarily, the springs 487 return the armature 486 to the position shown in Fig. 35 when the magnet 462 is deenergized. This will usually occur beginning at about 90° of a revolution of the shaft 404. If the armature 486 should stick, the knock-off cam 405 (Fig. 31) will move the arm 490 beginning at about 161° of a revolution of the shaft 404 and this will move the armature 486 counterclockwise, as viewed in Fig. 35, to the position shown. Thus, in any event, the end 485 of the armature 486 is moved into intercepting position with respect to the end 484 of the pawl 465 before the shaft 404 completes a revolution. As will be apparent, the shaft 404 is declutched from the cylinder 464 at the end of its revolution by the end 484 striking the end 485 and thereby moving the pawl 465 and shoe 468 out of clutching engagement with the cylinder 464.

It is noted that the knock-off cam 405 and the arm 490 may advantageously serve as a detent means for the clutch; i. e., the cam 405 is so shaped that when the shaft 404 is in its inactive or home position, the springs 487 will urge the arm 490 into engagement with the cam 405 and will thereby resist rotary movement of the cam 408, the shaft 404, and the driven parts of the clutch 460 which are connected to such shaft.

Summarizing the foregoing, it is noted from Fig. 61 that the #1 translator clutch 460 is engaged by the action of cam CR4 and the permutation bars PB1 to PB12, inclusive, are selected and released by the action of cam CR3 at about the same time, CR4 closing at 215° and CR3 at 220° of each machine cycle. It is also noted that when the shaft 404 begins to rotate, the positioning bail 443 and springs 440 move the seekers 401 into seeking relation with respect to the permutation bars, and the operating bail 451 then engages the selected seeker 401 and thereby actuates the related typewriter key. If none of the permutation bars are released, the seeker 401 corresponding to the space key 311-space is then selected and the latter is actuated thereby.

From an examination of Fig. 34, it is noted that six of the selector magnets, of the group TMS1 to TSM12, inclusive, are shown in plan. The remaining six of the selector magnets are arranged below the six shown (see Fig. 32), and they are so arranged that there is a selector magnet arranged directly below each of the six shown in Fig. 34. It is also noted that the six selector magnets shown in Fig. 34 are arranged in pairs with the outer ends of the armatures 423 of each pair disposed in overlapping staggered relation with respect to one another. It will be appreciated that the translator selector magnets below the ones shown in Fig. 34 and their respective armatures are also arranged in pairs which correspond to and are beneath the pairs appearing in Fig. 34. A restoring and knock-off bail 494 is associated with each pair of armatures 423 and their selector magnets shown in Fig. 34 and is also associated with the corresponding pair of armatures directly beneath those shown. The knock-off bails 494 are suitably pivoted on fixed studs 495 and each bail comprises a first bail element 496 extending across the magnet side of each of its associated armatures 423, and also comprises a second bail element 497 disposed above and across its associated armatures and coacting with the rear or right-hand edge of the lugs 424 carried by the permutation bars corresponding to the four armatures and selector magnets with which such knock-off bail is associated. Each knock-off bail is urged toward the position shown by a tension spring 498. Each armature 423 is pivoted on an upstanding fixed member 423a and is urged away from its related coil by a tension spring 423b.

The knock-off bail 494 coacts with the restoring bail 428 to relatch the permutation bars PB1 to PB12, inclusive, at the end of an operating cycle of the translator. As shown in Fig. 34, the lug 427 on any permutation bar will engage the bail 428 when released by the energizing of its related selector magnet. At about 211° of each revolution of the shaft 404, the restoring bail cam 406 will start moving the follower 430 counterclockwise as viewed in Fig. 33. The follower 430 will then move the bail lever 429 clockwise as viewed in Fig. 34, and the bail 428 will start restoring movement, to the right, of any of the permutation bars which were previously released. At about 272° of each revolution of the translator shaft 404, the restoring bail 428 will also engage the restoring lugs 427 on the permutation bars which were not previously released, and then the bail 428 will move all twelve of the permutation bars to the right as viewed in Fig. 34. At about 284° of the shaft 404, the rear edges of the lugs 424 on the permutation bars engage the bail elements 497 of their corresponding knock-off bails 494. The restoring bail 428 will continue to move the permutation bars to the right as viewed in Fig. 34 until about 310° of the revolution of the shaft 404. This will move the knock-off bails 494 clockwise and their bail elements 496 will engage and move outward any of their related armatures which are stuck and thereby assure the engagement of the latching points 425 of the lugs 424 on the permutation bars within the slots 426 of the related armatures 423. The springs 423b will then hold all armatures 423 against the lugs 425. The restoring bail 428 will, after about 310°, start a counterclockwise movement back to the inactive position shown, with the result that the permutation bars PB1 to PB12, inclusive, and the knock-off bails 494 will follow the restoring bail in its return movement until the latching point 425 of the lug 424 of each permutation bar engages the latching left-hand end of the slot 426 of its related armature 423. All permutation bars will be relatched at about 327° of each revolution of the shaft 404 and the restoring bail 428 will be returned to the inactive position shown at about 357°.

*The tape punch*

As stated, the illustrated embodiment comprises a tape code punch 500 (Figs. 1 and 39 to 46, inclusive) which functions to record selected data in a tape 12 (see also Figs. 49 and 50) and according to a 5-position telegraphic code system. The punch 500 is secured to the left-hand side of the #1 typewriter 300; and, when turned on under the control of a significant code designation in the program tape 15 (Figs. 59a and 59b), the punch is selectively operated by the actuation of certain keys of the main keyboard 301 of the #1 typewriter. The structural details of the tape punch 500 are disclosed in Figs. 39 to 46, inclusive, and the means for selectively operating the tape punch under the control of the typewriter keys is shown in Figs. 24, 36, 37, and 38.

Before describing the details of construction of the tape punch 500, it will be helpful to consider first the 5-position telegraphic code system. In Fig. 49, there is shown a fragment of a tape 12 bearing all of the code designations of a 5-position telegraphic code system which is known in this art as the Baudot code. There are five code or index point positions forming each record column in the Baudot code shown, and each record column extends transversely of the tape 12. Characters are represented by code holes in one or more of the code positions of each record column. Because there are not enough possible combinations in a 5-position code system to represent all of the letters, figures, and punctuation characters, the characters are divided into two classes, or cases, viz., figures case and letters case, and a figures-shift code designation is used in conjunction with code hole combinations to represent the figures case characters and a letters shift code designation is used with the same code hole combinations to represent the letters case characters. For example, the figures-shift designation 1-2-4-5 in a record column of the tape 12 followed by the 1-2-5 designation represents the figures case character "2" and the letters shift designation 1-2-3-4-5 followed by the same designation 1-2-5 represents the letters character "W." In the conventional printing machine, not shown herein, used to print the data represented by the code designations of the 5-position code system, the type elements for printing each letters and figures character represented by the same code hole combination, are provided on the same type bar and the letters shift and figures-shift designations are used to shift the printing position of such bars so that the bars will print the letters character when shifted to a letters case position and the figures character when in a figures case position.

The functional code designations representing the space, carriage return, line feed, figures-shift, and letters shift operations of the printer will effect their respective functional operation when the printer is in either case position. The legends appearing across the top of the tape 12 in Fig. 49 identify the characters and functional operations represented by the different code combinations composing the 5-position code system, as will be apparent to those skilled in this art. When the printer is adjusted to either case position by its significant case code designation, it will remain in such position until the designation representing the other case is read. In the tape 12 of Fig. 50, the characters recorded therein and interpreted by legends across the top thereof, are those recorded by the tape punch 500 when the illustrated embodiment is operated according to the particular data recorded in the statistical record cards MC—1, DC—1, DC—2, and DC—3 shown in Figs. 52 and 54 to 56, inclusive, and the control designations recorded in the program tape 15 of Figs. 59a and 59b.

As indicated previously, the code punch 500 is used in the illustrated embodiment disclosed herein to record selected data in the 5-position tape 12 and such recorded data relates to items or parts ordered by a customer from the supplier's warehouse. The prepared tape 12 is used afterwards to record in statistical record cards of the general type shown in Figs. 51 to 56, inclusive, data relating to the items ordered and such cards are used as a part of an inventory control system whereby the ordered parts are replaced in the warehouse. A tape controlled card punch for preparing such inventory cards is not disclosed herein as it forms no part of the present invention. A commercial known example of such a machine is fully disclosed and claimed in the U. S. patent to Doty et al. No. 2,340,801, granted February 1, 1944.

As stated hereinabove, the structural details of the tape punch 500 are shown in Figs. 39 to 46, inclusive. As shown, the punch comprises five vertically arranged code hole punches CP1 to CP5, inclusive, which correspond, respectively, to the five code hole positions of the Baudot code system of Fig. 49. As shown in Fig. 40, the vertical code punches are arranged beneath and in a transverse row across the tape 12 in which the coded data is to be recorded. The punch 500 also comprises a vertically disposed feed hole punch FP which is located between the code punches CP2 and CP3, and which functions during each operating cycle of the punch to punch the relatively small tape feed holes 501 which are located in all record columns of the tape 12 (see also Figs. 49 and 50).

As shown in Figs. 39 and 41, the code punch CP1 is mounted for vertical reciprocatory movement in spaced aligned guide passages 503 in a fixed guide block 504 and in an aligned die opening 505 in a fixed die plate 506. The lower end of the punch CP1 is pivotally connected in a suitable manner to the right-hand end of a related punch actuating lever 508, and the lever 508 is pivoted intermediate its ends on a rod 509 which extends transversely of and forms a part of a punch operating frame 510. The operating frame 510 (see also Fig. 40) also comprises spaced side arms 511 and 512 joined by an integral plate 513 and pivotally supported on a transversely extending stop rod 514 which is suitably fixed at its ends to the punch frame structure. The left-hand end of the punch lever 508, as viewed in Fig. 41, engages the top of the stop rod 514 when the punch CP1 is in its normal or inactive position shown. It will be appreciated that the remaining code punches CP2 to CP5, inclusive, and the feed hole punch FP are constructed the same as the punch CP1 and are mounted in the same manner in the guide block 504 and die plate 506 and are connected, respectively, at their lower ends to related actuating levers 515 to 519, inclusive, and such related actuating levers are arranged side-by-side in the frame 510 and are pivoted on the transverse rod 509. The ends of the levers 515 to 519, inclusive, which are remote from their punches, rest on top of the stop rod 514 with the punches in their normal or inactive position. A tension spring 521 connects the right-hand end, as viewed in Fig. 39, of each punch operating lever to a fixed flange plate 522 and thereby constantly urges the several code punches and feed punch to their inactive or withdrawn positions shown in the drawings.

As shown in Fig. 41, the lower face of the guide plate 506 is spaced from the upper face of the guide block 504 to provide a passage through which the tape 12 is fed lengthwise in the direction indicated by the arrow (see also Figs. 39 and 40). The tape is further guided in its lengthwise movement across the top of the punch by guide plates 523 and by a guide roller 524, shown in Figs. 39 and 40. After being punched, the tape 12 passes over a tape feed sprocket 525 having teeth 526 fitting within the feed holes 501. The sprocket 525 is indexed once for each operating cycle of the punch 500 so as to advance the tape to the next blank record column, as will be explained more fully hereinafter.

The punch 500 comprises an operating shaft 528 suitably journalled at its ends in the fixed frame structure of the punch and having a plurality of control cams 529, 530, 531, and 532 mounted thereon. Each revolution of the shaft and the cams thereon effects an operating cycle of the punch and each operating cycle is initiated by engaging a punch clutch 533 (Fig. 44) which connects a constantly running drive gear 534 with the operating shaft 528 for one revolution of the latter and then disconnects the two and stops the operating shaft 528 in its home or inactive position shown in the drawings. The punch clutch is engaged by the energizing of a punch clutch magnet PCM (Figs. 44 and 62v). The structure and mode of operation of the punch clutch 533 will be described in detail hereinafter.

The cams 531 and 532 are complementary cams and are engaged, respectively, by follower rollers 536 and 537 which are rotatably mounted in spaced relation, as shown in Fig. 41, on the outer end of an arm 539, the latter being pivoted to the stop rod 514 and arranged alongside and adjustably secured, as indicated at 540, to the side frame member 512 of the operating frame 510. Thus, the arm 539 forms a part of and is movable with the frame 510.

From an examination of Figs. 39 and 41, it will be apparent that each time a punch operating cycle is effected by rotating the shaft 528 one revolution counterclockwise, the cam 531 engaging the follower roller 536 will first move the operating frame 510 upward or counterclockwise about its pivot rod 514, the cam 532 being so shaped as to permit such upward movement. Then, the cam 532 by its engagement with the follower roller 537 will move the operating frame 510 downward, or clockwise, and back to the inactive position shown, the cam 531 being so shaped as to permit such return movement of the frame 510. During such upward and downward movement of the frame 510, the rod 509, on which the punch actuating levers 508 and 515 to 519, inclusive, are pivoted, is also moved upward and then restored to the position shown. It will be apparent that if, during such movement of the rod 509, the left-hand ends of all punch actuating levers 508 and 515 to 519, inclusive, are not held down against the stop rod 514, such actuating levers will be moved by the rod 509 clockwise about their pivotal connections with their related punches, the springs 521 being sufficiently strong to hold their right-hand ends stationary. On the other hand, if the left-hand end of any one of the punch actuating levers is held down against the fixed rod 514, the upward movement of the rod 509 will then effect a counterclockwise movement of the lever, or levers, so held, about the stop rod 514 as a pivot and, in so doing, the punch connected to each lever so held will be moved upward against the force of its spring 521 and through the tape 12, thereby punching a code hole in the corresponding code position of the tape, in the case of the code punches, and punching a feed hole 501 in the tape in the case of the feed punch.

In the construction shown (Figs. 39 and 40), the lever 516 corresponding to the feed punch FP is permanently held down against the stop rod 514 by the outer end of an arm 543, the arm 543 being fixed at its other end to a fixed frame member 544. Thus, for each revolution of the shaft 528, a feed hole 501 will be punched in the tape 12 in the manner explained. The code designations shown in Fig. 49 are punched in the tape 12 by the selective latching against the stop bar 514 of the adjacent ends of those actuating levers which are connected to the code punches corresponding to the code positions where it is desired to punch the code holes. Selective latching of the left-hand end, as viewed in Figs. 39 and 41, of the five code punch actuating levers 508, 515, 517, 518, and 519 against the stop rod 514, is effected, respectively, by the selective releasing of five corresponding latch levers 546, 547, 548, 549, and 550. The releasing of the five latch levers is controlled by the selective energizing of five corresponding punch selector magnets PSM1 to PSM5, inclusive, (see also Fig. 62v).

The five latch levers 546 to 550, inclusive, are arranged in side-by-side relation and are pivoted on a transverse fixed rod 551. The upper ends of the five latch levers extend, respectively, through corresponding slots 553 of a comb plate 554 fixed to the frame member 544, and such latch levers are aligned, respectively, with the adjacent ends of their respective code punch actuating levers which also extend through the corresponding slots 553. The five latch levers are each urged clockwise as viewed in Figs. 39 and 41 by tension springs 555 connecting, respectively, projections 556 on the latch levers with the flange of a transverse fixed frame plate 557. In the normal or inactive position of the parts as shown, each latch lever of the group 546 to 550, inclusive, is held against clockwise movement by its upper pointed end 559 engaging the right-hand end of a latching notch 560 cut in the under face of the pivoted armature 561 of its related selector magnet of the group PSM1 to PSM5, inclusive. A tension spring 552 holds each armature in the position shown.

When any one of the selector magnets of the group PSM1 to PSM5, inclusive, is selectively energized, in a manner which will be explained hereinafter, its related armature 561 is attracted and moves upward, thereby releasing its related latch lever of the group 546 to 550, inclusive, and the latter is then moved by its spring 555 clockwise as viewed in Figs. 39 and 41, and to a point where a latching notch 564 on the released latch lever engages over the left-hand end of its related punch actuating lever, of the group 508, 515, 517, 518, and 519, and thereby holds such engaged punch actuating lever down against the stop rod 514 and so that upon subsequent rotation of the operating shaft 528, the cams 531 and 532, through the frame 510 will cause the right-hand end of such punch actuating lever to move its related code punch of the group CP1 to CP5, inclusive, upward and punch a code hole in the corresponding code position of the tape 12, in the manner previously explained.

The selector magnets PSM1 to PSM5, inclusive, are disposed in staggered relation as shown in Figs. 39 and 40 so that such magnets and their armatures are aligned with their related latch levers. The armatures of adjacent selector magnets overlap at their outer ends so that their latching notches 560 are aligned in a transverse horizontal plane when the parts are in the inactive position shown.

During each operating cycle of the punch 500, the cam 530 (Fig. 41) on the punch operating shaft 528 functions to lock those latch levers which have been tripped by their related selector magnets, in their position of latching engagement with their related punch actuating levers, and also functions to lock the untripped latch levers in their inactive positions so that they cannot interfere with the punching during the same cycle of the selected code combination by the tripped levers. To this end, a latch lock bail lever 566 is rotatably mounted on a transverse rod 567 suitably fixed to the frame structure of the punch and includes a follower arm 568 carrying a roller 569 which is constantly urged against the face of the cam 530 by a tension spring 570 connecting the arm 568 with a suitable fixed part (not shown) of the punch frame. The bail lever 566 carries a locking bail 571 extending transversely across the spear-shaped ends 572 of arms 573, the latter being integrally formed, respectively, with the five latch levers 546 to 550, inclusive. At about 13° of each punch operating cycle, the cam 530 and spring 570 move the locking bail 571 counterclockwise, as viewed in Fig. 41, and toward the ends 572 of the levers 546 to 550, inclusive, and such movement is completed at about 36° of such cycle. As a result of such movement, the locking bail 571 will pass beneath the points of the ends 572 of any untripped latch levers and will engage the lower inclined surfaces thereof and thereby lock such untripped levers in their inactive positions. The ends 572 of any latch levers which have been previously tripped will then be so positioned that the locking bail 571 will pass above the points of such ends and will engage the upper inclined surfaces thereof and thereby lock any such tripped levers in latching relation with respect to their related punch actuating levers.

The cams 531 and 532, previously described, are so shaped and positioned that they begin to move the punch operating frame 510 and punch actuating levers 508, 515 to 519, inclusive, at about 37° 30' of each punch operating cycle, which as explained above, is shortly after the point in the cycle where the latch levers are fully locked in their tripped or untripped positions. The punches touch the tape at about 87° of the punch cycle and reach the upper extent of their movement at about 146°. The punches leave the tape at about 177° 30'. The latch lock cam 530 moves the locking bail 571 out of locking relation with respect to the ends 572 of the latch levers 546 to 550, inclusive, at about 142° of each punch operating cycle.

As shown in Fig. 41, the locking bail lever 566 closes a pair of latch lock contacts 574 when the cam 530 moves the lever 566 into locking position as explained above. As will appear more fully hereinafter in the "Operation," the contacts 574, when closed, energize an anti-repeat relay R63 (Fig. 62v) which breaks the energizing circuits of the punch clutch magnet PCM and the punch selector magnets PSM1 to PSM5, inclusive. The coils of these magnets will be deenergized by the anti-repeat relay R63 at about 100° of the punch operating cycle.

The cam 529 (Fig. 39) is the tape feed cam and functions during each punch operating cycle to advance the tape feed sprocket 525 and tape 12 an amount sufficient to move the punched record column out of punching position and to move a blank record column into punching position. A lever arm 575 carrying a follower roller 576 engaging the feed cam 529 is pivoted to a suitably fixed stud 577 at its left-hand end as viewed in Fig. 39 and is connected at its outer or right-hand end to a vertically slidable feed pawl 578. A stud 579 on the pawl 578 and engaging the under side of the lever 575 and a tension spring 580 connecting the stud 579 and a fixed bracket 581, provide the just mentioned connection between the lever arm 575 and pawl 578. The pawl 578 is vertically slidable in a fixed block 582 and the tension spring 580 constantly urges the pawl 578 upward and also urges the follower arm 575 and follower roller 576 upward and against the face of the feed cam 529. A ratchet wheel 583 is fixed to the tape feed sprocket 525 and is adapted to be engaged by the upper end of the pawl 578, when the latter is moved upward. It will be apparent that when the punch shaft 528 rotates the cam 529 counterclockwise so that the roller 576 moves from the high dwell portion of the cam 529, the spring 580 will move the arm 575 upward and also move the feed pawl 578 upward into engagement with a tooth of the tape feed ratchet 583 and thereby index such ratchet and tape feed sprocket clockwise. A fixed stop 584 is engaged by the pawl 578 and thereby limits the upward movement thereof so that for each tape feed operation, the tape 12 will be advanced the distance of one record column as before explained. The cam 529 is so shaped that the arm 575 and pawl 578 begin their upward movement at about 150° of each punch operating cycle and the pawl 578 engages a tooth of the ratchet 583 and begins to advance the tape at about 181° of such cycle, which is after the point the punches leave the tape 12 on their return movement. The feed pawl 578 touches the stop 584 at about 252° of the punch cycle and the pawl 578 and lever 575 are restored to their respective inactive positions shown at about 345° of such punch cycle.

During the latter part of each punch operating cycle and after the latch locking bail 571 clears the latch levers 546 to 550, inclusive, and after the punches leave the tap 12, the latch levers are restored to their inactive or latched positions shown where they are held by the latching notches 560 of the armatures 561 of their related selector magnets of the groups PSM1 to PSM5, inclusive. This is effected by a restoring bail 585 (Figs. 39 and 42) extending across the lower side of the right-hand arms 573 of all latch levers 546 to 550, inclusive. The bail 585 is formed integral with an arm 587 and the latter is fulcrumed at one end on the fixed rod 551 and is adapted to be engaged at its other and outer end by an eccentrically mounted stud 588 extending between and fixed at its ends to the tape feed cam 529 and the locking bail cam 530. Normally, the lever 587 and restoring bail 585 are held in the position shown by a tension spring 590 urging such bail against a fixed stop 591. During the latter part of the punch cycle, the eccentric pin 588 engages the outer end of the lever arm 587. As a result, the arm 587 and bail 585 are moved counterclockwise about the rod 551. Thus, the bail 585 engages any previously tripped latch levers 546 to 550, inclusive, and moves them counterclockwise and slightly past the latching position shown in Figs. 39 and 41. In moving the previously tripped latch levers past their latching position, the bail 585 will also engage and move the remaining or untripped latch levers counterclockwise. As the latch levers are thus moved counterclockwise, such levers engage a bail element 593 forming a part of the knock-off bail lever 594 which is pivoted on a rod 595. The knock-off lever 594 also includes a second bail element 596 which is arranged above and extends across the outer ends of all armatures 561 of the selector magnets PSM1 to PSM5, inclusive. Thus, the lever 594 is rocked clockwise and the bail element 596 thereof will engage and release any of the armatures 561 that may be stuck with the result that all armatures will be positioned against the ends 559 of their related latch levers and held there by their related springs 562. The restoring bail 585 is then permitted by the further rotation of the eccentric pin 588 to return to the position shown, and in so doing the springs 555 move their respective latch levers 546 to 560, inclusive, clockwise until their upper pointed ends 559 again engage the right-hand end of the notches 560 in their related armatures and are thereby held in latched position.

As explained above, a cycle of operation of the punch 500 is initiated by the engaging of the punch clutch 533 and the latter is engaged by the energizing of the punch clutch magnet PCM. The punch clutch is shown in detail in Figs. 44, 45, and 46 and comprises a driving member 600 fixed to the constantly rotating drive gear 534 and journaled for rotation on the punch operating shaft 528, and also comprises a driven member 601 fixed to the outer end of the punch operating shaft 528. The driving member comprises a sleeve 602 journalled on the shaft 528 and a second sleeve 603 encircling and fixed to the sleeve 602 and formed with an annular flange 604 at the right-hand end thereof as viewed in Fig. 45. As shown in Figs. 40 and 47, the driving gear 534 is fixed to the outer sleeve 603 and is in constant mesh with the gear 479 which is rotated by the motor 461 through the belt 482 and pulleys 481 and 483. The clutch 533 is of the friction type and clutching engagement is effected by frictional engagement of the left-hand face (Fig. 45) of a latching plate 605 of the driven member 601 with the outer or right-hand face of the annular flange 604 of the constantly running driving member 600. In addition to the latching plate 605, the driven member 601 comprises a detent plate 606 which is formed integral with a sleeve 607 encircling the shaft 528 and is fixed on the shaft by a clamping nut 608 threaded on the end of the shaft 528. Relative movement between the sleeve and shaft is prevented further by interfitting teeth and recesses formed, respectively, on the engaging ends of the sleeve 607 and a shoulder 609 of the shaft 528. Fixed to the detent plate 606 by a pin 611 is a collar 612 surrounding the sleeve 607; and, fixed to the latch plate 605 by a pin 613 is a second collar 614. The two collars 612 and 614 are formed, respectively, with engaging helical cam surfaces indicated at 615. With the collars 612 and 614 in their relative position shown, the latch plate 605 is held out of frictional engagement with the flange 604 and the clutch 533 is thereby disengaged. The collar 614 and latch plate 605 are constantly urged to rotate counterclockwise, as viewed in Fig. 44, with respect to the collar 612 and detent plate 606 by means of a coil spring 616 encircling the collars 612 and 614 and anchored at its ends to the pins 611 and 613. The detent plate 606 and shaft 528 are held in the home or inactive position shown by engagement of the outer end of a detent arm 617 with a recess 618 in the periphery of the detent plate 606, and the latch plate 605 is held in the position shown by engagement of the outer end of a latch arm 619 with a shoulder 620 formed on the periphery of the latch plate 605. The detent arm 617 is pivoted on a fixed pivot rod 622 and is held in the position shown by means of a tension spring 623 connecting the arm 617 and a pin 624 on a fixed bracket 625. The latch arm 619 is fixed to and forms a part of an armature 626 of the punch clutch magnet PCM and the armature is pivoted on the rod 622 and is held in the position shown by a tension spring 627 connecting a pin 628 on the armature with a pin 629 on the bracket 625.

From the drawings, it will be apparent that upon the clutch magnet PCM being energized, its armature 626 will be attracted and will move counterclockwise as viewed in Fig. 44 and the arm 619 will move out of engagement with the shoulder 620 of the latch plate 605. The coil spring 616 will rotate the latch plate 605 and collar 614 counterclockwise with respect to the collar 612 and detent plate 606, which will result in the helical cam surfaces 615 of the two collars also forcing the latch plate 605 to the left and along the shaft 528 as viewed in Figs. 45 and 46, and so that the plate 605 will move into frictional clutching engagement with the flange 604. As the clutching surfaces come into engagement, the helical spring 616 is rotating the latch plate 605 in the same direction as the direction of rotation of the flange 604 of the driving member 600, with the result that when frictional clutching engagement is effected, the two engaging surfaces are locked together and then rotate in unison. As the latch plate 605 rotates with the driving member 600, a knock-off pin 631 projecting from the plate 605, engages the outer end of a knock-off arm 632 rigid with the armature 626 and thereby returns the armature 626 clockwise toward the position shown in case such armature becomes stuck. As stated above, the clutch magnet PCM is deenergized by the anti-repeat relay R63 (Fig. 62v) at 100° of the revolution of the shaft 528 which is before the pin 631 engages the knock-off arm 632. The outer end of the latch arm 619 will be held in engagement with the periphery of the latch plate 605 by the spring 627, so that when the shoulder 620 returns to the angular position shown, it will engage the end of the arm 619 and will result in stopping the latch plate 605 from further rotation. As at this time the shaft 528, detent plate 606, and collar 612 are still rotating, the relative rotation of the collars 612 and 614 will result in the engaging cam surfaces 615 on the collars and spiral spring 616 effecting movement of the plate 605 out of clutching engagement with the flange 604. At the same time the latter occurs, the detent 617 will engage the recess 618 on the detent plate 606 and thereby hold the punch shaft 528 in the home or inactive position shown.

As will be described more fully hereinafter, the usual or normal operation of the punch 500 is effected by energizing the punch selector magnets PSM1 to PSM5, inclusive, and the punch clutch magnet PCM, by a code selector unit 635 (Fig. 24) and the latter is operated by the actuation of keys of the #1 typewriter 300. Provision is also made herein for selectively energizing the punch selector magnets PSM1 to PSM5, inclusive, directly from code designations in the statistical record cards; and, when the latter takes place, the punch clutch magnet PCM is energized by the closing of a pair of bail contacts 636 (Figs. 42 and 62v) which is effected by the tripping of any one of the latch levers 546 to 550, inclusive. As shown in Fig. 42, a bail 637 extends across the upright arms of all of the latch levers 546 to 550, inclusive, and the bail 637 is fixed to a bail lever 638 pivoted on the fixed rod 551 and having a contact actuating element 639 engaging the upper movable spring blade of the bail contacts 636. Thus, when any one of the latch levers of the group 546 to 550, inclusive, is released by the energizing of its related selector magnet, in the manner previously described, such released lever engages the bail 637 and moves the bail lever 638 clockwise to close the bail contacts 636. The inherent spring force of the upper movable spring blade of the contacts 636 is sufficient to return the lever 638 to the position shown and open the bail contacts 636 when the latch levers 546 to 550, inclusive, are restored to latched position. The punch clutch magnet circuit is broken by the anti-repeat relay R63 (Fig. 62v) which is energized by the closing of the latch lock contacts 574, as explained previously.

Means is provided for closing a pair of tape contacts 641 (Figs. 43 and 62f) in the event that the tension on the tape 12 becomes too great and in the event the tape supply becomes exhausted. As will later appear, the closing of the tape contacts energizes the relay R33 (Fig. 62f) and the contacts R33c (Fig. 62e) of the latter relay then close to pick up the main interlock relay R36. The contacts of the relay R36 are then operated to stop all further reading and feeding of the program tape and statistical cards, as will be explained more fully hereinafter under "Operation." Thus, as long as tape contacts remain closed, relay R33 and interlock relay R36 remain energized and the illustrated embodiment is locked against further operation.

As shown in Fig. 43, the tape contacts 641 are adapted to be operated by a lever 642 which is pivoted on a fixed rod 643 and is provided with a contact operating element engaging the upper spring blade 644 of the tape contacts 641. The inherent spring force of the blade 644 is sufficient to hold the lever 642 in the position shown and to hold the contacts 641 open, provided no additional force is applied to the lever 642 to move it in a clockwise direction. A lever 645 is pivoted on a fixed stud 646 and is provided with a tape feeler element on the right-hand end of an arm 645a thereof and which engages the underside of the tape 12. The lever 645 also includes a depending arm 645b which engages at its lower end a stud 647 on the contact actuating lever 642. A tension spring 648 connecting the arm 645b and a suitable fixed frame part of the punch, normally urges the lever 645 counterclockwise. The construction is such that as long as the tape feeler element engages the underside of the tape 12, the spring 648 can not move the lever 645 beyond the normal position shown. In case the tape 12 breaks or runs out, the spring 648 then moves the lever 645 counterclockwise beyond the position shown; and, in so doing, the arm 645b through the stud 647 moves the lever 642 clockwise against the inherent spring force of the blade 644 and thereby closes the contacts 641.

The tape guide roller 524 is mounted on the end of a lever arm 649 pivoted on the rod 643, and the arm 649 is normally biased to move counterclockwise as shown in Fig. 43 by a tension spring 650 connecting a lower extension of the arm and a suitable fixed part of the punch frame. If the tension on the tape 12 becomes greater than the force of the spring 650, the arm 649 will be moved further clockwise and until it engages a stud 651 on the contact operating lever 642 and then the lever 642 will be moved by the arm 649 clockwise to close the tape contacts 641 and thereby stop operation of the apparatus, as before explained.

*Code selector unit.*—As explained previously, the usual or normal operation of the punch 500 of the illustrated embodiment, is effected by the energizing of its code selector magnets PSM1 to PSM5, inclusive, and its clutch magnet PCM by a code selector unit 635. The code selector unit 635 is shown in Figs. 24, 36, 37, and 38, and is operated upon the actuation of each of certain keys of the main keyboard 301 of the #1 typewriter 300, to energize the selector magnets PSM1 to PSM5, inclusive, singly and in combination so as to punch in the tape 12 the code designation in the Baudot code of Fig. 49 which corresponds to the particular key actuated.

The code selector unit 635 comprises a frame structure which is suitably mounted beneath the #1 typewriter, as shown in Fig. 24, and a plurality of selector slides 653a and 653b mounted, respectively, for longitudinal sliding movement in the frame structure. The slides 653a, 653b, correspond, respectively, to the keys of the keyboard 301 which control the punch 500.

As explained previously, each time a key of the main keyboard 301 is depressed, a related one of the cam units 321 is tripped and the cam 323 of the tripped unit then engages the constantly rotating power roller 325 and as a result such cam unit is rocked first away from the power roller 325 and then back toward the power roller and relatched in the position shown. The relationship of the several cam units 321 with respect to the power roller 325 is indicated diagrammatically in Fig. 27. The cam units 321 appearing below the roller in Fig. 27 and at the right of the roller in Figs. 24 and 38 are referred to herein as front cam units and the units appearing above the roller 325 in Fig. 27 and to the left of the roller in Fig. 24 are referred to herein as the back cam units.

Each cam unit 321 which is tripped by a key of the main keyboard 301 that controls the punch 500, is provided with a downward extension 654 carrying a roller 655 and each time such a cam unit is tripped and is operated, its roller effects a sliding movement of a corresponding one of the selector slides. The selector slides 653a are those which are operated by corresponding front cam units and the slides 653b are those which are operated by corresponding rear cam units. As the cam units 321 are arranged in staggered relation along the power roller 325 as shown in Fig. 27, the slides 653a and 653b will be arranged alternately in the frame structure, as shown in Fig. 36. The frame structure for the selector unit includes a front guide comb 656 and a rear guide comb 657 and the selector slides are mounted, respectively, in aligned slots 658 forming the two combs and are supported therein by suitably mounted anti-friction rollers 659. A stop plate 660 overlies the front comb 656 and cooperates with space lugs 661 and 662 on the selector slides to limit the longitudinal sliding movement of the latter. Tension springs 663 (Fig. 36) connecting pins 664 projecting from adjacent slides 653a and 653b serve to urge such slides against the stop plate 660 and thereby maintain the slides in their respective positions shown. From the foregoing it will be apparent that each time a slide 653a (Fig. 38) is operated by its related front cam unit 321, it will be moved lengthwise forwardly of the typewriter and will be returned by the spring 663 attached thereto and that each time a slide 653b (Fig. 24) is operated by its related back cam unit, it will be moved rearwardly thereby and will be returned to the position shown by its spring.

The sliding movement of each of the selector slides 653a and 653b, which results from each operation of its related cam unit 321, provides for the energizing of the five selector magnets PSM1 to PSM5, inclusive, singly and in combination according to the Baudot code of Fig. 49, and also provides for energizing the punch clutch magnet PCM. This control of the punch by each of the selector slides is effected by the permutative closing of five selector code contacts SC1 to SC5, inclusive (Fig. 37) and by the closing of the common contacts C. These contacts also appear in Fig. 62v of the wiring diagram. The code contacts SC1 to SC5, inclusive, control, respectively, the energizing of the selector magnets PSM1 to PSM5, inclusive, and therefore correspond, respectively, to the five code positions of Fig. 49. These code contacts SC1 to SC5, inclusive, are operated, respectively, by corresponding bails SB1 to SB5, inclusive. The common contacts C are operated by a corresponding bail SBC.

As shown in Fig. 36, the bails SB1 to SB5, inclusive, and SBC are arranged in horizontally spaced relation and each such bail comprises a bail element 666 extending transversely through aligned elongated slots 667 formed in all of the selector slides. Each bail element 666 is connected at its two outer ends to supporting arms 668 and 669, respectively; the arm 668 being secured at its outer end to a pivot pin 670 carried by a side frame 671, and the arm 669 being fixed to a bail shaft 672 which extends through aligned openings in a side frame plate 672a and in a vertical flange 673 of a frame plate 674. The right-hand end of each bail shaft as viewed in Fig. 36, extends outwardly of the flange 673 and an upstanding contact actuating element 675 is fixed thereto in position to close the corresponding set of contacts of the group SC1 to SC5, inclusive, and the contacts C.

The bottom of the slot 667 of each of the selector slides 653a and 653b is formed with upstanding cam projections 677 which are permutatively located on the several selector slides and operate corresponding ones of the bails SB1 to SB5 and the bail SBC. Each cam projection 677 functions to cam upward a related bail element 666 when the selector slide on which the cam projections is located is moved lengthwise by the operative movement of its corresponding cam unit 321, and the upward movement of each such bail element results in rotating the related bail shaft 672 to close the related set of selector code contacts of the group SC1 to SC5, inclusive, and the contacts C.

Each of the selector slides 753a and 753b is provided with a cam projection 677 for raising the bail SBC and closing the common contacts C each time such slide is operated. The cam projections 677 for operating the remaining bails SB1 to SB5, inclusive, are so located on each selector slide that they provide, when such slide is operated, for the closing of those code contacts of the group SC1 to SC5, inclusive, which correspond to the code hole positions for representing the character or functional operation corresponding to the typewriter key which was actuated to operate such slide. Each selector slide is originally formed with six cam projections 677 and the projections not to be used are removed by any suitable means. The respective positions of the cam projections which have been removed in the slide 653a of Fig. 38 and in the slide 653b of Fig. 24 are indicated by dotted lines.

It is noted that the slide 653a of Fig. 38 contains cam projections which will operate the bails SBC, SB2, and SB5, and the latter will therefore close the related contacts C, SC2, and SC5, respectively, when such slide is operated. From the previous description, it will be obvious that the closure of such contacts will energize the punch clutch magnet PCM and the punch selector magnets PSM2 and PSM5 and thereby operate the punch 500 to punch the 2-5 code designation in the tape 12. As shown in Fig. 49, the 2-5 designation represents the letters case character "L" and the figures case character ")". It is also noted that the slide 653b of Fig. 24 is provided with cam projections 677 for operating the bails SBC, SB1, SB3, and SB5 which close, respectively, the contacts C, SC1, SC3, and SC5, and will thereby provide for energizing the punch clutch magnet PCM and the punch selector magnets PSM1, PSM3, and PSM5 and effect the consequent punching of the 1-3-5 code designation in the tape 12. As shown in Fig. 49, the 1-3-5 designation represents the letters case character "Y" and the figures case character "6".

*The #2 typewriter*

The #2 typewriter 2300 is shown at the right of Fig. 1, and, as explained hereinabove at the outset, is selectively operated under the control of code designations recorded in the program tape and the record cards, to type data in a stock picker tag like the tag 14 of Fig. 58. The arrangement of the keys composing the keyboard 2301 of the #2 typewriter is shown in plan in Fig. 48. The #2 typewriter 2300 is exactly the same in general construction and mode of operation as the #1 typewriter 300 described hereinabove in detail. The character keys 2311 and functional keys 2312, 2313, and 2314 of the #2 typewriter are operated by a #2 translator, not shown herein in detail, but which is the same in construction and operation as the #1 translator 400 previously described in detail. The twelve code selector magnets of the #2 translator appear in the wiring diagram of Fig. 62w and are represented, respectively, by the reference characters 2TSM1 to 2TSM12, inclusive. Also, the #2 typewriter motor 2326 and the #2 translator motor 2460 (Fig. 62w), which correspond to the motors 326 and 461 (Fig. 62v) of the #1 typewriter, appear in Fig. 62w. The #2 translator clutch magnet 2462 appears in Fig. 62q along with the #1 translator clutch magnet 462, and they are both shown as being under the control of the constantly running cam contacts CR4 of the reading unit 100. The #2 typewriter 2300 is also provided with an extra tab rack 2337 at the back thereof (Fig. 1) which is identical with the rack 337 of the #1 typewriter, and also with tab interlock contacts 2TIC (Fig. 62q) and carriage return contacts 2CRIC which are controlled by control stops 2CS1 and 2CS2 placed in a predetermined fashion in the rack 2337 and effecting the same functions as the contacts TIC and CRIC and the control stops CS1 and CS2 of the #1 typewriter 300. In Fig. 62q, the interlock circuits controlled by the contacts 2TIC and 2CRIC of the #2 typewriter are shown along with the interlock circuits controlled by the contacts TIC and CRI3 of the #1 typewriter. The details of construction of the parts of the #2 typewriter 2300 and the #2 translator have not been included in the drawings and a detailed description of the operation of the parts thereof has not been included herein because they are the same as those of the #1 typewriter and the #1 translator and will be readily understood from the showing and description of the #1 typewriter included as a part hereof.

It is noted that the actuation of the keys of the #2 typewriter does not control the operation of a tape punch and consequently a code selector unit, like the one 635 shown in Figs. 36, 37, and 38, is not mounted beneath the #2 typewriter. The characters typed and functional operations performed by the actuation of the several keys 2311, 2312, 2313, and 2314 composing the keyboard 2301 of the #2 typewriter are indicated by significant legends appearing above the horizontal center lines of the key caps 2307 in Fig. 48. The numeral characters appearing on the key caps below the legends referred to, indicate the code combinations of the #2 translator used to actuate the several keys. In comparing the main keyboard 301 of the #1 typewriter of Fig. 27 with the keyboard 2301 of the #2 typewriter of Fig. 48, it is noted that the keyboard 2301 does not include any keys comparable to the keys 318 of the keyboard 301 which control the operation of the punch 500. All of the keys of the keyboard 2301 control the #2 typewriter in the conventional manner. The #2 keyboard contains some extra character keys 2311 not included in the keyboard 301. As indicated on the key caps thereof these extra keys 2311 are those for printing the characters "&", "#", "*", and "↑"

OPERATION

As indicated hereinabove, it is believed that the operation of the illustrated embodiment can best be understood by explaining a comprehensive problem or example. In the master card MC—1 of Fig. 52, and in the detail cards DC—1, DC—2, and DC—3 of Figs. 54, 55, and 56, and in the program tape 15 of Figs. 59a and 59b are shown code designations representing certain selected characters and control functions which, as explained hereinbelow, provide for the operation of the apparatus to type on the #1 typewriter 300 the data as appearing on the invoice 11 shown in Fig. 57 and to type on the #2 typewriter 2300 the data appearing on the picker tag 14 of Fig. 58, and to operate the tape punch 500 to punch according to the 5-position code of Fig. 49 the coded data as recorded in the example of tape 12 shown in Fig. 50. The description to follow will explain how the apparatus operates to effect these results under the control of the particular code designations recorded in the cards and program tape.

It is noted that the row of figures below the broken lower edge of the invoice 11 of Fig. 57 comprises a scale which indicates the character space positions of the #1 typewriter carriage 310 when the invoice 11 is held in typing position by the platen thereof. Likewise, the scale below the broken lower edge of the picker tag 14 indicates the character space positions of the #2 typewriter carriage 2310. It is believed that the scales will aid in following the description of the operation.

Figs. 62a to 62w, when placed sequentially and in end-to-end relation, disclose a composite electrical wiring diagram containing all of the electrically operable instrumentalities and their connecting circuit wires forming a part of the illustrated embodiment. The coils of the electrical relays are identified therein in the customary manner by numerals preceded by the letter character "R" and the contacts of such relays in the same way followed by different letter characters. For example, R101 designates the coil of the relay and R101N a set of contacts operated by R101. Where space on the drawing is at a premium, certain of the contacts are identified only by the letter characters. For example, the contacts R155 which are shown in Fig. 62d are identified only by the letter characters "A" to "F," inclusive. Where a relay comprises both a pick up coil and a holding coil, the former is further identified by the character "P" and the latter by the character "H."

In the wiring diagram contained in Figs. 62a to 62w, inclusive, all switches are shown in their off position, and all relay contacts are in their normal or deenergized positions. Also, all cam operated contacts are shown in the positions they occupy at the 360° or latched position of a machine cycle. For the purposes of this description, it is assumed that at the beginning there is no record card in the passage 141 of the unit 100 and that the program tape 15 of Figs. 59a and 59b is positioned so that its #1 record column is at the sensing station 109 (Fig. 3).

The double pole main power switch MS (Figs. 1 and 62a) is first closed, thereby connecting a convenient source of direct current to the positive conductor 1100 and the negative conductor 1101. As shown, the positive conductor 1100 extends lengthwise along the left-hand side of Figs. 62a to 62w, inclusive, and the negative conductor 1101 extends lengthwise and along the right-hand side of such figures of the drawings.

The switches SW#1, SW#2, SW#3, and SW#4, located on the right-hand side of the #1 typewriter 300 (Fig. 1) are now closed by adjusting each one of them to the left. Switch SW#1 (see also Fig. 62v) when thus closed, turns on the motor 326 of the #1 typewriter 300 which operates the power roll 325 (Fig. 24). Switch SW#2 (Fig. 62v) is a double pole switch, one pole 2a of which controls the energizing circuit for the motor 461 which, as previously described, provides power for the #1 translator 400 which operates the #1 typewriter 300, and power for the 5-position tape punch 500, and the other pole 2b controls the circuits for the punch selector magnets PSM1 to PSM5, inclusive, and the punch clutch magnet PCM. Switch SW#3 (Fig. 62w) controls the energizing circuit for the motor 106 that drives the reading unit 100 which, as explained, functions to read and space the cards and to read and space the program or control tape. The latter motor also drives the constantly running cams 801 to 808, inclusive (Fig. 9) which operate, respectively, the cam contacts CR1 to CR8, inclusive (see also the timing chart of Fig. 61). Switch SW#4 (Fig. 62w) is a double pole switch and one pole 4a controls the energizing circuit for the motor 2326 of the #2 typewriter 2300, and the other pole 4b thereof controls the energizing circuit for the motor 2460 which furnishes power to operate the #2 translator of the #2 typewriter.

The carriage return keys 313 and 2313 of both typewriters are first manually depressed to return both of their carriages, 310 and 2310, to their left-hand margin positions. The left-hand margin stops of the two typewriters 300 and 2300 are placed so that their respective carriages will occupy their #11 character space position when their keys 313 and 2313 are thus depressed.

Operation is initiated by inserting the dealer or master card MC—1 (Fig. 52) in the card receiving slot 104 (Fig. 1) of the card reading unit 100 and into the passage 133a (Fig. 13) until its forward edge engages the #1 stop 151a. This will effect automatically the card eject operation in the manner previously described in detail under the sub-heading "Card eject mechanism and operation" and during such operation the master card MC—1 is fed to its #1 column reading position.

*Initial eject and card feeding operation*

The insertion of the master card MC—1 into the slot 104 (Fig. 13) and into the entrance passage 133a until it engages the #1 stop 151a closes the hopper contacts HC (Figs. 6 and 62L) and thereby establishes an electrical circuit extending from the positive conductor 1100 to the negative conductor 1101 and including the pick-up coil of relay R16, which is the eject control relay. As shown in Fig. 62L, this established circuit also includes the normally closed relay contacts R60C and R57C. The relay R16 then closes its hold contacts R16A (Fig. 62c) to establish an energizing circuit for the hold coil of R16, which circuit extends from the positive wire 1100 through the eject cam contacts ECB2 which are closed at the beginning of an eject cycle (Fig. 60), and then through the now closed contacts R16A and the hold coil of R16 to the negative conductor 1101. Contacts R16C (Fig. 62e) also close and establish an energizing circuit for the eject clutch magnet EJM which extends from the positive conductor 1100 through the now closed contacts R16C and the eject clutch magnet EJM to the other side of the line. The contacts R16B (Fig. 62e) also close and thereby establish an energizing circuit for the pick-up coil of the main interlock control relay R36 which extends across the power supply line, as shown.

The energizing of the eject clutch magnet EJM by the closing of contacts R16C (Fig. 62e) initiates an eject cycle by effecting engagement of the eject clutch EJC in the manner previously described. As will presently appear, the interlock relay R36 which was energized by the closing of contacts R16B prevents, during this eject cycle, the establishing of circuits through the tape feed clutch magnet TFM (Fig. 62e), the card feed clutch magnet CFM, and the tape reading brushes B1 to B12, inclusive (Fig. 62d). During this eject cycle, circuits through the card sensing finger contacts F1 to F12, inclusive (Fig. 62a), can not be established because the card feed clutch CFC is now in its disengaged condition and the twelve card sensing fingers CRF1 to CRF12, inclusive, are therefore held in their latched or non-sensing position where the corresponding finger controlled contacts are held open. The contacts R59C (Fig. 62a) in the card sensing circuits are also now open.

As explained previously, the energization of the eject clutch magnet EJC performs the following functions: the upper contacts HC are opened at about 25° of the eject cycle (Fig. 60); the master or heading card MC—1 in the card entrance passage 133a is properly aligned with the walls of the passage by the projection 286 (Fig. 4); the card feeding rollers 130, 131 (Fig. 13) are separated to receive the card MC—1; the #1 card stop 151a is withdrawn out of the path of the card MC—1; the upper partition plate 138 is shifted to press the card MC—1 against the rotating hopper feeding rolls 125 which thereby feed the card further through the passage 133a and into the main passage 141 and so that the leading end thereof is between the card feed rollers 130, 131 and abuts against the #2 stop 157 where the #1 column of the card MC—1 is in sensing position at the station 107; then the card feeding rollers 130, 131 are returned to their normal feeding relation where they engage the card MC—1 therebetween. As the card MC—1 is now between the rollers 130, 131, the card lever contacts 760 (Figs. 15 and 62L) are now closed, as explained hereinabove.

As stated, the pick-up coil of the interlock relay R36 (Fig. 62e) was energized by the closing of contacts R16B and the relay thereby prevents the establishing of any circuits to effect reading or feeding of the tape as long as the contacts R16B are closed. The hold coil of R36 is energized by the closing of its contacts R36B (Fig. 62c), the latter circuit being under the control of constantly running cam contacts CF2 (see timing chart of Fig. 61). R36 opens its contacts R36A (Fig. 62e) and thereby prevents the energizing of the card feed clutch magnet CFM. Contacts R36C (Fig. 62d) also open and thereby prevent the establishing of program tape sensing circuits which include the constantly running cam contacts CR7 and extend through a tape contact roller 1103 and the tape reading brushes B1 to B12, inclusive. Also, the now open contacts R36C prevent the establishing of a circuit including CR7 and extending through the tape feed clutch magnet TFM (Fig. 62e) which, at the present time, is also open due to the normally open tape-on relay contacts R10C. Contacts R36D (Fig. 62h) also open and thereby prevent the establishing of operating circuits including the cam contacts CR5 and extending through a pyramid relay translator network shown in Figs. 62h, 62i, 62j, and 62k and which, as will be explained, is adjusted by the energizing of any of the tape code set-up relays R146 to R151, inclusive (Fig. 62d). Contacts R36E (Fig. 62b) close to condition an energizing circuit for the hold coil of a carriage-return interlock relay R55, the purpose of which will be fully explained hereinafter.

The closing of the card lever contacts 760 (Fig. 62L) by the new card MC—1 occurs at about 290° of the eject cycle, and thereby energizes relays R59 and R60. As explained hereinabove, the contacts 760 remain closed as long as a record card is disposed between the feed rolls 130 and 131, and the contacts do not open between cards provided a new card is inserted in the slot 104 before the old card is ejected. The relay R60 opens its contacts R60C in the energizing circuit for the pick-up coil of R16, but the latter circuit is now already open due to the opening of the hopper contacts HC at 25° of the eject cycle (Fig. 60). It will be recalled, however, that the hold coil of the eject control relay R16 (Fig. 62c) is energized by its hold contacts R16A and through the eject cam contacts ECB2 and consequently the contacts of R16 remain in their shifted positions as long as ECB2 are closed. The contacts R60C (Fig. 62L) perform no useful purpose in the particular eject cycle now being described. Their purpose is to prevent the energizing of the pick-up coil of R16 by the closing of the hopper contacts HC when a new record card is inserted in the card read unit 100 while an old card is being analyzed and read.

The hold coil of eject control relay R16 (Fig. 62c) is dropped out by the opening of the eject cam contacts ECB2 at 320° of the eject cycle (Fig. 60). R16B (Fig. 62e) then open to deenergize the pick-up coil of relay R36. As stated, the hold coil of R36 (Fig. 62c) is under the control of the constantly running cam contacts CR2 which, as will be apparent from the timing chart (Fig. 61), occurs at the 15° point of each machine cycle determined by the rotation of the main drive shaft DS. Thus, at 15° of the machine cycle following the deenergizing of the pick-up coil of R36, the hold coil of R36 is deenergized by the opening of the constantly running cam contacts CR2 and the contacts of R36 will then return to the position shown in the drawings.

Relay R59 (Fig. 62L), which was energized by the closing of the card lever contacts 760, closes its contacts R59A (Fig. 62d) and its contacts R59C (Fig. 62a). The closed contacts R59A (Fig. 62d) condition the program tape reading and spacing circuits controlled by cam contacts CR7, and including the now closed interlock contacts R36C. The closing of the contacts R59C (Fig. 62a) conditions circuit paths for reading the record card and including the card reading finger contacts F1 to F12, inclusive, and the bail contacts 855. As explained previously, the card reading fingers CRF1 to CRF12, inclusive, remain in their latched-up positions and their contacts F1 to F12, inclusive, therefore remain open until the card feed clutch magnet CFM (Fig. 62e) is energized and effects engagement of the card feed clutch CFC.

Relay R60 is held energized by the closing of its hold contacts R60A (Fig. 62c), the holding circuit including the eject cam contacts ECB2 which are normaly closed and which only open during an eject cycle and between 320° and 350° of such cycle (Fig. 60). It is noted that the relay R60 will not drop out during the present eject cycle because the card lever contacts 760 (Fig. 62L) remain closed from 290° to the end of the cycle, and the contacts ECB2 will then reclose and maintain the circuit including the hold coil of R60 until the last card is ejected from the passage 141. Contacts R60B (Fig. 62c) close to permit the energizing of the item count magnet ICM during the eject cycle, when the eject cam contacts ECB1 close at 110°, provided the relay contacts R48C are then in their closed position shown. A complete description of the manner in which the item count magnet is operated and its purpose is included hereinafter under the separate heading "Item count mechanism."

Summarizing the foregoing, when the master or heading card MC—1 (Fig. 52) was inserted into the open card receiving slot 104, an eject cycle was effected, during which the master card MC—1 was fed to its #1 card reading position and the pick-up coils of relays R59 and R60 were energized. These relays will remain energized as long as the card lever contacts 760 (Fig. 62L) are kept closed, and the latter contacts will remain closed as long as the operator continues to feed new record cards into the open card receiving slot 104 while an old card is still being read and until 320° of the eject cycle following the reading of the last card to be inserted. The hold coil of relay R60 is also now held energized by the normally closed eject cam contacts ECB2.

With the reclosing of the interlock contacts R36C (Fig. 62d) at the end of the eject cycle, sensing circuit paths are established to the tape contact roll 1103 and to the #1 record column of the program tape (Fig. 59a) which is now in position to be read. From this point on, the apparatus will be operated in accordance with the code designations recorded in the record columns of the program tape 15 and in the record columns of the cards fed into the receiving slot 104 of the card reading unit 100 and in accordance with data manually stored in the relay storage unit to be later described, all of which will be readily understood as the description proceeds.

*Reading the master card MC—1*

The operation of the apparatus as affected by the reading of the master or heading card MC—1 (Fig. 52), will first be described. As explained herein previously, the columns of the master card MC—1 are divided by vertical lines into separate record fields. Legends appearing on the card identify the purpose of the several fields. It is noted that the heading of the invoice 11 (Fig. 57) bears typewritten data in spaces having identifying legends corresponding to the fields of the card MC—1. In order to facilitate an understanding of the operation under the control of the master card MC—1, the following description thereof is divided into operating steps each of which is identified hereinbelow as a corresponding operation number. The operation numbers identifying the operating steps under the control of the master card, are each preceded by the character "M" such for example, as "Operation #M1, #M2, #M3," etc. The operating steps identified as operation numbers correspond, respectively, to the different record columns of the program tape 15 (Figs. 59a and 59b) which successively pass the tape sensing station 108 (Fig. 3) during the entire period the master card MC—1 is in the reading unit. The identifying legends or sub-headings included hereinbelow identify, respectively, the operation number or numbers described under each such sub-heading and also identify the function or operation performed as a result of the sensing of corresponding numbered record columns of the program tape when such corresponding column bears a controlling code designation. Also, when a typing or other function is effected under the control of a record card column as a part of an operating step, the sub-heading identifying such operating step also includes the number of the card column controlling such typing or other function.

*Operation #M1—Tape on.*—As explained hereinabove, the automatic operation of the illustrated embodiment under the control of the program tape 15 and the master card MC—1 begins with the dropping out of the hold coil of interlock relay R36 (Fig. 62c) which occurs at 15° of the machine cycle following the eject cycle because of the opening of contacts CR2. Thus, with the reclosing of its contacts R36C (Fig. 62d), a sensing circuit is completed through the #1 record column of the program tape 15 (Fig. 59a) which contains the 9-11 code designation. This is the tape-on designation and provides for turning on the mechanism for feeding the program tape. The sensing circuit is established at 313° of the machine cycle by the closing of cam contacts CR7 (Fig. 62d) and is traced as follows: from the positive conductor 1100 through cam contacts CR7; contacts R59A, now closed; R36C, now closed; R17C, normal position shown; R31C, normal position shown; the tape contact roll 1103; the reading brushes B9 and B11; the normally closed points of the C and E contacts of the now deenergized tape shift control relay R155; and through the pick-up coils of tape code set-up relays R148 and R150 to the negative conductor 1101. R148 closes its hold contacts R148N (Fig. 62c) and R150 closes its hold contacts R150N to thereby establish hold circuits through their respective hold coils when cam contacts CR1 close at 354° (Fig. 61) of the machine cycle. Contacts CR1 open to break these hold circuits at 280° of the following machine cycle. These hold circuits are traced as follows: from the positive conductor 1101; contacts CR1; wire 1104; R31E, normally closed; R17F, normally closed; a wire 1105; and then in parallel through contacts R148N and R150N and the hold coils of R148 and R150 to a wire 1106 and the negative conductor 1101. The tape code set-up relays R148 and R150 adjust their several contacts in the pyramid translator circuit network of Figs. 62h, 62i, 62j, and 62k, and thereby condition an energizing circuit for the pick-up coil of the tape-on control relay R10 (Fig. 62k). This conditioned circuit is closed by cam contacts CR5 (Fig. 62h) at 75° of the machine cycle following the one in which the set-up relays R148 and R150 were energized by the closing of CR7. The conditioned translator circuit is traced as follows: from positive conductor 1100, through cam contacts CR5 (Fig. 62h); now closed interlock relay contacts R36D; a wire 1107; contacts R146A (Fig. 62i), in the position shown; a wire 1108; contacts R147B (Fig. 62j), in the position shown; a wire 1109; contacts R148D (Fig. 62k), now shifted; contacts R149G, in the position shown; contacts R150R, now shifted; R151EE, in the position shown; and the pick-up coil of the tape-on control relay R10 to the negative wire 1101. R10 closes its hold contacts R10A (Fig. 62L) and thereby establishes an energizing circuit for the hold coil of R10 by a circuit traced as follows: from the positive conductor 1100 through the normally closed contacts R17E (Fig. 62L); normally closed contacts R11A, the now closed contacts R10A, and the hold coil of R10 to the negative conductor 1101. The tape-on relay R10 closes its contacts R10C (Fig. 62e) and thereby establishes an energizing circuit for the tape clutch magnet TFM which is traced as follows: from the positive conductor 1100 through cam contacts CR7 (Fig. 62d), the now closed contacts R59A, the normally closed contacts R36C, a wire 1111, now closed contacts R10C (Fig. 62e), contacts R17A in the position shown, normally closed contacts R116E, normally closed contacts R236C and the tape clutch magnet TFM to the negative conductor 1101.

Thus, the hold coil of the tape-on relay R10 (Fig. 62L) will remain energized until the tape-off relay R11 is energized to open its contacts R1.A or until the restoring relay R17 is energized to open its contacts R17E. As long as the contacts R10C (Fig. 62e) remain closed, and as long as the interlock relay contacts R36C (Fig. 62d), the contacts R59A, and contacts R17A (Fig. 62c), R116E, and R236C also remain closed, the tape clutch magnet TFM will be pulsed once for each machine cycle by the closing of the cam contacts CR7 at 313° (Fig. 61), and the clutch magnet will be dropped out at 360° by the opening of contacts CR7. As explained previously, the pulsing of the tape feed clutch magnet TFM provides for the engaging of a clutch tooth at the 0° position of a machine cycle and for the disengaging of such clutch tooth at 90° of such cycle. Thus, the tape is moved a distance of one column during the first 90° of each machine cycle and remains stationary for the last 270° of each such cycle and the tape is sensed while it is stationary by the closure of cam contacts CR7 at 313° of each machine cycle. This is the normal tape feeding operation.

In the tape-on operation being described, it will be assumed that the #1 record column of the tape 15 is sensed by the closing of CR7 at 313° (Fig. 61) of a first machine cycle. The tape-on relay R10 will therefore be energized at 75° of the next or second machine cycle when CR5 close, and the tape feed clutch magnet TFM will be energized at 313° of such second cycle by the closing of CR7. The tooth of the tape feed clutch will engage at the end or 360° of such second cycle and the tape 15 then moves for the first 90° of the following or third machine cycle. It is noted that at 313° of such second machine cycle, when CR7 closed to energize the magnet TFM, sensing circuits were again established through the code designation 9-11 in column #1 of the tape 15 because such column was still in sensing position. However, this will have no effect on the operation because this code designation only energizes again the pick-up coil of the tape-on relay R10 and such relay is now held energized as a result of the previous sensing of this designation.

*Operation #M2—Punch on.*—The 5-position tape punch is now turned on under the control of an 8-11 code designation in record column #2 and in the master side of the program tape. When the program tape was spaced, due to the first pulsing of the tape clutch magnet by cam contacts CR7, as explained above, column #2 of the program tape moved beneath the sensing brushes. As shown in Fig. 59a, the 8-11 code designation is punched in column #2 of the program tape. Thus, when CR7 (Fig. 62d) close at 313° of the machine cycle wherein the tape was spaced to the #2 column position, sensing circuits are established through the code holes in the #8 and #11 code positions of tape column #2 with the result that tape code set-up relays R147 and R150 are energized. It is believed that the thus established sensing circuits will be apparent from Fig. 62d and the previous description and need not be traced in detail herein. The tape code set-up relays close their hold contacts R147N and R150N (Fig. 62c) and thereby establish energizing circuits for their hold coils through the cam contacts CR1 in the same manner as previously described. The closing of CR7 (Fig. 62d) will also effect the pulsing of the tape clutch magnet TFM (Fig. 62e) which will space the tape to the column #3 reading position. The energized code set-up relays R147 and R150 adjust their contacts in the pyramid translator network of Figs. 62h, 62i, 62j, and 62k, and thereby condition an energizing circuit extending through the translator network and including the punch-on relay R7 (Fig. 62j). It is believed that this conditioned circuit can be readily traced from an examination of the pyramid network and from the explanation given previously in describing the tape-on operation. The conditioned circuit is established by the closing of the cam contacts CR5 (Fig. 62h) at 75° of the machine cycle during which the tape is spaced to its #3 column reading position. The relay R7, when thus energized, closes its hold contacts R7B (Fig. 62c) to energize its hold coil through the cam contacts CR2 which, as shown in the timing chart (Fig. 61), are closed at 108° of each machine cycle and are opened at 15° of the succeeding machine cycle. The punch-on control relay R7 opens its contacts R7A (Fig. 62b) which, as shown, are located in the energizing circuit for the hold coil of relay R237. Consequently, the opening of contacts R7A assure that the relay R237 will be deenergized in the event it had been energized. The relay R237 is termed the "punch-off" control relay and its functions will be explained more fully hereinafter under operation #M6. The relay R7 also opens its contacts R7C (Fig. 62b) which cooperate with the contacts R30C of the cam control relay R30 to drop out a second punch control relay R56, in the event such relay were energized at this point. The relay R30 (Fig. 62a) is energized at 340° of each machine cycle when cam contacts CR8 (Fig. 61) close and is deenergized at 270° of the following cycle when CR8 open. Thus, between 270° and 340° of each cycle, R30 is deenergized and its contacts R30C (Fig. 62b) are open and during such period the open contacts R7A assure the deenergizing of the hold coil of R56 in case it had been energized. The purpose of this arrangement will be fully disclosed hereinafter in connection with other operations when the punch control relay R56 is energized. Referring to Fig. 62v of the drawing, it will be noted that the normally closed contacts R56C are in series with the now closed pole 2b of switch SW#2 and are therefore in the circuits which energize both the five code selector magnets PSM1 to PSM5, inclusive, of the punch and also the punch clutch magnet PCM. The just described opening of the hold circuit of relay R56 (Fig. 62b) by the opening of contacts R7C assures that the punch-off control contacts R56C will be closed at this time and that the operating circuits to the punch clutch magnet and the code selector magnets of the punch can be established in the normal manner, as will be presently described in full. The energizing of the relay R7 is termed a "punch-on" operation because it assures that the punch-off control relay R237 and the punch control relay R56 are both deenergized, as just explained. It is noted that the reason for assuring at this time that the punch is in its "on" condition is so that a figures-shift code designation can be punched in the 5-position code tape 12 (Fig. 50). The energizing circuits for the punch clutch magnet PCM (Fig. 62v) and the punch selector magnets PSM1 to PSM5, inclusive, are traced as follows: from the positive conductor 1100; through the normally closed punch control contacts R56C; the now-closed pole 2b of SW#2; the common contacts C of the punch which, as previously described, are closed each time a cam unit 321 of the #1 typewriter 300 operates a code selector slide 653a or 653b; and through the normally closed points of transfer contacts R63C of the non-repeat relay R63 and the punch clutch magnet PCM to the negative conductor 1101. A parallel circuit path also extends from the common contacts C through the normally closed non-repeat relay contacts R63A, the code selector contacts SC1 to SC5, inclusive, and the corresponding code wires and punch selector magnets of the group PSM1 to PSM5, inclusive, to the negative conductor 1101. Thus, the punch control contacts R56C and the common contacts C control circuit paths through both the punch clutch magnet and the five code selector magnets.

*Operation #M3—Punch figures-shift, #1 typewriter on.*—In this operation, the #1 typewriter 300 is turned on and the figures-shift code designation is punched in the 5-position tape 12 (Fig. 50). With the program tape 15 in its #3 column sensing position, wherein is punched the 9–10–11–12 code designation, sensing circuits will be established with the closing of the cam contacts CR7 at 313° of the same machine cycle in which the tape was spaced to its said #3 column reading position. From an examination of Fig. 62d of the drawings, and from the previous description, it will be apparent that CR7 and the code holes in the program tape will effect the energizing of tape code set-up relays R148, R149, R150, and R151. These relays will close their hold contacts R148N to R151N, inclusive (Fig. 62c), and will thereby provide for energizing their corresponding hold coils under the control of CR1, the same as in the previously described tape sensing operations. The relays R148 to R151, inclusive, adjust their contacts in the pyramid relay translator network of Figs. 62h to 62k, inclusive, and thereby condition an operating circuit path through the network and including the relay R117 (Fig. 62k), which is the functional relay for turning on the #1 typewriter and for effecting the punching of the figures-shift code designation in the 5-position tape 12. This conditioned circuit through the relay translator network is closed by cam contacts CR5 at 75° of the machine cycle following the one when CR7 energized the tape code set-up relays. The relay R117 will thus become energized and will close its contacts R117A (Fig. 62i) and thereby condition an energizing circuit including the pickup coil of the #1 typewriter-on relay R3. R117 also closes its contacts R117B (Fig. 62d) to condition an energizing circuit for the figures-shift control relay R232. These conditioned circuits for the #1 typewriter-on relay R3 and for the figures-shift control relay R232 are both closed by the constantly running cam contacts CR5 (Fig. 62f) at 135° of the machine cycle.

The conditioned circuit for the #1 typewriter-on relay R3 is traced as follows: from the positive conductor 1100, through cam contacts CR5 (Fig. 62f); the wire 1112; the wire 1113 (Fig. 62i); the contacts R117A, now closed; the wire 1114; wire 1115; the normally closed contacts R14C; and the pick-up coil of relay R3 to the negative conductor 1101. When energized by the closing of CR5, the relay R3 closes its hold contacts R3A (Fig. 62L) and thereby establishes an energizing circuit for the hold coil of R3 which is traced as follows: from the positive conductor 1100 through the normally closed contacts R17E, R4A, and R14A, the now closed hold contacts R3A and the hold coil of R3 to the negative conductor 1101. Thus, the hold circuit for the #1 typewriter-on relay R3 will remain closed as long as none of the contacts R18E, R4A, and R14A are opened by the energizing of their respective relays.

The #1 typewriter-on relay R3 also closes its contacts R3B (Fig. 62b) and thereby establishes an energizing circuit for the #1 typewriter control relays R228 and R229, which circuit extends across the power line. As shown, R228 closes its contacts A to H, inclusive, and K to N, inclusive, (Fig. 62w), and thereby conditions energizing circuits including the 12 selector magnets TSM1 to TSM12, inclusive, of the #1 translator unit 400 which actuates the key levers of the #1 typewriter 300, as explained fully hereinabove.

R229 closes its contacts R229A (Fig. 62q) which are in series with the normally closed tab interlock contacts TIC and thereby condition a holding circuit for the relay R34 which, as will be explained hereinafter, is the tab interlock relay and provides for energizing the main interlock relay R36 and for thereby suspending the card and tape reading operations during a tabulating operation of the #1 typewriter 300. Contacts R129B (Fig. 62q), which are connected in series with the carriage-return interlock contacts CR1C, also close and thereby condition a hold circuit for the carriage-return interlock relay R33 which also provides for energizing the main interlock relay R36 and thereby suspends operation of the card and tape reading operations while the #1 typewriter 300 is undergoing a carriage-return operation, as will be explained more fully hereinafter.

As described hereinabove, the interlock contacts TIC and CR1C are operated by the control stops CS1 and CS2 in the tab rack 337 of the #1 typewriter 300. As will be explained later, the hold coils of the interlock relays R33 and R34 can also be energized by circuits including the interlock contacts 2TIC and 2CR1C of the #2 typewriter 2300 and including the now open contacts R231A and R231B of the relay R231, the latter being energized when the #2 typewriter-on relay R5 is energized.

The #1 typewriter-on relay R3 also closes its contacts R3D (Fig. 62q) and thereby conditions an operating circuit for the #1 translator clutch magnet 462 which, as explained, effects operation of the keys of the #1 typewriter. This conditioned circuit includes the normally closed contacts R55C and the constantly running cam contacts CR4. CR4 close the #1 translator clutch magnet 462 circuit at 215° and open such circuit at 300° of each machine cycle (see timing chart Fig. 61). R3 opens its contacts R3C (Fig. 62h) and thereby drops out relay R149 should the latter be energized at this time, the purpose of which will be fully explained hereinafter.

As explained hereinabove, contacts R117B (Fig. 62d) also closed when R117 was picked up by the closing of CR5 at 75° and thereby conditioned an energizing circuit for the figures-shift control relay R232. This conditioned circuit is closed by CR6 at 135° and is traced as follows: from the positive conductor 1100 through cam contacts CR6 (Fig. 62f), the wire 1112, contacts R117B (Fig. 62d), the wire 1117, and through the pick-up coil of R232 to the negative conductor 1100. R232 closes its hold contacts R232F (Fig. 62c) and thereby provides an energizing circuit for its hold coil which is under the control of cam contacts CR1, the latter closing at 354° of each machine cycle and opening at 280° of the following cycle. R232 also closes its A, B, and C contacts (Fig. 62w) and thereby conditions energizing circuits for the #1 translator selector magnets TSM4, TSM7, and TSM8. These conditioned translator operating circuits are closed by the closing of cam contacts CR3 (Fig. 62r) at 220° (Fig. 61) of the machine cycle and can be traced as follows: from the positive conductor 1100, through cam contacts CR3, the wire 1118, the now closed A, B, and C contacts of R232 (Fig. 62w) in parallel, and through code wires CW4, CW7, and CW8, in parallel, and selector magnets TSM4, TSM7, and TSM8, to the negative conductor 1101. As explained previously and as shown in the timing chart (Fig. 61), the cam contacts CR4 (Fig. 62q) close at 215° of each machine cycle, and they now energize the #1 translator clutch magnet 462 through the now closed contacts R3D.

With selector magnets TSM4, TSM7, and TSM8, and the clutch magnet 462 energized, the #1 translator operates in the manner previously described to pull down the figures-shift key 318 (Fig. 27) on the #1 typewriter 300. As the tape punch 500 was previously turned on in operation #M2, the figures-shift key lever 308 will then trip its related cam unit 321 and thereby operate its related selector slide 653a of the selector unit 635 and close the punch selector contacts SC1, SC2, SC4, and SC5 (Fig. 62v) and the common contacts C of the punch 500.

This will provide for the energizing of the related punch selector magnets PSM1, PSM2, PSM4, and PSM5 (Fig. 62v) and the punch clutch magnet PCM by circuits traced hereinabove and including the normally closed contacts R56C and the now closed pole 2b of switch SW#2. This will effect an operating cycle of the punch 500 in the manner described hereinabove and during such cycle the 1-2-4-5 or figures-shift code designation is punched in the 5-position tape 12 of Fig. 50. As explained hereinabove, after the punch selector magnets are energized and thereby release their related latch levers 546 to 550, inclusive (Figs. 39, 40, and 41), and the clutch magnet PCM connects the motor 460 and punch shaft 528, the locking bail 571 moves to lock the released latch levers in their new positions and to lock the latch lever, which has not been released, in its normal latched position. In so doing, the locking bail 571 closes the latch lock contacts 574 (Fig. 62v) and thereby establishes an energizing circuit for the non-repeat relay R63. R63 then shifts its contacts R63A and R63C and thereby breaks the energizing circuits for the punch selector magnets and the punch clutch magnets. The now closed points of contacts R63C provide for holding the relay R63 energized as long as the common contacts C remain closed and thereby prevent a repeat operation of the punch.

Summarizing the foregoing, in this operation #M3, column #3 of the program tape 15 is read, which contains the code designation 9-10-11-12; and, as a result, the #1 typewriter was turned on, and the figures-shift code designation was punched in the 5-position tape 12 of Fig. 50.

*Operation #M4—Card feed on, #1 typewriter off.*—In this operating step, the card feed is turned on and the #1 typewriter is turned off, the latter being effected in order to prevent the #1 typewriter carriage from spacing during the same machine cycle the card feed is turned on. During the first part of the previous machine cycle wherein CR5 and CR6 closed circuits to turn on the #1 typewriter 300 and to punch the figures-shift code designation in the 5-position tape 12, the program tape 15 was spaced to its #4 column reading position wherein is recorded the 11-12 code designation. Thus, when cam contacts CR7 closed at 313° of such machine cycle, sensing circuits were established through code holes in the #11 and #12 code positions of the program tape 15 and these circuits include tape code set-up relays R150 and R151. In the manner explained before, these code set-up relays are held energized by a circuit including cam contacts CR1 (Fig. 62c) and their now closed hold contacts R150N and R151N. As in the previously described operations, the code set-up relays R150 and R151 adjust their contacts in the pyramid relay translator circuit network in Figs. 62h to 62k, inclusive, of the drawing, and thereby condition a control circuit path therethrough and including the pick-up coil of relay R137 (Fig. 62k) which is the control relay for turning on the card feed and for turning off the #1 typewriter 300. In the manner previously explained, the conditioned circuit through the pyramid network for energizing R137, is closed by CR5 (Fig. 62h) at 75° of the following cycle. Relay R137 then closes its contacts R137B (Fig. 62i) and thereby conditions a pick-up circuit for the #1 typewriter-off relay R4. Relay R137 also closes its contacts R137A (Fig. 62i) and thereby conditions an energizing circuit for the card-feed-on relay R8. Both of these conditioned circuits are closed by the cam contacts CR6 at 135° of the machine cycle by circuits traced as follows: from positive conductor 1100; cam contacts CR6 (Fig. 62f); wire 1112; and through wire 1120 (Fig. 62i), contacts R137B now closed, and relay R4 to the negative conductor 1101; and also in parallel from wire 1112 through wire 1121 (Fig. 62i), contacts R137A and relay R8 to the negative conductor 1101.

The #1 typewriter-off relay R4 when thus energized by the closing of CR6, opens its normally closed contacts R4A (Fig. 62L) which, as explained previously, are in the energizing circuit for the hold coil of the #1 typewriter-on relay R3. Thus, the relay R3 is deenergized and the contacts thereof restored to the positions shown in the drawings. The contacts R3D (Fig. 62q) open and thereby prevent the establishing, by CR4, of an energizing circuit for the #1 translator clutch magnet 462 which effects operation of the #1 typewriter. Contacts R3B (Fig. 62b) open and thereby drop out the #1 typewriter control relays R228 and R229 which also adjust their respective contacts to the positions shown. R228 opens its contacts A to H, inclusive, and K to N, inclusive (Fig. 62w), and thereby prevents the establishing of operating circuits including the #1 translator selector magnets TSM1 to TSM12, inclusive. Contacts R229A and R229B (Fig. 62q) open and prevent the establishing of circuits through the hold coils of interlock relays R33 and R34. Thus, the relay R4 turns off the #1 typewriter by deenergizing the relay R3 and relays R228 and R229 and this occurs before contacts CR4 close at 215° of the cycle, with the result that the #1 typewriter is not operated during the machine cycle in which CR5 and CR6 effect the energizing of the relay R4.

The "card-feed-on" relay R8 closes its hold contacts R8A (Fig. 62L) and thereby establishes a hold circuit therefor across the power line and which is traced as follows: from positive conductor 1100 (Fig. 62L), through the normally closed contacts R9A, R32D, and R15A; the now closed contacts R8A, and the hold coil of R8 to the negative conductor 1101. Thus, as long as the relays R9, R32, and R15 remain deenergized the card-feed-on relay R8 is held energized across the power line.

The card-feed-on relay R8 closes its contacts R8C (Fig. 62e) and thereby establishes an energizing circuit for the card feed clutch magnet CFM which is traced as follows: from the positive conductor 1100, through the now closed contacts R8C (Fig. 62e), the normally closed interlock contacts R36A, and the card feed clutch magnet CFM to the negative conductor 1101. Thus, the card feed clutch magnet CFM remains energized across the power line until either the relay R8 is deenergized or the main interlock relay R36 is energized. As explained hereinabove, the tooth of the card feed clutch CFC is engaged at 345° of a machine cycle and the card is not sensed until 42° of the next cycle (Fig. 61). Thus, the card feed clutch CFC is not engaged until the end of the cycle in which the relay R8 was energized. The sensing of the #1 column of the master card and the spacing of the card to the #2 card column reading position will be described as a part of the next operation.

*Operation #M5—Card feed off, #1 typewriter on, tape shift control—Read card column #1.*—During the previous machine cycle when the #1 typewriter-off relay R4 and the card-feed-on relay R8 were energized by the closing of CR6, the program tape 15 spaced to its #5 column sensing position and sensing circuits were established by CR7 at 313° of such cycle through the code hole combination 7-9-10-12 in the tape 15 (Fig. 59a). This provided for the energizing of the tape code relays R146, R148, R149, and R151. These relays closed their hold contacts R146N, R148N, R149N, and R151N in Fig. 62c and the hold coils thereof are energized through such contacts when CR1 close at 354° of such cycle. These tape code set-up relays also shifted their contacts in the pyramid translator network in Figs. 62h to 62k, inclusive, and thereby conditioned an operating circuit for relay R142 (Fig. 62i) and such conditioned circuit is closed by CR5 at 75° of the next machine cycle. Such next machine cycle is the one in which column #1 of the card is sensed. As will presently appear, R142 is the controlling relay for turning off the card feed, for effecting the tape shift control, and for turning on the #1 typewriter. The contacts of R142 are shown in Figs. 62b, 62i, and 62j.

When the card-feed clutch magnet is energized during the previous cycle by the closing of R8C (Fig. 62e), as explained above, the tooth of the card feed clutch will engage at the end of such previous machine cycle; and, with the beginning of the following machine cycle, the card reading fingers will move into sensing relation with respect to the #1 column of the master or heading card MC—1 (Fig. 52). As shown in the timing chart of Fig. 61, the reading fingers will move into sensing relation with the card at approximately 42° of the machine cycle and move out of sensing relation at 220° of such cycle. The card will begin to move to the #2 column reading position at about 235° of such cycle and will complete such movement at about 360° of such cycle. As shown in Fig. 52, no code designation is punched in the #1 column of the card MC—1, and consequently none of the reading finger contacts F1 to F12, inclusive, will close to establish sensing circuits through the card code set-up relays R101 to R112, inclusive (Fig. 62a). The bail contacts 855 will close and pick up R58 for a purpose which will be presently explained but this will not affect the operation now being described.

When CR5 closes at 75° to energize R142, as explained above, R142 closes its contacts R142A (Fig. 62j) to condition an energizing circuit for the card-feed-off relay R9, and closes its contacts R142B (Fig. 62h) to condition an energizing circuit for the tape-shift control relay R115, and also close its contacts R142C (Fig. 62i) to condition an energizing circuit for the #1 typewriter-on relay R3. These three conditioned circuits include the cam contacts CR6 which, as previously explained, connect the positive conductor 1100 to the wire 1112 at 135° of the machine cycle. By examining Figs. 62j, 62h, and 62i, these conditioned circuits can be readily traced from the wire 1112 and in parallel through the contacts R142A, R142B, and R142C, and through the pick-up coils of R9, R115, and R3, respectively, to the negative conductor 1101.

The card-feed-off relay, R9, when thus energized, opens its contacts R9A (Fig. 62L) which, as previously explained, are in the hold circuit for the card-feed-on relay R8. The relay R8 thus becomes deenergized and opens its contacts R8C (Fig. 62e) which are in the energizing circuit for the card feed clutch magnet CFM and the latter thus becomes deenergized and latches up the card feed clutch CFC at the end of the cycle with the card MC—1 in position to have its #2 record column sensed when the clutch CFC is next engaged.

When the tape-shift control relay R115 is energized by the closing of CR6 at 135°, it transfers its contacts R115B (Fig. 62f) and thereby conditions an energizing circuit for the pick-up coil of tape-shift control relay R155 and such conditioned circuit can be closed only if column #1 of the card MC—1 being read during this machine cycle contains a code hole in its #12 index point position. It is noted that relay R142, which, as explained previously, is energized at 75° of this cycle by the closing of contacts CR5, also transferred its contacts R142D (Fig. 62f) and thereby conditioned a second energizing circuit for the tape-shift control relay R155 which second circuit can be closed only if column #1 of the card MC—1 read during this cycle contains a code hole in the #11 index point position. As explained previously, column #1 of the card is blank and consequently neither of the conditioned energizing circuits for tape-shift relay R155 will be established.

The fact that the #1 column of the card is blank signifies that the card MC—1 is a master or heading card. As R155 remains deenergized, its contacts A to F (Fig. 62d) remain in their respective positions shown, and the code designations on the left-hand or master side of the program tape 15 of Figs. 59a and 59b will continue to be read and will thereby continue to control the operation of the illustrated embodiment while the master card MC—1 is in the card reading unit 100.

When the card contains either a #11 or a #12 code hole in its #1 column, such fact signifies that the card is a detail card and R155 will become energized and will transfer its contacts A to F, inclusive (Fig. 62d), and thereby connect, respectively, the six tape sensing brushes B1 to B6, inclusive, to the six tape code set-up relays R146 to R151, inclusive.

The energizing circuit for R155 conditioned by the closing of R115B is traced as follows: from the positive conductor 1100 (Fig. 62f), through the cam contacts CR6; the normally closed contacts R109C to R101C, inclusive, of the card code set-up relays R109 to R101, inclusive; a wire 1123; the normally closed points of transfer contacts R111E; the now-open contacts R112E; the normally closed points of contacts R143A; the contacts R115B, now transferred; and the pick-up coil of tape shift relay R155 to the negative conductor 1101. If the #1 column of the card MC—1 had contained a #12 hole, the tape code set-up relay R112 would have been energized and its contacts R112E transferred while R115B and CR6 closed and consequently the just traced circuit for R155 would have been established.

The second energizing circuit for R155, which was conditioned by the closing of R142D, includes the same path as the first one traced in the previous paragraph, up to and including the wire 1123, and from the latter the second circuit includes the now open points of R111E, the normally closed contacts R113A, and contacts R142D, now transferred, to the pick-up coil of R155 and the negative conductor 1101. If the #1 card column had contained a #11 code hole, the tape code set-up relay R111 would have been energized and its contacts R111E would have been transferred to established the aforesaid second conditioned circuit for the tape shift relay R155.

When the #1 typewriter-on relay R3 (Fig. 62i) is energized through R142C and by the closing of CR6, as explained hereinabove, its contacts are shifted to hold the relay energized and to turn on the #1 typewriter in the same identical manner as when this relay was energized as a part of operation #M3 described hereinabove. It is therefore believed unnecessary to repeat the description at this point. As the contacts R3D (Fig. 62q) are now closed, CR4 will energize the #1 translator magnet 462 at 215° of each machine cycle until R3D opens. As the #1 card column does not contain a code designation, none of the #1 translator selector magnets (Fig. 62w) will be energized. Consequently, the #1 translator 400 operates to pull down the space key 311-space on the #1 typewriter in the manner previously described and thereby effects the spacing of its carriage 310 and the invoice sheet 11 (Fig. 57) to its #12 character space position. As the 5-position tape punch 500 is still turned on, the selector slide 653a actuated by the cam unit 321 for the space key will effect operation of the punch 500 in the manner previously explained to punch the space code designation in the 5-position tape 12. As shown in Figs. 49 and 50, the space code designation comprises a code hole in the #3 index point position of the tape 12.

*Operation #M6—Card feed on, #1 typewriter off, punch off.*—During the previously described machine cycle when the control relay R142 was energized and thereby effected the operations explained, the program tape 15 (Fig. 59a) spaced to its #6 column reading position, and at 313° of such cycle, the code designation 9-10-12 in the #6 column was sensed by the closing of the cam contacts CR7. This effected the energizing of the tape code set-up relays R148, R149, and R151. These code relays then closed their hold contacts R148N, R149N, and R151N (Fig. 62c) to provide energizing circuits for their respective hold coils when cam contacts CR1 closed at 354° of such previously described machine cycle. These code set-up relays also shifted their contacts in Figs. 62h to 62k, inclusive, and thereby conditioned an operating circuit through the pyramid translator relay network and which includes the relay R139 (Fig. 62k). Thus, when the contacts CR5 close at 75° of the following machine cycle, this conditioned circuit is established and R139 is thereby energized. R139 is the control relay which functions to turn on the card feed, turn off the punch, and to turn off the #1 typewriter.

The relay R139 closes its contacts R139B (Fig. 62i) and thereby conditions an energizing circuit for the #1 typewriter-off relay R4, which circuit can be traced from the positive wire 1100, through the cam contacts CR6 (Fig. 62f), the wire 1112, the wire 1120 (Fig. 62i), the now closed contacts R139B (Fig. 62i), and through the pick-up coil of R4 to the negative conductor 1101. As explained hereinabove, the relay R4 through its contacts R4A (Fig. 62L), opens the hold circuit for the #1 typewriter-on relay R3. R3 then restores its contacts to the position shown on the drawings and also deenergizes the relays R228 and R229. The manner in which the relay R4 turns off the #1 typewriter is fully explained hereinabove under operation #M4, and to repeat the description thereof is believed to be unnecessary.

Contacts R139C (Fig. 62j) also close and thereby condition an energizing circuit for R237, which circuit extends from the positive conductor 1100 (Fig. 62f), through cam contacts CR6, the wire 1112, a wire 1124 (Fig. 62j), the now closed contacts R139C, and the pick-up coil of relay R237 to the negative conductor 1101. Relay R237 effects a punch-off operation. Relay R237 closes its hold contacts R237F (Fig. 62b) and thereby establishes an energizing circuit for its hold coil which extends across the power line and includes the normally closed contacts R7A of the punch-on control relay R7 referred to hereinabove in operation #M2. Thus, R237 will remain energized as long as R7 is deenergized. Contacts R237D (Fig. 62d) transfer and thereby condition an energizing circuit for the pick-up coil of the punch control relay R56 and the latter circuit is under the control of cam contacts CR7 and will thereby become energized at 313° of the cycle. The hold coil of relay R56 (Fig. 62b) is energized by the closing of its hold contacts R56A and the circuit includes the normally closed contacts R7C of the punch-on relay R7 and the cam operated relay contacts R30C. Contacts R56C (Fig. 62v) open to disconnect the previously traced circuits for energizing the punch clutch magnet PCM and the punch selector magnets PSM1 to PSM5, inclusive, and thereby prevent the operation of the punch 500 as long as the relay R56 remains energized.

It is noted that although R56 is not energized to open its contacts R56C and disconnect the punch operating circuit until after CR7 close at 313° of this cycle, the punch 500 is not operated during this cycle because the #1 typewriter 300 was turned off when CR6 closed at 135° to energize the relay R4 through R139B. Contacts R4A then opened to deenergize the relay R3.

R237 also opens its contacts R237A (Fig. 62f) and thereby prevents the energizing of the skip key control relay R223 under the control of CR6 and R116A. R237B (Fig. 62g) open to prevent the energizing, under the control of the card MC—1, of the relay R24 which effects the punching of the figures-shift code, as will be explained hereinafter.

Relay R139 also closes its contacts R139A (Fig. 62i) and thereby conditions an energizing circuit extending from the positive conductor 1100 (Fig. 62f), through cam contacts CR6, the wire 1112, the wire 1121 (Fig. 62i), and the pick-up coil of the relay R8 to the negative conductor 1101. The relay R8, when thus energized by CR6, provides for turning on the card feed in the same identical manner as was fully explained hereinabove under operation #M4. As set forth above, the contacts R8C (Fig. 62e) close to energize the card feed clutch magnet. The hold coil of relay R8 (Fig. 62L) is kept energized by the closing of its hold contacts R8A and through the normally closed contacts R15A, R32D, and R9A.

*Operation #M7—#1 typewriter on, read card column #2.*—During the latter part of the previous machine cycle, when the card feed was turned on and the #1 typewriter and the punch were turned off, the program tape 15 was spaced to its #7 column reading position and when the cam contacts CR7 closed at 313° of such machine cycle, the code designation 7–11 in column #7 of the tape was sensed and the code set-up relays R146 and R150 (Fig. 62d) were energized. These relays are held energized by their respective hold contacts R146N and R150N (Fig. 62c) and through cam contacts CR1 and the contacts of these relays in the pyramid translator network in Figs. 62h to 62k, inclusive, are adjusted to condition an energizing circuit for the pick-up coil of the #1 typewriter-on relay R3 (Fig. 62i). This conditioned circuit is closed by the closing of cam contacts CR5 at 75° during the following cycle. The manner in which the relay R3 is held energized and turns on the #1 typewriter is fully described hereinabove as a part of operation #M3 and need not be repeated at this point.

During the preceding machine cycle, when the card feed clutch magnet CFM was energized by the closing of contacts R8C (Fig. 62e), the clutch tooth engaged at the end of such cycle and during the succeeding cycle when the #1 typewriter was turned on, as just explained, by the energizing of relay R3, the card reading fingers CRF1 to CRF12, inclusive, move during the first part of such cycle to sense column #2 of the master card MC—1. As shown in Fig. 52, column #2 contains code holes in the #11 and #2 index point positions which, as indicated, is the code designation representing the character "J." The card sensing fingers corresponding to the #11 and #2 index point position sense the code holes in these positions and thereby close corresponding finger contacts F11 and F2 (Fig. 69a). As shown in the timing chart (Fig. 61), the finger contacts close at 42° of the cycle and remain closed until 220° of the cycle. As contacts R59C are now closed, energizing circuits will be established for the corresponding card code set-up relays R111 and R102, such circuits extending from the positive conductor 1101 through R59C, now closed; the wire 1125; and through now closed finger contacts F11 and F2, in parallel, and the corresponding code set-up relays R111 and R102 to the negative conductor 1101. The hold coils of the card code set-up relays R111 and R102 are energized by the closing of their hold contacts R111N and R102N, respectively, and by a circuit including contacts R30A and a wire 1126. As explained above, the relay R30 is energized under the control of cam contacts CR8 which close at 340° of each machine cycle and open at 270° of the next cycle (see Fig. 61). Thus, the contacts R30A are closed at the time the card code set-up relays R111 and R102 are energized and remain closed to keep the hold coils thereof energized until 270° of the same machine cycle.

The bail contacts (Fig. 62a) also close as a part of the card sensing operation. As shown in the timing chart of Fig. 61, the bail contacts close at 38° of the cycle and open at 225° of the cycle and will thereby establish an energizing circuit for the pick-up coil of R58. R58 closes its hold contacts R58A (Fig. 62c) and thereby establishes an energizing circuit for its hold coil extending through the cam contacts CR1. As will appear more fully hereinafter, the contacts R58C (see Fig. 62g) close and thereby condition circuits for energizing the figures-shift control relay R24, and the space control relay R220. These conditioned circuits are under control of cam contacts CR6 (Fig. 62f) and contact points of the card code set-up relays R101 to R112, inclusive, and they control the automatic punching of the figures-shift code designation when the punch is turned on and columns of the card are being read. As the punch is now turned off, the closing of the contacts R58C will have no effect on the operation being described. The purpose of R58C, R24, and R220 will be fully explained hereinafter in operations #M74 and #M75.

The energizing of the card code set-up relays R111 and R102 provide for closing their contacts R111A and R102A (Fig. 62v) which condition energizing circuits for selector magnets TSM11 and TSM2 of the #1 translator of the #1 typewriter. These conditioned circuits are traced as follows: from the positive conductor 1100, through cam contacts CR3 (Fig. 62r); the wire 1118; a wire 1127 (Fig. 62v); contacts R102A, now closed; the code wire CW2; the normally closed B contacts of R225 (Fig. 62w); the B contacts of R228, now closed; and the #1 translator selector magnet TSM2, to the negative conductor 1101. From wire 1127 (Fig. 62v), a branch parallel circuit also extends through contacts R111A, now closed, the code wire CW11, normally closed contacts R223D (Fig. 62w), the normally closed M contacts of R225, the now closed M contacts of R228, and the selector magnet TSM11 (Fig. 62w) to the negative conductor. These conditioned circuits are closed by the contacts CR3 (Fig. 62r) at 220° of the cycle. At 215° of the same cycle, the cam contacts CR4 (Fig. 62q) also close and thereby energize the #1 translator clutch magnet 462 through the now closed contacts R3D. With the energizing of the #1 translator selector magnets and the corresponding clutch magnet, the #1 translator 400 operates to pull down the key 311-J on the #1 typewriter and as a result the character "J" is printed in character space position #12 of the invoice sheet 11 (see Fig. 57).

*Operation #M8—Storage set-up—Read card column #3.*—As shown in Fig. 52, column #3 of the master card MC—1 contains the 11–6 code designations which represents the character "O." Consequently, during this operation, the card reading fingers sense this designation and close the reading finger contacts F11 and F6 (Fig. 62a) and thereby energize the card code set-up relays R111 and R106. As will be apparent from the detailed description in operation #M7, these relays are held through their hold contacts R111N and R106N and the contacts R30A, as before, and they close their contacts R111A and R106A (Fig. 62v) to condition energizing circuits for the #1 translator selector magnets TSM11 and TSM6 (Fig. 62w) which circuits are closed at 220° by cam contacts CR3 (Fig. 62r). CR4 again energizes the #1 translator clutch magnet 462 (Fig. 62q) at 215° and thereby effects an operation of the #1 translator during which the key 311-O on the #1 typewriter is pulled down and the character "O" is printed in character space position #13 of the invoice 11 of Fig. 57.

As a part of this same operation, the 10-12 code designation in column #8 of the program tape, effects the energizing of tape code set-up relays R149 and R151 (Fig. 62d), and these relays are held energized by their hold contacts R149N and R151N (Fig. 62c) and through the cam contacts CR1. As before, the relays R149 and R151 adjust their contacts in the pyramid translator network in Figs. 62h to 62k, inclusive, and thereby condition an operating circuit path therethrough and including the pick-up coil of relay R12 (Fig. 62k). This conditioned operating circuit is closed by the cam contacts CR5 at 75° in the same manner as in previously described operating steps.

As will appear more fully hereinafter, the purpose of the relay R12 is to provide for storing numerical data in a relay storage unit shown in Figs. 62m to 62t, inclusive, and under the manual control of the keys 303, 304, and 305 of the auxiliary keyboard 302, shown structurally in Figs. 27 to 30, inclusive, and diagrammatically in Fig. 62m. The structural features of the auxiliary keyboard 302 are described in detail hereinabove under the sub-heading "The auxiliary keyboard." The relay storage unit, the manner in which numerical data is stored therein, and the manner in which the stored data is read out and controls the operation of the typewriter, will be fully explained hereinafter under separate sub-headings.

When R12 is energized, it transfers its contacts R12A (Fig. 62b) and thereby energizes the pick-up coil of a storage set-up conditioning relay R38 which, as will appear hereinafter, conditions the relay storage unit for receiving and storing numerical data under the manual control of the auxiliary keyboard 302. When contacts R12A transfer, they also drop out the hold coils of storage control relays R54 and R47, provided either of the latter relays had been energized as a result of a previous storage set-up operation. At this time, however, neither R54 nor R47 is energized. R12C (Fig. 62n) also open to assure the deenergizing of the hold coils of any of storage digit relays of the group R162 to R193, inclusive, and space control relays R214 to R218, inclusive, (Figs. 62n, 62o, 62p, and 62q) which might now be held from a previous number storing operation. As shown, the holding circuit for these relays extends from the positive conductor 1100 and includes the contacts R12C (Fig. 62n), wire 1128, the contacts R48A and R19C, connected in parallel, and a wire 1129 to which the hold contacts of all the storage relays just mentioned are connected in parallel. Contacts R12D (Fig. 62b) also transfer and thereby energize the pick-up coil of relay R48. As R12 has no hold coil, the pick-up coil thereof is deenergized at 278° when CR5 open, and the contacts of R12 are then restored to their normal positions shown.

The hold coil of the storage conditioning relay R38 (Fig. 62m) is energized by the closing of its hold contacts R38A and the hold circuit extends across the power line and includes the normally closed contacts R41C of a sequence control relay R41. Thus, as long as the sequence control relay R41 remains deenergized, the hold circuit for the storage conditioning relay R38 is maintained. Relay R38 also closes its contacts R38C (Fig. 62m) and thereby conditions an energizing circuit for the relay storage unit of Figs. 62m to 62q, inclusive, in a manner which will appear more fully hereinafter.

The relay R48 (Fig. 62b) which was picked up by the transfer of the contacts R12D, as explained above, is the master card control relay and is held energized for the rest of the period the master card MC—1 is being read, by a circuit including its now closed hold contacts R48B (Fig. 62c) and the eject cam contacts ECB2 which, as will be seen from an examination of the eject cycle timing chart (Fig. 60), are closed at all times except between 320° and 350° of an eject cycle. Thus, the relay R48 remains energized until the master or dealer card now being read is ejected from the card reading unit.

R48 opens its contacts R48A (Fig. 62n) so that at any time during the reading of the master card and before operation #M101, described hereinafter, the previously traced hold circuit for digit storage relays R162 to R193, inclusive, and space relays R214 to R218, inclusive, may be broken by the opening of the contacts R19C of a storage re-set relay R19 (Fig. 62h). Thus, a stored number may be wiped out of the storage relays named by energizing the re-set relay R19 at any time during the reading of the master card and before operation #M101.

R48 also transfers its contacts R48C (Fig. 62c) and thereby conditions a circuit for energizing the item count magnet ICM under the control of the cam contacts CR7 (Fig. 62d). The purpose of this circuit is to re-set the item count mechanism of Figs. 63, 64, and 65, to zero each time a master card is read and will be fully explained hereinafter under the sub-heading "Item count mechanism." This energizing circuit for the item count magnet ICM extends from the positive conductor 1100, through the cam contacts CR7 (Fig. 62d), a wire 1130, the homing contacts 1131 (Fig. 62c), the closed points of the now transferred contacts R48C, and through the count magnet ICM to the negative conductor 1101.

*Relay storage unit*

The description of the operation of the illustrated embodiment under the control of the master card MC—1 is interrupted at this point so that the relay storage unit of Figs. 62n to 62q, inclusive, and the manner in which numeric data is stored therein under the control of the auxiliary keyboard can be described. The relay storage unit is described herein as a part of the general operation because it can best be disclosed and understood as a part of the electrical wiring diagram of Figs. 62a to 62w. The relays comprising the relay storage unit, the keys of the auxiliary keyboard for manually entering numeric data in the storage unit, and the connecting circuit network for effecting digit entering operations are shown in Figs. 62m to 62q, inclusive. The contacts controlled by the digit representing relays of the storage unit are shown in Figs. 62r, 62s, and 62t as a part of a plurality of pyramid networks corresponding, respectively, to different order-representing relay banks of the storage unit and functioning to control circuits including the cam contacts CR3 and the code wires CW1 to CW10, inclusive, which are adapted to be respectively connected to corresponding selector magnets TSM1 to TSM10, inclusive, of the #1 translator 400 (Fig. 62w) and to corresponding selector magnets 2TSM1 to 2TSM10, inclusive, of the #2 translator.

The relays of the storage unit are divided into three sections, the first section being used in the particular example described herein to store the serial number assigned to the customer's order, the second section being used herein to store the page number of the invoice, and the third section being used to store the number of each part ordered by the customer. Thus, the first section is referred to hereinafter as the customer's order section, the second section as the page number section, and the third section as the quantity number section.

The first or customer's order section comprises digit-representing relays R162 to R185, inclusive, and space control relays R214 to R218, inclusive (Figs. 62n, 62o, and 62p). The digit-representing relays of the customer's order section are divided into six (6) banks of four relays each, and each bank represents an order or position of the customer's order number. Therefore, the maximum capacity of the first or customer's order section is the greatest number having six orders or positions. The six order banks are indicated, respectively, in the drawings as CO—6 to CO—1, inclusive. The highest order bank, CO—6, used for storing the sixth order, when the customer's order number is that large, comprises the relays R162 to R165 (Fig. 62n) and associated with that bank is the space control relay R214. The next highest or fifth order bank CO—5 comprises the digit relays R166 to R169, inclusive, and the space relay R215. The fourth order bank, CO—4, comprises the digit relays R170 to R173, inclusive, and the space relay R216. The third order bank, CO—3, comprises digit relays R174 to R177, inclusive, and the space relays R217. The second, or tens order bank, CO—2 comprises the digit relays R178 to R181, inclusive (Fig. 62p), and the space relay R218. The first or units order bank, CO—1, comprises the four digit relays R182 to R185, inclusive, no space relay being required.

The second or page number section of the relay storage unit, comprises the digit-representing relays R186 to R193, inclusive (Fig. 62q), and they are divided into two order banks, identified, respectively, as PN—2 and PN—1. The second or page number section, therefore, has a maximum capacity of the highest number having two orders.

The third or quantity number section of the relay storage unit comprises the digit-representing relays R194 to R209 (Figs. 62n and 62o), inclusive, and column control relays R210 to R213, inclusive. The digit relays are divided into four order-representing banks identified herein as QN—A, QN—B, QN—C, and QN—D, respectively. Each order bank comprises four of the digit relays and one of the column control relays, as shown.

The manner in which the numbers are stored in the three sections of the relay storage unit will be described in detail hereinafter under separate sub-headings. In general, the digits of each number are stored in succession by manually operating the keys 303, 304, and 305 of the auxiliary keyboard 302 shown in plan in Fig. 27. The key contacts closed by the actuation of the digit keys 303 are indicated as K0 to K9, inclusive, in Fig. 62m. The contacts closed by the space key 304 are identified by the character SP and the contacts operated by the motor bar 305 are identified by MB. As explained, when the operator depresses one of these keys, a corresponding key contact is closed. Four set-up relays R156 to R159, inclusive, are energized singly and in combination by the closing of the key contacts K0 to K9, inclusive, to represent the different digits according to a predetermined 4-position code. A set-up relay R160 is energized by the closing of the contacts SP, and a relay R20 is energized by the motor bar contacts MB. The contacts of the set-up relays R156 to R159 control the energizing of the digit-representing relays of each order bank of the three sections according to the same 4-position code and in a manner which will be more fully explained hereinafter.

When a digit of a number is stored in an order bank the energized relay or relays of such order bank adjust their contacts in a corresponding pyramid network of Figs. 62r, 62s, and 62t and thereby condition a read-out circuit path therethrough including the code wires, of the group CW1 to CW10, inclusive, corresponding to the digit stored. The pyramid networks corresponding to the order banks CO—6 to CO—1, inclusive, are identified, respectively, in Figs. 62r and 62s as COP—6 to COP—1, inclusive. The pyramid networks corresponding to order banks PN—2 and PN—1 are identified in Fig. 62s as PNP—2 and PNP—1, respectively. The pyramid networks corresponding to the four order banks QN—A to QN—D, inclusive, are identified, respectively, in Fig. 62t as QNP—A to QNP—D, inclusive.

*Storing the customer's order number and invoice page number.*—As explained hereinabove in operation #M8, the relay R38 (Fig. 62m) is now energized and its contacts R38C are closed and they thereby condition circuit paths for entering a number into the relay storage unit. In the illustrated embodiment, the relay storage unit is conditioned to receive and store the customer's order number first, and the invoice page number is stored next. As is customary, order numbers are assigned serially by the seller to the customer's orders as they are received. In the particular example being described, the selected customer's order number is "13" and the invoice page number is "1." The order and page numbers are usually stored by the operator while the apparatus is operating under the control of the master card and between operation #M8 and #M101. As will appear more fully hereinafter, if the order and page numbers are not stored before operation #M101, the apparatus will automatically stop and it can not start again until the numbers are stored.

The digits of the customer's order number are entered successively with the highest order digit entered first. As the number "13" comprises digits in the tens order and units order, respectively, and as such number does not have digits in the four higher orders, the number is stored by depressing the space key 304 (Fig. 27) four times in succession, then depressing the digit key 303 for entering the numeral "1," and then depressing the digit key 303 for entering "3." The invoice page number comprising only the units digit "1," the operator then stores this number by first depressing the space key 304 and then digit key 303 for entering "1."

When the operator first depresses the space key 304, the corresponding key contacts SP (Fig. 62m) are closed and thereby establish a circuit for the space storage set-up relay R160 and at the same time closes the bail contacts BC. The energizing circuit for R160 is traced as follows: from the positive conductor 1100, through the wire 1133, the now closed key contacts SP, and the coil of R160 to the negative conductor 1101. R160 closes its contacts R160A (Fig. 62n) in the order bank CO—6 and thereby conditions an energizing circuit for the space-representing relay R214 of this bank. The closing of the bail contacts BC establishes an energizing circuit for a first entry control relay R51 (Fig. 62m) which is traced as follows: from the positive conductor 1100; the now closed bail contacts BC; the normally closed points of contacts R54C; the normally closed contacts R50C of a second entry control relay R50; and through the coil of R51 to the negative conductor 1101. Relay R51 closes a pair of hold contacts R51A and thereby provides for holding R51 energized by a circuit path shunting the contacts R54C and R50C and including the bail contacts BC. Thus, R51 is held energized as long as the operator holds the space key 304 depressed. The first entry control relay R51 also closes its contacts R51B and thereby establishes an energizing circuit for the pick-up coil of a relay R54 and such circuit also includes the now closed bail contacts BC. The relay R54 is held energized by its hold contacts R54B (Fig. 62b) and by the normally closed contacts R53A, and the normally closed points of contacts R35A, R19A, and R12A. The first entry control relay R51 opens its interlock contacts R51C (Fig. 62m) and thereby prevents the establishing of an energizing circuit for a second entry control relay R50 until the operator releases the space key 304 and thereby opens the bail contacts BC and breaks the hold circuit for R51. R54 transfers its contacts R54C and thereby conditions an energizing circuit for said second entry control relay R50; but, as stated, the open contacts R51C prevent the establishing of such circuit as long as R51 is kept energized by the bail contacts BC. The first entry control relay R51 also closes its entry contacts R51D and thereby establishes, through the bail contacts BC, an energizing circuit for the pick-up coil of space relay R214 (Fig. 62n) which, as stated, is in the sixth order bank CO—6 and was conditioned by the closing of contacts R38C and also includes the now closed contacts R160A. The latter circuit is traced as follows: from the positive conductor 1100 (Fig. 62m), through the bail contacts BC now closed, a wire 1134, contacts R51D now closed, contacts R38C previously closed as a part of operation #M8, a wire 1135, the normally closed points of contacts R161A (Fig. 62n), the contacts R160A now closed, and the pick-up coil of relay R214 to the negative conductor 1101. The relay R214 is then held across the power line by the hold circuit previously described and extending from the positive conductor 1100, through the normally closed contacts R12C, the wire 1128, the normally closed contacts R19C, the wire 1129, the hold contacts R214D now closed, and the hold coil of R214 to the negative conductor 1101. Simultaneously with the energizing of the pick-up coil for R214, a parallel circuit was established from R38C (Fig. 62m) to energize the pick-up coil of a sequence control relay R40. R40 is held energized by a circuit extending from the positive conductor 1100, through the normally closed contacts R19D (Fig. 62n) of the re-set relay R19, a wire 1136, a wire 1137 (Fig. 62m), the normally closed contacts R42C of storage sequence control relay R42 and then through the now closed hold contacts R40A and the hold coil of R40 to the negative conductor 1101. The sequence control relay R40 closes its contacts R40B (Fig. 62n) to condition an energizing circuit for the fifth position order bank CO—5 of the section of storage relays for storing the order number. R40B function to condition the order bank CO—5 for receiving a storage entry in the same manner as the contacts R38C function with respect to the first order. When the operator releases the space key 304, the bail contacts BC open and break the hold circuit for the first entry control relay R51 (Fig. 62m) and the contacts of R51 then return to their positions shown. This includes the contacts R51C which now close to condition an energizing circuit for the second entry control relay R50. The pick-up coil of R54 is also deenergized, but the contacts R54C remain in their transferred position, because the hold coil of R54 (Fig. 62b) remains energized by the circuit previously traced.

As there is also no digit to be stored in the order bank CO—5, the operator again depresses the space key which closes the contacts SP and thereby picks up R160 (Fig. 60m), as before, and also closes the bail contacts BC. Thus, simultaneously with the picking up of R160, a circuit is established through the bail contacts BC, contacts R54C in their transferred position, R51C in the normal position shown, and the coil of the second entry control relay R50. R50B then close to pick up R53 through the bail contacts BC. R50A also close to hold the second entry control relay R50 energized through the bail contacts BC as long as the operator keeps his finger on the space key. R50 opens its contacts R50C to prevent the energizing of the first entry control relay R51 until the operator first releases the space key SP and opens the bail contacts BC. Thus, R50C function in this second entry operation in a manner similar to R151C in the first described storage entry operation. The relay R53 opens its contacts R53A (Fig. 62b) and thereby drops out the hold coil of R54, the latter then returning its contacts R54C (Fig. 62m) to their normal position shown. The energized space set-up relay R160 again actuates its contacts, including the closing of R160B (Fig. 62n), and thereby conditions an energizing circuit for the space-representing relay R215 of the order bank CO—5. The second entry control relay R50 closes its contacts R50D, and thereby establishes the energizing circuit for the pick-up coil of relay R215 which circuit also includes the bail contacts BC, the wire 1134, the now closed contacts R40B, and the normally closed points of contacts R161B. The relay R215 is held energized across the power line through its now closed hold contacts R215D and the normally closed contacts R12C and R19C and the wire 1129. Simultaneously with the energizing of R215, a parallel circuit path extending from R40B energizes the pickup coil of storage sequence control relay R41. R41 is held by its hold contacts R41A and the normally closed contacts R43C of sequence control relay R43 (Fig. 62o), the wire 1136, and the normally closed re-set relay contacts R19D. The sequence control relay R41 closes its contacts R41B (Fig. 62o) and thereby conditions an energizing circuit for storage entry in the next order bank CO—4 of the storage relays. R41 also opens its contacts R41C (Fig. 62m) and thereby drops out the hold coil of the storage conditioning relay R38 and the latter opens its contacts R38C to disconnect the sixth order bank CO—6 from the storage entering circuit wire 1134. When the operator releases the space key the second time, the opened bail contacts BC deenergizes the second entry control relay R50 and the relay R53 and their contacts are therefore returned to their normal positions shown in the drawings.

The operator depresses the space key 304 and thereby closes the key contacts SP and bail contacts BC for the third time. This energizes again the set-up relay R160 and the entry control relay R51. R160 closes its contacts R160C (Fig. 62o) to condition an energizing circuit for the pick-up coil of space relay R216 in the order bank CO—4. The closing of the bail contacts BC again energizes the first entry control relay R51 (Fig. 62m) through the normally closed points of contact R54C and the contacts R50C in their normally closed position, the same as when the space key was first depressed. The relay R51 is again held energized through the bail contacts BC and the now closed contacts R151A as long as the operator keeps the key depressed. R51 opens its interlock contacts R151C, as before. The contacts R151B close to pick up R54 through the bail contacts and the hold coil of R54 (Fig. 62b) is again held by its contacts R54B and through the normally closed contacts R53A. R54C (Fig. 62m) again transfer to condition an energizing circuit for the second entry control relay R50, but the latter can not be established at this time because of the now open R51C. The relay R51 closes its entry control contacts R51E (Fig. 62o) and thereby establishes, through the bail contacts BC, and the storage entering wire 1134, an energizing circuit for the space storage relay R216. The entering or pick-up circuit for R216 also includes the now closed sequence control contacts R41B, the contacts R161C, in their normally closed position, and the now closed space set-up relay contacts R160C. R216 closes its hold contacts R216D and thereby establishes a hold circuit therefor including the wire 1129 and the now closed R19C (Fig. 62n) and R12C. It is noted that, even though the entry control contacts R51D (Fig. 62m) are also closed again in this entering operation, no circuit can now be established to the order bank CO—6 of storage relays because the relay R38 is now deenergized and its contacts R38C are open. Simultaneously with the energizing of R316, a branch parallel circuit is established from R41B through the pickup coil of a storage sequence relay R42. The sequence relay R42 is held energized by its contacts R42A, the normally closed sequence control relay contacts R44B, the wire 1136, and the re-set relay contacts R190D (Fig. 62n). R42 opens its contacts R42C (Fig. 62o) and thereby drops out the hold coil of the sequence relay R40 first to be energized. R40 then opens its contacts R40B (Fig. 62n) in the entry path circuit for the order bank CO—5. The sequence relay R42 closes its contacts R42B (Fig. 62o) to condition an entry circuit path for the third position order bank CO—3. When the space key is released, key contacts SP and bail contacts BC are again opened and thereby deenergize the relay R160 and the first entry control relay R51. The relay R54 is held energized, as previously explained.

When the space key 304 is closed for the fourth time to close its contacts SP and bail contacts BC, the setup relay R160 is energized, as before, and R160 then closes its contacts R160D (Fig. 62o) to condition an energizing circuit for the pick-up coil of space-representing relay R217 which includes the contacts R161D and the now closed contacts R42B. For this fourth closing of the bail contacts BC by the actuation of the space key, the contacts R54C (Fig. 62m) are now in their transferred position and the contacts R51C are in their normally closed position. Thus, the bail contacts BC again pick up the second entry control relay R50 and also pick up the relay R53 through the contacts R50B when they close. R53 opens its contacts R53A (Fig. 62b) and thereby again drops out the hold circuit for R54 and the latter then restores its contacts R54C to the position shown. Also, with the picking up of R50 and with the closing of its entry control contacts R50E (Fig. 62o), the previously conditioned energizing circuit for the space storage relay R217 is established. R217 is held through its contacts R217D, the wire 1129, and the normally closed contacts R19C and R12C (Fig. 62n). Sequence control relay R43 is picked up simultaneously with R217 by a parallel circuit path extending from R42B. R43 closes its hold contacts R43A to establish a hold circuit therefor extending through the normally closed sequence relay contacts R45C and through the wire 1136 and the normally closed contacts R19D (Fig. 62n). R43C (Fig. 62n) then open to drop out the sequence relay R41 which opens its contacts R41B (Fig. 62o) in the entering circuit for the order bank CO—4. R43 closes its contacts R43B (Fig. 62p) and thereby conditions a storage entry circuit for the second position order bank CO—2. The space key is again released to open its key contacts SP and the bail contacts BC and thereby drop out the relays R50 and R53.

The operator now depresses the key 303 for storing the numeral "1" which is the tens order digit of the customer's order number "13" and consequently the first to be stored. The key contacts K1 (Fig. 62m) are closed thereby and they establish an energizing circuit for the digit storage set-up relay R156 which closes its contacts R156E (Fig. 62p) to condition an energizing circuit, including the previously closed sequence contacts R43B, for the pick-up coil of the digit storage relay R178 in the order bank CO—2. The relay R178, when energized alone, represents the digit "1." The bail contacts BC also close and pick up the first entry control relay R51 (Fig. 62m). R51 closes its entry control contacts R51F (Fig. 62p) and thereby establishes the energizing circuit for R178 including the now closed contacts R156E and R43B, a wire 1138, the normally closed contacts R161E (Fig. 62o) and the wire 1134. R178 then closes its hold contacts R178D and thereby establishes a hold circuit therefor including the wire 1129 and the normally closed contacts R19C (Fig. 62n) and R12C. R51 (Fig. 62m) opens its interlock contacts R51C, and closes its contacts R51B to pick up R54 which, as before, is held through its hold contacts R54B (Fig. 62b) and the normally closed contacts R53A (Fig. 62b). R54 transfers its contacts R54C (Fig. 62m) to condition a pick-up circuit for R50, as previously explained. Simultaneously with the energizing of relay R178 (Fig. 62p), a branch parallel circuit is established from R43B for energizing the pick-up coil of sequence control relay R44. R44 is held energized by its contacts R44A and the normally closed contacts R46C, the wire 1136, and the contacts R19D (Fig. 62n). R44 closes its contacts R44B (Fig. 62p) to condition an entering circuit for picking up storage relays of the next or units position order bank CO—1. Contacts R44C (Fig. 62o) open to drop out the sequencing relay R42 and the latter then opens its contacts R42B to disconnect the entering circuit wire 1134 from the storage relays of the order bank CO—3.

The operator next depresses the key 303 of the auxiliary keyboard for entering the units digit "3," which closes the key contacts K3 (Fig. 62m). The contacts K3 comprise two pairs of contacts which establish, respectively, energizing circuits for storage code set-up relays R156 and R157 which together represent the digit "3." These relays close their contacts R156F and R157F to condition energizing circuits for storage relays R182 and R183, respectively, of the units order bank CO—1. The depressing of the key for numeral "3" also closes the bail contacts BC and with R54C in shifted position, this picks up the entry control relay R50 which is held energized by the closing of its contacts R50A until the bail contacts are again opened by releasing the key. An entry energizing circuit is also established for the storage relays R182 and R183 when R50 closes its contacts R50F (Fig. 62p) and this circuit includes the bail contacts BC, the wire 1134, and contacts R161E, and the wire 1138, as previously described. R182 and R183 are held through their hold contacts R182D and R183D, respectively, and through the circuit path including the wire 1129 and the normally closed contacts R19C and R12C (Fig. 62n). Upon the establishing of the pick-up circuit for R182 and R183, a branch parallel circuit path is established from contacts R44B and including the pick-up coil of sequence control relay R45. R45 is held by its contacts R45A, and through the normally closed contacts R39A, the wire 1136, and the contacts R19D (Fig. 62n). R45 opens its contacts R45C (Fig. 62o) and drops out the sequence relay R43. R43 then opens its contacts R43B to prevent the establishing of a second entering circuit through the pick-up coils of the storage relays of the second position order bank CO—2. R45 closes its contacts R45B (Fig. 62q) and thereby conditions a pick-up circuit for storage relays of the second position order bank PN—2 which, as explained, are used to store the tens order of the page number of the invoice being typed by the #1 typewriter.

From the foregoing, it is apparent that the operator has now stored the customer's order number "13" in the six order banks CO—6 to CO—1, inclusive, of the storage relay network provided for this purpose, the space relay being energized in each of the order banks CO—6, CO—5, CO—4, and CO—3, the relay R178 representing the digit "1" being energized in CO—2, and the relays R182 and R183 representing the digit "3" being now energized in the order bank CO—1. The energized digit representing relays of order banks CO—2 and CO—1 adjust their contacts in the corresponding pyramid relay networks COP—2 and COP—1 in Fig. 62s so that the stored order number can be read out in a manner which will be fully described hereinafter in operations #M107 and #M108. The now energized space storage relays R214, R215, R216, and R217 adjust their contacts in the network in Fig. 62g to provide for picking up the space control relay R220 when the customer's order number is being read out of the storage unit. As will be fully described hereinafter in operation #M107, the relay network of Fig. 62g provides for automatically punching the figures-shift code designation in the 5-position tape before the first significant digit of the stored number is read out.

The invoice page number "1" is now stored in the second section of the relay storage unit. As stated above, this is effected by depressing the space key 304 and then the key 303 for storing the number "1." This will not store a digit in PN—2 and will store the digit "1" in PN—1 by energizing R190.

As stated hereinabove, the now closed relay contacts R45B (Fig. 62q) condition the order bank PN—2 for receiving the tens order of the invoice page number. Upon releasing the key for storing the units digit "3" of the customer's order number in the order bank CO—1, the operator next depresses the space key 304, which closes the contacts SP and results in the picking up of R160 and closes the bail contacts BC to pick up R51 and results in the holding of R51 through the bail contacts by the closing of relay contacts R51A. There are no set-up control contacts of R160 in order bank PN—2 and consequently the energizing of R160 is superfluous to the present operation. However, when R51 closes its entry control contacts R51G (Fig. 62q), a circuit is established including the bail contacts BC (Fig. 62m), the entering circuit wire 1134, the contacts R161E (Fig. 62o), the wire 1138, the contacts R51G (Fig. 62q), the now closed contacts R45B, and the pick-up coil of sequence control relay R46. R46 closes its hold contacts R46A and thereby provides an energizing circuit for its hold coil which also includes a wire 1140, the normally closed contacts R39A (Fig. 62p), the wire 1136, and R19D (Fig. 62n). R46 opens its contacts R46C (Fig. 62p) to drop out the hold circuit for sequence relay R44. R44 then opens its contacts R44B to prevent the establishing of a second entering circuit to the storage relays of the order bank CO—1. R46 closes its contacts R46B (Fig. 62q) to condition a pick-up circuit for the relays of the units order bank PN—1. Thus, when the operator releases the space key 304 and then depresses the key 303 for the numeral "1," the key contacts K1 (Fig. 62m) close and energize the set-up relay R156 and simultaneously therewith, the bail contacts BC close to pick up the entry control relay R50, the contacts R54C being now transferred as a result of the previous entering operation. R50 is held through its contacts R50A and the bail contacts, as before. The set-up relay R156 closes its contacts R156H (Fig. 62q) to condition an energizing circuit for the pick-up coil of storage relay R190. R50 also closes its entry control contacts R50G and thereby establishes the energizing circuit for the pick-up coil of R190, and the latter circuit also includes the previously closed sequence relay contacts R46B, the wire 1138, the contacts R161E (Fig. 62o), the wire 1134, and the bail contacts BC (Fig. 62m). With the energizing of the storage relay R190 (Fig. 62q) a branch parallel circuit is established from R46B to the pickup coil of sequence control relay R47. R47 closes its hold contacts R47A (Fig. 62b) and thereby establishes an energizing circuit for the hold coil thereof extending across the power line and including the normally closed points of contacts R35A, R19A, and R12A. R47 closes its contacts R47B (Fig. 62m) and thereby energizes relay R39. R39 then opens its contacts R39A (Fig. 62p) which then drop out the hold coils of sequence relays R45 and R46 and the latter relays then open their contacts R45B and R46B, respectively, to disconnect the entering circuit wires 1138 and 1134 from the order banks PN—2 and PN—1, respectively. It is also noted that at this time the order banks CO—6 to CO—1, inclusive, are also disconnected from the entry circuit wires 1134 and 1138 by the now open contacts R38C, R40B, R41B, R42B, R43B, and R44B, respectively.

Summarizing the foregoing, it is noted that the customer's order number "13" is now stored in the section of the relay storage unit comprising order banks CO—6 to CO—1, inclusive, and the invoice page number "1" is stored in the section comprising order banks PN—2 and PN—1, and that all of the storage relays of these order banks energized as a result of the above described entering operations are held by circuits including the wire 1129, the reset relay contacts R19C, and the contacts R12C. Also, the storage conditioning relay R38 is now deenergized. Sequence control relays R40 to R46, inclusive, are also now deenergized so that their contacts are in the position shown in the drawings. R47 is now held energized across the line and R39 is also energized by the now closed contacts R47B. Further actuation of the keyboard will not affect the condition of the relays of the storage unit. Thus, the condition of the eight order banks comprising the first and second section of the storage unit will remain as described as long as relays R12 and R19 are deenergized so that the holding circuits for the storage relays are maintained through the contacts R12C and R19C.

*Re-setting of the storage relays.*—The customer's order number and the invoice page number now stored in the eight banks of the first and second sections of the relay storage unit can be wiped out and new numbers stored therein by the operator at any time while the master card is being read, by energizing the re-set control relay R19 (Fig. 62h). Also, at any time during the storing of the customer's order number and page number, any stored data may be wiped out and the relay unit restored to its condition at the beginning of the number storing operations, by energizing the re-set relay R19. The relay R19 may be energized either by depressing the reset key 347 (Figs. 27 and 62h) or by the sensing of the 7–8–10–12 code designation in the program tape 15. When energized, relay R19 transfers its contacts R19a (Fig. 62b) thereby breaking the circuit including the hold coil of sequence relay R47, and establishing an energizing circuit for the pick-up coil of the storage conditioning relay R38. The relay R47 then opens its contacts R47B (Fig. 62m) to drop out the relay R39 and the latter then recloses its contacts R39A (Fig. 62p) so that the hold coils of sequence control relays R45 and R46 can be energized to control entering of a page number in the order banks PN-2 and PN-1 of storage relays, as previously described. The relay R38 closes its hold contacts R38A (Fig. 62m) to establish a hold circuit therefor including the normally closed contacts of R41C. Relay R19 opens its contacts R19C (Fig. 62n) and thereby drops out the hold coils of all of the digit storage and space relays that were picked up in storing the numbers as previously described. As explained previously in operation #M8, while the master card is being read, the relay R48 (Fig. 62c) is held energized through its hold contacts R48B and through the normally closed eject cam contacts ECB2 which will open to drop out R48 only during the next eject cycle. Consequently, contacts R48A (Fig. 62w) which are connected in shunt with the re-set relay contacts R19C are now open and the previously described dropping out of the storage relays of the eight order banks can be effected at this time by the opening of the contacts R19C. However, when the master card is ejected at the end of the cycle, the relay R48 becomes deenergized and from then until another master card is inserted, the contacts R48A remain closed with the result that any order number and page number previously stored in the order banks CO—6 to CO—1, inclusive, PN—2, and PN—1 of the storage unit can not be wiped out by energizing the re-set relay R19. The re-set relay R19 also opens its contacts R19D and thereby drops out the hold coils of the relay R20 (Fig. 62m) and the hold coils of the sequence control relays R40 to R46, inclusive, should they be energized. At this time, the latter named sequence relays have already been deenergized as a part of the storing operation, as previously explained; but, in case a number was being stored in the relay storage network and a mistake made before the storing operation was completed, then the opened contacts R19D will drop out any of these sequence relays which successively condition the several order banks for receiving the number. As will appear hereinafter in the description of operations under the control of the detail card wherein the quantity numbers are stored in and read out of order banks QN-A to QN-D, inclusive, the opening of R19D also drops out the hold coils of any of the relays R194 to R213, inclusive, and drops out the motor bar control relay R20. See operation #D65 included hereinafter. When the order number and the page number are wiped out of the storage unit by the operation of the relay R19, as explained, new numbers may be stored in the order banks provided therefor in the same manner as described hereinabove.

*Reading the master card (cont'd)*

The description of the operation of the apparatus under the control of the master card MC—1 (Fig. 52) continues as follows:

*Operations #M9 to #M16—read card columns #4 to #11.*—For operations #M9 to #M16, inclusive, the program tape and the master or heading card MC—1 are spaced once for each corresponding operating step and each corresponding machine cycle, the same as previously described. During these operations #M9 to #M16, inclusive, record columns #4 to #11, inclusive, of the card MC—1, are respectively read and the #1 typewriter operated under the control thereof to print the remaining portion of the customer's name, "HN W DOE," on the first line of the invoice 11 (Fig. 57) and in character space positions #14 to #21, inclusive, thereof. The control by the code designations in the card columns of the typing and character spacing of the carriage of the #1 typewriter will be apparent from the foregoing description. Record columns #9 to #16 on the master side of the program tape are also sensed as a part of corresponding operating steps; but, as such columns are blank, no controls will be effected thereby.

*Operation #M17—Carriage return operation controlled from the card—Read card column #12.*—As record column #17 of the tape is blank, no control will be effected from the tape during this operating step. Record column #12 of the master card MC—1 contains a code hole in the #12 index point position. Consequently, the sensing of this column by the card reading fingers at the beginning of the machine cycle will effect closing of the finger contacts F12 (Fig. 62a) and the energizing of card code set-up relay R112. R112 will then close its hold contacts R112N and thereby establish an energizing circuit for its hold coil through the cam operated relay contacts R30A in the manner previously described. R112 will close its contacts R112E (Fig. 62f) and thereby condition an energizing circuit for the carriage return control relays R224 and R33, such circuit being closed by CR6 at 135°. The conditioned circuit is traced as follows: from the positive conductor 1100, through the cam contacts CR6; the normally closed code set-up relay contacts R109C to R101C; the wire 1123; normally closed points of R111E; contacts R112E now closed; normally closed points of contacts R143A; normally closed points of contacts R115B; and then through the pick-up coils of R33 and R224, in parallel, to the negative conductor 1101. Thus, when CR6 close at 135° of the machine cycle, relays R33 and R224 become energized. R224 closes its hold contacts R224F (Fig. 62c) to energize its hold coil under the control of cam contacts CR2. R224 closes its translator control contacts R224A and R224B (Fig. 62u) and thereby connects the code wires CW3 and CW8 to a wire 1141 which is in turn connected to the wire 1118 and the positive conductor through cam contacts CR3 (Fig. 62r). The code wires CW3 and CW8 include, respectively, the normally closed C and H contacts of relay R225 (Fig. 62w), and the now closed C and H contacts of R228. As previously explained, the code wires CW3 and CW8 are also connected to the #1 translator selector magnets TSM3 and TSM8. It is noted that the card code set-up relay R112 also closed its contacts R112A (Fig. 62v) and thereby connected the code wire CW12 to the positive conductor through wire 1127, the wire 1118, and the cam contacts CR3. However, the latter circuit which would normally energize the #1 translator selector magnet TSM12 (Fig. 62v) can not be established during this operation by CR3, because R224 also opens its contacts R224D (Fig. 62w) which are in the code wire CW12. Thus, when CR3 close at 220° of the cycle the #1 translator selector magnets TSM3 and TSM8 are energized; and, when CR4 (Fig. 62q) close at 215°, the #1 translator clutch magnet 462 is energized through the now closed contacts R3D. The #1 translator will then operate to pull down the carriage-return key 313 (Fig. 27) of the #1 typewriter 300 and thereby effect a carriage return operation thereof in the manner previously described.

Contacts R224C (Fig. 62c) also close and pick up R55 by a circuit including the CR7 cam contacts (Fig. 62d), the wire 1130, R224C (Fig. 62c) now closed, and the pick-up coil of R55 to the negative conductor 1101. CR7 close this circuit at 313° of the machine cycle and this is after the opening of the cam contacts CR3 and CR4 which, as just explained, effect a carriage return operation of the #1 typewriter through the #1 translator. Contacts R55C (Fig. 62q) then open to prevent the #1 translator clutch magnet 462 of the #1 typewriter from being energized by CR4 during the following machine cycles while the carriage return operation is being effected. The relay R55 also closes its hold contacts R55A (Fig. 62b) and thereby establishes a hold circuit for R55 extending through the cam operated relay contacts R30D, R30 being energized by cam contacts CR8 (Fig. 62a) at 340° (Fig. 61) which is before CR7 open to drop out the pick-up coil of R55. The hold circuit for R55 (Fig. 62b) will also be held through interlock relay contacts R36E which also close as a part of this carriage return operation, as will be presently explained.

As explained hereinabove, the pick-up coil of relay R33 (Fig. 62f) was energized at the same time as R224. The relay R33 is the carriage-return interlock control relay previously referred to. Relay R33 closes its contacts R33C (Fig. 62e) and thereby energizes the pick-up coil of the main interlock relay R36. R36 closes its hold contacts R36B (Fig. 62c) and thereby establishes a hold circuit therefor under the control of CR2. As explained previously, when the interlock relay R36 is energized, it opens its contacts R36A (Fig. 62e) to drop out the card feed clutch magnet CFM. R36 also opens its contacts R36C (Fig. 62d) which opens the circuit to the tape feed clutch magnet CFM (Fig. 62e) and also opens the sensing circuits to the program tape contact roll 1103 and the program tape sensing brushes B1 to B12 inclusive. R36 also opens its contacts R36D (Fig. 62h) to break the circuit path from CR5 to the pyramid translator circuit network of Figs. 62h to 62k, inclusive. R36 also closes its contacts R36E (Fig. 62b) and thereby establishes a second energizing path for the hold coil of R55 which was referred to hereinabove. Thus, the relay R36 suspends all tape and card reading and feeding functions while the carriage return operation is taking place and also holds the interlock relay R55 energized, which suspends through its contacts R55C (Fig. 62q) the operation of the #1 translator 400.

The carriage return interlock relay R33 is held energized by the closing of its hold contacts R33A (Fig. 62q). The hold circuit for R33 also includes the contacts R229B and the normally closed interlock contacts CR1C. R229 was picked up and held energized as a part of the #1 typewriter-on operation set forth above as operation #M7 and consequently R229B are now closed. As shown in Figs. 25, 26 and 27, contacts CR1C are on the back of the #1 typewriter 300 and are closed for all character space positions of the carriage 310 except the #11 character space position where a pre-set stop element CS1 in the extra rack 337 opens such interlock contacts CR1C. As explained, the left-hand margin stop is positioned to stop the carriage at the #11 space position to complete the carriage return operation. Thus, the hold coil of relay R33 remains energized until the #1 typewriter carriage 310 returns to its #11 character space position where the pre-set stop element CS1 opens its carriage interlock contacts CR1C and thereby opens the energizing circuit for the hold coil of R33. Relay R33 then drops out and its contacts R33C (Fig. 62e) will open to deenergize the pick-up coil of the interlock relay R36. When CR2 (Fig. 62c) opens at 15° of the following machine cycle, the hold coil of relay R36 will become deenergized. The contacts of relay R36 will then be returned to their positions shown in the drawings and, will thereby restore, to their respective conditions occupied before the carriage return operation was initiated, the various circuits for reading and spacing the program tape 15 and the master card MC—1, and the circuit through the translator network of Figs. 62h to 62k, inclusive. Consequently, the operation of the apparatus will continue as before. It is also noted that the contacts R36E (Fig. 62b) which are in the hold circuit for R55 are then opened. The hold circuit for R55 will then remain closed through R30D until after CR8 open at 270° to drop out the relay R30 (Fig. 62a). R55 will then reclose its contacts R55C (Fig. 62q) and thereby permit again the operation of the #1 translator clutch magnet 462 under the control of CR4 and R3D.

*Operations #M18 to #M43—Read card columns #13 to #38.*—At the end of the previously described carriage-return operation and when CR1 (Fig. 62c) drop out the hold coil of interlock relay R36 at 15° of a machine cycle, the tape sensing and feeding circuits will be closed by CR7 at 313° of such cycle and the tooth of the card feed clutch will engage at the end of such cycle and the normal card sensing operation will begin with the next or following cycle. In the same fashion as explained previously, program tape columns #18 to #43, inclusive, will be sensed in successive operating steps and concurrently therewith corresponding card columns #13 to #38, inclusive, will be respectively sensed and will control the operation of the #1 typewriter to print the customer's street address and the name of the town and state on the invoice sheet 11 (see Fig. 57). As tape columns #18 to #43 are blank, the control of the corresponding operating steps will be effected entirely by the code designations recorded in the card columns. As a part of operations #M30 and #M43, carriage-return operations will be effected under the control of a #12 code hole in card columns #25 and #38, respectively, and in the same manner as just described in operation #M17.

*Operations #M44 to #M63, inclusive—Skipping operation under the control of a #11 hole in card column #39.*—As shown in Fig. 52, the field of the master or heading card MC—1 which comprises card columns #2 to #59, inclusive, is provided for recording the name and address of the customer. In the particular example disclosed herein, the master card MC—1, the last column of this name and address field used, is column #38. In order to save the time which would be expended by allowing each of the remaining blank columns of this field to be successively sensed during successive machine cycles, means is provided herein to skip over these blank columns and the corresponding record columns of the program tape at a relatively high rate of speed. This skipping operation is effected herein under the control of a significant code designation in column #39 of the card. Thus, after card column #38 has sensed and the #1 typewriter operated to return its carriage, and the interlock relay R36 has been dropped out to restore the apparatus to its normal operating position, card column #39 is sensed. The card column #39 contains a code hole in the #11 index point position which is the designation provided herein for effecting the skipping of the blank card columns remaining in the name and address field and also the skipping over of the corresponding record columns of the program tape. While this skipping operation is in reality only one continuous operation of the apparatus initiated under the control of the #11 hole in the master card, it has been identified by the above legend or sub-heading as operations #M44 to #M63, because, as explained, the operation numbers as used herein correspond, respectively, to the record columns of the program tape, and the tape columns #44 to #63, inclusive, move past the sensing brushes B1 to B12 inclusive during the skipping operation described hereinbelow.

Thus, with the apparatus restored to normal operation after the carriage-return operation from card column #38, column #39 is sensed and the #11 code hole therein will effect the energizing of card code set-up relay R111 (Fig. 62a). R111 will then close its hold contacts R111N to establish an energizing circuit for the hold coil thereof including the cam controlled relay contacts R30A and in the same manner as described hereinabove in connection with other card column sensing operations. R111 transfers its contacts R111E (Fig. 62f) and thereby conditions an energizing circuit for relays R236 and R223 which circuit is closed by cam contacts CR6 at 135° of the first machine cycle of this skipping operation. The conditioned skip control circuit is traced as follows: from the positive conductor 1100, through the contacts CR6; the normally closed set-up relay contacts R109C to R101C, inclusive; the wire 1123; contacts R111E, now shifted; contacts R113A, in the position shown; contacts R142D, in the position shown; and the pick-up coil of R236 to the negative conductor 1101. A branch parallel circuit extends from the closed contacts R113A, through the normally closed points of R116A and the pick-up coil of R223 to the negative conductor 1101.

The relay R223, through its contacts R223A, R223B, and R223C (Fig. 62u) provides for the energizing of translator selector magnets TSM4, TSM8 and TSM10 and consequently for pulling down the skip key 318 (Fig. 27) of the main keyboard during the first machine cycle of the skipping operation. The skip key 318 provides for punching the skip code in the tape 12 and does not otherwise effect the operation of the #1 typewriter. As the punch 500 is not now turned on, the pulling down of the skip key 318 will not affect the skipping operation now being described.

The relay R236 is held energized by its hold contacts R236F (Fig. 62c) and the cam contacts CR2. R236 transfers its contacts R236B (Fig. 62d) and thereby conditions an energizing circuit for the pick-up coil of R222 which is closed at 313° of the first machine cycle by CR7, which is after CR3 and CR4 operate to pull down the key lever of the skip key 318, as just explained. The energizing circuit for R222 is traced as follows: from the positive conductor 1100, through cam contacts CR7, the wire 1130, normally closed contacts R226A, the now transferred contacts R236B, and the pick-up coil of R222 to the negative conductor 1101. R222 is held energized by its hold contacts R222F (Fig. 62c) and the cam contacts CR1 which close at 354° of the first machine cycle of the skipping operation (Fig. 61). R222 closes its contacts R222A, R222B, and R222C (Fig. 62u), and thereby conditions energizing circuits for connecting the code wires CW3, CW8, and CW10 to the wires 1141 and 1118 and to the positive conductor 1100, through the cam contacts CR3 (Fig. 62r). As shown, in Figs. 62u, 62v, and 62w, the code wires CW3, CW8, and CW10 are connected, respectively, to the #1 translator selector magnets TSM3, TSM8, and TSM10 and these magnets will be energized at 220° of the second machine cycle of this skipping operation by the closing of cam contacts CR3. The closing of cam contacts CR4 (Fig. 62q) at 215° of such second cycle will also establish an energizing circuit for the clutch magnet 462 of the #1 translator. The translator will therefore operate during the second cycle of the skipping operation to pull down the standard tab key 314 (Fig. 27) of the #1 typewriter and thereby effect a tabulating operation of the typewriter carriage 310. At the beginning of this skipping operation, the carriage 310 occupied the #11 character space position, it having been returned as a result of a #12 hole in card column #38. The carriage now tabulates until it is stopped by the next preset regular tab stop 332. As shown in Fig. 25, the carriage will be stopped by a pre-set regular stop 332 in character space position #25.

When relay R236 was energized by CR6 at 135° of the first machine cycle of this skipping operation being described, it also closed its contacts R236E (Fig. 62e) and thereby established an energizing circuit for the pick-up coil of interlock relay R36. The hold coil of relay R36 (Fig. 62c) is then energized as before by CR2 and the hold contacts R36B. As explained previously, the contacts of R36 are shifted to break the circuit paths from CR7 (Fig. 62d) to the program tape contact roll 1103 and to the tape feed clutch magnet TFM (Fig. 62e), to break the circuit path to the card-feed clutch magnet CFM, and to break the circuit to the pyramid translator of Figs. 62b to 62k, inclusive.

R236 also closed its contacts R236A (Fig. 62d) and thereby energized the pick-up coil of the skip control relay R31 through the cam contacts CR7 at 313° of such first machine cycle. Thus R31 and R222 are energized at the same time. R31 is held energized across the line by the closing of its hold contacts R31B (Fig. 62e) and the normally closed contacts R32C of the skip-off control relay R32. Therefore, R31 will remain closed until the skip-off relay R32 is energized and opens its contacts R32C. R31 opens its contacts R31E (Fig. 62c) and thereby prevents the establishing of hold circuits by CR1 for the tape code set-up relays R146 to R151, inclusive, while the program tape is fed at its fast or skipping rate, as will presently appear.

R31 closes its contacts R31A (Fig. 62e) and thereby establishes a second energizing circuit for the pick-up coil of the interlock relay R36, the contacts R31A being connected in shunt with the contacts R236E which are also now closed as previously explained. Thus, R31A will keep the pick-up coil of R36 energized after the hold circuit for R236 is broken by the opening of CR2 at 15° of the next cycle, and until the skip-off relay contacts R32B open to drop out R31.

R31 also closes its contacts R31D (Fig. 62e) and thereby establishes an energizing circuit across the line for the skip-clutch magnet SKM. It is noted that the latter circuit also includes the normally closed contacts R32A of the skip-off relay R32. The skip clutch SKC then engages and thereby effects the simultaneous feeding of the program tape 15 and the master card MC—1 at the skipping rate, which is four times the normal rate, all of which has been fully described hereinabove in connection with the detailed description of the card and tape reading unit 100.

Relay R31 also transfers its contacts R31C (Fig. 62d) and thereby directly connects the contact roll 1103 of the program tape sensing brushes V1 to B12, inclusive, to the positive wire 1100 through the tape circuit breaker contacts CB which provide for reading code designations in the tape when the tape is being fed at the skipping rate. The timing chart in Fig. 61 shows the closing and opening time of the contacts CB.

When R222 (Fig. 62d) was energized by CR7 at 313° of the first machine cycle, it closed its contacts R222E (Fig. 62f) which are in an energizing circuit for the tabulating interlock relay R34, which circuit is traced as follows: from the positive conductor 1100 through cam contacts CR6 (Fig. 62f), the wire 1112, the wire 1143, the now closed contacts R222E, and the pick-up coil of R34 to the negative conductor 1101. The latter circuit is established by CR6 at 135° of the second machine cycle of the skipping operation which is the one following the cycle in which R222 was energized by CR7. R34 closes its hold contacts R34A (Fig. 62q) and thereby establishes an energizing circuit for the hold coil thereof which is traced as follows: from the positive conductor 1100, through the normally closed interlock tab contacts TIC which are actuated by the pre-set control stop CS2 in the extra tab rack 337 (Fig. 25) on the #1 typewriter; the #1 typewriter-on relay contacts R229A, now closed; the now closed hold contacts R34A; and the hold coil of R34 to the negative conductor 1101. The latter circuit will be broken by a pre-set control stop CS—2 in character space position #25 of the extra rack 337 on the #1 typewriter. As explained, the regular pre-set tab stop 332 in space position #25 also stops the carriage 310 in such position #25. R34 closes its contacts R34C (Fig. 62e) to establish a third energizing circuit for the pick-up coil of the interlock relay R36, R34C being connected in shunt with the previously closed contacts R31A and R236E. R34C will remain closed until the end of the tabulating operation of the #1 typewriter when the hold circuit for R34 (Fig. 62q) is broken by the stop CS—2, as just explained.

R222 also closes its contacts R222D (Fig. 62f) and thereby conditions an energizing circuit for the pick-up coil of R235 which circuit is closed by CR6 at 135° of said second machine cycle of this skipping operation. R235 will then close its contacts R235B (Fig. 62c) and thereby condition an energizing circuit for the pick-up coil of the interlock relay R55 which is closed by cam contacts CR7 at 313° of such second machine cycle. R235 also closes its contacts R235A (Fig. 62d) to condition an energizing circuit for the pick-up coil of R232 which provides for punching the figures-shift code in the 5-position tape. The latter circuit is under the control of CR7, but it can not be established during this skipping operation as the punch-off control relay R237 is now energized and its contacts R237E which are also in this circuit are now open.

The interlock relay R55 closes its hold contacts R55A (Fig. 62b) and thereby establishes its hold circuit across the power line and including the interlock relay contacts R36E, now closed; and the contacts R30D connected in shunt with R36E. Thus, as long as the interlock relay R36 remains energized, R55 is held energized. R55 opens its interlock contacts R55C (Fig. 62q) and thereby prevents the establishing of the energizing circuit for the #1 translator clutch magnet 462 which is under the control of the cam contacts CR4. The interlock contacts R55C thereby prevent the operation of the #1 translator 400 of the #1 typewriter 300 after the second machine cycle of this skipping operation and in the same manner as they did in the carriage-return operation previously described herein as operation #M17.

*Operation #M64—Skip off.*—The skipping operation, initiated in the previous operating step by a #11 hole in card column #39, is terminated during this operation by a skip-off designation in record column #64 of the program tape. In order to be consistent in the present description, the skip-off operation is described herein as operation #M64 and as a separate operating step, because the skip-off function is effected under the control of a code designation in the corresponding record column #64 of the program tape.

When column #64 of the program tape passes the sensing brushes B7 to B12, inclusive, a code hole in the #12 index point position thereof will effect the energizing of the code-set-up relay R151 (Fig 62d). The energizing circuit for R151 will be established through the circuit breaker contacts CB and the now-transferred contacts R31C of the skip control relay R31, and the sensing brush B12. A hold circuit for R151 will not be established because of the now-open contacts R31E (Fig. 62c). Also, as the interlock relay contacts R36D (Fig. 62h) are now open, the circuit conditioned through the relay translator network of Figs. 62h to 62k, inclusive, by the closing of the contacts R151, can not now be established. The tape code set-up relay R151 closes its contacts R151LL (Fig. 62e) and thereby establishes an energizing circuit for the skip-off control relay R32, which is traced as follows: from the positive conductor 1100, through the now closed contacts R31D (Fig. 62e) of the skip control relay R31; through the normally closed code set-up relay contacts R146LL, R147LL, R148LL, R149LL, and R150LL; and through R151LL, now closed, and the pick-up coil of R32 to the negative conductor 1101. The relay R32 is held energized by its contacts R32B (Fig. 62c) and through cam contacts CR2. R32 opens its contacts R32A (Fig. 62e) and thereby drops out the skip clutch magnet SKM. The skip clutch SKC is then disengaged and stops feeding the program tape 15 in position to have its record column #65 read. R32C (Fig. 62e) open and thereby drop out the skip control relay R31. R32D (Fig. 62L) open and thereby drop out the hold circuit for the card-feed-on relay R8. R8 then opens its contacts R8C (Fig. 62e) and thereby prevents the establishing of an energizing circuit to the card feed clutch magnet CFM when the interlock relay contacts R36A reclose. The normal card feeding operation is thus prevented from being resumed after a skipping operation so that there will be no interference with the first sensing operation of the program tape 15. When the skip clutch SKC is disengaged, movement of the card MC—1 is stopped in position to have its column #60 read. The column can not be read, however, until the card feed clutch CFC is again energized by energizing the relay R8.

As explained hereinabove, the pick-up coil of interlock relay R36 (Fig. 62e) was energized by the closing of contacts R236E during the first machine cycle of the skipping operation and when R111E and CR6 picked up R236. Subsequently, contacts R31A closed and then contacts R34C closed, both of the latter being connected in shunt with R236E, and they thereby hold the pick-up coil of relay R36 energized as long as any one set of these contacts is closed. The hold coil of R236 is deenergized by the opening of CR2 at 15° of the machine cycle following the one in which R236 was picked up. R236E then opened; but, by that time R31 and R34 were energized and their contacts R31A and R34C were closed. As explained, R31 is deenergized by the opening of the skip-off relay contacts R32C and contacts R31A then open. As also explained, the hold coil of R34 is deenergized by the opening of the interlock contacts TIC (Fig. 62q) by the pre-set control stop CS2 in character space position #25 in the extra tab rack 337 on the #1 typewriter when the carriage thereof reaches such space position. Then the contacts R34C open. Thus, when all of these contacts; R236E, R31A, and R34C; open to drop out the pick-up coil of relay R36 and when the hold coil of R36 (Fig. 62c) is deenergized by the opening of cam contacts CR2 at 15° of a machine cycle, the relay R36 becomes deenergized and all of its contacts are then returned to their respective positions shown in the drawings. As stated before, the program tape 15 will then be in position to have its column #65 read and the card MC—1 will be in position to have its column #60 read and the card feed clutch CFC is deenergized.

It is noted that R31C (Fig. 62d) are returned to the position shown when R31 is deenergized and consequently the control of the sensing circuits for the program tape is returned to the cam contacts CR7 when the interlock relay contacts R36 reclose.

As explained, the purpose of the previously described skipping operation is to skip over the remaining unused columns in the name and address field of the master card MC—1 so as to reduce the amount of time required in preparing the invoice sheet 11 of Fig. 52, picker tag 14 of Fig. 58, and the 5-position tape 12 of Fig. 50 from the data stored in the master card MC—1. It is noted that the #1 typewriter carriage 310 was tabulated to character space position #25 as a part of this skipping operation where the carriage was stopped by a pre-set regular stop #332. This tabulation of the carriage is not essential to the particular skipping operation described. However, as will later appear, the tabulating of the carriage is an essential part of skipping operations under the control of designations in the detail card, and, as it is desirable to provide only one designation to effect both master card and detail card skipping, the tabulating is permitted to take place as an incident to the master card controlled skipping just described.

*Operation #M65—Carriage return under the control of the program tape.*—In this operation, the #1 typewriter carriage 310 is returned to its #11 character space position (Fig. 25) and the platen 309 thereof is line spaced, as previously explained, so that the invoice 11 (Fig. 57) will be in position to have the first letter "A" of "ABCDE" in the fourth line of typing, typed thereon. This carriage-return operation is effected under the control of a #10 code hole designation in column #65 of the program tape 15 (Fig. 59b).

When the cam contacts CR7 (Fig. 62d) close in the machine cycle following the dropping out of interlock relay R36 and the reclosing of its contacts R36C, a sensing circuit will be established through the contact roll 1103 and the tape reading brush B10 and will thereby energize the tape code set-up relay R149. The relay R149 is held energized by the closing of its contacts R149N (Fig. 62c) and through the cam contacts CR1. The relay R149 adjusts its contacts in the relay translator pyramid network in Figs. 62h to 62k, inclusive, to condition an operating circuit therethrough and including the pick-up coil of the carriage return relay R224 (Fig. 62f) and the carriage-return interlock relay R33. This conditioned circuit is traced as follows: from the positive conductor 1100 (Fig. 62h), through cam contacts CR5; the contacts R36D, in the position shown; contacts R146A (Fig. 62i), in the position shown; R147B (Fig. 62j), in the position shown; R148D (Fig. 62k), in the position shown; R149H, now transferred; R150S, in the position shown; R151HH, in the position shown; the wire 1144; and the pick-up coils of R224 and R33 (Fig. 62f), to the negative conductor 1101. Thus, when the cam contacts CR5 close, relays R224 and R33 will become energized. Relay R224 closes its hold contacts R224F (Fig. 62c) and thereby provides a holding circuit through the cam contacts CR2. The relay R33 is held energized by its hold contacts R33A (Fig. 62q) and through the now closed relay contacts R229B and the carriage-return interlock contacts CR1C which are closed for all character space positions of the carriage except the #11 space position where they are opened by a pre-set control stop CS1 in the corresponding space position of the extra tab rack 337 (Fig. 25) on the back of the #1 typewriter 300.

The relays R33 and R224 function to effect a carriage-return operation of the #1 typewriter in identically the same manner as described hereinabove as operation #M17 wherein the relays R33 and R224 were picked up from a #12 hole in the master card MC—1. It is therefore believed to be unnecessary to repeat in detail the description at this point. The relays R33 and R224 provide for energizing the interlock relays R36 and R55 and for pulling down the carriage-return key 313 on the #1 typewriter by means of the #1 translator 400, as before. The carriage 310 is returned to its #11 character space position and the platen line-spaced incident thereto, so that the invoice 11 will be in position for typing the character "A," the latter being a part of "ABCDE" used herein to identify by name the kind of dealer customer to whom the invoice is addressed. At the end of the carriage-return operation, the program tape 15 is in position to have its column #66 read.

*Operation #M66—Card feed on, #1 typewriter off.*—At 313° of the machine cycle when R36 is dropped out, CR7 will close to establish a sensing circuit through the record column #66 of the tape 15 which contains the 11–12 code designation. As set forth hereinabove in operation #M4, this code designation provides for energizing R137 (Fig. 62k) when CR5 close, and R137 provides, when CR6 close, for energizing the card-feed-on relay R8 (Fig. 62i) and the #1 typewriter-off relay R4. This operation is identically the same as operation #M4 and it is believed to be unnecessary to repeat the description at this point.

*Operation #M67—#1 typewriter on—Read card column #60.*—When the program tape 15 spaces to its column reading position #67, the 7–11 code designation is sensed and this designation energizes the #1 typewriter-on relay R3 (Fig. 62i) again and in the same manner as described in operation #M3 hereinabove.

The #1 typewriter is turned on during the same machine cycle that column #60 of the card is read. Consequently, the alphabetic character "A," which is recorded in this card column, is printed in character space position #11 of the invoice 11 and in a manner which will be apparent from the previous description.

*Operations #M68 to #M70—Read card columns #16 to #63.*—In these operations blank record columns #68, #69 and #70 of the program tape are sensed and the tape spaced once for each operation. Also, card columns #61, #62, and #63 are read and the #1 typewriter operated under the control of the designations recorded therein to print "B," "C," and "D" in positions #12, #13, and #14 of the fourth line of the invoice 11.

*Operations #M71—Card feed off—Read card column #64.*—In this operation the #8 code designation in the program tape 15 turns off the card feed by energizing the relay R9, the same as described in operation #M5. Column #64 of the card is read and the character "E" printed in character space position #15 of the fourth line of the invoice 11.

*Operation #M72.*—In this operation the blank record column #72 of the program tape is sensed and the tape spaced. As the #1 typewriter is turned on, CR4 (Fig. 62q) will energize the #1 translator clutch magnet 462 at 215° and thereby operate the translator 400 to pull down the space key and space the carriage 310 to character space position #17.

*Operation #M73—Card feed on.*—In this operation the #7 designation in tape column #73 turns on the card feed by energizing the relay R8 in the same manner as described in detail in operation #M4. CR4 (Fig. 62q) will again energize the #1 translator magnet 462 and thereby space the carriage 310 to character space position #18.

*Operation #M74—Punch on—Read card column #65.*—The punch is turned on by energizing relay R7 in response to an 8–11 designation in column #74 of the program tape, in identically the same manner as described above in operation #M2. The blank column #65 of the card is sensed and as no selector magnets of the #1 translator 400 are energized, CR4 again energize the #1 translator magnet 462 to pull down the space key which operates the #1 typewriter to space the carriage to character space position #19. It is also noted that as a part of the card sensing operation, the bail contacts 855 (Fig. 69a) close to pick-up R58 which closes its contacts R58C (Fig. 62g). R58 is held by its hold contacts R58A (Fig. 62c) and through CR1. Thus, with the sensing of the blank card column #65, a circuit is established under the control of CR6 for energizing the space control relay R220 (Fig. 62g). This circuit is traced as follows: from the positive conductor 1100 (Fig. 62f), through CR6; the wire 1112; R58C (Fig. 62g), now closed; the normally closed contacts R109B to R101B, inclusive, of the card code set-up relays R109 to R101, respectively; the wire 1145; the normally closed points of contacts R110C; the normally closed contacts R111C; the normally closed contacts R112C; the wire 1146; the wire 1147; and the pick-up coil of R220 to the negative conductor 1101. R220 closes its hold contacts R220F (Fig. 62c) and thereby establishes an energizing circuit for the hold coil thereof under the control of CR2. R220 also closes its contacts R220D (Fig. 62d) and thereby establishes an energizing circuit for the pick-up coil of the space-test relay R27 which circuit includes the now closed punch-off control contacts R237D and is under the control of CR7.

R27 closes its hold contacts R27B (Fig. 62e) and thereby establishes a hold circuit therefor which extends across the power line and includes the normally closed contacts R25C. Thus, during this operating step, the cam unit 321 actuated by the space key 311-space (Fig. 27) actuates its related selector slide 653a (Fig. 24) and the latter effects an operating cycle of the tape punch 500 during which the space code designation is punched in the 5-position tape 12 of Fig. 50. The timing is such that the contacts R56C (Fig. 62v) are reclosed as a part of the punch-on operation while the selector slide 653a operated by the space key cam unit 321 effects closing of the punch selector contacts SC3 and the punch common contacts C. Hence, the punch operates to punch the #3 code hole in the 5-position tape 12 during this operating step.

It is noted that as a part of this punch-on operation, the relay contacts R7A (Fig. 62b) opened to drop out the hold coil of the punch-off control relay R237 when R7 was energized by CR5. Consequently, contacts R237D (Fig. 62d) were returned to the position shown and space test relay R27 was picked up and is now held energized across the line as a result of sensing a blank card column while the punch is turned on. R27 closes its contacts R27C (Fig. 62e) and thereby conditions an energizing circuit for the pick-up coil of the figures-shift control relay R29. This conditioned energizing circuit for R29 is under the control of R24D which are now open.

The purpose of the relays R220 and R27 is to condition the apparatus for automatically punching a figures-shift code designation in the 5-position tape when the next card column bearing a digit-representing designation is sensed. The function of these relays will be apparent from the next operation, #M75.

*Operation #M75—Card feed off—Punch automatically figures-shift code—Read card column #66.*—In this operation, the card feed is turned off by the energizing of relay R9 under the control of a code hole in the #8 code position of record column #75 of the program tape and in the same manner as set forth hereinabove in operation #M5. Card column #66 is read during a first machine cycle and the code hole in the #2 index point position therein provides during such first cycle for operating the #1 translator 490 which actuates the figures-shift key 318 (Fig. 27) on the #1 typewriter 300 to effect the punching of the figures-shift code designation in the 5-position tape 12 of Fig. 50 and provides, during a second or following machine cycle, for actuating the typewriter again to print the numeral "2" in character space position #19 of the invoice 11 and to punch the code designation for the numeral "2" in the 5-position tape 12. The punching of the figures-shift designation in the 5-position tape ahead of the designation for the numeral "2" is effected automatically and is controlled by circuits set up in the previous operation #M74 and by the digit-representing designation in card column #66.

At 42° of the first machine cycle, the sensing finger contacts F2 (Fig. 62a) close as a result of the sensing of a #2 code hole in card column #66. This will effect the energizing of card code set-up relay R102 which will close its hold contacts R102N and thereby establish a hold circuit therefor through the cam controlled relay contacts R30A which are closed at this time, as previously explained. The set-up relay R102 transfers its contacts R102B (Fig. 62g) and thereby conditions an energizing circuit for the figures-shift control relay R24 which is under the control of cam contacts CR6. The circuit is traced as follows: from the positive conductor 1100 (Fig. 62f); through CR6; the wire 1112; the now closed contacts R58C (Fig. 62g) which, as explained above, are now closed due to the energizing of relay R58 by the sensing finger bail contacts 855 (Fig. 62a) during each card reading operation; the hold coil of R58 (Fig. 62c) being now held by CR1; through the normally closed contacts R109B to R103B (Fig. 62g), inclusive; the contacts R102B, now transferred; the wire 1148; the normally closed contacts R110B; the normally closed contacts R111B; the normally closed contacts R112B; the now closed contacts R237B; the wire 1149; the pick-up coil of the relay R24 to the negative conductor 1101. Thus at 135° of said first machine cycle, the one in which card column #66 was read, CR6 will close the circuit just traced and energize the pick-up coil of relay R24. R24 closes its hold contacts R24A (Fig. 62c) and thereby establishes an energizing circuit for the hold coil thereof which includes the contacts CR2 which remain closed until 15° of the second or following machine cycle. R24 closes its contacts R24B (Fig. 62d) and thereby conditions an energizing circuit for the coil of relay R25 which is closed at 313° of the first machine cycle by CR7. R25 will then open its contacts R25C in the hold circuit for R27. R24 closes its contacts R24D (Fig. 62e) and thereby establishes an energizing circuit for the pick-up coil of relay R29 which was previously conditioned by the closing of contacts R27C during the operation #M74. R29 closes its hold contacts R29A (Fig. 62c) and thereby establishes an energizing circuit for the hold coil thereof which is under the control of the contacts CR2 which, as explained, remain closed until 15° of said second machine cycle.

R29, when energized, closed its contacts R29C (Fig. 62e) and thereby established a pick-up circuit for the interlock relay R36 which adjusts its contacts from the position shown in the drawings to stop the program tape feeding and sensing and the card feed in a manner which will be apparent from the previous description. R36 is held energized, as before, by its contacts R36B (Fig. 62c) and through cam contacts CR2.

R29, when energized, also closed its contacts R29B (Fig. 62a) which are connected in shunt with the cam operated relay contacts R30A. When R29B close, R30A are also closed and the previously mentioned hold circuit for card code set-up relay R102 is thereby established. As stated, R29 is held by CR2 which open at 15° (Fig. 61) of the second machine cycle. Consequently, when R30A open as a result of the opening of CR8 at 270° of the first machine cycle, R29B will maintain the hold circuit for R102; and, when CR8 again close at 340° of the first machine cycle, the contacts R30A will again close and thereby maintain the hold circuit for R102 until after 270° of the second machine cycle when CR8 again open and drop out R30. Thus, the card code set-up relay R102 is energized at 42° of the first machine cycle and the hold coil thereof remains energized until after 270° of the second machine cycle when CR8 open to drop out R30.

R29 closes its contacts R29D (Fig. 62e) and thereby establishes an energizing circuit for relays R225 and R226, such circuit extending across the power line as shown. The functions performed by the contacts of R226 have no bearing on the operation being described. R225 shifts its contacts A to H, inclusive, and K to N, inclusive, from their normal positions shown in Fig. 62w of the drawings. The D, G and H contacts of R225 will then connect the code wires CW4, CW7, and CW8, and the related selector magnets TSM4, TSM7, and TSM8 to the wire 1118 which, as previously explained, is connected to the positive conductor 1100 through cam contacts CR3 (Fig. 62r). The A, B, C, E, F and K to N, inclusive, contacts of R225 (Fig. 62w) will now be open and thereby disconnect the remaining code wires and related #1 translator selector magnets from control by CR3 and the contacts of the card code set-up relays R101 to R112, inclusive. It is noted that R102A (Fig. 62v) is now closed as a result of the energizing of the card code set-up relay R102. However, as just explained, the now open B contacts of R225 prevent, during this first machine cycle, the establishing of a circuit through R102A and including the selector magnet TSM2. It will therefore be apparent that when CR3 close at 220° of the first machine cycle, the selector magnets TSM4, TSM7, and TSM8 will be energized and when CR4 (Fig. 62g) close at 215° of the first machine cycle, the #1 translator clutch magnet 462 will be energized and the #1 translator 400 then operated to pull down the figures-shift key 318 (Fig. 27) of the #1 typewriter 300. The figures-shift key 318 will then trip its front cam unit 321 and thereby operate its related selector slide 653a and thereby close punch selector contacts SC1, SC2, SC4 and SC5 (Fig. 62w) and the common contacts C. This will provide a cycle of operation of the tape punch 500 in the manner previously described, during which the 1-2-4-5 code designation is punched in the 5-position tape 12 of Fig. 50. As shown, this is the code designation representing a figures-shift operation.

When relay R25 (Fig. 62d) is energized at 313° of the first machine cycle, the contacts R25C (Fig. 62e) open to drop out R27 and R27 then opens its contacts R27C to drop out the pick-up coil of R29. The hold coil of R29 (Fig. 62c) is deenergized at 15° of the second machine cycle when cam contacts CR2 open. R29 will then open its contacts R29C (Fig. 62e) in the energizing circuit for the interlock relay R36. As the hold coil of R36 (Fig. 62c) is also deenergized at this time due to the open contacts CR2, the contacts of R36 will be restored to their normal positions shown. The tape sensing and feeding circuits will therefore be established again at 313° of this second machine cycle when CR7 (Fig. 62d) close. The contacts R29D (Fig. 62e) will also open and thereby deenergize the figures-shift control relays R225 and R226 which will then restore their contacts to the position shown in the drawings. It is noted that the B contacts of R225 (Fig. 62w) will then be closed and thereby connect the code wire CW—2 and related selector magnet TSM2 to the now closed card code set-up relay contacts R102A (Fig. 62v) which, as explained previously, are connected by means of the wire 1127 and the wire 1118 to the positive conductor 1100 through cam contacts CR3 (Fig. 62r). Thus, when CR3 close at 220° of the second machine cycle, the selector magnet TSM2 of the #1 translator will become energized and when CR4 (Fig. 62q) close at 215° of the second machine cycle, the #1 translator clutch magnet 462 will become energized and the #1 translator then operates to pull down the key 311—2 (Fig. 27) on the typewriter which prints the numeral "2" and the latter character. will then be typed in character space position #19 of the invoice 11 (Fig. 57). Simultaneously with the actuation of the type bar printing the numeral "2," the related selector slide 653b (Fig. 24) will be operated to close selector contacts SC1, SC2, and SC5 (Fig. 62v) and the common contacts C and will thereby effect an operating cycle of the punch 500, during which the 1–2–5 code designation, representing the digit "2," is punched in the 5-position tape 12 of Fig. 50.

*Operation #M76—Tabulating from program tape.*—In this operation, the code hole in the #9 index point position of record column #76 of the program tape provides for energizing the tape code set-up relay R148 (Fig. 62d). R148 closes its hold contacts R148N (Fig. 62c) and thereby establishes a hold circuit therefor under the control of CR1. R148 also adjusts its contacts in the pyramid translator of Figs. 62h to 62k, inclusive, and thereby conditions an energizing circuit for the pick-up coil of the tabulating control relay R221 (Fig. 62k) which circuit is closed by CR5 (Fig. 62h) at 75° of the machine cycle. R221 closes its contacts R221F (Fig. 62c) and thereby provides a hold circuit therefor under the control of cam contacts CR2. R221 also closes its contacts R221A, R221B, and R221C (Fig. 62u) and thereby connects the code wires CW3, CW8, and CW10, through the wire 1114, the wire 1118, and cam contacts CR3 (Fig. 62r) to the positive conductor 1100. Thus, when CR3 close at 220°, circuits will be established to selector magnets TSM3, TSM8, and TSM10 of the #1 translator (Fig. 62w), and, when CR4 (Fig. 62q) close at 215°, the #1 translator clutch magnet 462 is energized with the result that the #1 translator 400 will operate to actuate the tabulating key 314 (Fig. 27) of the #1 typewriter. This will provide for a tabulating operation of the #1 typewriter carriage 310 (Fig. 25) which will move to its character space position #25 where a preset regular tab stop 332 is engaged by the end 335 of the tab lever 334 and the latter is returned thereby to the normal position shown in Fig. 25 and the typewriter carriage is therefore stopped. As previously explained, the cam unit 321 which is tripped when the tabulating key 314 of the #1 typewriter is actuated, does not operate a selector slide 653a or 653b for controlling the 5-position tape punch 500. Consequently, the punch will not be operated while the #1 typewriter carriage is being tabulated in the manner previously described.

R221, when energized, also closes its contacts R221E (Fig. 62f) and thereby conditions an energizing circuit for the tabulating interlock relay R34 which circuit is closed at 135° by the cam contacts CR6. R34 then closes its contacts R34C (Fig. 62e) and thereby establishes an energizing circuit for the interlock relay R36 which adjusts its contacts to break the circuits for sensing and feeding the program tape and prevents further feeding and sensing of the card and also breaks the circuits through the relay translator in Figs. 62h to 62k, inclusive, all of which has been fully explained hereinabove and need not be repeated here. The relay R34 also closes its hold contacts R34A (Fig. 62q) and thereby establishes a hold circuit therefor which includes the now closed contacts R229A and the tabulating interlock contacts TIC previously referred to as being mounted on the extra tab rack 337 on the back of the #1 typewriter. When the typewriter carriage 310 reaches its character space position #25 and is there stopped by the regulator tab stop 332 (Fig. 25) as explained above, a pre-set control stop CS2 in the corresponding position of the extra tab rack 337 opens the interlock contacts TIC and thereby breaks the hold circuit for the relay R34 which restores its contacts to the position shown in the drawing and drops out the interlock relay R36 in the manner previously described.

When R221 was energized by CR5 at 75°, it also closed its contacts R221D (Fig. 62c) and thereby conditioned an energizing circuit for the typewriter interlock relay R55 which circuit is closed by CR7 at 313°. R55 closes its hold contacts R55A (Fig. 62b) and thereby establishes an energizing circuit for its hold coil through contacts R36E. As explained above in operations #M44 to #M63, inclusive, the interlock relay contacts R36E are connected in shunt with the contacts R30D, and R36E close when R36 is energized and thereby provide for maintaining the hold circuit for R55 until the tabulating operation has been completed and the relay R36 deenergized by the opening of contacts R34C. If R36 is deenergized while CR8 are closed the contacts R30D will hold the circuit for R55 until after 270° of a machine cycle when CR8 open to drop out R30. It is also explained in operations #M44 to #M63, inclusive, that R55 when energized opens its interlock contacts R55C (Fig. 62q) and thereby disconnects the #1 translator clutch magnet 462 from control by contacts CR4 while the tabulating operation is being effected.

*Operation #M77—Card feed on—Punch off.—* At 313° of the machine cycle and after the interlock relay R36 is deenergized, cam contacts CR7 (Fig. 62d) close and thereby provide for sensing the 7–9 code designation in column #77 of the program tape 15 (Fig. 59b). This will effect the energizing of tape code set-up relays R146 and R148 which close their hold contacts R146N and R148N to establish hold circuits therefor under the control of cam contacts CR1 (Fig. 62c). R146 and R148 adjust their contacts in the pyramid relay translator of Figs. 62h to 62k, inclusive, and thereby condition an energizing circuit for the relay R136 (Fig. 62i) which is closed, as before, by cam contacts CR5 at 75° of the following machine cycle. R136 then closes its contacts R136A (Fig. 62i) to condition an energizing circuit for the card-feed-on relay R8 and closes its contacts R136B (Fig. 62j) to condition an energizing circuit for the pick-up coil of the punch-off control relay R237. As before, these conditioned circuits are established at 135° by the closing of cam contacts CR6 (Fig. 62f). The manner in which the relay R8 provides for turning on the card feed is fully described hereinabove under operation #M4 and the manner in which the relay R237 turns off the tape punch 500 is fully described hereinabove in operation #M6. To repeat the description of these operations at this point is believed to be unnecessary. As the #1 typewriter was turned on previously, the cam contacts CR4 (Fig. 62q) close and energize the #1 translator clutch magnet 462 at 215° of the machine cycle. As no #1 translator selector magnets are energized during this cycle, the #1 translator 400 will operate to actuate the space key 311-space on the #1 typewriter and will thereby space the carriage 310 thereof to its character space position #26.

*Operation #M78—Card feed off—Punch on—Read card column #67.—* In this operation, the 7–8 code designation in column #78 of the program tape 15 provides for energizing the tape code set-up relays R146 and R147 (Fig. 62d), which close their hold contacts R146N and R147N (Fig. 62c) and thereby establish hold circuits therefor under the control of CR1. R146 and R147 also shift their contacts in the pyramid relay translator network of Figs. 62h to 62k, inclusive, and thereby condition an energizing circuit for the relay R129 (Fig. 62h), the latter being closed at 75° by CR5 in the manner previously explained. R129 closes its contacts R129A (Fig. 62j) and thereby conditions are energizing circuit for the punch-on relay R7, and R129 also closes its contacts R129B and thereby conditions an energizing circuit for the card-feed-off relay R9. These conditioned circuits are closed by cam contacts CR6 at 135° in the manner previously explained. The manner in which the punch is turned on by the energizing of relay R7, was fully described hereinabove in operation #M2 and need not be repeated here. Also, the manner in which the card feed is turned off by the energizing of the relay R9 was described in detail in operation #M5.

In the previous operation, #M77, the card feed was turned on and the tooth of the card-feed clutch engaged at the end of such cycle. Consequently, in this operating step, card column #67 (Fig. 52) is sensed which contains a code hole in the #1 index point position thereof. In the manner previously explained, this will provide for energizing the card code set-up relay R101 (Fig. 62a) and the latter will close its contacts R101A (Fig. 62v) and thereby connect the code wire CW1 to the cam contacts CR3 by the wires 1127 and 1118. Thus, when CR3 close at 220°, the corresponding selector magnet TSM1 (Fig. 62w) is energized and when CR4 (Fig. 62q) close at 215°, the #1 translator clutch magnet 462 is energized. This will provide for an operation of the #1 translator 400 in the manner previously explained, during which the key 311-1 (Fig. 27) fron printing the numeral "1" will be pulled down. As the punch is turned on during this operation by the energizing of the relay R7, the selector slide 653a operated by the actuation of the key 311-1, as just explained, closes selector contacts SC1, SC2, SC3 and SC5 and common contacts C and thereby effects an operating cycle of the tape punch 500 during which the 1–2–3–5 code designation is punched in the 5-position tape 12 of Fig. 50. This is the code designation for the numeral "1." The typewriter will print the numeral "1" in character space position #26 of the invoice and will space to the character space position #27.

*Operation #M79—Punch off.—* The 8–12 code designation in column #79 of the program tape will provide for energizing the punch-off control relay R237, the same as in previously described reading operations of the program tape. The manner in which the relay R237 turns off the punch is fully described hereinabove in operation #M6 and need not be repeated at this point. No #1 translator selector magnets (Fig. 62w) are energized as the card feed was turned off in the previous operation. As the #1 typewriter is still turned on, cam contacts CR4 will effect the energizing of the #1 translator clutch magnet and thereby space the carriage to character space position #28.

*Operation #M80—Card feed on.—* In this operation the code hole in the #7 index point position of column #80 of the program tape 15 provides for energizing the card-feed-on relay R8. The manner in which this relay performs its function of turning on the card feed is described in detail hereinabove in operation #M4. The cam contacts CR4 close at 215° to energize the #1 translator clutch magnet 462 and thereby provide for spacing the carriage to its character space position #29.

*Operation #M81—Punch on—Read card column #68.*—The 8–11 code designation in column #81 of the program tape provides for energizing the relay R7, which, in the manner previously explained in operation #M2, turns on the tape punch. As the card feed was turned on in the previous operating step, column #68 of the card MC—1 (Fig. 52) is read as a part of this operating step. As column #68 contains a code hole in the #3 index point position the card code set-up relay R103 (Fig. 62a) will be energized in the manner previously explained and R103 will close its contacts R103A (Fig. 62v) and thereby connect the code wire CW3 to cam contacts CR3 by the wires 1127 and 1118. Thus, when CR3 close at 220° of the machine cycle, the #1 translator selector magnet TSM3 is energized and when CR4 close at 215° (Fig. 62q), the #1 translator clutch magnet 462 is energized. This will provide for an operation of the #1 translator 400 which will actuate the key 311-3 (Fig. 27) for printing the numeral "3." The numeral "3" will be printed in character space position #29 of the invoice 11 of Fig. 57. The related selector slide 653b (Fig. 24) will be operated and will close punch selector contacts SC1 and the common contacts C which will effect an operating cycle of the punch 500, during which a code hole is punched in the #1 code position of the 5-position tape 12 of Fig. 50. This is the designation representing the numeral "3."

*Operation #M82—Read card column #69.*—In this operation, card column #69 is read and the numeral "6" printed in character space position #30 of the invoice and the 1–3–5 code designation punched in the 5-position tape 12 of Fig. 50 in a manner which will be fully understood from the previous description.

*Operation #M83—Card feed off—Read card column #70.*—The card feed is turned off in response to the sensing of a code hole in the #8 index point position of record column #83 of the program tape 15. This designation provides for energizing the relay R9 which will turn off the card feed in the same manner as described above in operation #M5. As explained previously, the card feed clutch CFC is not disengaged until the end of a machine cycle. Consequently, card column #70 is read during this cycle. As shown in Fig. 52, this column contains a code hole in the #2 index point position. The latter will provide for operating the #1 translator to print the numeral "2" in character space position #31 of the invoice 11 of Fig. 57 and to punch the 1–2–5 designation in the 5-position tape 12 of Fig. 50. The latter designation is the one representing the numeral "2."

*Operation #M84—Tabulating from program tape.*—In this operation the #1 typewriter is tabulated in response to the sensing of a code hole in the #9 index point position of the record column #84 of the program tape. The manner in which this tabulating operation is effected is described in detail hereinabove in operation #M76 and need not be repeated at this point. The carriage of the #1 typewriter will tabulate to its character space position #38 where a pre-set regular tab stop 332 (Fig. 25) will engage and restore the tab lever 334 to its normal position shown and thereby stop the typewriter carriage 310. A preset control stop CS2 in the corresponding character space position of the extra tab rack 337 on the #1 typewriter operates the interlock contacts TIC to drop out the hold coil of the relay R34 (Fig. 62q) which restores its contacts to the position shown in the drawing and thereby drops out the interlock relay R36 in the same manner as fully disclosed hereinabove.

*Operation #M85—Card feed on—Punch off.*—In this operation, the 7–9 code designation in column #85 of the program tape provides for energizing the card-feed-on relay R8 and the punch-off control relay R237 as described hereinabove in operation #M77. The manner in which the relay R8 turns on the card feed is described in detail in operation #M4 and the manner in which R237 turns off the punch is described above in operation #M6. In this operation CR4 will close at 215° and thereby energize the #1 translator clutch magnet 462 which will actuate the key 311-space and thereby space the carriage of the #1 typewriter to character space position #39 in the same manner as previously described.

*Operations #M86, #M87, and #M88—Read card columns #71, #72, and #73.*—In these operations columns #71, #72 and #73 of the master card MC—1 are sensed successively and the #1 typewriter operated to type the characters "O," "P," and "E" in character space positions #39, #40, and #41, respectively, of the invoice 11 of Fig. 57.

*Operation #M89—Card feed off—Read card column #74.*—In this operation the card feed is turned off by the energizing of relay R9 from a code hole in the #8 index point position of column #89 of the program tape 15. The manner in which this function is performed is described hereinabove in operation #M5. As the card feed clutch is not disengaged until the end of the machine cycle, column #74 of the card MC—1 is read and the #1 typewriter operated in response thereto to type the character "N" in character space position #42 of the invoice, and then to space the carriage to its space position #43.

*Operations #M90 and #M91.*—In these operations the blank record columns #90 and #91 of the program tape are sensed in succession, and, as the #1 typewriter is turned on, cam contacts CR4 will provide for energizing the #1 translator clutch magnet 462 during each machine cycle, with the result that the carriage 310 will be spaced to its character space position #44 and then to its position #45.

*Operation #M92—Card feed on.*—In this operation, the card feed is again turned on by the energizing of the relay R8 from a code hole in the #7 index point position of column #92 of the program tape 15 and in the same manner as described hereinabove in operation #M4. As the #1 typewriter is still turned on, the cam contacts CR4 will again provide for spacing the carriage 310 thereof to its character space position #46.

*Operations #M93 to #M96—Read card columns #75 to #78.*—In these operations columns #75 to #78 of the card MC—1 are read successively and the characters "D," "E," "A," and "L" printed in character space positions #46, #47, #48, and #49, respectively, of the invoice 11, and in the same manner as previously described.

*Operation #M97—Card feed off—Read card column #79.*—In this operation the card feed is turned off by energizing the relay R9 from the

8 code hole in column #97 of the program tape. During the same operating step, column #79 of the master card MC—I is read and the character "R" printed in character space position #50 of the invoice.

*Operation #M98—Tabulating from program tape.*—In this operation the #1 typewriter is tabulated in response to the sensing of a code hole in the #9 index point position of record column #98 of the program tape 15. This operation is identically the same as described hereinabove in operation #M76, and a repetition of the details thereof at this point is unnecessary. The typewriter carriage will tabulate to character space position #53 of the invoice 11 where the carriage is stopped by a pre-set regular tab stop 332 (Fig. 25), as will be fully understood from the previous description.

*Operation #M99.*—In this operation the blank column #99 of the program tape is sensed and as no code designations are recorded therein, CR4 will energize the #1 translator clutch magnet at 215° and thereby provide for actuating the key 311-space and spacing the #1 typewriter to its character space position #54.

*Operation #M100—#1 Typewriter off.*—In this operation the 7-12 code designation in column #100 of the program tape provides for energizing the relay R4 which turns off the #1 typewriter 300 by dropping out the #1 typewriter-on relay R3. This is fully explained above in operation #M4.

*Operation #M101—Storage test.*—The tape will space to column reading position #101 wherein the 10-11 code designation is read. This is the storage test designation and the purpose thereof is to stop operation of the illustrated embodiment in the event the operator has not stored the customer's order number and invoice page number by this time. The sensing of the 10-11 designation in the tape 15 results in energizing the storage test relay R2 (Fig. 62k) when the contacts CR5 close. This relay closes its hold contacts R2A (Fig. 62e) and will thereby establish an energizing circuit for its hold coil provided the contacts R17H and R47C are closed. As explained previously, the relay R47 was energized simultaneously with the storing of the digit "1" in order bank PN—1 (Fig. 62q) and R47 is now held energized through its hold contacts R47A (Fig. 62b). Consequently, the normally closed contacts R47C (Fig. 62e) are now open and the just described hold circuit for the relay R2 can not now be established. Therefore, the pick-up coil of relay R2 will drop out at 278° of the cycle with the opening of the cam contacts CR5 and the tape 15 will then space to its column reading position #102.

For the purpose of describing the operation in #M101 when the operator has neglected to store the order and page number at this point, assume that the relay R47 is not now energized. In such a condition, when the hold circuit for the relay R2 is established through the normally closed contacts R47C (Fig. 62e), a parallel circuit path is also established to energize the interlock relay R36. The latter circuit extends from the positive conductor 1100, through R47C, assumer to be closed, the wire 1150, contacts R2C, now closed as R2 is energized, and through the pick-up coil of R36 to the negative conductor 1101. As will be apparent from the foregoing description, the interlock relay R36 will then adjust its contacts to stop the tape reading and the tape spacing operations and to prevent the card from being fed. When the operator stores the order number and page number in the manner previously explained, the relay R47 will become energized, and will then open its contacts R47C to break the hold circuit for the storage test relay R2 and the pick-up coil of the interlock relay R36. The apparatus will then be restored to its normal operating condition as will be obvious from the previous description.

*Operation #M102—Punch on.*—In this operation, the 8-11 code designation in column #102 of the program tape, provides for energizing the punch-on relay R7 through the cam contacts CR5. The relay R7 will then function to turn on the tape punch in the same manner as described hereinabove in operation #M2.

*Operation #M103—#1 Typewriter on—Readout customer's order number, 6th position.*—This operation is effected under the control of the 10-11-12 code designation recorded in column #103 of the program tape 15. This is the code designation for turning on the #1 typewriter and for reading out any digit value stored in the 6th position or highest order bank CO—6 of the customer's order section of the relay storage unit. In a manner which will be obvious from the previous description, the sensing of the code designation 10-11-12 energizes the tape code set-up relays R149, R150, and R151, and the contacts of these relays are adjusted in the relay translator network of Figs. 62h to 62k, inclusive, to condition an energizing circuit for R132 (Fig. 62k), and this conditioned circuit is closed at 75° by cam contacts CR5. The relay R132 closes its contacts R132A (Fig. 62i) to condition an energizing circuit for the #1 typewriter-on relay R3 and closes its contacts R132B (Fig. 62i) to condition an energizing circuit for the readout control relay R128. These conditioned circuits for R3 and R128 are closed at 135° by the cam contacts CR6. The relay R3 turns on the #1 typewriter in the same manner as fully explained hereinabove in operation #M5 and consequently there is no need of repeating the description at this point.

The readout control relay R128 closes its hold contacts R128D (Fig. 62b) to establish a hold circuit therefor which includes the wire 1151 and the relay contacts R30A (Fig. 62a). As explained above, the relay R30 is controlled by the cam contacts CR8 which are closed from 340° of one cycle to 270° of the next (Fig. 61). Thus, the hold circuit for R128 is now maintained until after CR8 open at 270° to drop out R30. R128 also closes its contacts R128B (Fig. 62g) and thereby provides an energizing circuit for the pick-up coil of the space control relay R220 which is under the control of CR6. The latter circuit is traced as follows: from the positive conductor 1100 (Fig. 62f); through CR6; the wire 1112; the wire 1152 (Fig. 62g); the wire 1153; contacts R128B, now closed; contacts R214A, now transferred as the space relay R214 in order bank CO—6 (Fig. 62n) is energized; the wire 1147, and the pick-up coil of R220 to the negative conductor 1101. R220 is held energized by its hold contacts R220F (Fig. 62c) and cam contacts CR2.

The readout control relay R128 also closes its contacts R128A (Fig. 62r) for the purpose of reading out any digit value which is stored in the highest order bank CO—6 of the storage unit. As shown, the closed contacts R128A connect the wire 1118 and contacts CR3 to the pyramid network COP—6, the latter corresponding to the order bank CO—6, as previously explained. As shown, the output circuit wires of the pyramid network COP—6 are connected to the code wires CW1 to CW10, inclusive. As the stored customer's order number "13" contains no 6th order digit, none of the digit representing relays of the order bank CO—6 are energized and the contacts of these relays in COP—6 (Fig. 62r) are in the position shown. Consequently, the closing of R128A does not condition a readout circuit through COP—6 which includes one of the code wires CW1 to CW10, inclusive. The subsequent closing of CR3 will, therefore, not energize any of the translator selector magnets in Fig. 62w. When CR4 (Fig. 62q) close at 215°, an energizing circuit will be established for the #1 translator clutch magnet 462. Consequently, the #1 translator will actuate the key 311-space of the typewriter 300 and thereby effect a spacing operation of the carriage to its character space position #55. The operation of the space key will cause the corresponding selector slide 653a to be operated and thereby close the punch selector contacts SC3 (Fig. 62v) and the common contacts C which will effect an operating cycle of the punch 500 during which the space code designation is punched in the 5-position tape 12 of Fig. 50.

The space control relay R220 (Fig. 62g), which was energized as explained above, provides for conditioning circuits which effect the automatic punching of the figures-shift code designation in the 5-position tape before the punching of the code designation representing the first significant digit of the order number. As described hereinafter in operation #M107, the figures-shift designation is automatically punched during the operating step when the first significant digit of the order number is read out. R220 accomplishes its function in the present operating step when attempting to read out the sixth position of the order number, in the same manner as it did previously in operation #M74 in connection with the reading of blank column #65 of card MC—1. In this operation, the relay R220 closes its contacts R220D (Fig. 62d) and thereby establishes an energizing circuit for the pickup coil of the space-test relay R27. R27 closes its contacts R27B (Fig. 62e) and thereby establishes a holding circuit therefor extending across the power line and including the normally closed contacts R25C. Thus R27 will now remain energized until R25C are opened. R27C also close and condition an energizing circuit for the figures-shift control relay R29. The latter conditioned circuit is now open at R24D. As there is no digit value stored in the order bank CO—6 being read out in this machine cycle, the relay R220 does not interfere with the normal spacing and punching operations described above. Its function will be explained in detail hereinbelow in operation #M107 in connection with the reading out of the first digit of the customer's order number.

*Operation #M104—Readout order number 5th position.*—In this operation, the 7-9-12 designation provides for the energizing of readout control relay R127 (Fig. 62i) under the control of CR5 in the same manner as the tape reading operations previously described. R127 closes its contacts R127D (Fig. 62b) to establish a hold circuit therefor through cam controlled relay contacts R30A (Fig. 62a). Readout control contacts R127A (Fig. 62r) close and thereby provide for connecting the cam contacts CR3 with the pyramid network COP—5 which corresponds to the fifth position order bank CO—5 of the relay storage unit. As none of the relays R166 to R169, inclusive, composing this order bank CO—5 (Fig. 62n), are now energized, a circuit can not be established by CR3 through R127A to any of the translator code wires and consequently none of the #1 translator selector magnets will be energized. Thus, when CR4 close and energize the #1 translator clutch magnet 462 (Fig. 62q), the space key of the typewriter will again be actuated and the typewriter carriage spaced to character space position #56. The actuation of the space key will again effect an operating cycle of the punch 500, during which the space code designation is punched in the 5-position tape 12 of Fig. 50.

R127 also closes its contacts R127B (Fig. 62g) and as space relay contacts R215A are now transferred due to the fact that the space relay R215 of the order bank CO—5 (Fig. 62n) is now energized, a circuit will again be established through cam contacts CR—6 and including the pick-up coil of the space control relay R220. R220 will again be held for the purpose of picking up the space test relay R27. However, as this relay R27 was picked up during the previous operation #M103 and is now held across the line through its contacts R27B (Fig. 62e), the energizing of the space control relay R220 during this operating step has no further effect on the operation of the apparatus.

*Operation #M105—Readout order number 4th position.*—When the control tape 15 spaces to column reading position #105, the code designation 7-10-11 is read and when the cam contacts CR5 close, an energizing circuit is established for the storage readout relay R126 (Fig. 62i). R126 will close its hold contacts R126D (Fig. 62b) to establish through the wire 1151 a hold circuit therefor under the control of R30A (Fig. 62a). R126 will also close its readout contacts R126A (Fig. 62r) and will thereby attempt to condition a digit readout circuit through the pyramid network COP—4 corresponding to the 4th position order bank CO—4 (Fig. 62o); but, as none of the digit-representing relays R170 to R173, inclusive, of such order bank, have been energized, no circuit can be established through R126A to the translator code wires when the cam contacts CR3 close at 220° of the cycle. Consequently, the closing cam contacts CR4 (Fig. 62q) will energize the #1 translator clutch magnet 462 and thereby effect another space operation of the #1 typewriter and the punching of another space code designation in the 5-position tape 12 of Fig. 50. The typewriter carriage will space to character space position #57. The contacts R126B (Fig. 62g) will close and again pick up the space control relay R220 through the now closed points of the space relay contacts R215A; but, as in the previous cycles, this will not affect the present operation as the space-test relay R27 is already energized.

*Operation #M106—Readout order number 3rd position.*—When column #106 of the tape 15 is moved into reading position, the 7-10-12 code designation therein provides for energizing the storage readout relay R125 (Fig. 62i) in the manner previously described. The operation of the #1 typewriter 300 and the tape punch 500 will be the same during this cycle as in the two previously described readout operations, because none of the digit-representing relays R174 to R177 of the 3rd position order bank CO—3 (Fig. 62o) is energized and R125A (Fig. 62r) cannot therefore condition a readout circuit including CR3 and any of the code wires CW1 to CW10, inclusive. CR4 will effect the spacing of typewriter carriage to its character space position #58 in the same manner as in the previous readout operations.

*Operation #M107—Readout order number 2nd position — Automatic punching figures-shift code.*—Provision is made as a part of this operating step for automatically punching the figures-shift code designation in the 5-position tape 12 before reading out the 2nd position order bank CO—2 (Fig. 62p) wherein is stored the first significant digit of the customer's order number. As described hereinabove, the first significant digit of the stored order number is the numeral "1" which is stored in the order bank CO—2. Consequently, the figures-shift designation will be automatically punched ahead of the printing and punching of the numeral "2." The apparatus was conditioned to effect this operation during the previously described operating step #M103 by the energizing of relay R220 and the relay R27, the latter being now held energized by its contacts R27B (Fig. 62e) and the normally closed contacts R25C. Also, the now closed contacts R27C (Fig. 62e) condition an energizing circuit for the figures-shift control relay R29.

When the program tape spaces to bring its column #107 into sensing position, the code designation 7-11-12 therein is sensed and the latter provides for energizing the storage readout relay R124 (Fig. 62i) under the control of the cam contacts CR5, as before. R124 closes its hold contacts R124D (Fig. 62b) to establish a holding circuit therefor through the wire 1151 and the cam controlled relay contacts R30A (Fig. 62a). R124A (Fig. 62s) also close to provide for reading out, under the control of CR3, the stored digit in the pyramid network COP—2 corresponding to the 2nd position order bank CO—2 (Fig. 62p). However, the stored digit will not be read out during the same machine cycle in which R124 is energized, as will presently appear.

R124, when energized, also closes its contacts R124B (Fig. 62g) which, when CR6 (Fig. 62f) close at 135°, provides for energizing the pick-up coil of figures-shift control relay R24 (Fig. 62g) through the normally closed points of R218A and circuit wire 1149. R24 is held energized through R24A (Fig. 62c) and CR2. R24B (Fig. 62d) will then close to condition an energizing circuit for the pick-up coil of R25 which, as explained hereinabove, is under the control of CR7 which close at 313°. R25 will then open its contacts R25C (Fig. 62e) and thereby drop out the hold coil of the space-test relay R27. R24 also closes its contacts R24D and thereby picks up the figures-shift control relay R29, the circuit for which was previously conditioned in operation #M103 by the closing of R27C. R29 is held energized through its hold contacts R29A (Fig. 62c) and CR—2.

R29 closes its contacts R29B (Fig. 62a) which, as explained previously, are connected in shunt with R30A and are in the hold circuit for storage readout relay R124 (Fig. 62b). It is noted that R30A open when R30 is deenergized by CR8 at 270° of the machine cycle, and that R29B stay closed to keep R124 energized until CR2 opens at 15° of the following cycle, and that before R29B open at 15°, CR8 closes again to pick up R30 and R30A reclose so as to maintain the holding circuit for R124 until 270° of the following cycle. Therefore, R124 is held energized from 75° of one machine cycle until 270° of such following cycle.

R29 closes its contacts R29C (Fig. 62e) to energize the interlock relay R36 which, as before explained, opens the reading and spacing circuits for the program tape 15 and prevents operation of the card feed clutch CFC.

R29 also closes its contacts R29D (Fig. 62e) and thereby picks up the figures-shift relays R225 and R226. R226 opens its contacts R226A (Fig. 62d) to prevent the energizing of relays R222 and R232 which control other operations of the punch not pertinent to the present description. R225 opens its contacts A, B, C, E, F, K, L, M, and N (Fig. 62w) and transfers its D, G, and H contacts and thereby disconnects all of the code wires CW1 to CW10, inclusive, from control through the pyramid networks of Figs. 62r, 62s, and 62t and connects the code wires CW4, CW7, and CW8 directly to the circuit wire 1118 which is under the control of cam contacts CR3 (Fig. 62r). Consequently, when CR3 close at 220°, energizing circuits are established for the #1 translator selector magnets TSM4, TSM7, and TSM8; and, when the cam contacts CR4 (Fig. 62q) close at 215° to energize the #1 translator clutch magnet 462, the #1 translator will operate to actuate the figures-shift key 318 (Fig. 27) of the #1 typewriter. The actuation of the figures-shift key 318 provides for an operating cycle of the punch 500 during which the figures-shift code designation is punched in the 5-position tape 12 of Fig. 50 in the manner previously described.

Since R225 is picked up by R29D (Fig. 62e) and R29 is picked up by R24D, R24 being energized by CR6 at 135° of the cycle in which R124 is energized; the contacts A to H, inclusive, and K to N, inclusive, of R225 (Fig. 62w) are actuated in the manner previously described before CR3 close at 220°. Thus, the circuit path through the network COP—2 (Fig. 62s) and including readout relay contacts R124A can not be established during this first machine cycle of operation #M107 and the #1 translator 400 is operated to effect punching of the figures-shift code designation in the 5-position tape 12, as described.

As R29 and R24 are held energized by CR2 (Fig. 62e), they drop out at 15° of the following or second machine cycle. R29D (Fig. 62e) then open to drop out R225 and R226, and R29C (Fig. 62e) open to drop out the interlock relay R36 which restores its contacts to their normal position shown. The contacts A to H, inclusive, and K to N, inclusive, of R225 (Fig. 62w) are then restored to their normal position shown, so that the code wires CW1 to CW10 reconnect the corresponding selector magnets of the #1 translator to the pyramid networks of the order banks in Figs. 62r, 62s, and 62t. As explained, the hold coil of R124 (Fig. 62b) remains energized through R30A (Fig. 62a) until after 270° of such following or second machine cycle when CR8 open to drop out R30. Consequently, the contacts R124A (Fig. 62s) remain closed until after 270° of such second cycle. Also, as the digit "1" is stored in the order bank CO—2, as explained hereinabove, the storage relay R178 is now energized, and its contacts R178A in the corresponding pyramid network COP—2 (Fig. 62s) are now in shifted position where they condition a circuit path through the network and terminating in the code wire CW1. This circuit path extends from the now closed contacts R124A and includes the A contacts of R178 in their shift position, the A contacts of R179 in their normal position, the A contacts of R180 in normal position, the A contacts of R181 in their normal position, the #1 code wire CW1, the A contacts of R225 (Fig. 62w) now closed, the A contacts of R228 now closed, and the #1 translator selector magnet TSM1. Thus, when CR3 close at 220° of the machine cycle following the one in which the figures-shift code designation was punched in the 5-position tape, the conditioned circuit just traced will be established; and, when CR4 close at 215°, the #1 translator 400 will actuate the key 311-1 (Fig. 27) for printing the numeral "1." The numeral "1" will be printed in character space position #58 of the invoice. Simultaneously with the printing operation, the punch 500 will be operated to punch the code designation for the numeral "1" in the 5-position tape 12 of Fig. 50 in the same manner as previously described.

*Operation #108—Readout order number 1st position.*—As stated previously, when relay R29 drops out, it opens its contacts R29C (Fig. 62e) and thereby drops out the interlock relay R36 which restores its contacts to their normal position shown. When R36 was energized, the program tape was stopped in position to read its column #108 and consequently, at 313° of the machine cycle in which the numeral "1" is printed on the invoice 11, the cam contacts CR7 establish a sensing circuit through column #108 of the program tape and read the code designation 8-9-10 recorded therein, in the manner previously described. Thus, when cam contacts CR5 close at 75° of the next cycle, the relay R123 (Fig. 62j) will be energized. R123 will close its readout control contacts R123A (Fig. 62s) and will thereby condition a circuit through the network COP—1 for reading out the numeral "3" stored in the 1st or units order bank CO—1, which circuit is closed at 220° by the cam contacts CR3. As will be recalled, the numeral "3" was stored by energizing storage relays R182 and R183 of the units order bank CO—1 (Fig. 62p). Consequently, their contacts in the corresponding pyramid network COP—1 (Fig. 62s) are now in adjusted or operated position. When CR3 close, a circuit is established thereby including the wire 118, readout contacts R123A now closed, the A contacts of R182 now transferred, the A contacts of R183 now transferred, the code wire CW3, and the translator selector magnet TSM3 (Fig. 62w). When CR4 (Fig. 62q) close, an energizing circuit will be established for the #1 translator clutch magnet 462 and the #1 translator will be operated to actuate the typewriter key 311-3 (Fig. 27) for printing the numeral "3" and the latter will be printed in character space position #59 of the invoice 11 of Fig. 57. Simultaneously therewith, the punch 500 will be operated in the manner previously described to punch the code designation for the numeral "3" in the 5-position tape 12 of Fig. 50.

*Operation #M109—Punch off.*—In this operation, the 8-12 code designation in column #109 of the program tape 15 provides for energizing the punch-off relay R237 (Fig. 62j) under the control of cam contacts CR5. R237 then effects the turning off of the 5-position tape punch in the same manner as explained hereinabove in operation #M6.

As the #1 typewriter is now turned on, its carriage will be spaced to character space position #61 when cam contacts CR4 close at 215° of the cycle and energize the #1 translator clutch magnet 462.

*Operations #M110 to #M113.*—In these operations the program tape 15 is spaced during successive machine cycles to column reading positions #110, #111, #112, and to #113. As shown in Fig. 59b, no code designations are recorded in the master side of columns #110 to #113, inclusive, of the tape, and consequently no controls will be effected therefrom. During each of the four successive cycles, the #1 typewriter carriage will be spaced when the cam contacts CR4 close at 215° and energize the #1 translator clutch magnet 462. The carriage will therefore be spaced four times and to its #65 character space position.

*Operation #M114—Readout invoice page number—2nd Position.*—In this operation, the 8-9-11 code designation in column #114 of the program tape 15 provides for energizing the readout control relay R122 (Fig. 62j) under the control of cam contacts CR5. The hold coil of R122 (Fig. 62b) will be energized through its hold contacts R122D and the cam control relay contacts R30A (Fig. 62a). R122 will close its readout control contacts R122A (Fig. 62s); but, as no digit has been stored in the order bank PN—2 (Fig. 62q) corresponding to pyramid network PNP—2 (Fig. 62s), no circuit path has been conditioned therethrough, and, when CR3 close, none of the #1 translator selector magnets (Fig. 62w) will become energized. When CR4 (Fig. 62q) close, the clutch magnet 462 for the #1 translator will become energized in the manner previously explained and the translator 400 will actuate the space bar 311-space on the #1 typewriter and thereby cause its carriage to space to its character space position #66.

*Operation #M115—Readout page number—1st Position—Storage shift control.*—In this position, the 8-9-12 code designation in column #115 of the program tape provides for energizing the readout control relay R35 (Fig. 62j) under the control of CR5. R35 closes its readout contacts R35C (Fig. 62s) so that when cam contacts CR3 close at 220°, a circuit will be established through pyramid network PNP—1 corresponding to the units order bank PN—1 wherein is stored the numeral "1." This conditioned circuit includes the A contacts of R190 now transferred, the A contacts of each of relays R191, R192, and R193 and also includes the code wires CW1 and the #1 translator selector magnet TSM1 (Fig. 62w). Therefore, when CR4 close, the #1 translator clutch magnet 462 effects operation of the translator to actuate the key 311-1 (Fig. 27) for printing the numeral "1" in character space position #66 of the invoice.

In this operating step #M115, provision is also made to condition the third section of the relay storage unit for manually storing the quantity number of the part ordered, which part corresponds to the next detail card to be fed into the receiving slot 104 of the card reading unit 100. As previously explained, the third section of the relay storage unit comprises the order banks QN—A to QN—D, inclusive, (Figs. 62n and 62o), and their corresponding pyramid networks QNP—A to QNP—D, inclusive (Fig. 62t). The third section is conditioned at this time so that the operator can store the quantity number of the ordered part represented by the first detail card DC—1 (Fig. 54) to follow, while the apparatus is finishing its automatic operation under the control of the master card MC—1 (Fig 52). The control for the conditioning of the quantity number section of the relay storage unit is effected by contacts of the relay R35 which, as just described, also provide for reading out the units order of the page number.

When R35 was energized, it also closed its contacts R35D (Fig. 62n) and thereby established an energizing circuit for the pick-up coil of R161 which extends across the power line, as shown. R161 closes its hold contacts R161F and thereby establishes an energizing circuit for the hold coil thereof extending from the positive conductor 1100 through the normally closed contacts R12C, the wire 1128, the normally closed reset relay contacts R19C, and through the now closed hold contacts R161F and hold coil of R161 to the negative conductor 1101. The relay R161 is termed the storage shift control relay and provides, when energized, for disconnecting the pick-up coils of the relays of order banks CO—6 to CO—1, inclusive, PN—2 and PN—1 from the above described storage entering circuit paths, including the ball contacts BC (Fig. 62m), the wire 1134, the contacts R38G, the contacts of the sequence control relays R40, R41, R42, etc. and contacts of the entry control relays R50 and R51, and the relay R161 also provides for connecting such entering circuit paths to the pick-up coils of the relays of the order banks QN—A to QN—D, inclusive. R161, when energized, transfers its contacts R161A, R161B (Fig. 62n), R161C and R161D (Fig. 62o) from their respective positions shown, and also opens its contacts R161E (Fig. 62o).

The relay R35 also transfers its contacts R35A (Fig. 62b) and thereby drops out the hold coil of sequence control relay R47 and establishes an energizing circuit for the pick-up coil of the storage conditioning relay R38. R38 is then held energized across the power line through its hold contacts R38A (Fig. 62m) and the normally closed contacts R41C of sequence control relay R41. Contacts R38C close and thereby condition the order bank QN—A (Fig. 62n) of the quantity number section of the relay storage unit, for storing the highest order of the quantity number under the control of the auxiliary keyboard 302 (Fig. 27). Relay R47, when deenergized by the transferring of R35A, returns its contacts to their normal position shown. R47B (Fig. 62m) open to drop out R39 and R39A (Fig. 62p) reclose. R47C (Fig. 62e) reclose to permit the energizing of the hold coil of storage-test relay R2 and the interlock relay R36 in the manner previously explained in operation #M101.

From the foregoing, it is apparent that the operator can now store the quantity number of the part represented by the first detail card DC—1 to follow the master card MC—1 being read, by operating the keys of the auxiliary keyboard 302. This will be described hereinafter under the heading "Storing the quantity number."

Operation #M116—Carriage return under control of the program tape.—In this operation, the #10 code hole designation in column #116 of the program tape 15 provides for energizing the carriage return control relays R224 and R33 (Fig. 62f) under the control of cam contacts CR5. As was fully explained hereinabove in operation #M65, these relays R224 and R33 provide for a carriage-return operation of the #1 typewriter carriage 310, during which the platen is automatically line spaced. A duplication of the description of this operation at this point is believed to be unnecessary.

Operation #M117—Card feed on, #1 typewriter off.—In this operation, the 11–12 code designation in column #117 of the program tape 15 provides for turning on the card feed by energizing the relay R8 (Fig. 62i) which in turn energizes card-feed clutch magnet CFM (Fig. 62e) and also provides for turning off the #1 typewriter 300 by energizing the relay R4 (Fig. 62i). These functions are performed in identically the same manner as fully described hereinabove in operation #M4.

Operation #M118—Card feed off, master card class control—Read card column #80.—In this operation, the 7–8–9–11 code designation in column #118 of the program tape provides for turning off the card feed; provides, in conjunction with column #80 of the card, for determining the class of customer to which the invoice is addressed; and provides, in case the customer is a non-dealer customer as distinguished from a dealer customer, for conditioning certain circuits in the apparatus, which circuits provide when subsequent detail cards are read for omitting certain preferred price data from the invoice.

The 7–8–9–11 designation in column #118 of the tape 15 provides for energizing R113 (Fig. 62h) under the control of CR5 in the manner previously explained. R113C (Fig. 62j) close and provide for energizing the card-feed-off relay R9 under the control of CR6 which function is performed in the same manner as described hereinabove in operation #M5. The card feed clutch CFC is disengaged and card movement is stopped at the end of the machine cycle, as explained previously. However, card column #80 is sensed during the first part of such machine cycle.

R113 opens its contacts R113A (Fig. 62f) and thereby prevents the energizing of skip control relays R233 and R223 should card column #80 contain a code hole in the #11 index point position. As explained previously under the sub-heading "Operations #M44 to #M63," a #11 code hole in the card is normally used herein to provide a card and tape skipping operation. In the operation being described the 11 hole in the master card is used in conjunction with the relay R113 to signify the class of customer to which the invoice is addressed. Hence, the relay contacts R113A (Fig. 62f) prevent during this operating step, the skipping operation normally effected by the #11 hole in the card.

R113 closes its contacts R113B (Fig. 62g) and thereby conditions an energizing circuit for the pick-up coil of class control relay R64, which circuit also includes the normally open contacts R111L of the card code set-up relay R111 and is under the control of cam contacts CR6 (Fig. 62f) and includes the circuit wires 1112 and 1152. Thus, when the card column #80 of the master card contains a #11 code hole, the relay R111 (Fig. 62a) will be energized and its contacts R111L (Fig. 62g). in conjunction with R113B, will complete the pick-up circuit for R64 when CR6 close. As shown in Fig. 52, the column #80 of the master card MC—1, now being read, is blank. Consequently, the relay R111 is not energized during the operating step being described, R111L will not be closed and the class control relay R64 will not become energized.

From the foregoing, it is apparent that the class to which the customer belongs is determined by the presence or absence of a #11 code hole in column #80 of the card MC—1. It is noted that the master card MC—2 of Fig. 53 contains a code hole in the #11 index point position of its column #80. This identifies the customer as a non-dealer customer who is not entitled to the discount allowed the regular dealer customers. Consequently, when preparing an invoice in response to an order received from the non-dealer customer of Fig. 53, the class control relay R64 is energized by the circuits previously described. R64 will then close its hold contacts R64B (Fig. 62b) and thereby establish an energizing circuit for its hold contacts across the power line and including the normally closed points of transfer contacts R12D. As explained above in operation #M8, the R12 relay is energized in response to the sensing of a 10-12 code designation in column #8 of the master side of the program tape and provides for conditioning the relay storage units for receiving the customer's order number and page number. Thus, with relay R64 energized as a result of a #11 code hole in card column #80 of the master card MC—2, R64 will remain energized while reading all of the following detail cards and until operation #M8 of the next master card to be read. As will be explained more fully hereinafter in operation #D67, the contacts of R64, provide for skipping over the net price field of the detail card DC—1 and thereby prevent the printing of such net price on the invoice going to the non-dealer customer of card MC—2.

*Operation #M119—Tape off.*—In this operation, the 9-12 code designation in column #119 of the program tape provides for the energizing of tape code set-up relays R148 and R151 (Fig. 62d) and these relays close their hold contacts R148N and R151N (Fig. 62c), respectively, to establish hold circuits therefor under the control of CR1. R148 and R151 adjust their contacts in the relay translator network of Figs. 62h to 62k, inclusive, and thereby condition an energizing circuit through the network including the tape-off relay R11 (Fig. 62k). The conditioned circuit is established by the closing of CR5 at 75° and R11 then opens its contacts R11A (Fig. 62L) in the previously described hold circuit for the tape-on relay R10. R10 then opens its contacts R10C (Fig. 62e) to break the energizing circuit for the tape clutch magnet TFM which is deenergized and thereby latches up the tape feed clutch TFC (Fig. 16) to stop the tape feed.

Manual typing of dates, etc.

As explained in operation #M116, the carriage was returned to its #11 character space position and the platen automatically line-spaced. The operator now types, in the spaces provided therefor on the invoice 11 of Fig. 57, the order date, the date the order was received, the date the invoice is written and the scheduled date of delivery of the parts ordered. If the shipping address of the customer is different from the billing address automatically typed under the control of the master card MC—1, as explained above, the operator now manually positions the typewriter carriage 310 and types in the shipping address in the space provided therefor in the upper right-hand portion of the heading. The operator then positions the carriage of the #1 typewriter 300 in its #11 character space position and in position to type the first line of the body of the invoice under the control of the first detail card DC—1 (Fig. 54). The operator may place the first detail card DC—1 in the open card- receiving slot 104 of the card reading unit 100 at any time after the master card MC—1 was moved to its column #1 reading position as a part of the "Initial eject and card reading operation" described hereinabove.

Manual eject operation

The operator now depresses the eject key EJK (Figs. 27 and 62k) and thereby effects an eject operation of the illustrated embodiment, during which the master card MC—1 is ejected from the card reading unit 100 and the first detail card DC—1, which has been placed in the open card receiving slot 104, is fed into its #1 column reading position. During this eject operation, the program tape is fed at its fast speed, four times normal, and stopped with its #1 column in position to be read. Also, the eject cam contacts ECB2 (Fig. 62c) open at 320° and drop the hold coils of relays R48, R60, and R16 which return their contacts to their respective normal positions shown.

As explained previously, the relay R48 is the master card control relay. R48 re-closes its contacts R48A (Fig. 62n) which are connected in shunt with the reset relay contacts R19C in the hold circuit for the digit-representing relays and space relays of the order banks CO—6 to CO—1, inclusive, PN—2, and PN—1, wherein is now stored the customer's order number "13" and the invoice page number "1." Thus, the latter hold circuit can not now be broken by the opening of the contacts R19C of the re-set relay R19. R48 returns its contacts R48C (Fig. 62c) to the position shown where the item count magnet ICM is under the control of the eject cam contacts ECB1 and the relay contacts R60B. As stated, the function of the item count magnet ICM and the circuits including R48C will be fully explained hereinafter under the heading "Item count mechanism."

ECB2 will also drop out the hold coil of R60; but, as its pick-up coil (Fig. 62L) remains closed through the card lever contacts 76C as long as a record card is in the reading unit, the hold circuit for R60 will be re-established when ECB2 close at 350° of the eject cycle (Fig. 60). ECB2 will also drop out the hold coil of the eject control relay R16 at 320°. As will presently appear, R16 is energized to initiate the eject operation.

The eject cycle is effected as follows: When the eject key EJK is depressed by the operator, its contacts 1155 (Fig. 62k) are closed, and the relay R15 is then energized by a circuit extending across the power line. R15 will open its contacts R15A (Fig. 62L) which are in the hold circuit for the card-feed-on relay R8 and the latter will then open its hold contacts R8A and thereby prevent the establishing of this circuit during the eject operation. R15 will close its contacts R15B (Fig. 62L) and thereby establish an energizing circuit for the pick-up coil of relay R17. R15 will also close its contacts R15D which will energize the pick-up coil of the eject control relay R16. Relay R15 will open its contacts R15C (Fig. 62f) to assure that the hold circuit for the homing control relay R22 is deenergized at the start of the eject cycle.

As explained hereinabove under the heading "Initial eject and card feeding operation," the relay R16 (Fig. 62L) provides for effecting an eject operation by energizing the eject clutch magnet EJM (Fig. 62e) and by energizing the main interlock relay R36. When R16 is energized by the closing of R15D, it closes its hold contacts R16A (Fig. 62c) to establish a hold circuit therefor under the control of eject cam contacts ECB2, which, as previously explained, breaks such hold circuit at 320° of the eject cycle. R16 also closes its contacts R16B (Fig. 62e) and thereby energizes the pick-up coil of the interlock relay R36, and R16 also closes its contacts R16C (Fig. 62e) to energize the eject clutch magnet EJM. The manner in which the magnet EJM effects engagement of the eject clutch EJC and thereby provides an eject cycle of operation, has all been fully explained hereinabove and need not be repeated at this point. It will be apparent that during this eject cycle the old card MC—1 is fed out of the card reading unit 100 and the new card DC—1 is fed into the unit and stopped with its #1 column in reading position.

The relay R17 (Fig. 62L) when energized by the closing of R15B, provides for restoring the program tape 15 to its #1 column sensing position where it is ready to control operations of the illustrated embodiment when the detail card DC—1 (Fig. 54) is read. R17 closes its hold contacts R17B (Fig. 62e) to establish a hold circuit therefor extending across the power line and including the normally closed relay contacts R22C. R17 also transfers its contacts R17A and thereby establishes an energizing circuit for the tape clutch magnet TFM, which circuit also extends across the power line and includes the normally closed contacts R22C and the normally closed contacts R116E and R236C. The transferring of the contacts R17A to energize magnet TCM provides for feeding the program tape 15 at four times its normal rate as will be presently explained more fully. R17 transfers its contacts R17C (Fig. 62d) and thereby provides for reading the tape while operating at its fast speed by connecting the tape contact roll 1103 to the positive wire 1100 through the circuit breaker contacts CB. R17 closes its contacts R17D (Fig. 62e) and thereby establishes a second energizing circuit for the interlock relay R36, the first circuit being established by the closed contacts R16B, as previously explained. R17E (Fig. 62L) open to prevent the energizing during this eject operation of the hold circuits for the tape-on relay R10, the #1 typewriter-on relay R3, and the #2 typewriter-on relay R5. The relay R17 opens its contacts R17F (Fig. 62c) and thereby prevents the establishing of any hold circuits for the program tape code set-up relays R146 to R151, inclusive, when a code designation in the tape is read with the latter operating at its fast speed. R17G (Fig. 62f) close to condition an energizing circuit for the pick-up coil of the homing control relay R22 which is established when either the homing code designation

7–8–9–10–11–12 on the master side, or 1–2–3–4–5–6 on the detail side of the tape 15, is sensed. The relay contacts R17A (Fig. 62e) open to drop out the storage-test relay R2 in case such relay had been picked up and this manual eject cycle effected before a number is entered into the storage unit.

The energizing of the tape clutch magnet TFM (Fig. 62e) by the now transferred contacts R17A, provides for holding such magnet energized and the clutch TFC thereby engaged until the homing control relay R22 is energized. As explained previously, when the tape clutch TFC is thus held engaged, the program tape 15 is fed at four times the speed it is normally fed when CR7 pulses the magnet TFM once for each revolution of the main drive shaft DS, which is the normal machine cycle. The four times normal speed is approximately the same as the rate the tape 15 is fed by the engaging of the skip clutch SKC. The program tape 15 will move at its fast rate until its column #140 (Fig. 59b) is sensed by the brushes B7 to B12, inclusive (Fig. 62d), through the circuit breaker CB and the now transferred contacts R17C. The master side of column #140 contains the homing control code designation 7-8-9-10-11-12 and when this designation is sensed, all tape code set-up relays R146 to R151, inclusive, are energized. These relays then close their contacts R146NN to R151NN, inclusive (Fig. 62f), and thereby establish an energizing circuit for the homing control relay R22. R22 will then open its contacts R22C (Fig. 62e) which are in the energizing circuit for the tape feed clutch magnet TFM and also in the energizing circuit for the hold coil of R17. The tape feed clutch TFC will thus become disengaged and the program tape 15 stopped in its #1 column sensing position. R17 will then restore its contacts to their normal position shown. When the operator releases the eject key EJK (Fig. 62k), the relay R15 is deenergized and its contacts will be restored to their normal positions shown. R15C (Fig. 62f) will thus reclose, and an energizing circuit will be established for the hold coil of the homing control relay R22 when the pick-up coil thereof is energized from the homing code designation in the tape 15, as just explained, and closes its hold contacts R22A.

When the hold coil of the eject control relay R16 is deenergized by the opening of eject cam contacts ECB2 (Fig. 62c), R16 reopens its contacts R16B (Fig. 62e); and, when R17 is deenergized by the opening of R22C it reopens its contacts R17D. When both R16B and R17D have reopened, the energizing circuit for the pick-up coil of the interlock relay R36 will be broken. The hold circuit for R36 (Fig. 62c) will then be broken at 15° of the following cycle when CR2 open. Thus, R36 will restore all of its interlock contacts to their respective positions shown and normal operation of the apparatus will be resumed under the control of the program tape and the first detail card DC—1.

*Reading the detail card DC—1*

As shown in Fig. 54, the detail card DC—1 now in its #1 column reading position in the card reading unit 100 contains recorded coded data relating to a particular item or part which has been ordered by the customer. The card DC—1 is shown as being divided by vertical lines into different record fields bearing legends indicating the data therein. The body of the invoice 11 of Fig. 57 is also divided into vertical columns and the picker tag 14 of Fig. 58 is divided into spaces, and such legends and spaces bear legends similar to those appearing on the detail card. The operation of the apparatus under the control of the detail card DC—1 and the program tape 15 will now be described. As in the case of the master card, the operation under the control of the detail card is divided hereinbelow into operating steps identified, respectively, as operation numbers preceded by the letter "D" and corresponding, respectively, to the numbers of the record columns of the program tape.

*Operations #D1 to #D4.*—When the interlock relay R36 is deenergized at the end of the eject cycle by the opening of CR2 at 15° of a machine cycle, as described hereinabove, sensing circuit paths will be established to the #1 record column of the program tape, and, as the relay R155 is still deenergized, the sensing circuit paths will include the tape reading brushes B7 to B12, inclusive (Fig. 62d), on the master side of the tape. The first four operations #D1 to #D4, inclusive, are identically the same as those identified above as operations #M1 to #M4, inclusive. That is, in operation #D1, the tape feed is turned on; in operation #D2, the punch is turned on; in operation #D3, the #1 typewriter is turned on and the figures-shift code designation is punched in the 5-position tape 12 of Fig. 50; and, in operation #D4, the card feed is turned on and the #1 typewriter is turned off.

*Operation #D5—Card feed off, #1 typewriter on, tape shift control—Read card column #1.*—In this operation, the 7–9–10–12 code designation in the master side of column #5 of the program tape provides for energizing R142 (Fig. 62i) under the control of CR5, and the contacts of R142 then provide for energizing the card-feed-off relay R9 (Fig. 62j), the #1 typewriter-on relay R3 (Fig. 62i), and the tape shift control relay R115 (Fig. 62h) under the control of CR6 and in the same manner as previously described in operation #M5. Card column #1 of the card DC—1 is read, which contains a code hole in its #11 index point position and such code hole signifies that the card is a detail card, as explained hereinabove in operation #M5. The reading of the #11 hole in the card DC—1 provides for energizing the card code set-up relay R111 (Fig. 62a) in the manner previously described. Contacts R111E (Fig. 62f) transfer and, in conjunction with contacts R142D which have also transferred, effect the energizing of the pick-up coil of tape-shift control relay R155 when CR6 close. It will be apparent that this operation is identically the same as operation #M5 described hereinabove with the exception that in this operation #D5, the #1 column of the card DC—1 contains the #11 hole and effects energizing of R155, as just explained. For a full description of the circuits involved, reference may be made to operation #M5.

The relay R155 closes its hold contacts R155N (Fig. 62c) and thereby establishes a hold circuit therefor extending through the normally closed eject cam contacts ECB2. Thus, R155 is held energized until the next eject cycle when ECB2 open at 320° of such cycle, as explained above. R155 transfers its contacts A to F, inclusive (Fig. 62d), and thereby connects the sensing brushes B1 to B6, inclusive, to the circuit wires leading to tape code set-up relays R146 to R151, inclusive, and disconnects these relays from the brushes B7 to B12, inclusive. Thus, the code designations in the record columns of the program tape 15 (Figs. 59a and 59b) and on the detail side thereof will control the following operation of the illustrated embodiment, in conjunction with the detail card DC—1.

When the pick-up coil of R155 (Fig. 62f) was energized, as explained above, the relay R223 was also energized by a branch circuit path extending from the now-transferred contacts R111E and through the normally closed points of R113A and R116A. The relay R223 provides for punching the skip code designation in the 5-position tape 12 of Fig. 50. R223 is held through its hold contacts R223F (Fig. 62c) and cam contacts CR2. R223 closes its contacts R223A, R223B, and R223C (Fig. 62u) and thereby connects the code wires CW4, CW8, and CW10, to the wire 1141 and wire 1118 which are under the control of CR3 (Fig. 62r), as explained previously. As card code set-up relay R111 (Fig. 62a) was energized as a part of this operation, it closed its contacts R111A (Fig. 62v) and thus connected the code wire CW11 to CR3. In order to prevent the establishing of a circuit to the selector magnet TSM11 and thus interfere with the punching of the skip designation during this operation, the control relay R223 opens its contacts R223D (Fig. 62w) in the code wire CW11. As the #1 typewriter 300 was turned on during this operation, CR3 will close at 220° and thereby energize the #1 translator selector magnets TSM4, TSM8, and TSM10 through closed contacts R223A, R223B, and R223C. The #1 translator clutch magnet 462 will be energized at 215° through CR4, and the #1 translator 400 will then be operated to actuate the skip key 318 on the #1 typewriter keyboard 301 (Fig. 27). As described, this key trips a cam unit 321 and operates a corresponding punch selector slide 653b, but does not operate a type bar. As the punch was turned on in operation #D2, the operation of the selector slide will close the punch selector contacts SC2, SC4, and SC5 and common contacts C (Fig. 62v) and thereby effect an operating cycle of the punch 500, during which the 2–4–5 designation is punched in the 5-position tape. This is the skip designation and is used herein to signify in the tape 12 that the card now in the card reading unit 100 is a detail card.

*Operation #D6—Card feed on, #1 typewriter off.*—In this operation, the 5–6 code designation in column #6 of the program tape, and on the detail side thereof, provides for energizing R137 (Fig. 62k) under the control of CR5. R137 then closes its contacts R137B (Fig. 62i) and thereby conditions an energizing circuit for the #1 typewriter-off relay R4. R137 also closes its contacts R137A (Fig. 62i) and thereby conditions an energizing circuit for the card-feed-on relay R8. These two conditioned circuits are closed by the cam contacts CR6 at 135° of the cycle and the relays R4 and R8 will become energized and will then function in the manner previously described to turn off the #1 typewriter by dropping out the hold circuit for relay R3 (Fig. 62L) and to turn on the card feed by closing the contacts R8C (Fig. 62e) and thereby energizing the card feed clutch magnet CFM. The tooth of the card feed clutch will engage at the end of the cycle.

*Operation #D7—#2 typewriter on, punch off, #1 typewriter off—Read card column #2.*—The 2–4–5 code designation in column #7 of the program tape, and on the detail side, is sensed and relay R133 (Fig. 62j) is energized when cam contacts CR5 close. R133 closes its contacts R133A (Fig. 62i) to condition a circuit for energizing R4. R33B (Fig. 62j) also close to condition a circuit for energizing R5. R133C (Fig. 62j) also close to condition an energizing circuit for R237. These three conditioned circuits are closed by cam contacts CR6 at 135°. The energizing of the relay R4 performs no useful purpose in this operation as the #1 typewriter was turned off in the preceding operation.

The relay R5 turns on the #2 typewriter. R5 closes its hold contacts R5A (Fig. 62L) and thereby establishes an energizing circuit for the hold coil thereof extending across the power line and including the normally closed contacts R6A and R17E. R5 closes its contacts R5B (Fig. 62b) and thereby energizes relays R230 and R231. R5 closes its contacts R5D (Fig. 62q) and thereby conditions an energizing circuit for the #2 translator clutch magnet 2462 of the #2 typewriter 2300, which circuit is under the control of cam contacts CR4 and also includes the normally closed interlock contacts R55C.

As shown in Fig. 62w, the relay R230 closes its contacts A to H, inclusive, and K to N, inclusive, and thereby electrically connects the twelve #2 translator selector magnets 2TSM1 to 2TSM12, inclusive, to the twelve code wires CW1 to CW12, inclusive. The circuit paths connecting the #2 translator selector magnets to corresponding code wires CW1 to CW12, inclusive, are identified, respectively, as the #2 code wires 2CW1 to 2CW12, inclusive, and the contacts of R230 which effect the electrical connection are located respectively in the wires 2CW1 to 2CW12, inclusive.

R231 closes its contacts R231A and its contacts R231B (Fig. 62q) and thereby conditions holding circuits for the tabulating interlock relay R34 and the carriage-return interlock relay R33. These interlock circuits include, respectively, the mechanically operated interlock contacts 2TIC and 2CRIC which are normally closed and are adapted to be opened by the control stops 2CS2 and 2CS1, respectively, the latter being pre-set in the extra tab rack 2337 on the back of the #2 typewriter 2300. These control stops 2CS1 and 2CS2 and their related interlock contacts 2CRIC and 2TIC operated thereby are similar to those provided in the #1 typewriter and are for the same purpose, as was explained hereinabove. Thus, R231A and R231B are for the same control purpose in the #2 typewriter as the contacts R229A and R229B in the #1 typewriter.

The relay R237 when energized in the manner above explained, functions to turn off the punch 500 in the same manner as described previously in operation #M6 and the description thereof need not be repeated at this point. During this same cycle, the #2 column of the detail card DC—1 is sensed. As this card column is blank, none of the selector magnets 2TSM1 to 2TSM12, inclusive, of the #2 translator are energized. Therefore, when CR4 (Fig. 62q) close at 215°, they energize the #2 translator clutch magnet 2462, as explained previously, and thereby effect an operation of the #2 translator to actuate the space bar on the #2 typewriter, with the result that the carriage 2310 thereof is spaced to the #12 character space position. It will be recalled that the operator positioned the #2 carriage at the #11 character space position at the beginning of the operation of the illustrated embodiment. As the #1 typewriter 300 was turned off during this operation #D7, no operation thereof was effected.

*Operation #D8—Read card column #2.*—There is no code hole in the #8 column on the detail side of the program tape 15 (Fig. 59a); so, for this operation, the tape spaces to the #9 column reading position without effecting any control functions. During this operation, the #3 column of the card DC—1 is sensed which contains a code designation in the #3 index point position thereof, with the result that the card code set-up relay R103 (Fig. 62a) is energized. R103 closes its contacts R103A (Fig. 62v) with the result that the #2 translator selector magnet 2TSM3 is electrically connected through the code wire 2CW3, the C contacts of R230, and the code wire CW3 to the circuit wires 1127 and 1118, the latter being under the control of the cam contacts CR3 (Fig. 62r) as previously explained. Thus, when cam contacts CR3 close, the #2 translator selector magnet 2TSM3 will be energized, and when CR4 close the #2 translator clutch magnet 2462 will be energized. Thus, the #2 translator will be operated to actuate key 2311-3 of the #2 typewriter which then operates to type the numeral "3" in character space position #12 on the picker tag 14 (see Fig. 58).

*Operation #D9—Card feed off—Read card column #4.*—In this operation, the #2 code hole designation on the detail side of the program tape 15 energizes the card-feed-off relay R9 (Fig. 62j) under the control of cam contacts CR5. The card feed is turned off by R9 in the same manner as previously described in operation #M5. The card feed clutch CFC is latched up at the end of this operation. Consequently, the column #4 of the detail card is read in the manner previously described and the #2 typewriter operated under the control thereof to type the numeral "3" in character space position #13 of the picker tag.

*Operation #D10—Card feed on.*—In this operation, the 1 code designation in column #10 and on the detail side of the program tape 15 is read, with the result that the card-feed-on relay R8 (Fig. 62i) is again energized under the control of the cam contacts CR5. The manner in which R8 turns on the card feed was fully explained in operation #M4, above. The card feed clutch tooth will engage at the end of the cycle. No card column will be read during this cycle; but, as the #2 typewriter is still turned on, the cam contacts CR4 (Fig. 62q) establish again an energizing circuit for the #2 translator clutch magnet 2462 and the #2 translator will actuate the space bar 2311-space of the #2 typewriter and thereby space the picker tag 14 of Fig. 58 to its character space position #15.

*Operation #D11—Skip off—Read card column #5.*—In this operation, the #6 code hole designation in column #11 on the detail side of the tape 15 is sensed, with the result that the tape code set-up relay R151 (Fig. 62d) is energized. R151 will close its contacts R151LL (Fig. 62e) and thereby attempt to establish an energizing circuit for the skip-off control relay R32; but, this circuit can not be established during this cycle, because it also includes the now open contacts R31D of the skip-on relay R31. As there has been no previous skipping operation, the relay R31 is not now energized.

As will be noted from an examination of the code chart for the program tape 15, included hereinabove under the heading "The program tape," a code hole in the 6th index position in the detail side effects a skip-off operation the same as a code hole in the 12th index position on the master side and which was described hereinabove in operation #M64. The skip-off designation, obviously, does not affect the present operation. The reason for this designation at this point in the tape will be explained more fully hereinafter when describing the operation under the control of the direct order detail car DC—3, which represents an ordered item or part not at the warehouse preparing the present invoice. The "location" field of the card DC—3 is skipped over and this skip-off designation in the tape is then used to stop such skip operation at the desired point.

It is noted that in this operation #D11, column #5 of the detail card DC—1 is read, with the result that the #2 typewriter is operated in the same manner as previously described to print the numeral "1" in the #15 character space position of the picker tag 14 of Fig. 58.

*Operation #D12—Card feed off.*—In this operation, column #6 of the card is read and the #2 typewriter operated in the manner previously described to print the numeral "2" in character space position #16 of the picker tag 14, thus completing the typing of the data designating the location of the ordered part in the warehouse. Also, the #2 code hole designation in column #12 of the program tape 15 is sensed with the result that the card-feed-off relay R9 is energized under the control of cam contacts CR5. The manner in which the relay R9 turns off the card feed is fully described in operation #M5.

*Operation #D13—Card feed on.*—In this operation, the code hole in the #1 index point position of program tape column #13 provides for turning on the card feed by energizing the relay R8 under the control of CR5. The manner in which this function is effected is the same as described above in operation #M4. As the #2 typewriter is still turned on, the #1 translator clutch magnet 2462 (Fig. 62q) will be energized when cam contacts CR4 close and consequently the space bar 2311-space on the #2 typewriter will be actuated to space the picker tag 14 to its character space position #18.

*Operation #D14—#1 typewriter on—Read card column #7.*—In this operation, the 1-5 code designation in column #14 of the program tape provides for energizing the #1 typewriter-on relay R3 under the control of CR5. The manner in which this function is effected is described in operation #M3. In this operation, column #7 of the card is sensed, which is blank. Thus, when CR4 (Fig. 62q) close at 215°, both the #1 and the #2 translator clutch magnets will be energized with the result that the space bars of both the #1 and #2 typewriters are actuated and each of their carriages thereby spaced one character space position, the #1 typewriter carriage spacing to its character space position #12 and the #2 carriage to its space position #19.

*Operations #D15, #D16, and #D17—Read card columns #8, #9, and #10.*—In these operations, columns #8, #9 and #10 of the detail card DC—1 are read in succession and both the #1 and the #2 typewriters operated under the control thereof to print the first three characters of the "Group No.," which are "6," "5," and "2," in the spaces provided therefor on the invoice 11 and on the picker tag 14, respectively. As there are no code designations in columns #15, #16, and #17 of the program tape, no further functions will be performed during these operations.

*Operation #D18—Card feed off—Read card column #11.*—In this operation, the #2 code designation on the detail side of the tape is sensed and turns off the card feed by energizing relay R9 as previously described in operation #M5. Column #11 of the card is sensed and both the #1 and #2 typewriters operated to print the numeral "4," thereby completing the typing of data comprising the group number.

*Operation #D19—Card feed on.*—The card feed is again turned on by the sensing of the 1 code designation in column #19 of the program tape. See the description under operation #M4 above. The translators of both the #1 and #2 typewriters will be operated when cam contacts CR4 close and energize both the #1 and the #2 translator clutch magnets. The space bars of both typewriters will thus be actuated to space each of the carriages one character space position, the #1 typewriter being spaced to its #17 space position and the #2 typewriter to its #24 space position.

*Operation #D20—Punch on—Read card column #12.*—In this operation, the 2-5 code designation in column #20 of the program tape 15 provides for energizing the punch-on relay R7 under the control of cam contacts CR5. The manner in which the relay R7 is energized and performs its function of turning on the punch, was fully described hereinabove in operation #M2. During this operation, the blank column #12 of the card DC—1 is also read, with the result that both the #1 and #2 typewriters are operated in the manner previously described to space their carriages to the #18 and #25 character space positions, respectively. The operation of the space bar on the #1 typewriter will effect through its related selector slide 653a, an operating cycle of the punch 500 during which the #3 code hole, the space code designation, is punched in the 5-position tape 12 of Fig. 50, as previously explained.

It is also noted that during this operating step, the space control relay R220 (Fig. 62g) is energized in the same manner as described in detail hereinabove in operation #M74. It is noted that the punch 500 was turned on during this operation and a blank card column was read. These two facts provide for energizing the relay R220, as previously explained. R220 then energizes the pick-up coil for the space test relay R27 (Fig. 62d) and the latter relay closes its hold contacts R27B (Fig. 62e) and thereby establishes a hold circuit therefor extending across the power line. R27 closes its contacts R27C to condition an energizing circuit for the figures-shift control relay R29. Thus, during this operating step, the relay R27 is energized to condition the apparatus for automatically punching the figures-shift code designation when the next card column bearing a digit-representing designation is sensed. As stated, this was all fully explained hereinabove in operation #M74, and reference may be had thereto for a full understanding of the manner in which this function is effected.

*Operation #D21—Punch automatically figures-shift code—Read card column #13.*—As column #21 of the program tape 15 is blank, no control function will be effected by the program tape during this operation. In this operation, card column #13 of the detail card DC—1 (Fig. 54) is sensed and as this column contains a digit-representing designation, the illustrated embodiment will be operated to automatically punch, during a first machine cycle, the code designation in the 5-position code representing the figures-shift, and to punch, during the following or second machine cycle, the code designation representing the digit which is recorded in card column #13. The manner in which these operations are effected is fully described hereinabove in operation #M75 and reference may be had thereto for a full explanation thereof.

It is noted that during the first machine cycle of this operation, the #1 translator selector magnets TSM4, TSM7, and TSM8 (Fig. 62w) are energized because of the shifted contacts of the energized relay R225 and by CR3, and that this will provide for actuating the figures-shift key 318 of the #1 typewriter in the same manner as previously explained in operation #M75. As the #2 typewriter is also turned on during this operation, the #2 translator selector magnets 2TSM4, 2TSM7, and 2TSM8 will be energized at the same time as the corresponding selector magnets of the #1 translator. The #2 translator clutch magnet 2462 (Fig. 62q) will also be energized through CR4. However, no key of the #2 typewriter will be actuated, because as shown in Fig. 48, the #2 keyboard does not contain a figures-shift key corresponding to the key 318 on the #1 keyboard. The #2 translator will go through a cycle of operation, but there will be no key selection and consequently no key actuation.

As shown in Fig. 54, column #13 of the card DC—1 contains the code designation representing the numeral "2." Thus, both the #1 and the #2 typewriters will be operated during the second machine cycle of this operating step, to print the numeral "2" in character space position #18 of the invoice 11 and #25 of the picker tag 14. In the manner previously explained, the operation of the #1 typewriter to type the numeral "2" simultaneously provides for the punching of the code designation representing this number in the 5-position tape 12 of Fig. 50.

*Operations #D22 to #D25—Read card columns #14 to #17.*—In these operations, card columns #14 to #17, inclusive, will be sensed in succession and the #1 and #2 typewriters operated under the control thereof to print the numerals "6," "4," "7," and "9" on both the invoice 11 and the picker tag 14 and in the character space positions indicated in Figs. 57 and 58. The punch 500 will also be operated during successive cycles to punch the code designations representing these numerals in the 5-position tape 12 of Fig. 50.

*Operation #D26—Card feed off—Read card column #18.*—In this operation, the card feed is again turned off under the control of the #2 code designation in the program tape 15 which, as before, energizes the card-feed-off relay R9. The function of the relay R9 is fully described hereinabove in operation #M5. Column #18 of the card DC—1 will be read and the #1 and #2 typewriters both operated under the control of the designation recorded therein to type the numeral "6" in space position #23 of the invoice 11 and in space position #30 of the picker tag 14. As shown, the numeral "6" is the last digit in the "Part No." field. The punch 500 will also be operated by the selector slide 653b related to the tripped cam unit 321 of the #1 typewriter, to punch the designation for the numeral "6" in the 5-position tape 12 of Fig. 50.

*Operation #D27—Card feed on, punch off.*—The 1-3 code designation in column #27 of the program tape will effect the energizing of the relay R136 (Fig. 62i) which will turn the card feed on and the punch off, as explained previously in operation #M77. R136B (Fig. 62j) will close to energize the puch-off control relay R237 under the control of CR6. R136A (Fig. 62i) will close and effect the energizing of the card-feed-on relay R8 under the control of the contacts CR6. The manner in which the punch-off relay R237 and the card-feed-on relay R8 perform their respective functions has already been described above in operations #M6 and #M4, respectively. As the #1 and #2 typewriters are still turned on, the cam contacts CR4 (Fig. 62q) will effect the energizing of both the #1 and the #2 translator clutch magnets and the resulting actuation of the space keys of both typewriters to space their carriages one character space position. The #1 typewriter will space to its space position #25 and the #2 typewriter to its space position #32.

*Operations #D28 to #D38—Read card columns #19 to #29.*—In these operations, columns #19 to #29 of the card DC—1 are read and both the #1 and #2 typewriters operated under the control thereof to print the word "Shaft" in spaces identified in the invoice 11 and picker tag 14 by the heading "Part name." The two typewriters also space their respective carriages so that the carriage of the #1 typewriter will be in position to print in its character space position #36, and so that the carriage of the #2 typewriter will be in its space position #43.

*Operations #D39—Card feed off—Read card column #30.*—In operation #D39, the 2 code designation on the detail side of the tape 15 is sensed and the card feed is turned off by the energizing of the relay R9, in the same manner as previously described. Blank card column #30 is sensed and both typewriters operated to space their respective carriages one space position, the #1 carriage stopping in position to print in character space position #37 and the #2 typewriter in its space position #44.

*Operation #D40—#1 typewriter off, carriage return from program tape.*—In this operation, the #1 typewriter is turned off and the #2 typewriter operated to return its carriage 2310 to the left-hand margin and to line-space the platen thereof. This is effected by the sensing of the 2-5-6 code designation recorded in column #40 of the program tape 15 and which provides for energizing relay R134 (Fig. 62j) under the control of cam contacts CR5.

R134 closes its contacts R134A (Fig. 62i) to energize, when CR6 (Fig. 62f) close, the #1 typewriter-off relay R4. The manner in which the relay R4 performs its function of turning off the #1 typewriter has been fully described hereinabove in operation #M4 and need not be repeated at this point.

The relay R134 also closes its contacts R134B (Fig. 62k) to energize the carriage-return relay R224 (Fig. 62f) and the carriage-return interlock relay R33 under the control of CR6. The energizing circuit for the carriage-return control relays R224 and R33 is traced as follows: from the positive conductor 1100 through CR6 (Fig. 62f); the wire 1112; R134B (Fig. 62k), now closed; the wire 1144; and through the pick-up coils of R33 and R224 (Fig. 62f) in parallel to the negative conductor 1101. The carriage-return operation of the #2 typewriter is effected in the same manner as that previously described in operation #M17 wherein the relays R33 and R224 were energized in response to the sensing of a #12 code hole in the card DC—1. As previously explained, R224 closes its contacts R224A and R224B (Fig. 62u) to connect, by code wires CW3 and CW8 and 2CW3 and 2CW8, the #1 translator selector magnets 2TSM3 and 2TSM8 (Fig. 62w), to the circuit wires 1141 and 1118 which are under the control of the cam contacts CR3. Thus, when the latter close and when CR4 close to energize the #2 translator clutch magnet 2462 (Fig. 62q), the #2 translator is operated to actuate the carriage returnkey 2313 on the #2 typewriter and thereby effect a carriage return operation of the #2 typewriter. The relay R33 will close its contacts R33C (Fig. 62e) and thereby establish an energizing circuit for the interlock relay R36 which prevents operation of the card and tape feeding and sensing circuits, the same as previously described. Relay R33 is held by its hold contacts R33A (Fig. 62q) and through the normally closed carriage return interlock contacts 2CRIC on the back of the #2 typewriter. As will be apparent from the previous description, the contacts 2CRIC are opened by a pre-set control stop CS1 in the #11 character space position of the extra tab rack 2397 on the back of the #2 typewriter, which is the position where the left-hand margin stop has been positioned. Consequently, as the #2 carriage is returned to its left-hand margin, and the platen line-spaced incident thereto, the opened contacts CR1C drop out the hold coil of interlock relay R33 (Fig. 62q) and the latter will restore its contacts to the position shown in the drawing, and thereby deenergize the interlock relay R36 which will, in turn, return its contacts to the position shown and normal operation is then resumed.

*Operation #D41—Card feed on, #1 typewriter on, #2 typewriter off.*—The 3-5-6 code designation in column #41 of the program tape 15 provides for energizing relay R131 (Fig. 62h) when CR5 close. This relay closes its contacts R131A (Fig. 62i) to condition an energizing circuit for the card-feed-on relay R8. R131C (Fig. 62i) close to condition an energizing circuit for the #1 typewriter-on relay R3. R131B (Fig. 62j) close to condition an energizing circuit for the #2 typewriter-off relay R6. These conditioned circuits are closed by the cam contacts CR6 (Fig. 62f) at 135°. The manner in which the card feed is turned on by the energizing of relay R8 is fully disclosed hereinabove in operation #M4, and the manner in which the #1 typewriter is turned on by the energizing of relay R3 has been fully explained above in operation #M5, and consequently a description of these functions need not be repeated at this point.

The #2 typewriter-off relay R6, when thus energized, opens its contacts R6A (Fig. 62L) and thereby drops out the hold coil of the #2 typewriter-on relay R5. R5 then opens its contacts R5B (Fig. 62b) and thereby drops out relays R230 and R231. R5 opens its contacts R5D (Fig. 62q) and thereby disconnects the #2 translator clutch magnet 2462 from cyclic control by the cam contacts CR4. R230 returns its contacts A to H, inclusive, and K to N, inclusive (Fig. 62w) to their normal position shown in the drawings and thereby disconnects the #2 translator selector magnets 2TSM1 to 2TSM12, inclusive, from the code wires CW1 to CW12, inclusive. R231 opens its contacts R231A and R231B (Fig. 62q) and thereby prevents the establishing of interlocking circuits by the #2 typewriter which include the hold coils of the relays R33 and R34.

As the #1 typewriter is turned on in this operation under the control of the cam contacts CR6, the circuit for the #1 translator clutch magnet 462 thereof will be established by the closing of the cam contacts CR4. As the card feed clutch CFC does not engage until the beginning of the next machine cycle, card column #31 which is now in position to be read, will not be sensed during this cycle and consequently the selector magnets of the #1 translator will not become energized. Thus, when CR4 close the #1 translator clutch magnet 462 will be energized and actuate the space bar on the #1 typewriter in the manner fully explained hereinabove, which will space the carriage thereof to its #38 character space position.

*Operation #D42—Card feed off, punch on—Read card column #31.*—The 1-2 code designation in the column #42 of the program tape 15 provides for energizing relay R129 (Fig. 62h) when cam contacts CR5 close, the same as described hereinabove in operation #M78. R129 closes its contacts R129A (Fig. 62j) and thereby conditions an energizing circuit for the punch-on relay R7. R129B (Fig. 62j) close and thereby condition an energizing circuit for the card-feed-off relay R9. These conditioned circuits are closed as before by the energizing of CR6 at 135°. The relay R9 turns off the card feed in the manner described hereinabove in operation #M5. The relay R7 turns on the punch in the same manner as fully described hereinabove in operation #M2. During this cycle, the card column #31 will be sensed and the numeral "1," which is the warehouse code number, will be printed in character space position #38 of the invoice by the #1 typewriter. The punch is also operated to record the designation for the numeral "1" in the 5-position tape 12 of Fig. 50.

*Operation #D43—Card feed on, punch off.*—In this operation, the code designation 1-3 in column #43 of the program tape 15 provides for turning on the card feed and turning off the punch by energizing the relay R136, the same as described above in operations #M77 and #D27. As the #1 typewriter is now turned on, the #1 translator clutch magnet 462 (Fig. 62q) will be energized when CR4 close and the space bar actuated to space the #1 typewriter carriage to character space position #40. The punch will not be operated.

*Operation #D44—Card feed off—Punch on—Read card column #32.*—The column #44 of the program tape 15 contains the 1-2 code designation and thereby effects the operation of turning the card feed off and the punch on the same as in operations #M78 and #D42. Card column #32 of the card DC—1 is read and the #1 typewriter operated as a result thereof to print the numeral "1," which is the card code number, in character space position #40 of the invoice 11, and the punch 500 is operated to punch the corresponding code designation in the 5-position tape 12 of Fig. 50.

*Operation #D45—#1 typewriter off.*—When the tape 15 passes to its column reading position #45, the 1-6 code designation is sensed with the result that the #1 typewriter-off relay R4 will become energized when CR5 close and will thereby turn off the #1 typewriter in the manner already described hereinabove in operation #M4. As the #1 typewriter is turned off, the punch 500 is not operated.

*Operation #D46—Punch off, quantity number test.*—In this operation, the punch 500 is turned off and a test is made to determine whether or not the operator has, by this time, stored the quantity number in the relay storage unit. This operation is effected in response to the reading of a 1-2-3-6 code designation in column #46 of the program tape 15. This code designation provides for the energizing of relay R145 (Fig. 62h) when the cam contacts CR5 close. R145A (Fig. 62j) close to condition an energizing circuit for the punch-off relay R237. R145B (Fig. 62h) close to condition an energizing circuit for the quantity test relay R1. These conditioned circuits are closed by cam contacts CR6. The manner in which the relay R237 turns off the punch has already been explained above in operation #M6 and need not be repeated at this point.

The relay R1, when thus energized, closes its hold contacts R1A (Fig. 62f) and its contacts R1B and thereby establish an energizing circuit for the hold coil of relay R1 and also establish, through the circuit wire 1156, an energizing circuit for the pick-up coil of interlock relay R36 (Fig. 62e). These circuits also include the normally closed points of contacts R20A (Fig. 2f). As has already been fully described, the energizing of the interlock relay R36 provides for locking up the card and tape feed and preventing the sensing of either the card or tape and this condition will now remain until the contacts R20A transfer to drop out the hold coil of relay R1 and the pick-up coil of R36.

As will presently appear, the relay R20 is energized by the action of the operator in closing the motor bar contacts (Fig. 62m) at the end of a quantity number storing operation. Consequently, had the operator stored the quantity before this operation #D46, the contacts R20A (Fig. 62f) would now be transferred, and the energizing circuits for the hold coil of R1 and the pick-up coil of R36 could not have been established.

The description of the operation of the apparatus under the control of the detail card DC—1 is interrupted at this point in order to explain how the operator stores the quantity number in the relay storage unit.

*Storing the quantity number*

As explained hereinabove in operation #M115, at any time after the reading out of the units order of the invoice page number and the ejection of the master card MC—1, the operator may store, by actuating the keys 303, 304 and 305 of the auxiliary keyboard 302 (Fig. 27), the quantity number for the ordered part or item represented by the next detail card to be read which, as was described, is the card DC—1. The conditioning of the section of the relay storage unit for storing the quantity number was effected by contacts R35D (Fig. 62n) which closed to energize the storage shift control relay R161, and by the contacts R35A (Fig. 62b) which transferred to drop out the hold coil of the sequence relay R47 and to establish an energizing circuit for the relay R38 which is the storage conditioning relay, the contacts R38C (Fig. 62m) of the latter relay being closed and thereby conditioning the order bank QN—A (Fig. 62n) for receiving the highest order of the quantity number under the control of the auxiliary keyboard. As explained above in operation #D46, a test was made to determine if the quantity number had been stored in the relay storage unit; and, as such number had not been stored, the interlock relay R36 was energized to stop automatically the operation of the apparatus. The operator normally stores the quantity number of parts ordered while the above described operations #D1 to #D45, inclusive, are being automatically effected, so that the continuous operation of the apparatus will not be interrupted at operation #D46.

As explained hereinabove under the heading "Relay storage unit," the section of the relay storage unit which is provided herein for storing the quantity number of ordered parts, comprises the order banks QN—A, QN—B, QN—C, and QN—D (Figs. 62n and 62o), and each of these four order banks comprises four digit-representing relays of the group R194 to R209, inclusive, and one of the column-shift control relays of the group R10 to R213, inclusive. Thus, provision is made for storing any quantity number having as many as four order positions. In the majority of instances, the quantity number of ordered parts comprises only one order position. In some cases, the number comprises two order positions; but, it is very seldom that it has more than two order positions. It is, of course, highly desirable in the interest of order and neatness, that the numbers be typed on the invoice in preselected character space positions with the corresponding order positions of all quantity numbers occupying the same character space positions in their respective lines of typing. As was previously described, in order that the customer's order number and invoice page number be typed in the preselected character space positions when the numbers have fewer order positions than the storage capacity provided, the operator in storing each number depresses the space key once for each order position of the storage capacity not used by the number stored. Thus, in storing the number "13" having only two order positions, the operator depressed the space key four times before depressing the key for storing the digit "1." This procedure is acceptable in storing the order and page numbers as they are only stored once for each page of the invoice. However, as there is a diffeernt quantity number stored for each detail card and as the number usually contains only one or two order positions, considerable time would be consumed if the operator is required to depress the space key once for each order position not used. Because of the column-shift control relays R210 to R213, inclusive, and their contacts in the networks QNP—A to QNP—D, inclusive, in Fig. 62t, the operator is not required in storing the quantity number, to depress the space key once for each order position not used and, when the stored numbers are read out as described hereinafter in operation #D48, #D49, and #D50, these relays provide for automatically spacing the carriages of the two typewriters so that the digits of each order are typed in their preselected character space positions. Thus, the highest order of the quantity number is always stored in the order bank QN—A, the next highest in order bank QN—B, etc.

The quantity number is stored in the following manner. As shown in Figs. 57 and 58, the number of "shafts" ordered by the customer is indicated on the invoice 11 and picker tag 14 as being "1." The operator, of course, obtains this information from the order received from the customer dealer to which the invoice is addressed. In entering the numeral "1" into the quantity storage order banks, the operator simply depresses the digit "1" key 303 of the auxiliary keyboard 302 (Fig. 27) which will close its corresponding key contacts K1 (Fig. 62m) and thereby establish an energizing circuit for the storage unit code set-up relay R156. R156 will then shift its contacts in Figs. 62n and 62o and including its contacts R156K and thereby conditions an energizing circuit for the storage relay R194 of the order bank QN—A. The manner of energizing the storage relay R194 for storing the quantity number, is the same as described hereinabove when storing the customer's order number and invoice page number; that is, the bail contacts BC (Fig. 62m) are also closed by the depression of the key 303 for the digit "1" and they thereby energize the first entry control relay R51 through the normally closed points of contacts R54C and the normally closed contacts R50C. R51 then closes its contacts R51A to establish a hold circuit for the coil of relay R51 through the bail contacts BC which remain closed as long as the operator holds down the key. The contacts R51B are also closed and they energize the pick-up coil of control relay R54 and the latter will remain energized by its hold contacts R54B (Fig. 62b) and through the normally closed points of R12A, R19A, and R35A and the normally closed contacts R53A. Relay R51 also opens its interlock contacts R51C (Fig. 62m) so that when the relay R54 is energized and transfers its contacts R54C to condition an energizing circuit for the second entry control relay R50, such circuit can not be established through the bail contacts during this storing operation. The relay R51 also closes its entry control contacts R51D; and, as the contacts R38C have already been closed and the storage shift contacts R161A (Fig. 62n) have been transferred, an entering circuit will be established through the bail contacts BC and including the contacts R156K previously closed and the pick-up coil of storage set-up relay R194. A branch parallel circuit will also be established for the pick-up coil of column-shift control relay R210, which extends from R161A through the wire 1157, the pick-up coil of R210, and the wire 1159, to the negative conductor 1101. R194 will close its hold contacts R194D and thereby establish a hold circuit including the normally closed contacts R19D of the re-set relay R19. R194 also shifts its A contacts (Fig. 62t) in the pyramid relay network QNP—A corresponding to the order bank QN—A. As the quantity number to be stored in the problem being described comprises only a digit in the units order, no further entering operation of the digit keys of the auxiliary keyboard is required for storing such number. However, if the quantity number had been a two-position number, then the first digit stored would be the one in the tens order and the auxiliary keyboard would be actuated a second time to store the units order digit of the number in the order bank QN—B. As explained in connection with storing the numbers in the other two sections of the relay storage unit, the sequencing relay R40 (Fig. 62m) is also energized at the same time the relays R194 and R210 are picked up as a part of the first storing operation, by a parallel circuit path extending from contacts R38C. R40 transfers its contacts R40B (Fig. 62n) and thereby conditions the next order bank QN—B for receiving the next digit of the quantity number. R40 (Fig. 62m) also closes its hold contacts R40A to establish an energizing circuit for the hold coil thereof extending through the normally closed sequence relay control contacts R42C and through the normally closed re-set relay contacts R19D (Fig. 62n).

When the quantity number has been entered in the storage banks, which, in the problem being described, comprises only the digit "1" in QN—A, the operator then depresses the motor bar 305 (Fig. 62m) and thereby closes contacts MB. This establishes an energizing circuit for the motor bar relay R20 which includes the now closed contacts R210H of the column-shift control relay R210. The contacts R210H are interlock contacts and assure that at least on digit of the quantity number has been stored before the motor bar can be operated to terminate the storing operation of the quantity number. R20 closes its hold contacts R20B (Fig. 62m) and thereby establishes an energizing circuit for the hold coil thereof extending through the normally closed re-set relay contacts R19D (Fig. 62m). R20 also transfers its contacts R20A (Fig. 62f) and thereby energizes the key lock solenoid 378 which locks up the auxiliary keyboard to prevent further operation thereof, as described hereinabove under "The auxiliary keyboard." The transferring of R20A also deenergizes the hold coil of quantity test relay R1 and the pick-up coil of interlock relay R36, which were energized in operation #D46, as explained above. When the latter occurs, the interlock relay R36 returns its contacts to their normal positions shown on the drawings, and thereby permits the operation of the apparatus to continue as before. R20C (Fig. 62g) also close to condition an energizing circuit for the figures-shift control relay R24. The purpose of the contacts R20C will be explained in detail hereinafter in connection with the reading out of the quantity number.

*Reading the detail card DC—1 (Cont'd)*

As the quantity has been entered, the operation under the control of the detail card DC—1 and program tape 15 is now resumed.

*Operation #D47—#1 typewriter on.*—In this operation the 1–5 code designation in column #47 of the program tape turns on the #1 typewriter by energizing relay R3 (Fig. 62i) under the control of cam contacts CR5. The manner in which R3 turns on the #1 typewriter is fully described in operation #M3. When cam contacts CR4 close, the #1 translator clutch magnet 462 (Fig. 62q) will be energized and the #1 typewriter will be operated by the #1 translator to space the carriage 310 thereof to its #42 character space position.

*Operation #D48—#2 typewriter on, punch on—Storage readout, quantity number, 3rd position.*—Column #48 of the tape contains a 3–4–5 designation which provides for turning on the #2 typewriter, for turning on the punch, and also for reading out the 3rd position of the stored quantity number when the latter has that many positions. It is noted that in the particular example disclosed, the tape 15 does not contain a code designation for reading out a fourth position of a quantity number, the reason being that only three order positions are required for the application of the illustrated embodiment being described. The manner in which a fourth position would be read out is not described in detail herein, but it will be obvious to those skilled in this art from the drawings and from the following description.

The 3–4–5 code designation in the program tape provides for energizing the relay R130 (Fig. 62k) when cam contacts CR5 close. R130 closes its contacts R130C (Fig. 62j) to condition an energizing circuit for the #2 typewriter-on relay R5. The contacts R130A (Fig. 62j) close to condition an energizing circuit for the punch-on relay R7. R130B (Fig. 62h) also close to condition an energizing circuit for the readout control relay R120. These conditioned circuits are closed by the cam contacts CR6, in the manner previously explained. The relays R5 and R7 perform their functions in the manner previously described in operations #D7 and #M2, respectively, and the description thereof need not be duplicated here.

Readout control relay R120, when energized, closes its contacts R120D (Fig. 62b) to establish a hold circuit therefor, including the circuit wire 1151 and extending through relay contacts R30A (Fig. 62a) which, as explained, are under the control of CR8. R120 closes its contacts R120B (Fig. 62g) and thereby provides, under the control of cam contacts CR6, an energizing circuit for the space control relay R220. This circuit is traced as follows: from the positive conductor 1100 (Fig. 62f), through cam contacts CR6, the wire 1112, the wire 1152 (Fig. 62g), the wire 1153, R120B now closed, column-shift control relay contacts R213G in the position shown, column-shift control relay contacts R212F in the position shown, the wire 1147, the pick-up coil of space-control relay R220 to the negative conductor 1101. R220 closes its hold contacts R220F (Fig. 62c) and thereby establishes an energizing circuit for the hold coil thereof under the control of cam contacts CR2. R220D (Fig. 62d) close and thereby establish an energizing circuit for the pick-up coil of space test relays R27. The relay contacts R237D which are in the latter circuit, are returned to their normal position shown, as a result of the punch-on operation taking place during this same cycle under the control of the relay R7. The contacts R7A (Fig. 62b) open to drop out R237 and the latter then transfers its contacts R237D. The hold coil of the space test relay R27 (Fig. 62e) is energized by the closing of its hold contacts R27B and such circuit includes the normally closed contacts R25C. R27 closes its contacts R27C to condition an energizing circuit for the figures-shift control relay R29. The relays R220 and R27 function in this reading out operation the same as they do in the reading out of the customer's order number, as explained above in operations #M103 and #M107. That is, R220 and R27 are energized during the first attempt to read out an order position of a stored number when the number does not comprise a digit in such order position. As explained hereinafter in operation #D50, the relay R27 provides, when the highest digit of the stored quantity number is read out, for automatically punching the figures-shift code designation in the 5-position tape ahead of the code for such highest digit.

Before describing in detail the reading out of the particular quantity number now stored as described above, it is noted that the pyramid networks QNP—A to QNP—D (Fig. 62t), inclusive, are connected to the wire 1118 by means of a circuit network including contacts of the column-shift control relays R210 to R213, inclusive, and by contacts R121A, R120A, R119A, and R118A of the readout control relays R121, R120, R119, and R118, respectively. The readout control relays are adapted to be energized during successive operating steps by code designations in successive columns of the program tape 15. In reading out the quantity number in applications of the illustrated embodiment where all four storage order positions are used, the readout control relay R121 is energized during the first readout cycle; and, if the stored number has digits in all four order positions, all of the column-shift control relays R213 to R210, inclusive (Figs. 62n and 62o), will be energized. Therefore, a readout circuit path will be established through the contacts R121A (Fig. 62t) and R213A to R210A, inclusive, and through the network QNP—A to the code wires CW1 to CW10, inclusive. If the stored number does not have a digit in the fourth position, R213 will not be energized and R213A will then be open, and the readout circuit path can not be established to any of the code wires and translator selector magnets (Fig. 62w). Consequently, at 215° of the machine cycle CR4 (Fig. 62q) will energize the translator clutch magnets 462 and 2462 and thereby operate the two translators and space the two typewriter carriages during the first readout operation. As previously explained, the particular program tape 15 of Figs. 59a and 59b contains only code designations for reading out a quantity number having a maximum of three positions. Consequently, the readout control relay R120 is energized during the first readout cycle which is the operation #D48 being described under this sub-heading. Also, as the stored quantity number has only a digit in the units order position, the column-shift control relay R210 (Fig. 62n) is now energized and its contacts in Fig. 62t are in shifted position, and the remaining column-shift control relays R211, R212, and R213 are deenergized and their contacts in Fig. 62t are in their respective positions shown.

Thus, in this operation #D48 of the particular example being described, R120 closes its contacts R120A (Fig. 62t) in an attempt to read out a third order digit of the stored quantity number. By closing the contacts R120A, an attempt is made to establish a readout circuit path to the pyramid network QNP—A, which circuit extends from the positive conductor 1100 (Fig. 62r), through CR3, the wire 1118, the closed contacts R120A, the normally closed points of R213B, and to contacts R212A, which are now open, as the stored quantity number has no third order digit. Consequently, such readout circuit is not established during this operating step, and CR4 (Fig. 62q) will energize the #1 and the #2 translator clutch magnets 462 and 2462 at 215° and the latter will actuate the space bars of both typewriters and thereby space the carriages thereof, the #1 typewriter spacing to character space position #43 of the invoice 11 of Fig. 57, and the #2 typewriter spacing to space position #12 of the picker tag 14 of Fig. 58.

As the punch was turned on during this operation, the actuation of the space bar of the #1 typewriter will also effect an operating cycle of the tape punch 500, during which the space code designation is punched in the 5-position tape 12 of Fig. 50 in the manner previously described.

*Operation #D49—Readout quantity number 2nd position.*—In this operation, the code designation 1-2-6 in column #49 of the program tape provides for energizing readout control relay R119 (Fig. 62h) under the control of cam contacts CR5. R119 closes its hold contacts R119D (Fig. 62b) and thereby establishes a hold circuit through the wire 1151 and contacts R30A (Fig. 62a). R119 closes its readout control contacts R119A (Fig. 62t) so that when CR3 again close, an attempt is made to read out the second order position of the stored quantity number. This attempted readout circuit includes CR3 and the wire 1118, as before, and extends from R119A, now closed, and through column shift control relay contacts R213C in the position shown, contacts R212B in the position shown, to the now open contacts R211A of the column shift control relay R211 (Fig. 62n). As this circuit can not be established during this cycle, the contacts CR4 (Fig. 62q) again provide for energizing the #1 and #2 translator clutch magnets 462 and 2462 and thereby effect actuation of the space bar in each of the typewriters to space the #1 typewriter to its character space position #44 and the #2 typewriter to its character space position #13. As the punch 500 is now turned on, the space code designation will also be recorded in the 5-position tape 12 of Fig. 50.

R119B (Fig. 62g) also close and thereby establish during this cycle an energizing circuit for the pick-up coil of space control relay R220 by the network shown. However, this latter operation will perform no useful function at this time because the relay R220 was energized in previous operation #D48 and thereby effected the energizing of the space test relay R27. As explained, R27 is now held energized.

*Operation #D50—Readout quantity number, units order position—Automatic punching of figures-shift code.*—The 1-3-4 code designation in column #50 of the program tape provides for energizing the readout control relay R118 (Fig. 62i) under the control of the cam contacts CR5. R118 will close its hold contacts R118D (Fig. 62b) and thereby establishes an energizing circuit for its hold coil extending through the wire 1151 and the cam controlled relay contacts R30A (Fig. 62a).

The relay R118, by its readout contacts R118A (Fig. 62t), provides for reading out the units order digit "1" of the quantity number previously stored in the order bank QN—A (Fig. 62n). As this is the first digit of the stored number to be read out, the apparatus will automatically punch a figure-shift code designation in the 5-position tape 12 of Fig. 50 ahead of the punching of the code designation for the numeral "1." This operating step is effected in two machine cycles, the figures-shift code being punched during the first machine cycle and the reading out of the stored digit "1" and the punching of the designation for "1" being effected in the second machine cycle. As explained previously in operation #D48, the apparatus was conditioned for punching automatically the figure-shift code designation by the energizing of the relay R220 which in turn energized the relay R27 and the latter is now held energized by its contacts R27B (Fig. 62e).

The automatic punching of the figures-shift code designation in the 5-position tape is effected in this operating step in substantially the same manner as described hereinabove in connection with the reading out of the second position of the customer's order number (see operation #M107). When R118 is energized as explained above, it closes its contacts R118B (Fig. 62g) and thereby establishes an energizing circuit for the figures-shift control relay R24. The circuit extends from positive conductor 1100 (Fig. 62f), through cam contacts CR6, the wire 1112, the wires 1152 and 1153 (Fig. 62g), R118B now closed, R213K in the position shown, R212H in the position shown, R211G in the position shown, R210F now transferred as column shift control relay R210 (Fig. 62n) is energized, and through the wire 1149, the pick-up coil of relay R24 to the negative conductor 1101. Thus, R24 is energized by the circuit just traced and closes its hold contacts R24A (Fig. 62c) to establish a hold circuit therefor under the control of cam contacts CR2. R24 closes its contacts R24B (Fig. 62d) and thereby establishes an energizing circuit for relay R25 at 313° of the first machine cycle when cam contacts CR7 close. R24 closes its contacts R24D (Fig. 62e) and thereby establishes, across the power line, an energizing circuit for the pick-up coil of relay R29 which was previously conditioned in operation #D48 by the closing of the contacts R27C. R29 closes its contacts R29C and thereby establishes an energizing circuit for the interlock relay R36 which, as explained previously, transfers its contacts and prevents the establishing of circuits for reading and spacing the control tape 15 and the card DC—1.

When the relay R25 is energized at 313° by the closing of the cam contacts CR7, it opens its contacts R25C (Fig. 62e) and thereby drops out the hold coil of the relay R27.

The relay R29, when energized as explained above, closes its hold contacts R29A (Fig. 62c) and thereby provides a hold circuit therefor under the control of cam contacts CR2, the latter remaining closed until 15° of the second machine cycle. R29 closes its contacts R29C and thereby energizes the pickup coil of the main interlock relay R36, which adjusts its contacts to stop further reading and feeding of the program tape and card, as explained previously. R29 closes its contacts R29B (Fig. 62a) and thereby shunts the cam controlled contacts R30A in the hold circuit for the readout control relay R118 (Fig. 62b). Thus, when cam contacts CR8 open at 270° of the first machine cycle and the relay R30 is dropped out and opens its contacts R30A, the contacts R29B maintain the hold circuit for readout control relay R118 until CR8 again close at 340° of the first machine cycle and thereby energize again the relay R30 which closes its contacts R30A. R30A then hold the relay R118 energized until after 270° of the second machine cycle when CR8 again open and deenergize the relay R30.

The relay R29 closes its contacts R29D (Fig. 62e) and thereby establishes an energizing circuit for relays R225 and R226. The relay R226 opens its contacts R226A (Fig. 62d) and thereby prevents the establishing of an energizing circuit for the control relays R232 and R222. The relay R225 shifts its contacts A to H, inclusive, and K to N, inclusive (Fig. 62w) and thereby connects the code wires CW4, CW7, and CW8 directly to the wire 1118 which, as previously explained, is under the control of CR3 and disconnects the remaining code wires from control by CR3. Thus, during the first machine cycle, the read-out circuit path can not be established through the network QNP—A (Fig. 62t) for reading out the units order of the stored quantity number. When cam contacts CR3 close at 220° of the first machine cycle, energizing circuits will therefore be established for the #1 translator selector magnets TSM4, TSM7, and TSM8 (Fig. 62w) through the now closed points of the D, G, and H contacts of relay R225. At 215° of the first machine cycle, the cam contacts CR4 also close and thereby establish an energizing circuit for the #1 translator clutch magnet 462 (Fig. 62q) which effects an operation of the #1 translator during which the figures-shift key lever of the #1 typewriter is actuated. This will provide an operating cycle of the punch in the manner previously explained, during which the figures-shift code designation is punched in the tape. It is noted that the #2 translator selector magnets 2TSM4, 2TSM7, and 2TSM8 will also be energized by CR3 and that the #2 translator clutch magnet 2462 will be energized by CR4, which will provide a cycle of operation of the #2 translator. However, the #2 typewriter will not be operated thereby, because a 4-7-8 combination of selector magnets will not select any of the keys of the #2 typewriter keyboard (see Fig. 48).

At 15° of the second machine cycle, the cam contacts CR2 open and thereby drop out the hold circuits for the relays R29, R24 and the interlock relay R36 (Fig. 62c). R29 will then open its contacts R29D and break the energizing circuit for the relays R225 and R226 which will restore their contacts to the normal positions shown in the drawings. The contacts A to H, inclusive, and K to N, inclusive, of relay R225 (Fig. 62w) will then reconnect the code wires for controlling the translator selector magnets of the two typewriters by circuit paths established through the network QNP—A (Fig. 62t) and under the control of the cam contacts CR3. R29C reopen and thereby break the pick-up circuit for the interlock relay R36 which restores its contacts to their respective positions shown as the hold coil of R36 was deenergized by the opening of CR2.

When R118 was energized at the beginning of the first machine cycle, it also closed its readout contacts R118A (Fig. 62t) and thereby conditioned a readout circuit path through the network QNP—A and under the control of the cam contacts CR3. This circuit includes the contacts CR3 and wire 1118, as before, and can be traced from the latter through the now closed readout contacts R118A, contacts R213D in the position shown, contacts R212C in the position shown, R211B in the position shown, contacts R210A now transferred, the A contacts of storage relay R194 now transferred as the digit "1" is stored in the order blank QN—A of Fig. 62n, the A contacts of storage relay R195 in the position shown, the A contacts of storage relay R196 in the position shown, the A contacts of storage relay R197 in the position shown, and the code wire CW1. During the first machine cycle, this conditioned readout circuit path was opened by the A contacts of relay R225 (Fig. 62w). The relay R118 (Fig. 62b) is held energized by R30A and R29B (Fig. 62a) in the manner previously described, from the time such relay is picked up in the first machine cycle until after 270° of the second machine cycle when the contacts R30A open. Therefore, this conditioned readout circuit path will remain open as just explained until after the relay R225 restores its A contacts in Fig. 62w to their normal position in the second machine cycle. When R225 restores its A contacts to the positions shown in the drawings, the conditioned readout circuit path will then include the #1 translator selector magnet TSM1 and the #2 translator selector magnet 2TSM1. This circuit will be established in the second machine cycle when CR3 close. When CR4 close in the second cycle, energizing circuits will also be established to the #1 and #2 translator clutch magnets (Fig 62q). The two translators will then operate to actuate the keys on the #1 and #2 typewriters for printing the numeral "1." The numeral "1" will be printed in character space position #44 of the invoice 11 and in the character space position #13 of the picker tag 14. The actuation of the key of the #1 typewriter will also effect an operating cycle of the punch 500, during which the code designation for the numeral "1" will be punched in the 5-position tape 12 of Fig. 50.

*Operation #D51 — Punch carriage return code.*—In this operation, the carriage-return code is punched in the 5-position tape under the control of the 2–3–5–6 code designation in column #51 of the program tape 15. The 2–3–5–6 code provides for energizing the pick-up coil of carriage-return control relay R233 (Fig. 62j) under the control of CR5. R233 then closes its hold contacts R233F (Fig. 62c) and thereby establishes an energizing circuit for the hold coil thereof through cam contacts CR2. R233 closes its contacts R233A and R233B (Fig. 62w) and thereby conditions energizing circuits for the #1 translator selector magnets TSM1 and TSM10 and for the #2 translator selector magnets 2TSM1 and 2TSM10. As will be apparent from the previous description, these conditioned circuit paths are under the control of cam contacts CR3, so that when the latter close, these selector magnets become energized. When CR4 close, to energize both translator clutch magnets, the translator of the #1 and the #2 typewriters are operated. As shown in Fig. 27, the #1 translator will actuate the special CR key 318 which, as previously explained, does not effect operation of a type bar, but merely trips a cam unit 321, and the latter will operate a punch selector slide 653a which provides for punching the carriage-return code designation in the tape 12 of Fig. 50. As no type bar is provided for actuation by the CR key 318, the #1 typewriter will not print, nor will it space. As shown in Fig. 48, the energizing of the selector magnets 2TSM1 and 2TSM10 will not effect a key selection on the #2 typewriter. Consequently, the #2 translator will not effect operation of a key on the typewriter.

*Operation #D52—Punch line-feed code.*—The 2–4–5–6 code designation in column #52 of the program tape provides for energizing the line-feed punch control relay R234 (Fig. 62j) under the control of CR5. R234 then closes its hold contacts R234F (Fig. 62c) and thereby establishes a hold circuit therefor under the control of cam contacts CR1. R234 closes its contacts R234A and R234B (Fig. 62w) and thereby conditions energizing circuits for the #1 translator selector magnets TSM4 and TSM8 and for the #2 translator selector magnets 2TSM4 and 2TSM8 and these conditioned circuits are closed by CR3. Thus, when CR4 close, the translators of both typewriters are operated. The #1 translator will actuate a special LF key 318 (Fig. 27) which trips a related cam unit 321 and the latter operates a related selector slide 653a which effects an operation of the punch 500 during which the line-feed code designation is punched in the 5-position tape 12 of Fig. 50. There is no type bar actuated by the tripped cam unit on the #1 typewriter and consequently the #1 typewriter will not space, nor will it print. As shown in Fig. 48, no key will be selected by the energizing of the #2 selector magnets 2TSM4 and 2TSM10 and consequently the #2 translator will go through a cycle of operation, but it will not actuate any key of the #2 typewriter.

*Operation #D53—Punch figures-shift code.*— The code designation 3–4–5–6 in column #53 of the tape 15 provides, when cam contacts CR5 close, for energizing the relay R117 (Fig. 62k). This operating step effected by R117 is identically the same as described above in operation #M3, when R117 was energized by the 9–10–11–12 code in the master side of the tape. As described, R117 provides for punching the figures-shift code in the 5-position tape and also for turning on the #1 typewriter. As the #1 typewriter is already turned on, the latter function of R117 is superfluous, but it does not interfere with the punching operation. It is noted that in this operation the #2 translator selector magnets 2TSM4, 2TSM7, and 2TSM8 will also be energized, but these selector magnets will make no key selection on the #2 typewriter as shown in Fig. 48. Therefore, the #2 translator will go through a cycle of operation as in #D51 and #D52, and no key will be actuated.

*Operation #D54—Punch off.*—In this operation, the 2–6 code designation in column #54 of the program tape provides for energizing relay R237 (Fig. 62j) under the control of CR5. R237 performs its function of turning off the punch in the same manner as explained hereinabove in operation #M6. As the #1 and #2 typewriters are both turned on during this operation, each will be spaced one character space position as a part of this operation, the #1 typewriter spacing to character space position #46 and the #2 typewriter to its position #15.

*Operation #D55—Tabulating operation of the #1 and #2 typewriters.*—In this operation, a code hole in the #3 code position of the program tape 15 provides for energizing the tabulating control relay R221 (Fig. 62k) under the control of CR5. The relay R221 provides for a tabulating operation of the carriages of both the #1 and the #2 typewriters in the same manner as R221 effected the tabulation of the #1 typewriter in operation #M76 hereinabove, and a repetition of the detailed description thereof at this point is unnecessary.

The #1 typewriter carriage 310 will tabulate to its #53 character space position where a pre-set tab stop 332 stops the movement of the carriage in the manner fully explained hereinabove and where an interlock control stop CS2 in the same character space position of the extra tab rack 337 opens the interlock contacts TIC (Fig. 62q). The #2 typewriter carriage 2310 tabulates to its character space position #31 where the movement of the carriage is arrested by a pre-set regular tab stop like the stop 332 of the #1 typewriter and where an interlock control stop 2CS2 opens the interlock tab contacts 2TIC (Fig. 62q). When both the interlock contacts 2TIC of the #2 typewriter and the contacts TIC of the #1 typewriter are thus opened, the two energizing circuits for the hold coil of relay R34 are broken. When R34 thus becomes deenergized, it transfers its contacts to the position shown in the drawing and this includes the opening of contacts R34C (Fig. 62e) to drop out the main interlock relay R36, as previously described. The contacts of R36 then shift to their positions shown in the drawings and thereby restore the apparatus to its normal operating condition.

*Operation #D56—Card feed on—Punch off.*—In this operation, the 1-3 code designation in column #56 of the program tape provides for energizing the relay R136 (Fig. 62i) under the control of cam contacts CR5. The relay R133 shifts its contacts and provides for turning the card feed on and the punch off in the same manner as described hereinabove in operation #M77, wherein the relay R136 was energized by a 7-9 code designation in column #77 of the program tape and on the master side thereof. As the punch has already been turned off in operation #D54 above, the turning off of the punch in this operation is superfluous. However, it does not interfere with the other functions performed during this operation. As both the #1 and the #2 typewriters are now turned on, the #1 and #2 translators will be operated when CR4 close (Fig. 62q) and they will actuate the space bars of the two typewriters and thereby space the #1 carriage to its #54 character space position and the #2 carriage to its character space position #32.

*Operations #D57 to #D63—#2 typewriter off—Read card column #33—Skip from A #11 hole in the card—Skip off.*—In this operation, the 2-4 code designation in column #57 of the program tape provides for energizing the #2 typewriter-off relay R6 (Fig. 62j) under the control of cam contacts CR5. The #2 typewriter is turned off in the same manner as explained hereinabove when R6 was energized in operation #D41.

In this operation, the column #33 of the detail card DC—1 is sensed and the code hole in the #11 index point position thereof provides for a skipping operation. The skip code designation is punched in column #33 of the card DC—1 because such card does not contain recorded data in the field thereof identified by the legend "List price." Consequently, time is saved by skipping over the list-price field and also by the #1 typewriter tabulating to skip the corresponding field in the invoice 11.

The manner in which this skipping operation is effected in this operating step is identically the same as described hereinabove under the sub-heading "Operations #M44 to #M63" wherein the skipping was effected under the control of the #11 hole in column #39 of the master card MC—1. Also, the skip-off designation, which is a code hole in the #6 code position of column #63 of the program tape, provides for energizing the skip-off control relay R32 which stops movement of the tape and card in identically the same manner as described in detail hereinabove, in operation #M64. The movement of the program tape will be stopped in position to have its record column #64 read. The movement of the detail card DC—1 will be stopped in position to have its column #40 read. A pre-set regular tab stop 332 (Fig. 25) in character space position #61 stops the #1 typewriter carriage 310 at that point. An interlock control stop CS2 in the corresponding character space position of the extra tab rack 337 opens the interlock tab contacts TIC (Fig. 62q) to break the hold circuit for the tab interlock relay R34.

Thus, at the end of the skipping operation and when the interlock relay R36 is deenergized and returns its contacts to their normal positions shown in the drawings, the program tape 15 will be in its #64 column reading position, the card DC—1 will be stopped in its column #40 reading position, and the #1 typewriter carriage will be in position to print in character space position #61.

It is noted that in Figs. 59a and 59b the program tape 15 is shown as containing code designations in its columns #60, #61, and #62 which are part of the area of the tape skipped over in the operating step being described. Although these code designations may cause momentary energizing of the tape code set-up relays R146 to R151, inclusive (Fig. 62d), they will have no effect on the skipping operation as the interlock relay R36 is then energized and its contacts R36D (Fig. 62h) prevent the energizing of any of the control relays through the relay translator network of Figs. 62h to 62k, inclusive. The hold coils of the tape code set-up relays R146 to R151 (Fig. 62c) are then prevented from being energized by the open contacts R31E of the skip control relay R31. As will be explained hereinafter, these skipped code designations in the program tape are used to control operations when the detail card being read has data recorded in its list-price field. For example, see detail card DC—2 in Fig. 55.

*Operation #D64—Card feed off.*—The 2 code designation in column #64 of the program tape provides for energizing the card-feed-off relay R9 (Fig. 62j). The manner in which R9 turns off the card feed is fully explained hereinabove in operation #M5. The card-feed-off function in this operation is superfluous as the hold coil of the card-feed-on relay R8 (Fig. 62L) was deenergized at the end of the skipping operation previously described when the skip-off control relay R32 was energized by the skip-off designation in column #63 of the program tape and opened its contacts R32D. The card-feed-off designation is used when operating under the control of a detail card having price data in the list price field. See description hereinafter of the operation under the control of card DC—2.

As the #1 typewriter is turned on during this operation #D64, the carriage thereof is spaced to its character space position #62 when CR4 close and energize the magnet 462 at 215° (Fig. 62q).

*Operation #D65 — Quantity re-set.* — As the quantity number of the ordered item or part represented by the detail card DC—1 has now been read out and typed, the stored quantity number is now wiped out of the order banks QN—A to QN—D (Figs. 62n and 62o) of the relay storage unit and such banks are again conditioned for storing the quantity number of the item represented by the next detail card to be read. For this purpose, column #65 of the program tape 15 contains the code designation 1-2-4-6 which, when CR5 close, provides for energizing the re-set control relay R19 (Fig. 62h). It is believed that the manner in which the re-set control relay R19 wipes out the stored quantity number will be apparent from the previous description of a re-set operation under the heading "Re-setting of the storage relays," which explains in detail how the data stored in the customer's order number and page number sections of the relay storage unit may be wiped out. It is noted, however, that the energizing of the relay R19 at this time will have no effect on the numbers now stored in the customer's order number and page number storage sections, because the contacts R48A (Fig. 62n) which are connected in shunt with the re-set relay contacts R19C, are now closed. Thus, any of the storage relays of the group R162 to R193, inclusive, and space relays of the group R214 to R218, inclusive, which may now be energized, will remain energized even though the re-set relay contacts R19C are opened by the energizing of R19. It is also noted that the hold circuit of storage shift control relay R161 is also maintained through R48A.

The relay R19, when energized, as explained above, also opens its contacts R19D (Fig. 62n) and thereby drops out the hold coils of all storage relays of the group R194 to R209, inclusive, and all column-shift relays of the group R210 to R213, inclusive, which may now be energized as a result of a previous storage operation. The opened contacts R19D also deenergize the hold coils of any of the sequence control relays of the group R40 to R46, inclusive, which may now be energized at this time. The opening of contacts R19D will also deenergize the hold coil of the motor bar control relay R20 (Fig. 62m). In the present re-set operation the hold circuit for storage conditioning relay R38 (Fig. 62m) remains closed and the contacts R38C thereof are closed to condition the first order bank QN—A (Fig. 62n) of the set of quantity number order banks for receiving values under the control of the auxiliary keyboard in the same manner as previously described. It will be noted that the hold circuit for the storage conditioning relay R38 (Fig. 62m) was not dropped out in the previous storing of the quantity number, because there were not enough digits stored to energize the sequence control relay R41 (Fig. 62n) and contacts R41C (Fig. 62m) were therefore not opened. The relay R19 also transfers its contacts R19A (Fig. 62b) to drop out the relay R41, if it had been energized, and to energize the pick-up coil of R38, the same as previously described; but, the latter is superfluous for the particular operation because R38 is already energized.

During the re-setting operation just described, the #1 typewriter was on. Therefore, its space key will be actuated when cam contacts CR4 (Fig. 62q) close at 215° to energize the #1 translator clutch magnet 462, and the carriage 310 of the typewriter will then space to its character space position #63.

*Operation #D66—#1 typewriter off.*—In column #66 of the tape 15, the 1-6 code designation provides for turning off the #1 typewriter by energizing the relay R4, and the latter performs its functions in the same manner as described in operation #M4.

*Operation #D67 — Unit net price skip control.* — As explained hereinabove in operation #M118, the fact that column #80 of the master or heading card MC—1, previously read, is blank, signifies that the customer for whom the invoice 11 is being prepared is a "dealer" customer as distinguished from a "non-dealer" customer. The dealer customer receives a discount and consequently, both the "net" price of the items ordered as well as the "list of special net" price are to be printed on the invoice. Were the customer a "non-dealer," like the one identified in master card MC—2, he will not receive the discount provided by the net price and consequently the latter price should not appear on his invoice. As explained hereinabove, when the customer is a "non-dealer," such fact is signified by the presence of a #11 hole in column #80 of the corresponding master card. The #11 hole then provides for energizing relay R64 (Fig. 62g) and the latter is then held energized across the line through R12D (Fig. 62b) while all the detail cards representing the parts ordered by the non-dealer customer are being read.

Column #67 of the program tape 15 contains the code designation 1-4-5-6 which conditions an energizing circuit for the skip control relay R116 (Fig. 62h). This conditioned circuit includes the wire 1160 and the contacts R64C (Fig. 62i) which are now open because of the fact that master card MC—1 representing the customer to whom the invoice being prepared is to be sent, is a dealer customer. R116 is therefore not energized and the skipping operation is not effected during this operation.

When the part represented by the detail card DC—1 is ordered by the customer of master card MC—2, the just-mentioned circuit to skip-control relay R116 including the contacts R64C, is established in operation #D67 when CR5 close. R116 closes its hold contacts R116F (Fig. 62c) and thereby provides a hold circuit therefor under the control of CR2. R116 closes its contacts R116D (Fig. 62d) and thereby provides an energizing circuit for the skip control relay R31 under the control of cam contacts CR7. R31 then effects a simultaneous skipping operation of the program tape 15 and of the card DC—1 in the same manner as described hereinabove under the sub-heading "Operations #M44 to #M63." As neither R221 (Fig. 62k) nor R222 (Fig. 62d) is energized as a part of this operation, the tabulating key 314 of the #1 typewriter is not actuated and the #1 typewriter remains in position to print in character space position #62 while the skipping of the tape and card is being effected. The skip-off designation in program tape column #75 stops the skipping operation, the same as described above in operation #M64. The movement of the tape 15 then stops with the tape in position to have its column #76 read and the card DC—1 stops in its column reading position #43. The code designations in columns #68, #69, #72, #73, and #74 of the program tape 15 will not affect the skipping operation as the interlock relay contacts R36D (Fig. 62b) prevent the establishing of any control circuits through the tape code relay translator of Figs. 62h to 62k, inclusive. Thus, the unit net price field of the card DC—1 and the corresponding columns of the program tape 15 are skipped when the part represented by the card DC—1 is ordered by a non-dealer customer such as is represented by the master card MC—2 of Fig. 53.

*Operation #D68—Card feed on.*—In the specific example being described, the #1 code hole in column #68 of the program tape provides for turning on the card feed by energizing the relay R8. This operation has already been described in detail in operation #M4 and need not be repeated here.

*Operation #D69—#1 typewriter on—Read card column #40.*—The 1–5 code designation in column #69 of the program tape provides for turning on the #1 typewriter by energizing the relay R3 under the control of cam contacts CR5 in the manner already described above in operation #M3. Column #40 of the card DC—1 (Fig. 54) is also read; and, as this column is blank, no translator selector magnets (Fig. 62w) will become energized and the #1 typewriter carriage 310 will be spaced under the control of CR4 (Fig. 62q), to its character space position #64.

*Operations #D70 and #D71—Read card columns #40 and #41.*—In these operations, columns #41 and #42 of the card are read during successive cycles; and, as they contain no code designations, the #1 typewriter carriage spaces to character space position #65 and then to position #66. Columns #70 and #71 of the tape 15 are also read, but as they are blank, no controls are effected thereby.

*Operation #D72—Diagonal control—Read card column #43.*—In this operation, the code designation 2-3-4-5 in column #72 of the program tape 15 provides for energizing the diagonal control relay R143 (Fig. 62j) under the control of cam contacts CR5. R143 transfers its contacts R143A (Fig. 62f) and thereby conditions an energizing circuit for the diagonal control relay R144 which is under the control of CR6 and contacts of the card code set-up relays R101 to R109, inclusive, R111 and R112. When the card column being read during this operation contains a hole in the #12 index point position, the set-up relay R112 is energized and closes its contacts R112E (Fig. 62f) and thereby establishes the energizing circuit for the relay R144 when cam contacts CR6 close. When R144 is energized, it closes its contacts R144A, R144B, and R144C (Fig. 62u) and thereby provides for energizing the #1 translator selector magnets TSM4, TSM8, and TSM11 which effect the operation of the #1 translator when CR4 close to actuate the key 315 (Fig. 27) of the #1 typewriter to print the diagonal character "/". However, as the column #43 of the card DC—1 being read does not contain a #12 code hole, the relay R144 is not energized during this operation and the diagonal line will not be printed by the typewriter. As card column #43 of the card DC—1 is blank, the #1 typewriter is spaced to its character space position #67 in the manner previously explained.

*Operation #D73—Card feed off—Read card column #44.*—In this operation, the code hole in #2 position of column #73 of the program tape 15 provides for energizing the card-feed-off relay R9 (Fig. 62j) under the control of cam contacts CR5. The relay R9 performs this function in the same manner as described hereinabove in operation #M5. Column #44 of the card DC—1 is read and as this column contains a code hole in its #5 index point position, the #1 typewriter is operated in the manner previously explained to print the numeral "5" in character space position #67 of the invoice 11.

*Operation #D74—Card feed on.*—The #1 code hole designation in column #74 of the tape provides for energizing the relay R8 which turns on the card feed in the manner described previously in operation #M4. The card column #45 will not be read as a part of this operating step, because the clutch CFC does not engage until the end of the cycle. As the #1 typewriter is turned on, the carriage 310 thereof will be spaced to character space position #69 when CR4 (Fig. 62q) close to energize the #1 translator clutch magnet 462. The card feed is turned off in operation #D73 above and turned on in this operation so as to provide an automatic space on the invoice between the units of dollars printed in space position #67 and the tens of cents printed in character space position #69.

*Operation #D75—Skip off—Read card column #45.*—In this operation, the #6 code hole designation in column #75 of the program tape 15 provides for energizing the skip-off control relay R32 (Fig. 62e) which, as explained above in operation #D67, stops a skipping operation initiated in operation #D67 when an invoice is prepared for a "non-dealer" customer. However, as the invoice being prepared is directed to a "dealer" customer, R31 was not energized in operation #D67 and consequently no skipping operation was effected. Contacts R31D (Fig. 62e) are now open and therefore the circuit for R32 can not be established in this operating step. In this operation, column #45 of the card is read which contains a code hole in its #9 index point position which effects printing of the numeral "9" in character space position #69 of the invoice 11, in the same manner as previously explained.

*Operation #D76—#1 typewriter on—Read card column #46.*—The 1–5 code designation in column #76 of the tape provides for turning on the #1 typewriter by energizing the relay R3. As the relay R3 is at this time already energized, the code designation in the tape has no effect in the operation being described. This code designation is recorded in column #76 so that when preparing invoices to "non-dealer" customers and the tape columns #68 to #74 are skipped, as explained above in operation #D67, the #1 typewriter will be turned on at this point.

In this operation, card column #46 is read which contains a code hole in the #0 index point position. Consequently, the #1 typewriter is operated to print the numeral character "0" in character space position #70 of invoice 11.

*Operation #D77—Card feed off—Read card column #47.*—The column #77 of the program tape contains a hole in the #2 index point position which provides for energizing the card-feed-off relay R9, in the manner previously described. Card column #47 is read during this operation, and as such column is blank, the #1 typewriter is spaced when CR4 close, to character space position #72.

*Operation #D78—Net price tabulating control.*—In this operation, the 2-3-4-6 code designation in column #78 of the program tape will effect the energizing of the tabulating control relay R221 (Fig. 62k), when the contacts R64A are closed. As shown in Figs. 62j and 62k, the circuit path for energizing R221 includes the normally open points of contacts R151B, a wire 1161, the contacts R64A, and the pick-up coil of R221. As explained hereinabove in operation #M118, the relay R64 is energized in response to the sensing of a #11 code hole in column #80 of a non-dealer card like the card MC—2 shown in Fig. 53. In the invoice being prepared, the master card, MC—1, contains no such designation in the column #80 and consequently the relay R64 is not now energized. Therefore, the 2-3-4-6 code designation in the tape 15 will not provide for energizing the relay R221 in the present operation. As the #1 typewriter is turned on, the cam contacts CR4 (Fig. 62q) will close an energizing circuit for the #1 translator clutch magnet 462 and the #1 translator will then actuate the space key of the #1 typewriter 300 to space the carriage to its character space position #73.

When preparing invoices for non-dealer customers, such as the one represented by the master card MC—2, the relay R64 is energized and held energized while reading subsequent detail cards; and, in this operation #D78, the tabulating control relay R221 (Fig. 62k) is energized and will thereby effect a tabulating operation of the #1 typewriter carriage 310. This tabulating operation is the same as described hereinabove in operation #M76 and the details thereof need not be repeated at this point. A pre-set regular tab stop 332 (Fig. 25) in character space position #73 will stop the #1 typewriter carriage 310 and a control stop CS2 in the corresponding space position of the extra tab rack 337 will open the interlock tab contacts TIC (Fig. 62q) and thereby drop out the hold coil of the tabulating interlock relay R34 which will then provide for de-energizing the interlock relay R36 and thereby restore the apparatus to its normal operation. This tabulating control provides for skipping over character space positions #64 to #73, inclusive, of the invoice 11 which, as shown, comprise the area provided for printing the net price. From an examination of Fig. 59b, it is noted that the #1 typewriter is turned off in column #66 of the program tape 15. This was explained above in operation #D66. As explained in operation #D67, when an invoice is prepared for a customer as represented by the card MC—2, a skipping operation will be effected and the program tape will be stopped in position to read its column #76 and the card stopped in position to read its column #48. The typewriter at the time it was turned off in operation #D66, was in its character space position #62. Consequently, when the typewriter is turned on, in operation #D76, it will space to its position #63; and, in operation #D77, it will space to its position #64; and in operation #D78, the carriage will be tabulated from its position #64 to its position #73, as explained above.

*Operation #D79—#1 typewriter off—Card feed on.*—In this operation, the 5-6 code designation in column #79 of the program tape provides for energizing the relay R137 (Fig. 62k) under the control of cam contacts CR5. This is the same operation as was described hereinabove in operation #M4. The #1 typewriter is turned off at this point in order to prevent the invoice 11 from being spaced during the cycle the card feed is turned on.

*Operation #D80—#1 typewriter on—Read card column #48.*—Column #80 of the program tape contains the 1-5 code designation which provides for energizing the #1 typewriter-on relay R3, in the same manner as previously explained in operations #M7 and #M3. As the card feed was turned on in the previous operation #D79, column #48 of the detail card is read. This column being blank, the #1 typewriter will space to its character space position #74.

*Operations #D81 and #D82—Read card columns #49 and #50.*—Columns #81 and #82 of the tape are blank. In these operations, card columns #49 and #50 will be read during successive machine cycles and as these are blank, the #1 typewriter carriage will be spaced to its character space position #75 and then to its position #76.

*Operation #D83—Diagonal control—Read card column #51.*—Column #83 of the program tape 15 contains the diagonal control code 2-3-4-5. This operation is the same as operation #D72 described above. As column #51 of card DC—1 does not contain a #12 hole, the diagonal control relay R144 (Fig. 62f) can not be energized. Consequently, the diagonal control function is superfluous to the operation being described. Card Column #51 of the card DC—1 being blank, the #1 typewriter spaces to its character space position #77.

*Operation #D84—Card feed off—Read card column #52.*—A hole in the #2 index point position of the program tape 15 provides for energizing the card-feed-off relay R9, under the control of CR5. This relay turns off the card feed in the same manner as fully described hereinabove in operation #M5. Card column #52 is read and the hole in the #9 index point position thereof provides for printing the numeral "9" in character space position #77 of the invoice.

*Operation #D85—Card feed on.*—In this operation, the card feed is turned on again under the control of a code hole in the #1 index point position of column #85 of the program tape 15 and the #1 typewriter is automatically spaced to character space position #79. As in operations #D73 and #D74, the card-feed-off function effected in operation #D84 and the card-feed-on operation in #D85, provide for automatically spacing the typewriter after the printing of the units of dollars on the invoice.

*Operation #D86—Skip off—Read card column #53.*—In this operation, the skip-off code designation in column #86 of the program tape 15 is read, but as a skip operation had not been previously effected, this designation will perform no function at this point. The purpose of the skip-off designation at this point in the program tape is to provide for stopping a skipping operation which is effected when a #11 hole is punched in column #48 of the detail card being read. In certain types of detail cards, for example, see the detail card DC—2 of Fig. 55, only the "list" price is punched in the card and this is contained in the field composed of its columns #33 to #39, inclusive. In the "net" price field and in the "list of special net" price fields, a #11 code hole is punched at the beginning of each field so as to effect the skipping operations. With such cards as DC—2, the skip-off designation in column #86 of the tape 15 provides for stopping the tape 15 in position to read tape column #87 thereof and in stopping the card DC—2 in position to read card column #55 thereof.

In this operation #D86, card column #53 of the card DC—1 is read, and as this column contains a code hole in the #8 index point position, the #1 typewriter will be operated to type the numeral "8" in character space position #79 of the invoice.

*Operation #D87—Card feed off—Read card column #54.*—The card feed is turned off as a part of this operation in response to the code hole in the #2 index point position of column #87 of the program tape. This designation provides for energizing the relay R9, which performs its function of turning off the card feed in the same manner as described above in operation #M5. Column #54 of the card DC—1 is read and the code hole in the #5 index point position provides for printing the numeral "5" in character space position #80 of the invoice.

*Operation #D88—#2 typewriter on—#1 typewriter off—Readout order number, 6th position.*—Beginning with this operation, the stored customer's order number and invoice page number are read out and typed on the picker tag 14 in the #2 typewriter. In this operation, the 2–4–6 code designation in column #88 of the program tape 15 provides for energizing the relay R138 (Fig. 62j) under the control of cam contacts CR5. R138 closes its contacts R138B (Fig. 62i) to condition an energizing circuit for the readout control relay R128. Contacts R138C (Fig. 62i) close to condition an energizing circuit for the #1 typewriter-off relay R4. R138A (Fig. 62j) close to condition an energizing circuit for the #2 typewriter-on relay R5. These conditioned circuits are closed at 135° by the cam contacts CR6. The manner in which the relay R4 turns off the #1 typewriter is fully described in operation #M4 above, and the manner in which the relay R5 turns on the #2 typewriter is described hereinabove in operation #D7, and such operations need not be repeated at this point. Also, the manner in which readout control relay R128 performs its function of reading out the sixth order position of the customer's order number was fully described hereinabove in operation #M103. As the stored order number "13" does not have a 6th order position, no digit is stored in the order bank CO—6 (Fig. 62n), and consequently, the #2 typewriter 2300 will be operated to space its carriage 2310 to character space position #33. As in the previously described operation #M103, the relay R128 will close its contacts R128B (Fig. 62g) and thereby establish an energizing circuit for the space control relay R220 for the purpose of conditioning the apparatus to automatically punch the figures-shift code designation ahead of the punching of the first significant digit of the customer's order number. The relay R220 will be energized and held as before, but such relay can not now operate to pick up and hold the space-test relay R27 (Fig. 62d) because at this time the punch is turned off and the punch-off control relay contacts R237D are in shifted position and thereby prevent the establishing of the energizing circuit for the pick-up coil of R27.

*Operation #D89—Readout order number—5th position.*—In column #89 of the program tape, the 1–3–6 code designation provides for energizing the readout control relay R127 which attempts to read out the 5th order position of the customer's order number in the same manner as described hereinabove in operation #M104; but, as the stored order number contains no 5th order digit, the #2 typewriter will only space to its character space position #34.

*Operation #D90—Readout order number—4th position.*—The 1–4–5 code designation in column #90 of the tape provides for energizing the readout control relay R126 which attempts to read out the 4th order position of the stored order number in the same manner as explained in operation #M105. As the stored order number does not contain a digit in the 4th position, the #2 typewriter will space again and to character space position #35.

*Operation #D91—Readout order number—3rd position.*—In the operation, the 1–4–6 code designation in column #91 of the tape provides for energizing the readout control relay R125 which attempts to read out the 3rd order position of the customer's order number, in the same manner as in operation #M106 above. As such stored number does not contain a digit in the 3rd position, the #2 typewriter will space again and to its character space position #36.

*Operation #D92—Readout order number—2nd position.*—In this operation, the 1–5–6 code designation in column #92 of the program tape 15 provides for energizing the readout control relay R124 (Fig. 62i) which closes its contacts R124A (Fig. 62s) and thereby provides, under the control of the cam contacts CR3, for reading out the tens digit "1" of the stored customer's order number in the same manner as fully explained hereinabove in operation #M107. This will energize the #2 translator selector magnet 2TSM1 (Fig. 62w) of the #2 typewriter and thereby effect printing of the numeral "1" in character space position #36 of the picker tag 14 of Fig. 58. It is noted that as the #1 typewriter is now turned off and as the punch 500 is now turned off, the relay R124 can not provide through its contacts R124B (Fig. 62g) for the automatic punching of the figures-shift code designation in the tape 12, like was described in operation #M107 above.

*Operation #D93 — Readout order number, units position.*—In this operation, the 2–3–4 code designation in column #93 of the program tape provides for energizing the readout control relay R123 (Fig. 62j) which functions to read out the stored digit "3" of the order number in the same manner as described above in operation #M108. The numeral "3" is typed in character space position #37 of the picker tag 14.

*Operation #D94.*—In this operation no control is effected from the program tape and the #2 typewriter therefore spaces to character space position #39 of the picker tag.

*Operation #D95—Readout, page number—2nd position.*—The 2–3–5 code designation in column #95 of the program tape provides for energizing the readout control relay R122 (Fig. 62j) which controls the reading out of the second order position of the stored page number the same as described previously in operation #M114. As the stored invoice page number "1" does not contain a tens order digit, the #2 typewriter will space, under the control of cam contacts CR4 (Fig. 62q), to the character space position #40 of the picker tag.

*Operation #D96—Readout, page number—Units position.*—The 2–3–6 code designation in column #96 of the program tape 15 provides for energizing the readout control relay R35 under the control of cam contacts CR5. As explained fully hereinabove in operation #M115, the readout contacts R35C (Fig. 62s) establish a circuit path through the pyramid network PNP—1 corresponding to the units order bank PN—1 of the page number section of the relay storage unit, and this circuit includes cam contacts CR3 and the code wire CW1 which is connected through wire 2CW1 (Fig. 62w) to the #2 translator selector magnet 2TSM1. Thus, when the cam contacts CR3 and CR4 close, the #2 translator operates the #2 typewriter to print the numeral "1" in character space position #40 of the picker tag.

As the hold coils of relays R38 (Fig. 62m) and R151 (Fig. 62n) are now energized, the functions normally performed by the contacts R35A (Fig. 62b) and R35D (Fig. 62n) are not required in this operation #D96.

*Operation #D97—#1 typewriter on.*—In this operation, the 1–5 code designation in column #97 of the program tape 15 provides for turning on the #1 typewriter 300 by the energizing of relay R3. The manner in which this function is effected by R3 is fully described hereinabove in operation #M3. During this operation, the #1 and #2 typewriters automatically space one character space position.

*Operation #D98—Carriage return under the control of the program tape.*—In this operation, the #4 code designation in column #98 of the program tape 15 provides for energizing the carriage return relays R224 and R33 (Fig. 62f) under the control of CR5. The circuit path for energizing these relays was traced hereinabove in operation #M65, and includes the contacts R151HH (Fig. 62k) of the tape code set-up relay R151, the wire 1144, and the pick-up coils of R33 and R224 (Fig. 62f). The manner in which these control relays effect a carriage return operation is fully described in operations #M65 and #M19 and need not be repeated here. As both the #1 typewriter and the #2 typewriter are now turned on, both carriages will be returned to their #11 character space positions and their platens automatically line-spaced incident to such operation. The #1 typewriter will then be in position to print in the second line of the invoice under the control of the next detail card. The #2 typewriter will also be positioned to print the data for the second detail card DC—2 in the next line of the picker tag. As in the previously described carriage return operations, the interlock relays R36 and R55 will be energized while the carriage return is being effected and these relays will be dropped out at the end of the operation and their contacts restored to their normal positions shown.

Any time after the first detail card DC—1 is fed to its #1 column sensing position, the next detail card DC—2 may be placed in the card entrance slot 104 where it will be ready to be fed into the unit 100 at the same time the first detail card DC—1 is fed out of the unit by means of an eject operation. Also, at any time after operation #D65 where the quantity number was wiped out of the relay storage order banks QN—A to QN—D, inclusive, the quantity number ordered for the part represented by the second detail card DC—2 may be stored by the operator in the quantity number storage section under the control of the auxiliary keyboard.

*Operation #D99—#1 typewriter off—#2 typewriter off.*—In this operation, the 1–4 code designation in column #99 of tape 15 provides for energizing the relay R135 (Fig. 62i) under the control of cam contacts CR5. R135 will then close its contacts R135A, (Fig. 62i) to condition an energizing circuit for relay R4 and will also close its contacts R135B (Fig. 62j) to condition an energizing circuit for the relay R6. These conditioned circuits will be closed by cam contacts CR6 in the manner previously explained, and the relays R4 and R6 will then provide for turning off the #1 and the #2 typewriters in a manner which has already been described fully hereinabove in operations #M4 and #D41, respectively.

*Operations #D100 and #D101—Eject.*—Column #100 of the program tape 15 being blank, no control is effected in the operation #D100. In the operation #D101, the 3–4 code designation in column #101 of the program tape provides for energizing the eject control relay R15 (Fig. 62k) which effects the ejecting of the detail card DC—1, previously read, from the card reading unit 100 and the feeding into sensing position of the second detail card DC—2, which the operator has, by this time, placed in the card receiving slot 104. The events which take place during the eject cycle have already been fully described hereinabove, under the heading "Manual eject operation" wherein the relay R15 was energized by the manual closing of the eject key EJK at the end of the operations under the control of the master card MC—1. It is noted that as a part of this eject operation, the eject cam contacts ECB2 (Fig. 62c) open as before to drop out the hold coil of the tape shift control relay R155 so that its contacts A to F, inclusive (Fig. 62d), are returned to their respective positions shown in the drawing where the control of the operation of the illustrated embodiment is returned to the master card side of the tape 15 and the new detail card DC—2 which is now fed into sensing position.

Reading the detail card DC—2

At the end of the eject operation which was described above as operation #D101, the new detail card, which is assumed for the purposes of this description to be the card DC—2, is in position to have its #1 record column sensed, and the program tape 15 is in position to have its #1 column read. From the foregoing description of operations effected when detail card DC—1 is in the unit 100, it is believed that it will be apparent how data recorded in the card DC—2 is selectively typed on the invoice 11 (Fig. 57) in the #1 typewriter 300 and on the picker tag 14 (Fig. 58) in the #2 typewriter 2300 and how data from the card DC—2 and stored in the relay storage unit is punched in the 5-position tape 12 of Fig. 50. In general, the operation of the apparatus under the control of the card DC—2 is substantially the same as that effected under the control of the card DC—1, as described above. From an examination of Fig. 55, it is noted that the card DC—2 contains price data recorded in its "list" price field and that no price data is recorded in either its "net" price field or its "list of special net" price field. It is also noted that the card DC—2 is different from the card DC—1 in that there is no skip code designation recorded in column #33 of the card DC—2 and that there is a skip code designation recorded in each of columns #40 and #48 of the card DC—2. From this it is believed to be apparent that in the operation under the control of the card DC—2, the price data in its "list price" field will be typed in the corresponding field of the invoice 11 and that nothing will be typed in the unit net price field and the list of special net price field in the invoice. A brief description of the manner in which the apparatus operates under the control of the card DC—2 is as follows.

With the card DC—2 in the card reading unit, operations #D1 to #D56 are identically the same as those previously described. In operation #D57, the 2-4 code designation in column #57 of the program tape turns off the #2 typewriter in the same manner as previously described. Column #33 of the card DC—2 is read and, as this column is blank, the #1 typewriter is spaced to its #55 character space position. In operations #D58 and #D59, blank columns #34 and #35 of the card are read and the #1 typewriter is accordingly spaced twice to its character space position #57. In operation #D60, the 2-3-4-5 code designation again attempts to provide for printing the diagonal line as explained above in operation #D60 under the control of the card DC—1; but, as the column #36 of the card does not contain a #12 code hole, the printing operation is not effected. Column #36 of the card DC—2 being blank, the #1 typewriter is spaced again to its character position #58. In operation #D61, the card feed is turned off under the control of the program tape and column #37 of the card is read and the numeral "1" printed in character space position #58 of the invoice. In operation #D62, the card feed is turned on again; but, as the card feed clutch will not engage until the end of the machine cycle, the card is not read and the #1 typewriter is automatically spaced by the closing of the cam contacts CR4, the same as previously described. In operation #D63, the skip-off signal in the tape is superfluous as the skip-on relay R1 is not now energized. The card column #38 is read and the numeral "1" printed in character space position #60 of the invoice 11. In operation #64, the card feed is turned off under the control of the program tape and column #39 of the card is read and the numeral "0" is printed in column #61 of the invoice.

Operations #D65 to #D68, inclusive, are identically the same as those described previously in connection with the card DC—1. In operation #D69, the #1 typewriter is turned on from the program tape and column #40 of the card DC—2 is read. As shown in Fig. 55, this column contains the #11 code hole, which is the skip code designation. As a result, a skipping operation will be effected in which both the program tape and the card DC—2 will be moved at four times their normal speed, as explained in previously described skipping operations. The #1 typewriter will also be tabulated. This operation is identically the same as that described hereinabove in operation #M64 and in operations "#D57 to #D63," and a repetition of the detailed description at this point is therefore believed to be unnecessary. The skipping operation will terminate in response to the skip-off signal in column #75 of the program tape with the program tape in position to have its column #76 read and with the card DC—2 in position to have its column #48 read. A pre-set tab stop 332 (Fig. 25) in character space position #73 of the #1 typewriter terminates the tabulating operation. Control stop element CS2 in the corresponding position of the extra tab rack 337 provides for restoring the apparatus to its normal operating condition.

The 1-5 code designation in column #76 of the program tape is superfluous to operation #D76 as the #1 typewriter is already turned on at this point. The skip-off relay R32 by its contacts R32D (Fig. 62L) turned off the card feed by de-energizing R8 in operation #D75 hereof. Consequently, the typewriter spaces to position #74. In operations #D77 and #D78, the code designation in corresponding columns of the program tape will have no controlling effect on the operation of the apparatus. The card-feed-off designation in column #77 will not affect the operation because the card feed is already turned off by R32D in operation #D75. Also, as previously explained, the master card MC—1, representing the customer to whom the present invoice is addressed, did not energize the relay R64; so, the 2-3-4-6 code designation in column #78 of the program tape is ineffective to pick up R221 (Fig. 62k).

It is noted that when an invoice is prepared for a non-dealer customer; for example, the customer of card MC—2; and, when the part represented by a card such as DC—2 is ordered by such customer, the 1-4-5-6 code designation in column #67 of the program tape will effect identically the same operation as described hereinabove in operation #D67 under the control of the card DC—1, and in such case columns #40 to #47, inclusive, and the tape columns #68 to #75 inclusive will be skipped. Also, operation #D78 under the control of card DC—2 will then be the same as operation #D78 under the control of card DC—1 and the #1 typewriter carriage will be tabulated to its character space position #73.

In operation #D79 under the control of detail card DC—2, the #1 typewriter is turned off to prevent the carriage from spacing and the card feed is turned on the same as previously described. In operation #D80, the #1 typewriter is turned on and column #48 of the card DC—2 is read. As shown in Fig. 55, this column contains the skip code designation and consequently a skipping operation will be effected, in which columns #81 to #86, inclusive, of the tape are skipped and columns #49 to #54, inclusive, of the card are skipped, the movement of the tape 15 stopping with its column #87 in sensing position and the movement of the card stopping with its column #54 in sensing position. The carriage of the #1 typewriter is stopped in position to print in character space position #80.

Beginning with operation #D87 and extending to and including operation #D101, the operating steps with the card DC—2 in the reading unit are identically the same as corresponding steps described above when card DC—1 was in the reading unit.

In the example being described, it is assumed that the operator places the detail card DC—3 in the open side of the card receiving slot before the operation #D101 so that during the latter operating step, the card DC—2 will be ejected and the next card DC—3 fed into its #1 column reading position.

*Reading the direct order card DC—3*

As explained hereinabove, the card DC—3 of Fig. 56 represents a part which is not carried in stock at the branch warehouse where the invoice 11 is being prepared, and it is necessary for the customer to order such part directly from the main warehouse. The card DC—3 is therefore termed a direct-order card and is used in the example being described to indicate to the customer that the part is available at the main warehouse and should be ordered directly therefrom.

Operations #D1 to #D4, inclusive, under the control of card DC—3 are identically the same as the corresponding operations #M1 to #M4, inclusive, described hereinabove. It is noted that the card DC—3 contains a code hole in its #12 index point position. In operation #D5, the 7-9-10-12 code designation in the column #5 of the program tape and on the master side thereof provides for energizing the relay R142 (Fig. 62i) under the control of CR5 which close at 75° of the machine cycle. As the card feed was turned on in the previous operation #D4, the card reading fingers CRF1 to CRF12, inclusive (Fig. 9), will move into sensing relation with respect to column #1 of the card DC—3 and the sensing finger contacts F12 (Fig. 62a) will close at 42° and thereby establish a sensing circuit including the card code set-up relay R112. R112 will then close its contacts R112F (Fig. 62f) to condition an energizing circuit for the relays R13 and R14. R112 also closes its contacts R112E (Fig. 62f) to condition an energizing circuit for the tape-shift relay R155.

R142, when energized, as explained above closes its contacts R142A (Fig. 62j) to condition an energizing circuit for the card-feed-off relay R9. R142 also closes its contacts R142B (Fig. 62h) to condition an energizing circuit for the relay R115, and closes its contacts R142C (Fig. 62i) to condition an energizing circuit for the #1 typewriter-on relay R3. These circuits conditioned by the contacts of R142 are closed by CR6 (Fig. 62f) at 135° of the machine cycle, as explained hereinabove in operation #M5.

R9 turns off the card feed in the same manner as previously described.

R115 closes its contacts R115C (Fig. 62f) in the previously conditioned circuit for the relays R13 and R14 and which also includes the contacts CR6. R115 also transfers its contacts R115B (Fig. 62f) and thereby establishes the energizing circuit for R155 which was previously conditioned by the contacts R112E and such circuit also includes the contacts CR6. R155 then shifts its A to F contacts (Fig. 62d), inclusive, to transfer the program control for subsequent operations to the detail side of the tape 15, the same as when previous detail cards were read.

R13 closes its hold contacts R13B (Fig. 62c) and thereby establishes a hold circuit therefor including the normally closed eject cam contacts ECB2. Thus, R13 remains energized until ECB2 open in the next eject cycle when card DC—3 is ejected from the card reading unit 100. R13 closes its contacts R13A (Fig. 62b) and thereby establishes an energizing circuit for the hold coil of punch-off relay R56, which circuit extends across the power line. R56 then opens its contacts R56C (Fig. 62v) which, in the manner previously explained, prevent the establishing of circuits through the punch selector contacts SC1 to SC5, inclusive, and the common contacts C and thereby prevent operation of the 5-position tape punch 500 while the card DC—3 is being read. R13 also opens its contacts R13C (Fig. 62j) in the energizing circuit for the pick-up coil of the #2 typewriter-on relay R5. Thus, neither the #2 typewriter 2300 nor the tape punch 500 can be operated until the next eject cycle when ECB2 open to drop out R13 and the card DC—3 is ejected from the reading unit 100

R14 closes its hold contacts R14B (Fig. 62c) and thereby establishes a hold circuit therefor including the cam contacts CR2 which open at 15° of the following machine cycle. R14 opens its normally closed contacts R14C (Fig. 62i) in the energizing circuit for the pick-up coil of the #1 typewriter-on relay R3, and opens its normally closed contacts R14A (Fig. 62L) in the energizing circuit for the hold coil of the #1 typewriter-on relay R3.

It is noted that R14 is energized by the contacts of R115 and R115 is energized at 135° by CR6. CR6 also energizes at 135° the pick-up coil of R3 through R142C (Fig. 62i). Thus, within a few milliseconds after R3 is energized, the contacts of R14 break both the pick-up and holding circuits of R3. Thus, the #1 typewriter is prevented from being operated by CR3 or CR4 during this operating step #D5 while R14 is energized.

In operation #D6, the card feed is turned on and the #1 typewriter is turned off, the latter functional control being superfluous as the #1 typewriter was prevented from being turned on in the preceding operation, as just explained.

In operation #D7, the 2-4-5 code designation is superfluous as the #2 typewriter-on relay R5 can not be energized due to now open contacts R13C (Fig. 62j), and the punch is now turned off due to the energized hold coil of relay R56 (Fig. 62b). Column #2 of card DC—3, which contains a code hole in the #11 index point position, is read and a skipping operation is effected as a result thereof. Tape columns #8 to #11, inclusive, and card columns #3 to #6, inclusive, are skipped. The skip-off designation in program tape column #11 terminates the skipping operation, the tape stopping with its column #12 in sensing position and the card stopping in position to have its column #7 read. The manner in which a skipping operation is effected in response to the sensing of a #11 hole in a card column was fully described hereinabove under the heading "Operations #M44 to #M63" etc. and the manner in which the skip-off designation terminates the skipping operation is fully described in operation #M64. The present skipping operation is similar to those previously described, with the exception that the carriage of the #1 typewriter can not be tabulated as the #1 typewriter-on relay R3 is not now energized. The carriage therefore remains in its #11 character space position.

It is believed that the remaining operating steps which take place with the card DC—3 in the reading unit will be apparent from the previous description and from an examination of the card and of the program tape. In operation #D13, the card feed is turned on and the #1 typewriter is turned on in operation #D14. The data recorded in columns #7 to #30 of the card DC—3 is typed on the invoice in operations #D14 to #D40, inclusive. As the #2 typewriter can not be energized and as the punch can not be operated, as previously explained, those functional operations which are effected by the code designations in the program tape and which relate to the control of the #2 typewriter and of the punch, may be ignored. In operations #D48, #D49 and #D50, the stored quantity number is read out of the storage unit and typed on the invoice 11. In operation #D57, the #11 hole in card column #33 provides for skipping the tape columns and card columns in the same manner as described above in operations #D57 to #D63 and in operation #D64, which were effected under the control of the detail card DC—1. The #11 code hole in columns #40 and #48 of the tape will also effect skipping operations as described above in connection with the card DC—2. The card DC—3 will be ejected in operation #D101, the same as when the cards DC—1 and DC—2 were in the reading unit.

Additional control functions

*Tape punch operated from the record card.*—In accordance with the present invention, means is also provided herein to operate the tape punch 500 directly from code designations recorded in a record card and without requiring the operation of the #1 typewriter 300. This operation is provided for by the relay R140 (Fig. 62h) which is energized as a result of the sensing of either a 7–8–11–12 code designation in the master side of the program tape 15 or a 1–2–5–6 code designation in the detail side of the program tape. When either of these designations is sensed, the energized tape code set-up relays of the group R146 to R151, inclusive (Fig. 62d), shift their contacts in the pyramid relay translator of Figs. 62h to 62k, inclusive, to condition a circuit path therethrough and including the pickup coil of relay R140. This conditioned circuit path is established by the closing of the cam contacts CR5 (Fig. 62h) in the same manner as described above in other tape sensing operations. R140 will then close its hold contacts R140N (Fig. 62b) and thereby establish an energizing circuit for its hold coil extending across the power line and including the normally closed contacts R3C of the #1 typewriter-on relay R3. From this, it will be apparent that if the #1 typewriter-on relay is energized at the time the 7–8–11–12 or 1–2–5–6 code designation is sensed, then the energizing circuit for the hold coil of relay R140 can not be established. It will also be appreciated that the control of operations under relay R140 can be terminated at any time by the energizing of the #1 typewriter-on relay R3 (Fig. 62i) from a significant code designation in the program tape 15 in the manner previously described. R3 will then open its contacts R3C and drop out the hold coil of the relay R140.

From an examination of Fig. 62v, it is noted that the relay R140 when thus energized, closes its contacts A to E, inclusive, and thereby connects, respectively, the five punch selector magnets PSM1 to PSM5, inclusive, to five punch code wires PCW1 to PCW5, inclusive, and the latter are connected to contacts of the card code set-up relays R101 to R112, inclusive, in Fig. 62u, which, as will presently appear, selectively connect the punch code wires to the wire 1118 and the cam contacts CR3 (Fig. 62r). Referring again to Fig. 62v, it is noted that R140 also closes its contacts R140F and thereby connects the positive wire 1100 to the punch clutch magnet PCM through the previously described latch bail contacts 636 and the normally closed non-repeat relay contacts R63C.

From the foregoing and from the previous description of operation of the punch 500, it will be apparent that upon sensing a code hole designation in a record column of a card, the card code set-up relay or relays energized will adjust their contacts in Fig. 62u and thereby condition an energizing circuit or circuits to one or more of the punch selectors of the group PSM1 to PSM5, inclusive, which conditioned circuit or circuits will be closed by the closing of cam contacts CR3 (Fig. 62r) at 220° of a machine cycle. When one of the punch selector magnets is energized in the manner previously explained, its related latch lever of the group 546 to 550, inclusive (Fig. 40), will engage the bail 637 (Fig. 42) and move the latter clockwise as shown therein to close the latch bail contacts 636. The latter will then establish an energizing circuit for the punch clutch magnet PCM (Fig. 62v) through the now closed relay contacts R140F. From this, it will be apparent that a cycle of operation of the punch 500 is effected during which a code designation will be punched in the 5-position tape 12 which represents the same character in the 5-position code of Fig. 49 as was represented by the sensed code designation in the record card which effected the operation of the punch.

*Error cancellation in the tape 12.*—In the illustrated embodiment, erroneous code designations punched in the tape 12 may be manually cancelled by depressing a cancel key (Fig. 62v). As shown, the depressing of the cancel key will close its contacts CKC and thereby establish an energizing circuit for the relay R61 which extends across the power line. R61 will then close its contacts R61A to R61F, inclusive, and thereby connect the five punch selector magnets PSM1 to PSM5, inclusive, to a circuit wire 1163. R61 also closes its contacts R61F and thereby connects the wire 1163 to the positive conductor 1100 and establishes an energizing circuit for all five of the punch selector magnets. R61F will also establish an energizing circuit for the punch clutch magnet PCM including the wire 1163, the normally closed non-repeat relay contacts R63A and R63C and the punch clutch magnet PCM to the negative conductor 1101. Thus, as long as the cancel key is held depressed by the operator, the punch 500 will be operated in successive cycles and during each such cycle a code hole will be punched in each of the five code positions of the 5-position tape 12. As shown in Fig. 49, this is identified as the "letters shift" code designation. This code designation also is used to cancel any previous recorded erroneous designations in a tape as is well known by those skilled in this art.

*Item count mechanism.*—In accordance with the present invention, an improved mechanism is provided which automatically counts the lines typed in the body of an invoice 11 (Fig. 57) and warns the operator when a predetermined number of lines have been typed so that she can prevent the illustrated embodiment from attempting to type more lines than is provided for in the invoice sheet. As explained previously, each line in the body of the invoice is typed under the control of a separate detail card and represents an ordered item or part.

As shown in Figs. 63, 64, and 65, the item count mechanism comprises an item count magnet ICM including an armature 31 pivotally supported on a stud 32 carried by a fixed support plate 33. The armature is pivotally connected at its outer or free end to a pawl 34 having a tooth 35 constantly urged into engagement with the teeth of a ratchet 36 by a tension spring 37, the latter connecting a fixed stud 38 and a tail portion 39 of the pawl 34. The ratchet 36 is fixed at its center to a hub 40 of a homing disk 41, and the latter is rotatably mounted on a fixed stud 42 projecting from the support plate 33. From this it is apparent that each time the magnet ICM is energized, its armature 31 is attracted and thereby draws the pawl 34 backward a distance of one tooth of the ratchet 36; and, when the magnet ICM is deenergized, the spring 37 moves the pawl 34 and its tooth 35 forwardly and thereby advances the ratchet 36 and homing disk 41 counterclockwise as viewed in Fig. 65 an angular distance of one tooth. A non-return pawl 44 engaging the ratchet 36 prevents reverse movement of the latter and a fixed stop 43 engaged by the tooth 35 of the pawl 34 limits the advancing movement of the ratchet to the amount stated.

A second or item count disk 45 is rotatably mounted on the fixed stud 42 and is formed with an annular flange 46 having teeth 47 formed thereon and adapted to engage similarly formed teeth on an annular flange 48 formed integral with the homing disk 41. The teeth of the two disks 41 and 45 are normally urged into locking engagement by means of a compression spring 49 encircling the stud 42 and engaging at its two ends, respectively, the disk 45 and an abutment on the outer end of the stud 42, such abutment being provided by retaining clips 50 and 51, each of which fits within an annular groove 52 on the stud 42 and by a washer 53 arranged between the clips. From this it will be apparent that the item count disk 45 is normally advanced with the homing disk 41. It is noted that the angular position of the disk 45 with respect to the disk 41 may be manually adjusted by separating the disk 45 from the disk 41 against the force of the spring 49, then rotating the disk 45 to the new desired position, and then permitting the spring 49 to return the disk 45 axially into locking engagement with the disk 41.

The homing disk 41 is provided with three cam notches 55 (Fig. 65) located 120° apart, and the item count disk is also provided with three cam notches 57 located 120° apart. A pivoted cam follower 58 having a tooth 59 engages the periphery of the homing disk 41 and a similar cam follower 60 having a tooth 61 engages the periphery of the item disk 45. The follower tooth 59 is kept in engagement with the homing disk 41 by the inherent spring force of a movable spring blade 63 of a pair of make homing contacts 1131. Likewise, the follower tooth 61 is kept in engagement with the periphery of the item count disk 45 by the inherent spring force of a movable spring blade 64 by a pair of break item count contacts 1165 (see also Fig. 62L).

From an examination of Fig. 65, it will be apparent that the homing contacts 1131 are open when the tooth 59 of the follower 58 engages a cam notch 55 in the disk 41. This is the home position of the disk 41 and contacts 1131. For all other angular positions of the disk 41, the tooth 59 engages a high dwell portion 66 of the disk 41 and the contacts 1131 are thereby closed. As shown in Fig. 63, the item count contacts 1165 are held open by the follower 60 when the tooth 61 thereof engages a high dwell portion 67 of the disk 45 and are permitted to close when the tooth 61 engages one of the cam notches 57.

In the construction shown, the angular distance between any two cam notches 55 of the disk 41 and any two cam notches 57 of the disk 45 is equivalent to twenty teeth of the ratchet 36. Thus, it requires twenty pulsations of the item count magnet ICM to advance either disk from a point where its related follower tooth engages one cam notch to a point where such follower tooth engages the next notch.

The homing contacts 1131, disk 41, and the item count magnet ICM are also shown diagrammatically in Fig. 62c and the item count contacts 1165 and disk 45 are shown diagrammatically in Fig. 62L. For the purposes of describing the illustrated embodiment, it will be assumed that the invoice 11 of Fig. 57 has room for typing fifteen lines in the body thereof under the control of fifteen corresponding detail cards. The item count mechanism will count thirteen lines and then notify the operator so that she will know that the detail card then in the unit will provide for typing the fourteenth line, and that the next card inserted by her will effect the typing of the fifteenth or last line of the page. In order to accomplish this item count disk 45 is adjusted angularly with respect to the homing disk 41 so that each cam notch 57 trails a cam notch 55 an angular distance equal to thirteen teeth of the ratchet 36. In other words, the disks 41 and 45 are so adjusted that when a tooth 59 engages a notch 55 and thereby opens the homing contacts 1131 at home position, a notch 57 of the disk 45 will be in a position where it requires thirteen pulsations of the magnet ICM to advance such notch to the point where its related tooth 61 engages therein and closes the item count contacts 1165.

With the disks 41 and 45 arranged as just explained, and when a master card is fed into the card reading unit 100, the operation commences in the manner described in full hereinabove. The master card relay R48 (Fig. 62b) is energized as a part of operation #M8 described hereinabove and as a result of the energizing of the storage set-up relay R12 which adjusts its points R12D to energize the pick-up coil of R48. R48 then closes its hold contacts R48B (Fig. 62c) and thereby establishes a hold circuit for R48 through the normally closed eject cam contacts ECB2. R48 transfers its contacts R48C (Fig. 62c) and thereby conditions an energizing circuit for the item count magnet ICM which includes the homing contacts 1131, the wire 1130, and the cam contacts CR7 (Fig. 62d). If at this time the homing disk 41 occupies a position where its follower tooth 59 is out of a cam notch 55, then the homing contacts 1131 are closed; with the result that for each succeeding machine cycle when the cam contacts CR7 (Fig. 62d) close, the count magnet ICM will be pulsed through the circuit just described to advance the homing disk 41 and item count disk 45 clockwise a distance of one tooth and this will continue for each machine cycle until the cam follower tooth 59 (Fig. 65) on the disk 41 enters a cam notch 55 and thereby opens the homing contacts 1131. As explained, this is the home position of the parts which is the position shown in the drawings. When the homing contacts 1131 are thus opened, the energizing circuit for the magnet ICM is broken, and the parts will remain in the home position for the remaining operating steps while the master card is being read. When the master card is ejected, the relay R48 is deenergized by the opening of the cam contacts ECB2 (Fig. 62e), in the manner previously explained, and the contacts R48C then return to the position shown in Fig. 62c. As explained above, with the parts in their home position, a cam notch 57 in the item count disk 45 will occupy an angular position thirteen tooth spaces clockwise from the position of its related cam follower tooth 61.

Thereafter when each detail card is ejected, the cam contacts ECB1 (Fig. 62c) close and thereby establish a circuit to the count magnet ICM through the contacts R60B now closed, and through the normally closed points of R48C. Thus, for each detail item typed, the count magnet ICM indexes the item counter including the disk 41 and the disk 45 an angular distance of one tooth. This continues until the thirteenth item has been printed and the controlling detail card is ejected. When the latter happens, the follower tooth 61 (Fig. 63) will enter a cam notch

57 on the disk 45 and close the item count contacts 1165 (Fig. 62L) and thereby energize the relay R57. R57 will then open its contacts R57C in the energizing circuit for the eject control relay R16 which circuit also includes the hopper contacts HC and the contacts R60C. R57 will also transfer its contacts R57A (Fig. 62k) and thereby disconnect the circuit wire 1164 in the translator network from the eject control relay R15 and connect such wire to the tape-off relay R11. As explained hereinabove, an eject operation of each detail card is effected as a result of sensing the 3–4 code designation in column #101 of the program tape 15 (operation #D101). When this is done, the energized tape code set-up relays condition a circuit through the pyramid translator of Figs. 62h to 62k, inclusive, which includes the normally closed points R151DD (Fig. 62k) and the aforementioned wire 1164. For the first thirteen eject operations of the detail cards with the relay contacts R57A (Fig. 62k) in the position shown in the drawings, this sensing of the 3–4 code designation in operation #D101 will provide for energizing the eject control relay R15 and this relay will then adjust its contacts R15D (Fig. 62L) and thereby energize the pick-up coil of the relay R16 to effect the eject operation. However, when the relay R57 is energized as a result of the ejecting of the thirteenth detail card, R57 will remain energized because the item count disk 45 remains in the position just described while the fourteenth item is being typed under the control of the fourteenth detail card. Thus, in operation #D101 of the fourteenth detail card when the eject code 3–4 in column #101 of the tape 15 is sensed, such code will then energize the tape-off relay R11 instead of the eject relay R15. The energizing of relay R11 will provide for a tape-off operation by opening its contacts R11A (Fig. 62L) in the hold circuit for the tape-on relay R10, with the result that further operation of the apparatus will cease. The stopping of the operation will signify to the operator that only one more line can be typed. The operator will then effect an eject operation by depressing the eject key EJK (Fig. 62k), and the operator will then know that no more detail cards are to be inserted in the slot 104 and that the invoice 11 must be removed from the #1 typewriter 300 carriage after the typing under the control of the fifteenth card has been completed. During this manual eject operation of the fourteenth detail card, the item count magnet ICM will be again pulsed, thereby advancing the disk 41 and moving the follower tooth 61 (Fig. 63) out of the cam notch 57 and opening the contacts 1165. This will deenergize the relay R57 (Fig. 62L), which will then restore its contacts to their normal position shown.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In record controlled recording apparatus wherein data is selectively recorded in a copy sheet in accordance with a predetermined plan and under the combined control of data designations recorded in the record columns of a data source record and of control designations recorded in the record columns of a program control strip, the combination of a main driving motor and drive mechanism constantly operated thereby for effecting successive operating steps of the apparatus; strip sensing and feeding means controlled by said drive mechanism for sensing successively the record columns of the control strip and for advancing the control strip in such a manner that one strip record column is moved into sensing position at a strip sensing station and is sensed thereat during a normal operating step; source record sensing and feeding means operable, when operatively connected to said drive mechanism, for sensing successively the record columns of said source record and for advancing the source record in such a manner that one source record column is moved into sensing position at a source record sensing station and is sensed during a normal operating step; first and second recording means, each being operable when it is activated, to record data on a separate copy sheet; means responsive to the sensing of data designations in said source record for operating said first and second recording means to record the sensed data on the copy sheets; and means responsive to the sensing of significant control designations recorded in predetermined columns of said control strip, for operatively connecting and disconnecting the source record sensing and feeding means from said drive mechanism and for activating and de-activating said first and second recording means whereby data is selectively recorded in the copy sheets of said recording means in a predetermined manner.

2. In record controlled recording apparatus wherein data is selectively recorded in a copy sheet in accordance with a predetermined plan and under the combined control of data designations recorded in the record columns of a data source record and of control designations recorded in the record columns of a program control strip, the combination of a main driving motor and drive mechanism constantly operated thereby for effecting successive operating steps of the apparatus; strip sensing and feeding means controlled by said drive mechanism for sensing successively the record columns of the control strip and for advancing the control strip in such a manner that one strip record column is moved into sensing position at a strip sensing station and is sensed thereat during an operating step; source record sensing and feeding means operable, when operatively connected to said drive mechanism, for sensing successively the record columns of said source record and for advancing the source record in such a manner that one source record column is moved into sensing position at a source record sensing station and is sensed thereat during an operating step; printing means operable, when activated, to print character data on a copy sheet and comprising a positionable carriage for holding the copy sheet in printing position and a plurality of selectively actuatable members operable to effect printing of the character data on the copy sheet and to effect functional operations of the printing means including the positioning of said carriage in different printing positions; means responsive to the sensing of data designations in said source record for operating the actuatable members of said printing means so as to print data in different selected positions on the copy sheet; and means responsive to the sensing of significant control designations recorded in predetermined columns of said control strip for operatively connecting and disconnecting the source record sensing and feeding means from said drive mechanism, for selectively operating the actuatable members of said printing means to perform predetermined functional operations thereof, and for activating and de-activating said printing means, whereby data is selectively printed in the copy sheet in a predetermined manner.

3. Record controlled apparatus operable to record data in a predetermined manner and comprising, in combination, record sensing means operable, when activated, to sense successively the record columns of a source record wherein is recorded designations representing character data; data storage means comprising positionable storage elements representing character data by their different positions, manually operable entering means for selectively positioning the storage elements so as to represent character data, and readout means controlled by the positions of said storage elements and effective, when activated, to produce controlling effects representing, respectively, the data stored; data recording means operable in response to the sensed character data designations in the columns of the source record and in response to the character representing controlling effects of said storage readout means, for recording in a copy sheet the data represented by the sensed designations and the stored controlling effects; and program sequencing means for selectively activating and de-activating said record sensing means and said storage readout means according to a predetermined plan so that data from said source record and said data storage means may be selectively recorded in the copy sheet.

4. Record controlled apparatus operable to record data in a predetermined manner and comprising, in combination, record sensing means operable, when activated, to sense successively the record columns of a source record wherein is recorded designations representing character data; data storage means comprising positionable storage elements representing character data by their different positions, manually operable entering means for selectively positioning the storage elements so as to represent character data, and readout means controlled by the positions of said storage elements and effective, when activated, to produce controlling effects representing, respectively, the data stored; first and second recording means, and each said recording means being operable, when activated, to record data on a separate copy sheet; means responsive to the sensed data designations in the source record and to the character representing controlling effects of said storage readout means, for operating said recording means to record the sensed data and stored data in the copy sheets; and program sequencing means for selectively activating and de-activating said record sensing means, said storage readout means, and said first and second recording means according to a predetermined plan so that selected data from said source record and from said data storage means may be recorded in the copy sheets in a predetermined manner.

5. Record controlled apparatus operable to record data in a predetermined manner and comprising, in combination, record sensing means operable, when activated, to sense successively the record columns of a source record wherein is recorded designations representing character data; data storage means comprising positionable storage elements representing character data by their different positions, manually operable entering means for selectively positioning the storage elements so as to represent character data, and readout means controlled by the positions of said storage elements and effective, when activated, to produce controlling effects representing, respectively, the data stored; printing means operable to print character data on a copy sheet and comprising a positionable carriage for holding the copy sheet in different printing positions, and comprising a plurality of selectively actuatable members operable to effect printing of characters on the copy sheet and to effect functional operations of said printing means including the positioning of said carriage in different printing positions; means responsive to the sensing of data designations in said source record and to the character representing controlling effects of said storage readout means, to actuate said members of said printing means to print the sensed and stored data on the copy sheet; and program sequencing means for selectively activating and de-activating said record sensing means and said storage readout means, and for selectively actuating the functional actuating members of said printing means so as to selectively print stored data and data from the source record in a predetermined fashion on the copy sheet.

6. Record controlled apparatus operable to record data in a predetermined manner and comprising, in combination, printing means operable, when activated, to print character data on a copy sheet and comprising positionable carriage means for holding the copy sheet in printing position, selectively actuatable character printing members for printing corresponding characters on said copy sheet and selectively actuatable functional members for effecting functional operations of the printing means and including the function of positioning said carriage in different printing positions; record sensing means operable, when activated, to sense successively data designations in a record source representing both character data and the functions performed by at least some of functional members of said printing means; data storage means comprising positionable storage elements representing character data by their different positions, manually operable means for entering data by positioning said elements, and readout means controlled by the position of said storage elements and effective when activated to produce control effects representing, respectively, the data stored; means responsive to the sensed character data designations in the record source and responsive to the character representing control effects produced by the storage readout means for actuating the corresponding character printing members of said printing means, and responsive to the data designations in the record source representing functional operations for actuating the corresponding functional members of said printing means; and program sequencing means for selectively activating and de-activating according to a predetermined plan said printing means, said record sensing means, and said storage readout means, and for selectively actuating according to said plan the functional members of said printing means, whereby selected portions of the character data in the record source and in the storage means are recorded in a predetermined manner on the copy sheet.

7. Record controlled apparatus operable to record data in a predetermined manner and comprising, in combination, printing means operable, when activated, to print character data on a copy sheet and said printing means comprising positionable carriage means for holding the copy sheet in printing position, selectively actuatable character printing members for printing corresponding characters on said copy sheet and selectively actuatable functional members for effecting functional operations of the printing means and including the function of positioning said carriage in different printing positions; a code punch operable, when activated, to record in a record sheet code designations representing both character data and functional operations of said printing means; record sensing means operable, when activated, to sense successively data designations in a record source representing both character data and the functions performed by at least some of functional members of said printing means; data storage means comprising positionable storage elements representing character data by their different positions, manually operable means for entering data by positioning said elements, and readout means controlled by the position of said storage elements and effective, when activated, to produce control effects representing, respectively, the data stored; means responsive to the sensed character data designations in the record source and responsive to the character representing control effects produced by the storage readout means for actuating the corresponding character printing members of said printing means, and responsive to the data designations in the record source representing functional operations for actuating the corresponding functional members of said printing means; means responsive to the sensed designations in said record source and the data representing control effects of said readout means for operating said punch; and program sequencing means for selectively activating and de-activating according to a predetermined plan said printing means, code punch, record sensing means, and said storage readout means, and for selectively actuating according to said plan the functional members of said printing means, whereby selected portions of the character data in the record source and in the storage means are recorded in a predetermined manner on the copy sheet and the record sheet.

8. Record controlled apparatus operable to record data in a predetermined manner and comprising, in combination, printing means operable, when activated, to print character data on a copy sheet and said printing means comprising positionable carriage means for holding the copy sheet in printing position, selectively actuatable character printing members for printing corresponding characters on said copy sheet and selectively actuatable functional members for effecting functional operations of the printing means and including the function of positioning said carriage in different printing positions; a code punch operable, when activated, and controlled in its operation by the actuation of each of a plurality of the character printing and functional members of said printing means, to record in a record sheet code designations representing the actuated members according to a predetermined code system; record sensing means operable, when activated, to sense successively data designations in a record source representing both character data and the functions performed by at least some of functional members of said printing means; data storage means comprising positionable storage elements representing character data by their different positions, manually operable means for entering data by positioning said elements, and readout means controlled by the position of said storage elements and effective when activated to produce control effects representing, respectively, the data stored; means responsive to the sensed character data designations in the record source and responsive to the character representing control effects produced by the storage readout means for actuating the corresponding character printing members of said printing means, and responsive to the data designations in the record source representing functional operations for actuating the corresponding functional members of said printing means; and program sequencing means for selectively activating and de-activating according to a predetermined plan said printing means, code punch, record sensing means, and said storage readout means, and for selectively actuating according to said plan the functional members of said printing means, whereby selected portions of the character data in the record source and in the storage means are recorded in a predetermined manner on the copy sheet and the record sheet.

9. Record controlled apparatus operable to record data in a predetermined manner and comprising, in combination, first and second printing means, each being operable, when activated, to print character data on a separate copy sheet and each said printing means comprising positionable carriage means for holding the copy sheet in printing position, selectively actuatable character printing members for printing corresponding characters on said copy sheet and selectively actuatable functional members for effecting functional operations of the printing means and including the function of positioning said carriage in different printing positions; a code punch operable, when activated, and controlled in its operation by the actuation of each of a plurality of the character printing and functional members of one of said printing means, to record in a record sheet code designations representing the actuated members according to a predetermined code system; record sensing means operable, when activated, to sense successively data designations in a record source representing both character data and the functions performed by at least some of functional members of said printing means; data storage means comprising positionable storage elements representing character data by their different positions, manually operable means for entering data by positioning said elements, and readout means controlled by the position of said storage elements and effective when activated to produce control effects representing, respectively, the data stored; means responsive to the sensed character data designations in the record source and responsive to the character representing control effects produced by the storage readout means for actuating the corresponding character printing members of both said printing means, and responsive to the data designations in the record source representing functional operations for actuating the corresponding functional members of both said printing means; and program sequencing means for selectively activating and de-activating according to a predetermined plan said first printing means, second printing means, code punch, record sensing means, and said storage readout means, and for selectively actuating according to said plan the functional members of said first and second printing means, whereby selected portions of the character data in the record source and in the storage means are recorded in a predetermined manner on the copy sheets of said printing means and the record sheet of said punch.

10. Record controlled apparatus operable to record data in a predetermined manner and comprising, in combination, first and second printing means, each being operable, when activated, to print character data on a separate copy sheet and each said printing means comprising positionable carriage means for holding the copy sheet in printing position, selectively actuatable character printing members for printing corresponding characters on said copy sheet and selectively actuatable functional members for effecting functional operations of the printing means and including the function of positioning said carriage in different printing positions; record sensing means operable, when activated, to sense successively data designations in a record source representing both character data and the functions performed by at least some of functional members of said printing means; data storage means comprising positionable storage elements representing character data by their different positions, manually operable means for entering data by positioning said elements, and readout means controlled by the position of said storage elements and effective when activated to produce control effects representing, respectively, the data stored; means responsive to the sensed character data designations in the record source and responsive to the character representing control effects produced by the storage readout means for actuating the corresponding character printing members of both said printing means, and responsive to the data designations in the record source representing functional operations for actuating the corresponding functional members of both said printing means; and program sequencing means for selectively activating and de-activating according to a predetermined plan said first printing means, second printing means, record sensing means, and said storage readout means, and for selectively actuating according to said plan the functional members of said first and second printing means, whereby selected portions of the character data in the record source and in the storage means are recorded in a predetermined manner on the copy sheets of said printing means.

11. Record controlled apparatus comprising source record sensing means operable, when activated, to sense successively the record columns of a first record sheet containing data designations relating to a first classification and the record columns of a second record sheet containing data designations relating to a second classification; recording means operable, when activated, and in response to the sensing of said data designations to record the two classes of data represented thereby in different areas of a copy sheet; programming means for controlling the sequence of operation of said apparatus and including the selective activating and de-activating of said source record sensing means and said recording means so as to control the operation of said apparatus according to a predetermined plan; said programming means including a first control section having control designations therein for controlling the sequence of operations of the apparatus while said first record source sheet is in position to be sensed and a second control section having control designations for controlling the sequence of operations while said second record source sheet is in position to be sensed; and means responsive to the sensing of a special designation in one column of the source record sheets for effecting control by said first control section while said first source record sheet is in position to be sensed and for effecting control by said second control section while said second source record sheet is in position to be sensed.

12. Record controlled apparatus comprising source record sensing means operable to sense successively the record columns of a first record sheet containing data designations relating to a first classification and the record columns of a second record sheet containing data designations relating to a second classification; recording means operable to record data in a copy sheet; means responsive to the sensing of data designations in said first and second record sheets for operating said recording means to record such data in said copy sheet; programming means for controlling the sequence of operations of said apparatus according to a predetermined plan; said programming means including an initial control section having control designations therein for controlling operations of the apparatus while an initial record column of said first record sheet and a corresponding initial record column of said second record sheet are in position to be sensed, a first classification control section including control designations determining the sequence of operations of the apparatus while the columns of the first record sheet following said initial column are being read, and a second classification control section having control designations for selectively controlling the sequence of operation of the apparatus while following columns of said second record sheet are being read; and means responsive both to a control designation of said initial section of the programming means and to the sensing of the initial record columns of said first and second record sheets for determining the classification of the record sheet being read and for shifting the control of subsequent operations to said first classification section when said first record sheet is in sensing position and for shifting the control to said second classification section when said second record sheet is in sensing position.

13. Record controlled apparatus comprising source record sensing means operable, when activated, to sense successively the record columns of a first record sheet containing data designations relating to a first classification and the record columns of a second record sheet containing data designations relating to a second classification; a plurality of separate recording means, each being operable, when activated, to record data in a separate copy sheet; means responsive to the sensing of data designations in said first and second record sheets for operating said recording means to record such data in their respective copy sheets; programming means for selectively activating and de-activating said source record sensing means and said plurality of recording means so as to control the operation of said apparatus according to a predetermined plan; said programming means including an initial control section having control designations therein operable to control operations of the apparatus when an initial record column of said first record sheet and when a corresponding initial record column of said second record sheet are in position to be sensed, a first classification control section including control designations therein operable to determine the sequence of operations of the apparatus while the columns of the first record sheet following its said initial column are being read, and a second classification control section having control designations therein operable to determine the sequence of operation of the apparatus while following columns of said second record sheet are being read; and means responsive both to a control designation of said initial section of the programming means and to the sensing of the initial record columns of said first and second record sheets for determining the classification of the record sheet being read and for shifting the control of subsequent operations to said first classification section when said first record sheet is in sensing position and for shifting the control to said second classification section when said second record sheet is in sensing position.

14. Apparatus according to claim 13 wherein said plurality of recording means comprise first and second printing means, and each said printing means being operable, when activated, to print character data on a separate copy sheet, and wherein the programming means operates in conjunction with the sensing of data designations in said source record sheets to control the operation of said two printing means so as to print selected data on the copy sheets and to arrange the printed data according to a predetermined plan.

15. Record controlled apparatus comprising source record sensing means operable, when activated, to sense successively the record columns of a first source record sheet containing data designations relating to a first classification and the record columns of a second source record sheet containing data designations relating to a second classification; recording means operable, when activated, and in response to the sensing of said data designations to record the two classes of data represented thereby in a copy sheet; program means for controlling the sequence of operation of said apparatus according to a predetermined plan and including the selective activation and de-activation of said source record sensing means and said recording means; said program means comprising first and second control strip sections corresponding, respectively, to the first and second classifications of source records, and each said control strip section including a plurality of record columns bearing control designations according to said plan which designations control the sequence of operations while sensing the source record sheet of the classification corresponding to such strip section; a first strip sensing means for successively sensing the record columns of the first control strip section; and a second strip sensing means operating concurrently with said first strip sensing means for successively sensing corresponding record columns of said second control strip section; translating means responsive to said first and to said second strip sensing means for effecting control effects of said apparatus according to the particular control designations sensed; and means operable to render said translating means responsive to said first strip sensing means while said first source record sheet is being sensed and responsive to said second strip sensing means while said second source record sheet is being sensed.

16. Apparatus operable under the joint control of data-representing designations contained in record columns of a source record sheet and control designations contained in record columns of a program control strip, to record such data in a copy sheet in a predetermined manner and comprising means for successively sensing the record columns of the source record sheet in a normal manner as such columns are advanced step-by-step past a record sensing station; source record feeding means for advancing the source record sheet at a normal rate and column-by-column to said record sensing station, there being one normal advancing operation for each normal sensing operation; recording means responsive to the sensing of data designations in the source record sheet for recording such data in a copy sheet; means for successively sensing the record columns of the control strip in a normal manner as such columns are advanced step-by-step past a control strip sensing station; strip feeding means for advancing the control strip at a normal rate and column-by-column to the control strip sensing station, there being one normal strip advancing operation for each normal strip sensing operation; means responsive to the sensing of control designations in the control strip for selectively controlling the normal step-by-step operations of the source record sensing and feeding means and the control strip sensing and feeding means, and the operation of said recording means; skipping means operable in response to the sensing of a significant designation for simultaneously moving the source record and the control strip past their respective sensing stations at a relative rapid, or skipping, rate and at the same time preventing normal sensing operations of the record sheet and control strip; and skip-off means effective upon the initiation of a skipping operation and operable in response to a significant skip-off designation in a pre-selected column of the control strip for stopping both the control strip and source record sheet with predetermined columns thereof at their respective sensing stations.

17. Apparatus operable under the joint control of data-representing designations contained in record columns of a source record sheet and control designations contained in record columns of a program control strip, to record such data in a copy sheet in a predetermined manner and comprising means for successively sensing the record columns of the source record sheet in a normal manner as such columns are advanced step-by-step past a record sensing station; source record feeding means for advancing the source record sheet at a normal rate and column-by-column to said record sensing station, there being one normal advancing operation for each normal sensing operation; printing means responsive to the sensing of data designations in the source record sheet for printing such data in a copy sheet and including a movable carriage for holding the copy sheet in different printing positions, and means for tabular spacing said carriage; means for successively sensing the record columns of the control strip in a normal manner as such columns are advanced step-by-step past a control strip sensing station; strip feeding means for advancing the control strip at a normal rate and column-by-column to the control strip sensing station, there being one normal strip advancing operation for each normal strip sensing operation; means responsive to the sensing of control designations in the control strip for selectively controlling the normal step-by-step operations of the source record sensing and feeding means, and the control strip sensing and feeding means, and the operation of said printing means; skipping means operable in response to the sensing of a significant designation for simultaneously effecting a tabular spacing operation and feeding the source record sheet and the control strip past their respective stations at a relative rapid, or skipping, rate and at the same time preventing normal sensing operations of the record sheet and control strip; means effective upon the initiation of a skipping operation and responsive to the sensing of a skip-off control designation in the control strip for stopping the control strip and source record sheet with predetermined columns thereof at their respective sensing stations; and means effective when said carriage reaches a predetermined printing position for stopping the tabular spacing movement of the carriage.

18. In record controlled recording apparatus wherein data is selectively recorded in a copy sheet in accordance with a predetermined plan and under the combined control of data designations recorded in the record columns of a data source record and of control designations recorded in the record columns of a program control strip, the combination of a main driving motor and a drive mechanism constantly operated thereby for effecting successive operating steps of the apparatus; normal strip sensing and feeding means operable, when operatively connected to said drive mechanism, for sensing successively the record columns of the control strip and for advancing the control strip in such a manner that one strip record column is moved into sensing position at a strip sensing station and is sensed during an operating step; normal source record sensing and feeding means operable, when operatively connected to said drive mechanism, for sensing successively the record columns of said source record and for advancing the source record in such a manner that one source record column is moved into sensing position at a source record sensing station and is sensed during an operating step; skipping means operable, when operatively connected to said drive mechanism, for feeding both said control strip and said source record past their respective sensing stations at a relatively fast or skipping rate; interlock means effective upon the initiation of operation of said skipping means to prevent operative connections between said drive mechanism and said normal strip sensing and feeding means and said normal source record sensing and feeding means; skip-off sensing means effective upon operation of said skipping means to sense the record columns of said control strip as they move past the strip sensing station at the skipping rate; and means responsive to the sensing by said skip-off sensing means of a special skip-off control designation in a predetermined record column of said control strip for disconnecting said skipping means from said drive mechanism, for rendering the interlock means ineffective, and for stopping both the control strip and source record with predetermined record columns thereof at their respective sensing stations.

19. In record controlled recording apparatus wherein data is selectively printed in a copy sheet in accordance with a predetermined plan and under the combined control of data and control designations recorded in the record columns of a data source record and of control designations recorded in the record columns of a program control strip, the combination of a main driving motor and drive mechanism constantly operated thereby for effecting successive operating steps of the apparatus; source record sensing and feeding means operated when connected to said drive mechanism, for sensing successively the record columns of said source record and for advancing the source record in such a manner that one record column thereof is moved into sensing position at a sensing station and is sensed thereat during a normal operating step; printing means operable, when activated, to print character data on a copy sheet and comprising a positionable carriage for holding the copy sheet in printing position, and a plurality of selectively actuatable members operable to effect printing of character data on the copy sheet and to effect functional operations of the printing means including the positioning of said carriage at different printing positions; means responsive to the sensing of the designations in said source record for operating the actuatable members of said printing means to print character data corresponding to designations sensed on the copy sheet; normal strip sensing and feeding means operable, when connected to said drive mechanism, for sensing successively the record columns of the control strip and for advancing the control strip in such a manner that one strip record column is moved into sensing position at a strip sensing station and is sensed thereat during a normal operating step; skipping means operable in response to the sensing of a special skip designation by one of said sensing and feeding means and operated by said drive mechanism for feeding both said control strip and said source record past their respective sensing stations at a relatively fast or skipping rate and for actuating an actuatable member of said printing means for effecting movement of said carriage to a new printing position; interlock means effective upon initiation of operation of said skipping means to disconnect said drive mechanism from said source record sensing and feeding means and from said normal strip sensing and feeding means; skip-off sensing means effective upon the operation of said skipping means to sense the record columns of said control strip as they move past the strip sensing station at the skipping rate; means responsive to the sensing by said skip-off sensing means of a special skip-off control designation in a predetermined record column of said control strip, for stopping operation of said skipping means and for stopping both the control strip and source record with predetermined record columns thereof at their respective sensing stations; and means effective upon the operation of said last-named means and upon the positioning of said carriage at a predetermined printing position for rendering the interlock means ineffective.

20. Record controlled apparatus operable in successive steps and comprising step control mechanism operating continuously to determine the successive operating steps of the apparatus; printing means operable, when activated, to print character data on a copy sheet and comprising a positionable member for holding the copy sheet in printing position, a plurality of character actuators operable, respectively, to effect printing of corresponding characters on the copy sheet and functional actuators, operable, respectively, to effect corresponding functional operations of the printing means and including the positioning of said positionable member; source record sensing means operable, when activated, and controlled by said step control mechanism to sense successively record columns of a source record sheet containing designations normally representing character data and functional operations of the printing means, there being one sensing operation for each operating step while the sensing means is activated; normally operable translating means controlled by the step control mechanism and responsive to the sensing of designations in the record source for effecting operation of said actuators to print the corresponding characters and to effect the functional operations corresponding, respectively, to the designations sensed; programming means controlled by said step control mechanism and operable step-by-step to control the sequence of operations of said apparatus according to a predetermined plan and including means for selectively activating and de-activating said printing means and said source record sensing means; and means controlled by said programming means and operable during a predetermined operating step of the apparatus and in response to the sensing of a particular designation in said source record, to prevent operation of said normally operable translating means and to effect a preselected operation of the apparatus which is different from that normally effected in response to the sensing of such particular designation.

21. Record controlled apparatus comprising record sensing means operable first to sense record columns of a heading record containing designations representing heading data and to sense at least one column of the heading record adapted to contain a special designation representing a class-selecting operation, and said sensing means being also operable to sense subsequently the record columns of one or more detail records and each such detail record containing data designations representing two different classes of detail data; means operable in response to the sensing of data designations in the heading record and in response to the sensing of the two classes of data designations in each detail record to print the heading data and the detail data in separate areas of a copy sheet; means responsive to the sensing of said special class-selecting designation in said one column of the heading record to activate a control device; and means effective upon the activation of said control device to prevent the printing of a predetermined one of said two classes of detail data recorded in subsequently sensed detail records.

22. Apparatus according to claim 21 wherein means is provided for restoring said control device to a deactivated condition upon the initiation of operation of the apparatus under the control of a second heading record.

23. Record controlled apparatus comprising printing means operable to print character data in a selected manner on a copy sheet and comprising a positionable carriage for holding the copy sheet in different printing positions; record sensing means operable first to sense record columns of a heading record containing data designations representing heading data to be printed in one area of the copy sheet and to sense at least one column of the heading record adapted to contain a special designation representing a class-selecting operation, and said sensing means being operable to sense subsequently the record columns of one or more detail records and each detail record containing data designations representing two different classes of detail data to be printed, respectively, in two corresponding areas of said copy sheet; translating means operable in response to the sensing of data designations in the record columns of said heading and detail records to operate said printing means to print the data in the corresponding areas of the copy sheet; means responsive to the sensing of said special class selecting designation in said one column of the heading record to activate a control device; and means effective upon the activation of said control device to prevent the operation of said printing means under the control of the data designations in the subsequent detail records which belong to a predetermined one of said two classes of detail data.

24. In record controlled apparatus, the combination of sensing means first operable to sense record columns of a heading record having data designations recorded therein representing heading data and to sense at least one record column thereof adapted to contain a special designation representing a class-selecting operation, and said sensing means being next operable to sense record columns of one or more detail records, and each such detail record having two separate groups of record columns containing, respectively, data designations representing detail data of two different classes; means responsive to the sensing of data designations in the record columns of said heading record and in the two class groups of record columns of each detail record to print the data represented by such designations in selected areas of a copy sheet; means responsive to the sensing of the special class-selecting designation in said one column of the heading record to activate a control device; means responsive to the activated control device and operable during the sensing of the detail records to prevent the printing of the detail data represented by the designations recorded in a predetermined one of said two class groups of record columns; programming means for controlling the sequence of operations while sensing the heading record and the sequence of operations while subsequently sensing the detail records; and means controlled by said programming means for de-activating said control device at the beginning of operations under the control of a second heading record.

25. Record controlled apparatus operable in successive steps and comprising step control mechanism operating continuously to determine the successive operating steps of the apparatus; printing means operable, when activated, to print character data on a copy sheet and comprising a positionable member for holding the copy sheet in printing position, and a plurality of selectively actuatable members operable to effect printing of characters on the copy sheet and to effect functional operations of the printing means including the positioning of the said positionable member; source record sensing means first operable, when activated, to sense successively, under the control of said step mechanism, the record columns of a heading record containing designations representing heading data and also to sense a column thereof adapted to contain a special class-selecting designation, and said sensing means being next operable under the control of said step mechanism to sense successively the record columns of a detail record containing detail data designations, the columns of the detail record being divided into two groups containing, respectively, detail data designations belonging to two different classes, and there being one sensing operation for each operating step while the sensing means is activated; normally operable translating means controlled by the step control mechanism and responsive to the sensing of designations in the records for effecting selective operation of said actuators to print the heading data and the two classes of detail data in separate areas of the copy sheet; programming means controlled by said step control mechanism and operable step-by-step to control the sequence of operations of said apparatus according to a predetermined plan and including a first section having control designations for selectively activating and de-activating said printing means and said source record sensing means when said heading card is in position to be sensed, and a second control section having control designations for selectively activating the said printing means and the sensing means while a detail record is in position to be sensed; means operable during a predetermined operating step of the apparatus and controlled jointly by a control designation of said programming means and the sensing of said special class-selecting designation in said one column of said heading record, to activate a control device; and means operable during a predetermined operating step of the apparatus and controlled jointly by the control device, when activated, and by a control designation of said second control section, to prevent the printing on said copy sheet of the detail data belonging to one of said two classes.

26. Record controlled apparatus operable in successive steps and comprising step control mechanism operating continuously to determine the successive operating steps of the apparatus; printing means operable, when activated, to print character data on a copy sheet and comprising a positionable member for holding the copy sheet in printing position, and a plurality of selectively actuatable members operable to effect printing of characters on the copy sheet and to effect functional operations of the printing means including the positioning of the said positionable member; source record sensing means first operable, when activated, to sense successively, under the control of said step mechanism, the record columns of a heading record containing designations representing heading data and also to sense a column thereof adapted to contain a special class-selecting designation, and said sensing means being next operable under the control of said step mechanism to sense successively the record columns of a detail record containing detail data designations, the columns of the detail record being divided into two groups containing, respectively, detail data designations belonging to two different classes, and there being one sensing operation for each operating step while the sensing means is activated; normally operable translating means controlled by the step control mechanism and responsive to the sensing of designations in the records for effecting selective operation of said actuators to print the heading data and the two classes of detail data in separate areas of the copy sheet; programming means controlled by said step control mechanism and operable step-by-step to control the sequence of operations of said apparatus according to a predetermined plan and including a first section having control designations for selectively activating and de-activating said printing means and said source record sensing means when said heading card is in positon to be sensed, and a second control section having control designations for selectively activating the said printing means and the sensing means while a detail record is in position to be sensed; means operable during a predetermined operating step of the apparatus and controlled jointly by a control designation of said programming means and the sensing of said special class-selecting designation in said one column of said heading record, to activate a control device; and means operable during a predetermined operating step of the apparatus and controlled jointly by the control device, when activated, and by a control designation of said second control section to prevent the sensing of the group of record columns of the detail record containing the data designations of one of said classes.

27. Record controlled apparatus operable in successive steps and comprising step control mechanism operating continuously to determine the successive operating steps of the apparatus; printing means operable, when activated, to print character data on a copy sheet and comprising a postionable member for holding the copy sheet in printing position, and a plurality of selectively actuatable members operable to effect printing of characters on the copy sheet and to effect functional operations of the printing means including the positioning of the said positionable member; source record sensing means first operable, when activated, to sense successively, under the control of said step mechanism, the record columns of a heading record containing designations representing heading data and also to sense a column thereof adapted to contain a special class-selecting designation, and said sensing means being next operable under the control of said step mechanism to sense successively the record columns of a detail record containing detail data designations, the columns of the detail record being divided into two groups containing, respectively, detail data designations belonging to two different classes, and there being one sensing operation for each operating step while the sensing means is activated; normally operable translating means controlled by the step control mechanism and responsive to the sensing of desigations in the records for effecting selective operation of said actuators to print the heading data and the two classes of detail data in separate areas of the copy sheet; programming means controlled by said step control mechanism and operable step-by-step to control the sequence of operations of said apparatus according to a predetermined plan and including a first section having control designations for selectively activating and de-activating said printing means and said source record sensing means when said heading card is in position to be sensed, and a second control section having control designations for selectively activating the said printing means and the sensing means while a detail record is in position to be sensed; means operable during a predetermined operating step of the apparatus and controlled jointly by a control designation of said programming means and the sensing of said special class-selecting designation in said one column of said heading record, to activate a control device; and means operable during a predetermined operating step of the apparatus and controlled jointly by said control device, when activated, and by a control designation of said second control section for skipping over the group of record columns of the detail record containing the data designations of a predetermined one of said classes and for concurrently positioning the copy sheet holding member to skip the area of said sheet where the corresponding detail data is normally printed.

28. Record controlled recording apparatus comprising a power source including a constantly operating drive mechanism effecting successive operating steps of the apparatus; source record sensing and feeding means operable, when connected to said drive mechanism, to sense successively the record columns of a source record having data designations recorded therein, and for advancing the source record in such a manner that a record column thereof is moved into sensing position at a sensing station and is sensed thereat during an operating step; initial record feeding means for feeding a source record into a position where the record column thereof first to be sensed is at the sensing station; recording means operable, when activated, and in response to the sensing of data designations in said source record, to record such data in a copy sheet; programming means for effecting a sequence of operations of said apparatus according to a predetermined plan and such operations including the connecting and disconnecting of the normal record sensing means and the drive mechanism and the activating and de-activating of said recording means; said programming means comprising a control strip having control designations recorded in predetermined record columns thereof, and means operable when connected to said drive mechanism for sensing successively the record columns of the control strip and for advancing the control strip in such a manner that one record column thereof is moved into sensing position at a strip sensing station and is sensed thereat during an operating step; and means effective upon the operation of said initial record feeding means for connecting the strip feeding means to said drive mechanism.

29. Apparatus according to claim 28 and comprising, in addition thereto, means responsive to the sensing of a significant control designation in a record column of said control strip for returning said control strip to its initial sensing position where the first record column thereof to be sensed is at the strip sensing station.

30. Record controlled recording apparatus comprising a power source including a constantly operating drive mechanism effecting successive operating steps of the apparatus; source record sensing and feeding means operable, when connected to said drive mechanism, to sense successively the record columns of a source record having data designations recorded therein, and for advancing the source record in such a manner that a record column thereof is moved into sensing position at a sensing station and is sensed thereat during an operating step; initial record feeding means for feeding a source record into a position where the record column thereof first to be sensed is at the sensing station; recording means operable, when activated, and in response to the sensing of data designations in said source record, to record such data in a copy sheet; programming means for effecting a sequence of operations of said apparatus according to a predetermined plan and such operations including the connecting and disconnecting of the normal record sensing means and the drive mechanism and the activating and de-activating of said recording means; said programming means comprising a control strip having control designations recorded in predetermined record columns thereof, and means operable when connected to said drive mechanism for sensing successively the record columns of the control strip and for advancing the control strip in such a manner that one record column thereof is moved into sensing position at a strip sensing station and is sensed thereat during an operating step; means effective upon the operation of said initial record feeding means for connecting the strip feeding means to said drive mechanism; and means responsive to the sensing of a significant control designation in said control strip for ejecting the old source record from sensing position and for operating said initial record feeding means to feed a new source record into position to have its initial record column sensed.

31. Record controlled recording apparatus comprising a power source including a constantly operating drive mechanism operated for effecting successive operating steps of the apparatus; source record sensing and feeding means operable, when connected to said drive mechanism, to sense successively the record columns of a source record having data designations recorded therein and for advancing the source record in such a manner that a record column thereof is moved into sensing position at a sensing station and is sensed thereat during an operating step; initial record feeding means for feeding a source record into a position where the record column thereof first to be sensed is at the sensing station; recording means operable, when activated, and in response to the sensing of data designations in said source record, to record such data in a copy sheet; programming means for effecting a sequence of operations of said apparatus according to a predetermined plan and such operations including the connecting and disconnecting of the normal record sensing means and the drive mechanism and the activating and de-activating of said recording means; said programming means comprising a control strip having control designations recorded in predetermined record columns thereof, and means operable when connected to said drive mechanism for sensing successively the record columns of the control strip and for advancing the control strip in such a manner that one record column thereof is moved into sensing position at a strip sensing station and is sensed thereat during an operating step; means effective upon the operation of said initial record feeding means for connecting the strip feeding means to said drive mechanism; and means responsive to the sensing of a significant control designation in said control strip for ejecting an old source record from sensing position, for restoring said control strip to its initial sensing position where the first record column thereof is at the strip sensing station, and for operating said initial record feeding means so as to feed a new source record into position to have its first column sensed.

32. In a record controlled recording apparatus wherein data is selectively recorded in a copy sheet in accordance with a predetermined plan and under the combined control of data designations recorded in the record columns of a data source record and of control designations recorded in the record columns of a program control strip, the combination of a main driving motor and drive mechanism constantly operated thereby for effecting successive operating steps of the apparatus; strip sensing and feeding means operable when operatively connected to said drive mechanism, to sense successively the record columns of the control strip and for advancing the control strip in such a manner that one column of the control strip is moved into sensing position at a sensing station and is sensed thereat during an operating step; source record sensing and feeding means operable when operatively connected to said drive mechanism, for sensing successively the record columns of said source record and for advancing the source record in such a manner that one source record column is moved into source record sensing position at a source record sensing station and is sensed thereat during an operating step; first and second recording means, each being operable, when it is activated, to record data in a separate copy sheet; means responsive to the sensing of data designations in said source record for operating said first and second recording means so as to record the sensed data in the copy sheets; initial record feeding means operable to feed each source record into a position where its first record column to be sensed is at the record sensing station; means responsive to the operation of said last-named means for operatively connecting said drive mechanism and said strip sensing and feeding means; and means responsive to the sensing of significant control designations recorded in predetermined columns of said control strip for operatively connecting and disconnecting the source record sensing and feeding means from said drive mechanism and for activating and de-activating said first and second recording means, whereby data is selectively recorded in the copy sheets of said first and second recording means in a predetermined manner.

33. In apparatus for handling record cards bearing data designations in successive record columns thereof, the combination of guide means providing a main card feeding passage having an inlet and an outlet end; normal card feeding means adjustable to an operative and to a non-operative condition and effective when in its operative condition to coact with opposite faces of a card for the purpose of feeding such card along said main passage and past a sensing station where the record columns are adapted to be sensed successively and said feeding means being effective when in its non-operative condition to permit a card to be moved by other means into said main passage without interference; an adjustable card stop normally occupying a non-operative adjusted position where a card is free to move through said passage without interference from said stop and effective when in an operative adjusted position to intercept a card moving in said main passage and to stop such card with the first column thereof to be sensed at the sensing station; initial card feeding means operable to feed a card into the inlet end of said main passage and against said stop when the latter is in its operative adjusted position; a power source including a constantly running device and drive mechanism connectible to said device and effective when so connected to provide an initial operating cycle; means operated by said drive mechanism for adjusting said normal card feeding means to its non-operative condition during the first part of said initial operating cycle and to adjust said normal card feeding means to its operative condition during the latter part of such cycle; means operated by said drive mechanism for operating said initial card feeding means after the adjusting of said normal card feeding means to its non-operative condition and before the normal card feeding means is returned to its operative condition; and means operated by said drive mechanism for adjusting said stop to its operative adjusted position before said initial feeding means operates to feed a card to the first column sensing position thereof and for returning said stop to its non-operative adjusted position after said initial feeding means operates to feed a card to said first column sensing position.

34. In apparatus for handling record cards bearing data designations in successive record columns thereof, the combination of guide means providing a main card feeding passage having an inlet and an outlet end; a pair of normal card feeding rolls arranged, respectively, at opposite sides of said main passage and normally positioned so as to engage opposite faces, respectively, of a record card occupying said passage and adapted to be separated from one another sufficiently to permit a card to be fed along said passage without interference by said rolls; an adjustable card stop normally occupying a non-operative adjusted position where a card is free to move through said passage without interference from said stop and effective when in an operative adjusted position to intercept a card moving in said main passage and stop such card with the first column thereof to be sensed at the sensing station; initial card feeding means operable to feed a card into the inlet end of said passage and against said stop when the latter is in its operative adjusted position; a power source including a constantly running device and drive mechanism connectible to said device and effective. when so connected, to provide an initial operating cycle; means operated by said drive mechanism for separating said card feeding rolls during the first part of said initial operating cycle and for returning said rolls to their normal card feeding relation during the latter part of such cycle; means operated by said drive mechanism for operating said initial card feeding means to feed a card into said main passage after said feeding rolls have been separated and before said rolls are returned to their normal card feeding relation; and means operated by said drive mechanism for adjusting said card stop to its operative adjusted position before said initial card feeding means operates to feed a card to the first column sensing position thereof, and for returning said stop to its non-operative adjusted position after said initial feeding means operates to feed a card to said first column sensing position.

35. In apparatus for handling record cards bearing data designations in successive record columns thereof, the combination of guide means providing a main card feeding passage having an inlet and an outlet end; normal card feeding means adjustable to an operative and to a non-operative condition and effective when in its operative condition to coact with opposite faces of a card occupying said passage and to feed such card along said main passage and past a sensing station where the record columns are adapted to be sensed successively, and said feeding means being effective when in its non-operative condition to permit a card to be moved by other means into said main passage without interference: means providing a card-entrance passage having a discharge end communicating with the inlet end of said main passage; initial card feeding means operable to feed a card from said card-entrance passage and into the inlet end of said main passage and into a position where it can be later fed by said normal card feeding means when the latter is in its operative condition; a power source including a constantly running device and drive mechanism connectible to said device and effective when so connected to provide an initial operating cycle; means operated by said drive mechanism for adjusting said normal card feeding means to its non-operative condition during the first part of said initial operating cycle and for adjusting said normal card feeding means to its operative condition during the latter part of such cycle; means operated by said drive mechanism for operating said initial card feeding means after the adjusting of said normal card feeding means to its non-operative condition and before returning said normal card feeding means to its operative condition; and means operated by said drive mechanism for aligning a record card in said card-entrance passage before said initial card feeding means is operated.

36. In apparatus for handling record cards bearing data designations in successive record columns thereof, the combination of guide means providing a main card feeding passage having an inlet and an outlet end; normal card feeding means adjustable to an operative and to a non-operative condition and effective when in its operative condition to coact with opposite faces of a card occupying said passage and to feed such card along said main passage and past a sensing station where the record columns are adapted to be sensed successively, and said feeding means being effective when in its non-operative condition to permit a card to be moved by other means into said main passage without interference; means providing a card-entrance passage having a discharge end communicating with the inlet end of said main passage; initial card feeding means operable to feed a card from said card-entrance passage and into the inlet end of said main passage and into a position where the card may be later moved by said normal card feeding means, said initial card feeding means comprising a movable feeding element adapted to engage frictionally one face of a record card in said entrance passage and a movable plate member operable to press a card against said feeding element whereby the card is fed into said main passage; a power source including a constantly running device and a drive mechanism connectible to said device and effective when so connected to provide an initial operating cycle; means operated by said drive mechanism for adjusting said normal card feeding means to its non-operative condition during the first part of said initial operating cycle and for adjusting said normal card feeding means to its operative condition during the latter part of such cycle; and means operated by said drive mechanism for operating said initial card feeding means after the adjusting of said normal card feeding means to its non-operative condition and before returning said normal card feeding means to its operative condition, and comprising means for moving said movable feeding element and means for operating said plate member to press a card against said element.

37. Apparatus according to claim 36 and further comprising means operated by said drive mechanism for aligning a record card in said entrance passage before said initial card feeding means is operated.

38. In apparatus for handling record cards bearing data designations in successive record columns thereof, the combination of guide means providing a main card feeding passage having an inlet and an outlet end; a pair of normal card feeding rolls arranged, respectively, at opposite sides of said main passage and normally positioned so as to engage opposite faces, respectively, of a record card occupying said passage and adapted to be separated from one another sufficiently to permit a card to be fed along said passage without interference by said rolls; means providing a card-entrance passage having a discharge end communicating with the inlet end of said main passage; initial card feeding means operable to feed a card from said card-entrance passage and into the inlet end of said main passage and between said card feeding rolls, said initial card feeding means comprising a movable feeding element adapted to engage frictionally one face of a record card in said entrance passage and a movable plate member operable to press a card against said feeding element whereby the card is fed into said main passage; a power source including a constantly running device and a drive mechanism connectible to said device and effective when so connected to provide an initial operating cycle; means operated by said drive mechanism for separating said card feeding rolls during the first part of said initial operating cycle and for returning said rolls to their normal operating relation during the latter part of such cycle; and means operated by said drive mechanism for operating said initial card feeding means to feed a card into said main passage while said feeding rolls have been separated and before said rolls are returned to their normal card feeding relation, and comprising means for moving said movable feeding element and means for moving said plate member to press a card against said element.

39. In apparatus for handling record cards bearing data designations in successive record columns thereof, the combination of guide means providing a main card feeding passage having an inlet and an outlet end; normal card feeding means adjustable to an operative and to a non-operative condition and effective when in its operative condition to coact with opposite faces of a card occupying said passage and to feed such card along said main passage and past a sensing station where the record columns are adapted to be sensed successively, and said feeding means being effective when in its non-operative condition to permit a card to be moved by other means into said main passage without interference; an adjustable card stop normally occupying a non-operative adjusted position where a card is free to move through said passage without interference from said stop and effective when adjusted to an operative position to intercept a card moving in said main passage and stop such card with the first column thereof to be sensed at the sensing station; means providing a card-entrance passage having a discharge end communicating with the inlet end of said main passage; initial card feeding means operable to feed a card from said card-entrance passage and into the inlet end of said main passage and against said stop when the latter is in its said operative position, said initial card feeding means comprising a movable feeding element adapted to engage frictionally one face of a record card in said entrance passage and a movable plate member operable to press a card against said feeding element whereby the card is fed into said main passage; a power source including a constantly running device and drive mechanism connectible to said device and effective when so connected to provide an initial operating cycle; means operated by said drive mechanism for adjusting said normal card feeding means to its non-operative condition during the first part of said initial operating cycle and for adjusting said normal card feeding means to its operative condition during the latter part of such cycle; means operated by said drive mechanism for operating said initial card feeding means after the adjusting of said normal card feeding means to its non-operative condition and before adjusting said normal card feeding means back to its operative condition and comprising means for moving said movable feeding element and means for operating said plate member to press a card against said element; and means operated by said drive mechanism for adjusting said card stop to its said operative position before said initial card feeding means operates to feed a card into the first column sensing position thereof and for returning said stop to its normal non-operative position after said initial feeding means has operated to feed a card to the first column sensing position thereof.

40. In apparatus for handling record cards bearing data designations in successive record columns thereof, the combination of guide means providing a main card feeding passage having an inlet and an outlet end; normal card feeding means adjustable to an operative and to a non-operative condition and effective when in its operative condition to coact with opposite faces of a record card occupying said main passage and to feed said card along said passage and past a sensing station where the record columns thereof are adapted to be sensed successively, and said feeding means being effective when in its non-operative adjusted condition to permit a card to be moved by other means through said main passage without interference; adjustable card ejecting means normally in a non-operative adjusted condition where a card is free to be moved through said main passage by said normal card feeding means and operable when adjusted to an operative condition to coact with opposite faces of a card occupying said main passage and to feed such card out through the outlet end thereof; holding means for positioning a new record card in an initial position from which it may be fed into the inlet end of said main passage; initial card feeding means operable to feed a new card from its said initial position and into said main passage and to a position therein where the first column to be sensed is at the sensing station; a power source including a constantly running device and drive mechanism connectible to said device and operable when so connected to provide an initial card feeding cycle; means operated by said drive mechanism for adjusting said normal card feeding means to its non-operative condition during the first part of said initial card feeding cycle and for adjusting said normal card feeding means to its operative condition during the latter part of such cycle; means operated by said drive mechanism for adjusting said card ejecting means to its operative condition after said normal card feeding means is adjusted to its said non-operative condition, so as to eject any old card occupying said main passage through the outlet end thereof, and then for returning said card ejecting means to its said normal non-operative condition; and means operated by said drive mechanism for operating said initial card feeding means to feed a new card from its said initial position and into said main passage after said card ejecting means has operated to eject any old card occupying said main passage and after said normal card feeding means has been adjusted to its non-operative condition and before the adjusting of said normal card feeding means back to its operative condition.

41. In apparatus for handling record cards bearing data designations in successive record columns thereof, the combination of guide means providing a main card feeding passage having an inlet and an outlet end; card sensing means located at a sensing station in said passage; adjustable card ejecting means normally in a non-operative adjusted condition where a record card is free to be moved through said main passage by other means and operable when adjusted to an operative condition to coact with opposite faces of a card occupying said main passage and to feed such card through the outlet end thereof; an adjustable card stop normally occupying a non-operative position where a card is free to move through said passage without interference from said stop and effective when adjusted to an operative position to intercept a card moving in said main passage and to stop such card with the first column thereof to be sensed at the sensing station; holding means for positioning a new record card in an initial position from which it may be fed into the inlet end of said main passage; initial card feeding means operable to feed a new card from its said initial position and into the inlet end of said main passage and against said stop when the latter is in its said operative position; a power source including a constantly running device and drive mechanism connectible to said device and operable when so connected to provide an initial card feeding cycle; means operated by said drive mechanism for adjusting said card ejecting means to its operative condition during an early part of said initial card feeding cycle so as to eject any old card occupying said main passage through the outlet end thereof, and for then returning said card ejecting means to its normal non-operative condition; means operated by said drive mechanism for operating said initial card feeding means to feed a new card from its said initial position and into said main passage after said card ejecting means has operated to eject any old card occupying said main passage; and means operated by said drive mechanism for adjusting said card stop to its said operative position after said card ejecting means has operated to eject any old card occupying said main passage and before said initial card feeding means operates to feed a new card into position to have its first column sensed, and for returning said card stop to its normal non-operative position after said initial feeding means has operated to feed a new card to such first column sensing position thereof.

42. In apparatus for handling record cards bearing data designations in successive record columns thereof, the combination of guide means providing a main card feeding passage having an inlet and an outlet end; normal card feeding means adjustable to an operative and to a non-operative condition and effective when in its operative condition to coact with opposite faces of a record card occupying said main passage and to feed said card along said passage and past a sensing station where the record columns thereof are adapted to be sensed successively, and said feeding means being effective when in its non-operative adjusted condition to permit a card to be moved by other means through said main passage without interference; adjustable card ejecting means normally in a non-operative adjusted condition where a record card is free to be moved through said main passage by said normal card feeding means and operable when adjusted to an operative condition to coact with opposite faces of a card occupying said main passage and to feed such card through the outlet end thereof; an adjustable card stop normally occupying a non-operative position where a card is free to move through said passage without interference from said stop and effective when adjusted to an operative position to intercept a card moving in said main passage and to stop such card with the first column thereof to be sensed at the sensing station; holding means for positioning a new record card in an initial position from which it may be fed into the inlet end of said main passage; initial card feeding means operable to feed a new card from its said initial position and into the inlet end of said main passage and against said stop when the latter is in its said operative position; a power source including a constantly running device and drive mechanism connectible to said device and operable when so connected to provide an initial card feeding cycle; means operated by said drive mechanism for adjusting said normal card feeding means to its non-operative condition during the first part of said initial card feeding cycle and for adjusting said normal card feeding means to its operative condition during the latter part of such cycle; means operated by said drive mechanism for adjusting said card ejecting means to its operative condition after said normal card feeding means is adjusted to its non-operative condition so as to eject any old card occupying said main passage through the outlet end thereof, and then for returning said card ejecting means to its normal non-operative condition; means operated by said drive mechanism for operating said initial card feeding means to feed a new card from its said initial position and into said main passage after said card ejecting means has operated to eject any old card occupying said main passage and after said normal card feeding means has been adjusted to its non-operative condition and before the adjusting of said normal card feeding means back to its operative condition; and means operated by said drive mechanism for adjusting said card stop to its said operative position after said card ejecting means has operated to eject any old card occupying said main passage and before said initial card feeding means operates to feed a new card into the first column sensing position thereof and for returning said card stop to its normal non-operative position after said initial feeding means has operated to feed a new card to the first column sensing position thereof.

43. In record controlled apparatus including mechanism for handling record cards bearing data designations in successive record columns thereof, the combination of guide means providing a main card feeding passage having an inlet and an outlet end; adjustable normal card feeding means operable when in a normal operative condition to engage frictionally the opposite faces of a record card in said passage so that such card may be fed past a sensing station, and said normal feeding means being adjustable to a non-operative condition where a record card may be moved in said passage without interference from said normal feeding means; record sensing means operable to sense the record columns of a card as such card is moved past said sensing station; holding means for holding a record card in an initial position from which it may be fed into the inlet end of said main passage; initial card feeding means operable to feed a card from its said initial position into said main passage and to a point where the first column thereof to be sensed is at the sensing station; a power source including a constantly running device; a first drive mechanism connectible to said device and operable when so connected to effect an initial feeding cycle and then to be disconnected from said device at the end of such cycle; a second drive mechanism connectible to said device and operable when so connected to provide successive normal operating steps of the apparatus during at least some of which a card in said main passage is fed past the sensing station and is sensed thereat column-by-column; means for connecting said first drive mechanism to said constantly running device and to effect thereby an initial card feeding cycle; means operated by said first drive mechanism for adjusting said normal card feeding means to its said non-operative condition during the first part of said initial card feeding cycle and for adjusting said normal card feeding means to its operative condition during the latter part of such cycle; means operated by said first drive mechanism for operating said initial card feeding means to feed said new record card into said main passage after said normal card feeding means has been adjusted to its non-operative condition; and means operable at the end of said initial card feeding cycle and in response to the engaging of the record card by said normal card feeding means upon the latter being restored to its normal operative condition, for connecting said second drive mechanism to said constantly running device.

44. Apparatus according to claim 43 wherein said means for connecting the first drive mechanism to said constantly running device comprises an electrically responsive clutch device and electrical circuit means for operating said clutch device including a pair of control contacts operated by the placing of a new record card in initial position in said holding means.

45. In record controlled apparatus including mechanism for handling record cards bearing data designations in successive record columns thereof, the combination of guide means providing a main card feeding passage having an inlet and an outlet end; adjustable normal card feeding means operable when in a normal operative condition to engage frictionally the opposite faces of a record card in said passage so that such card may be fed past a sensing station, and said normal feeding means being adjustable to a non-operative condition where a record card may be moved in said passage without interference from said normal feeding means; record sensing means operable to sense the record columns of a card as such card is moved past said sensing station; means for holding a record card in an initial position from which it may be fed into the inlet end of said main passage; initial card feeding means operable to feed a card from its said initial position into said main passage and to a point where the first column thereof to be sensed is at the sensing station; a power source including a constantly running device; a first drive mechanism connectible to said device and operable when so connected to effect an initial card feeding cycle and then to be disconnected from said device at the end of such cycle; a second drive mechanism connectible to said device and operable when so connected to provide successive normal operating steps of the apparatus, during at least some of which a card in said main passage is fed past the sensing station and is sensed thereat column-by-column; means responsive to the placing of a new record card in its said initial position in said holding means for connecting said first drive mechanism to said constantly running device and to effect thereby an initial card feeding cycle; means operated by said first drive mechanism for adjusting said normal card feeding means to its said non-operative condition during the first part of said initial feeding cycle and for adjusting said normal card feeding means to its operative condition during the latter part of such cycle; means operated by said first drive mechanism for operating said initial card feeding means to feed said new record card into said main passage after said normal card feeding means has been adjusted to its non-operative condition; and means operable at the end of said initial card feeding cycle and in response to the engaging of the record card by said normal card feeding means upon the latter being restored to its normal operative condition, for connecting said second drive mechanism to said constantly running device.

46. In record controlled apparatus including mechanism for handling record cards bearing data designations in successive record columns thereof, the combination of guide means providing a main card feeding passage; normal card feeding means adjustable to a normal operative condition and to a non-operative position and operable when in its operative condition to feed a card occupying said passage in a normal manner past a sensing station; means for sensing the record columns of a card as the card is moved past the sensing station by the normal feeding means and comprising sensing elements movable from a non-sensing position into sensing relation with respect to the record card and then back to such non-sensing position as each record column is moved to the sensing station; a power source including a constantly running device; means for feeding a new record card into a position in said main passage where the first column of such card to be sensed is positioned at the sensing station, and comprising a drive mechanism connectible to said power source and effective when so connected to effect an initial card feeding cycle and then be disconnected therefrom; means operated by said drive mechanism to adjust said normal card feeding means to its non-operative condition during said initial cycle; and mechanical interlock means operated by said drive mechanism for preventing movement of said sensing elements from their said non-sensing position throughout said initial card feeding cycle.

47. In record controlled apparatus including mechanism for handling record cards bearing data-representing designations, the combination of a first guide means providing a main card feeding passage having an inlet end and an outlet end; means for sensing a record card as it occupies a sensing position in said main passage; a second guide means providing first and second card-entrance passages, into each of which a new card may be inserted and held at an initial position, each said entrance passage having an inlet end and an outlet end, the outlet ends of both said entrance passages communicating, respectively, with the inlet end of said main passage in such a manner that a record card may be fed from its initial position in each entrance passage into sensing position in said main passage, and the inlet ends of both said entrance passages being disposed in juxtaposed relation; wall means having a card-entrance slot through which a new record card may be inserted and such slot being adapted to communicate with the inlet end of each of said card-entrance passages; means for feeding a record card from its initial position in each said entrance passage and into sensing position in said main passage; and selector means operable to provide communication between said entrance slot and the inlet end of said second card-entrance passage when a card is fed from said first entrance passage into sensing position in the main passage, and operable to provide communication between said entrance slot and the inlet end of said first entrance passage when a card is fed from said second entrance passage into sensing position in the main passage.

48. In record controlled apparatus including mechanism for handling record cards bearing data-representing designations, the combination of a first guide means providing a main card feeding passage having an inlet end and an outlet end; means for sensing a record card as it occupies a sensing position in said main passage; a second guide means providing first and second card-entrance passages into each of which a card may be inserted and held at an initial position therein, each said entrance passage having an outlet end communicating with the inlet end of said main passage, and said entrance passages having inlet ends, respectively, arranged in juxtaposed relation with one another; means for feeding a record card from its initial position in each said entrance passage into sensing position in said main passage; said second guide means including a partition member common to both said entrance passages at their inlet ends and movable between first and second extreme positions and being operable when in its said first extreme position to open the inlet end of said first entrance passage and to close the inlet end of said second entrance passage and being operable when in its said second extreme position to open the inlet end of said second entrance passage and to close the inlet end of said first entrance passage; and means operable upon the feeding of a card from said first entrance passage to said main passage for moving said partition member to its said second extreme position and operable upon the feeding of a card from said second entrance passage to move said partition member to its said first extreme position.

49. In record controlled apparatus including mechanism for handling record cards bearing data-representing designations, the combination of a first guide means providing a main card feeding passage having an inlet end and an outlet end; means for sensing a record card as it occupies a sensing position in said main passage; a second guide means providing first and second card-entrance passages, into each of which a new card may be inserted, each said entrance passage having an inlet end and an outlet end, the outlet ends of both said entrance passages communicating, respectively, with the inlet end of said main passage in such a manner that a record card may be fed from each entrance passage into sensing position in said main passage, and the inlet ends of both said entrance passages being disposed in juxtaposed relation; a first card-entrance stop adjustable between an operative and a non-operative position and effective when in its operative position to intercept and hold a card inserted in said first entrance passage at an initial position therein; a second card-entrance stop adjustable between an operative and a non-operative position and effective when in its operative position to intercept and hold a card inserted in said second entrance passage at an initial position therein; wall means having a card-entrance slot through which a new record card may be inserted and such slot being adapted to communicate with the inlet end of each of said card-entrance passages; means for feeding a record card from its initial position in each said entrance passage and into sensing position in said main passage; selector means operable to provide communication between said entrance slot and the inlet end of said second card-entrance passage when a card is fed from said first entrance passage into sensing position in the main passage, and operable to provide communication between said entrance slot and the inlet end of said first entrance passage when a card is fed from said second entrance passage into sensing position in the main passage; and means operable concurrently with the feeding of a record card from said first entrance passage for adjusting said first stop to its non-operative position of said second stop to its operative position and operable concurrently with the feeding of a card from said second entrance passage for adjusting said second stop to its non-operative position and said first stop to its operative position.

50. In record controlled apparatus including mechanism for handling record cards bearing data-representing designations, the combination of guide means providing first and second card-entrance passages for receiving inserted cards, each said passage having an inlet and an outlet end and the inlet ends of said passages being arranged in juxtaposed relation; said guide means including a partition member common to both said entrance passages at their inlet ends and movable between first and second adjusted positions and being operable when in its said first adjusted position to open the inlet end of said first entrance passage and close the inlet end of said second entrance passage, and being operable when in its said second adjusted position to close the inlet end of said first passage and open the inlet end of said second passage; drive mechanism operable to provide initial card feeding cycles during each of which a card occupying one of said entrance passages is fed through the outlet end thereof; initial card feeding means operated by said drive mechanism during each card feeding cycle and including first and second movable card feeding elements arranged respectively in said first and second card-entrance passages and opposite said partition member; and means operated by said drive mechanism and during alternate card feeding cycles to move said partition member to its said second adjusted position to press any card occupying said first passage against the movable card feeding element therein whereby such card is fed out of said first entrance passage, and operated by said drive mechanism during remaining initial card feeding cycles to move said partition member to its said first adjusted position to press any card occupying said second passage against the movable card feeding element therein so as to feed such card out of said second entrance passage.

51. In record controlled apparatus including mechanism for handling record cards bearing data-representing designations, the combination of guide means providing first and second card-entrance passages for receiving inserted cards, each said passage having an inlet and an outlet end and the inlet ends of said passages being arranged in juxtaposed relation; said guide means including a partition member common to both said entrance passages at their inlet ends and movable between first and second adjusted positions and being operable when in its said first adjusted position to open the inlet end of said first entrance passage and close the inlet end of said second entrance passage, and being operable when in its said second adjusted position to close the inlet end of said first passage and open the inlet end of said second passage; a first card-entrance stop adjustable between an operative and a non-operative position and effective when in its operative position to intercept and hold a card inserted through the inlet end of said first entrance passage at an initial position in such passage therein; a second card-entrance stop adjustable between an operative and a non-operative position and effective when in its operative position to intercept and hold a card inserted through the inlet end of said second entrance passage at an initial position therein; drive mechanism operable to provide initial card feeding cycles during each of which a card occupying one of said entrance passages is fed through the outlet end thereof; initial card feeding means operated by said drive mechanism during each card feeding cycle and including first and second movable card feeding elements arranged, respectively, in said first and second card-entrance passages and opposite said partition member; means operated by said drive mechanism during alternate card feeding cycles to move said partition member to its said second adjusted position to press any card occupying said first passage against the movable card feeding element therein whereby such card is fed out of said first entrance passage, and operated by said drive mechanism during remaining card feeding cycles to move said partition member to its said first adjusted position to press any card occupying said second passage against the movable card feeding element therein so as to feed such card out of said second entrance passage; and means operated by said drive mechanism and concurrently with the movement of said partition member to its said second adjusted position to adjust said first stop to its non-operated position and said second stop to its operated position and operable concurrently with the movement of said partition member to its said first adjusted position for adjusting said second stop to its non-operated position and said first stop to its operated position.

52. In record controlled apparatus including mechanism for handling cards bearing data-representing designations, the combination of guide means providing a card-entrance passage for receiving an inserted card and said passage having an inlet and an outlet end; a card-entrance stop adjustable to an operative and a non-operative position and effective when in its operative position to intercept and hold a card inserted through the inlet end of said passage at an initial position in such passage; initial card feeding means operable to feed an inserted card from its initial position in such passage and through the outlet end thereof; means operable concurrently with said last-named means to adjust said stop to its non-operative position; means including a pair of contacts biased towards closed position and effective when closed to effect operation of said initial card feeding means; latching means for latching said contacts in their open position; means effective upon an inserted card engaging said stop, for tripping said latching means and thereby permitting such contacts to close; and means responsive to the operation of said initial card feeding means for opening said contacts and for operating said latching means to latch the contacts in their open position.

53. In data recording apparatus operable step-by-step, the combination of data storage means comprising adjustable storage instrumentalities representing, respectively, character data by their different adjustments, manually operable storing means for selectively adjusting said storage instrumentalities so as to represent thereby stored character data, and readout means comprising readout instrumentalities corresponding, respectively, to said storage instrumentalities, and each such readout instrumentality being controlled by the adjustment of its corresponding storage instrumentality and being operable, when activated, to produce a controlling effect representing the data stored in its corresponding storage instrumentality; recording means operable, when activated, to record character data on a copy sheet; means responsive to the controlling effects produced by said readout instrumentalities for operating said recording means to record on the copy sheet character data represented by such controlling effects; and programming means for effecting a sequence of operations of said apparatus according to a predetermined plan and comprising means for activating said recording means at predetermined points in the operation of said apparatus and means operable during successive operating steps to activate the readout instrumentalities in a predetermined order so as to record selectively the character data represented by their respective controlling effects in successive operating cycles.

54. In data recording apparatus operable step-by-step, the combination of a numeric storage unit having a predetermined storage capacity and comprising an ordered series of storage instrumentalities corresponding, respectively, to the order positions of the largest number capable of being stored, and each said storage instrumentality being adjustable when the number to be stored contains a digit in the corresponding order position, to represent such digit, manually operable storing means for selectively adjusting said storage instrumentalities, and readout means comprising a series of readout instrumentalities corresponding, respectively, to said storage instrumentalities and to the order positions of the largest number capable of being stored, and each such readout instrumentality being controlled by its corresponding storage instrumentality and being operable, when activated, to produce a controlling effect when its corresponding storage instrumentality has a digit stored therein, which controlling effect represents the stored digit; a code punch operable to record data-representing code designations in a copy sheet; means responsive to controlling effects produced by said readout instrumentalities to operate said tape punch to record the code designations of each digit of the stored numbers; programming means for effecting a predetermined sequence of operations of said apparatus and comprising means operable during successive operating steps to activate, respectively, said readout instrumentalities in series and beginning with the readout instrumentality corresponding to the highest order position of the largest number capable of being stored; means operable upon the activation of each readout instrumentality which corresponds to a storage instrumentality wherein no digit has been stored, to operate said tape punch to record a space code designation; and means conditioned upon the operation of said last-named means and operable during the operating step when the first significant digit of each stored number if recorded, to operate said tape punch to record a figures-shift designation before recording the designation representing such first significant digit.

55. In record controlled recording apparatus, the combination of record sensing means operable to sense successively the record columns of a source record sheet, in certain ones of which data-representing designations are selectively recorded and including designations representing characters of a predetermined case classification; a code punch operable to record in a copy sheet code designations representing data according to a predetermined code system; means responsive to the sensing of the record columns of said source record sheet for operating the code punch to record code designations in the copy sheet representing the data recorded in such record columns; means responsive to the sensing of a blank record column to operate said punch to record a code designation representing a space operation; and means conditioned upon the operation of said last-named means and operable upon the sensing of a following record column containing a designation representing a character of said predetermined case classification, to operate said punch automatically to record a significant case shift code designation before recording the code designation of said character of the predetermined case classification.

56. In record controlled recording apparatus, the combination of record sensing means operable to sense successively the record columns of a source record sheet in certain ones of which data-representing designations are selectively recorded, and including designations representing figures case characters; a code punch operable to record in a copy sheet code designations representing data according to a predetermined code system; means responsive to the sensing of the record columns of said source record sheet for operating the code punch to record code designations in the copy sheet representing the data recorded in such record columns; means responsive to the sensing of a blank record column to operate said punch to record a code designation representing a space operation; and means conditioned upon the operation of said last-named means and operable upon the sensing of a following record column containing a designation representing a figures case character, to operate said punch automatically to record a figures-shift code designation before recording the code designation of such figures case character.

57. In recording apparatus, the combination of step control mechanism operable continuously to provide successive operating steps of the apparatus; recording means comprising a carriage for holding a record sheet and actuators selectively operable to record data on said record sheet and to space said carriage; data storage means comprising a series of storage instrumentalities, each being selectively adjustable to represent different character data, storing means for selectively adjusting said instrumentalities in a predetermined serial order whereby selected data is stored therein, and storage readout means comprising a series of readout instrumentalities corresponding, respectively, to said storage instrumentalities and each said readout instrumentality being controlled by its corresponding storage instrumentality and being operable, when activated, to produce a controlling effect representing the datum stored in its corresponding storage instrumentality; means responsive to the controlling effect produced by the activation of each readout instrumentality for operating an actuator to record on the copy sheet the datum represented by said controlling effect; programming means operated by said step control mechanism and comprising a plurality of readout selecting devices there being one for each readout instrumentality and said devices being operated in a fixed order during successive operating steps; column shift control means comprising means for determining the number of storage instrumentalities in which data is stored, and means controlled by said last-named means and by the operation of said readout selecting devices for activating said readout instrumentalities during successive operating cycles and in the same serial order in which data is stored in their corresponding storage instrumentalities and including means operable when data has not been stored in all of said storage instrumentalities for delaying the activation of said readout instrumentalities by a number of operating cycles equal to the difference between the total number of storage instrumentalities and the number in which data is stored; and means effective during each of said operating cycles in which the activation of said readout instrumentalities is delayed for operating an actuator to space said carriage one recording position.

58. In apparatus of the class described, the combination of step control mechanism operable continuously to provide successive operating steps; record sensing means operable, when activated, to sense data designations in a source record; data storage means comprising a plurality of storage instrumentalities adjustable, respectively, to represent stored data, manually operable means for adjusting said storage instrumentalities to store selected data therein, and readout means comprising readout instrumentalities corresponding, respectively, to the storage instrumentalities and each said readout instrumentality being controlled by its corresponding storage instrumentality and being operable to provide, when activated, a controlling effect representing the datum stored in its corresponding storage instrumentality; recording means operable, when activated, to record data on a copy sheet; means responsive to the sensing of data designations in the source record and to the controlling effects produced by activated readout instrumentalities to operate selectively said recording means to record the sensed data and the stored data; programming means operated by said step control mechanism to activate and deactivate said record sensing means, said storage readout instrumentalities, and said recording means, so as to selectively record data from the source record and stored data in predetermined areas of the copy sheet; interlock means operable to prevent operation of said record sensing means, said recording means, and said programming means; and means effective upon the absence of stored data in said storage means and operated, when so effective and by said programming means, during a predetermined operating step to operate said interlock means.

59. In apparatus of the class described, the combinaton of step control mechanism operable continuously to provide successive operating steps; record sensing means operable, when activated, to sense data designations in a source record; data storage means comprising a plurality of storage instrumentalities adjustable, respectively, to represent stored data, manually operable means for adjusting said storage instrumentalities to store selected data therein, and readout means comprising readout instrumentalities corresponding, respectively, to the storage instrumentalities and each said readout instrumentality being controlled by its corresponding storage instrumentality and being operable to provide, when activated, a controlling effect representing the datum stored in its corresponding storage instrumentality; recording means operable, when activated, to record data on a copy sheet; means responsive to the sensing of data designations in the source record and to the controlling effects produced by activated readout instrumentalities to operate selectively said recording means to record the sensed data and the stored data; programming means operated by said step control mechanism to activate and deactivate said record sensing means, said storage readout instrumentalities, and said recording means, so as to selectively record data from the source record and stored data in predetermined areas of the copy sheet; interlock means normally ineffective and operable when rendered effective to prevent operation of said record sensing means, said recording means, and said programming means; means effective upon the absence of stored data in said storage means and operated, when so effective, and by said programming means during a predetermined operating step, to render effective said interlock means; and means operable upon the subsequent storing of data in said data storage means to restore said interlock means to its normal ineffective condition.

60. In apparatus of the class described, the combination of step control mechanism operable continuously to provide successive operating steps; record sensing means operable, when activated, to sense data designations in a source record; data storage means comprising a plurality of storage instrumentalities adjustable, respectively, to represent stored data, manually operable means for adjusting said storage instrumentalities to store selected data therein, and readout means comprising readout instrumentalities corresponding, respectively, to the storage instrumentalities and each said readout instrumentality being controlled by its corresponding storage instrumentality and being operable to provide, when activated, a controlling effect representing the datum stored in its corresponding storage instrumentality; recording means operable, when activated, to record data on a copy sheet; means responsive to the sensing of data designations in the source record and to the controlling effects produced by activated readout instrumentalities to operate selectively said recording means to record the sensed data and the stored data; programming means operated by said step control mechanism to activate and de-activate said record sensing means, said storage readout instrumentalities, and said recording means, so as to selectively record data from the source record and stored data in predetermined areas of the copy sheet; interlock means operable when rendered effective, to prevent operation of said record sensing means, said recording means, and said programming means; storage testing means operable to render effective said interlock means; means operated by said programming means during a predetermined operating step to operate said testing means; and means effective upon the storing of data in said data storage means to render said last-named means ineffective to operate said storage testing means.

61. In apparatus of the class described, the combination of step control mechanism operable continuously to provide successive operating steps; data storage means comprising a plurality of storage instrumentalities adjustable, respectively, to represent stored data, manually operable means for adjusting said storage instrumentalities to store selected data therein, and readout means comprising readout instrumentalities corresponding, respectively, to the storage instrumentalities and each said readout instrumentality being controlled by its corresponding storage instrumentality and being operable to provide, when activated, a controlling effect representing the datum stored in its corresponding storage instrumentality; recording means operable, when activated, to record data on a copy sheet; means responsive to the controlling effects produced by activated readout instrumentalities to operate selectively said recording means to record the stored data; programming means operated by said step control mechanism to activate and de-activate said storage readout instrumentalities and said recording means, so as to record the stored data in a predetermined manner in the copy sheet; interlock means normally ineffective and operable, when rendered effective, to stop operation of said recording means and said programming means; means effective upon the absence of stored data in said storage means and operated, when so effective, and by said programming means during a preselected operating step, to render effective said interlock means; means operable upon the subsequent storing of data in said data storage means to restore said interlock means to its normal ineffective condition; and reset means operated by said programming means during an operating step following said preselected operating step and following the reading out and recording of the stored data, for adjusting said storage instrumentalities to wipe out the stored data.

62. In apparatus of the class described, the combination of step control mechanism operable continuously to provide successive operating steps; record sensing means operable, when activated, to sense data designations in a source record; data storage means comprising a plurality of storage instrumentalities adjustable, respectively, to represent stored data, manually operable means for adjusting said storage instrumentalities to store selected data therein, and readout means comprising readout instrumentalities corresponding, respectively, to the storage instrumentalities and each said readout instrumentality being controlled by its corresponding storage instrumentality and being operable to provide, when activated, a controlling effect representing the datum stored in its corresponding storage instrumentality; recording means operable, when activated, to record data on a copy sheet; means responsive to the sensing of data designations in the source record and to the controlling effects produced by activated readout instrumentalities to operate selectively said recording means to record the sensed data and the stored data; programming means operated by said step control mechanism for controlling the sequence of operations according to a predetermined plan and including means to activate and de-activate said record sensing means, said storage readout instrumentalities, and said recording means during predetermined operating steps, so as to selectively record data from the source record and stored data in predetermined areas of the copy sheet; and reset means operated by said programming means during a predetermined operating step following the reading out and recording of the stored data, for adjusting said storage instrumentalities to wipe out the stored data.

63. In apparatus of the class described, the combination of step control mechanism operable continuously to provide successive operating steps; a plurality of storage instrumentalities adjustably, respectively, to represent stored data; a plurality of data storing keys; entering means operated by said keys for adjusting said storage instrumentalities to store selected data therein; key operated locking means operable upon the storing of data in said storage instrumentalities for locking said data storing keys against further storing operations; readout means comprising readout instrumentalities corresponding, respectively, to the storage instrumentalities and each said readout instrumentality being controlled by its corresponding storage instrumentality and being operable to provide, when activated, a controlling effect representing the datum stored in its corresponding storage instrumentality; recording means operable, when activated, to record data on a copy sheet; means responsive to the controlling effects produced by activated readout instrumentalities to operate selectively said recording means to record the stored data; programming means operated by said step control mechanism to effect a sequence of operations according to a predetermined plan and including means to activate and de-activate said storage readout instrumentalities, and said recording means, so as to selectively record stored data in predetermined areas of the copy sheet; and reset means operable to unlock said locking means and to adjust said storage instrumentalities to wipe out any data stored therein.

64. Apparatus according to claim 63 wherein said programming means operates said reset means during a predetermined operating step of the apparatus.

65. In apparatus for recording both heading and detail data in different areas of a copy sheet and under the control of data designations contained in successive record columns of a heading source record sheet and of one or more detail source record sheets, the combination of source record sensing means first operable, when activated, to sense successively the record columns of said heading sheet and then to sense successively the record columns of said one or more detail sheets; a denominationally ordered series of numeric storage instrumentalities and each said instrumentality being adjustable to represent a digit when the number to be stored contains such digit in its corresponding denominational order position; means for storing in descending denominational order the digits of a selected number in the corresponding storage instrumentalities; a denominationally ordered series of readout instrumentalities corresponding, respectively, to said storage instrumentalities and being controlled by their corresponding storage instrumentalities and being operable, when activated, to produce controlling effects representing, respectively, the digits stored in their corresponding storage instrumentalities; recording means operable, when activated, and in response to the sensing of heading and detail data designations and to the controlling effects produced by activated readout instrumentalities to record the heading and detail data and the stored numeral data in different areas of the copy sheet; programming means for controlling the sequence of operations of said apparatus according to a predetermined plan and including means for activating and de-activating said source record sensing means, said readout instrumentalities, and said recording means; interlock means normally ineffective and operable when rendered effective to prevent the operation of said record sensing means, said recording means, and said programming means; testing means operated by said programming means at a predetermined time in the operation, for rendering said interlock means effective; and means for disabling said last-named means upon the storing of the last or units order digit of a number in the corresponding storage instrumentality.

66. In apparatus for preparing records from heading record cards containing designations in record columns thereof representing heading data and from detail record cards containing designations in record columns thereof relating to detail items, the combination of record sensing means operable, when activated, to sense successively the record columns of each card in sensing position and including feeding means operable to feed a new card into initial sensing position and to eject an old card from sensing position; data storage means including means manually settable to store selected data therein and readout instrumentalities operable, when activated, to produce controlling effects representing the stored data; recording means operable, when activated, and in response to the sensing of data designations in said record cards and to the controlling effects produced by activated readout instrumentalities for preparing a record of the sensed and stored data; programming means operable, when activated, for controlling the sequence of operations of said apparatus according to a predetermined plan and including the selective activating and de-activating of said sensing means, said readout instrumentalities and said recording means, and said programming means including a first control section having control designations therein for controlling the sequence of operations of the apparatus while a heading card is in position to be sensed and a second control section having control designations therein for controlling the sequence of operation while a detail card is in position to be sensed; means operable upon the operation of said feeding means to activate said programming means; means controlled by a special designation in an initial record column in said record cards for selectively effecting program control by said first control section of said programming means while a heading card is in position to be sensed and program control by said second control section while said detail card is in position to be sensed; resetting means operable in response to a control designation in said first control section for wiping out any previously stored data in said data storage means; and means operable after the record columns of said heading card have been sensed, to render said reset means inoperable whereby, after a heading card has been sensed, manually stored data can not be wiped out until the next heading card is in position to be sensed.

67. In apparatus for preparing records from heading record cards containing designations in record columns thereof representing heading data and from detail record cards containing designations in record columns thereof relating to detail items, the combination of record sensing means operable, when activated, to sense successively the record columns of each card in sensing position and including feeding means operable to feed a new card into initial sensing position and to eject an old card from sensing position; data storage means including means manually settable to store selected data therein and readout instrumentalities operable, when activated, to produce controlling effects representing the stored data; recording means operable, when activated, and in response to the sensing of data designations in said record cards and to the controlling effects produced by activated readout instrumentalities for preparing a record of the sensed and stored data; programming means operable, when activated, for controlling the sequence of operations of said apparatus according to a predetermined plan and including the selective activating and de-activating of said sensing means, said readout instrumentalities and said recording means, and said programming means including a first control section having control designations therein for controlling the sequence of operations of the apparatus while a heading card is in position to be sensed and a second control section having control designations therein for controlling the sequence of operation while a detail card is in position to be sensed; means operable upon the operation of said feeding means to activate said programming means; means controlled by a special designation in an initial record column in said record cards for selectively effecting program control by said first control section of said programming means while a heading card is in position to be sensed and program control by said second control section while said detail card is in position to be sensed; means responsive to a significant control designation in said first control section for activating said readout instrumentalities at a predetermined time and while said heading card is in position to be sensed and responsive to a significant control designation in said second control section for activating said readout instrumentalities at a predetermined time while each of said detail cards is in position to be sensed; resetting means operable in response to a control designation in said first control section for wiping out any previously stored data in said data storage means; and means operable after the record columns of said heading card have been sensed, to render said reset means inoperable whereby, after a heading card has been sensed, the manually stored data can not be wiped out until the next heading card is in position to be sensed.

68. In apparatus for preparing records from heading record cards containing designations in record columns thereof representing heading data and from detail record cards containing designations in record columns thereof relating to detail items, the combination of record sensing means operable, when activated, to sense successively the record columns of each card in sensing position and including feeding means operable to feed a new card into initial sensing position and to eject an old card from sensing position; data storage means including means manually settable to store selected data therein and readout instrumentalities operable, when activated, to produce controlling effects representing the stored data; recording means operable, when activated, and in response to the sensing of data designations in said record cards and to the controlling effects produced by activated readout instrumentalities for preparing a record of the sensed and stored data; programming means operable, when activated, for controlling the sequence of operation of said apparatus according to a predetermined plan and including the selective activating and de-activating of said sensing means, said readout instrumentalities and said recording means, and said programming means including a first control section having control designations therein for controlling the sequence of operations of the apparatus while a heading card is in position to be sensed and a second control section having control designations therein for controlling the sequence of operation while a detail card is in position to be sensed; means operable upon the operation of said feeding means to activate said programming means; means responsive to a significant control designation at the end of said second control section for operating said feeding means; means controlled by a special designation in an initial record column in said record cards for selectively effecting program control by said first control section of said programming means while a heading card is in position to be sensed and program control by said second control section while said detail card is in position to be sensed; resetting means operable in response to a control designation in said first control section for wiping out any previously stored data in said data storage means; and means operable upon the completion of the sensing of the record columns of said heading card to render said reset means inoperable whereby, after a heading card has been sensed, the manually stored data can not be wiped out until the next heading card is in position to be sensed.

69. In apparatus for preparing records from heading record cards containing designations in record columns thereof representing heading data and from detail record cards containing designations in record columns thereof relating to detail items, the combination of record sensing means operable, when activated, to sense successively the record columns of each card in sensing position and including feeding means operable to feed a new card into sensing position and to eject an old card from sensing position; data storage means comprising a first group of storage instrumentalities settable to represent data of a first class, a second group of storage instrumentalities settable to represent data of a second class, key operated entering means connectible to said first and second groups of instrumentalities and operable to store data therein, adjustable selecting means operable when in a first adjusted condition to connect said entering means to said first group of storage instrumentalities and operable when in a second adjusted condition to connect staid entering means to said second group of instrumentalities, and first and second groups of readout instrumentalities corresponding, respectively, to said first and second groups of storage instrumentalities and each said readout instrumentality being controlled by its corresponding storage instrumentality and being operable, when activated, to produce a controlling effect representing the datum stored in its corresponding storage instrumentality; recording means operable, when activated, and in response to the sensing of data designations in said record cards and to the controlling effects produced by activated readout instrumentalities for preparing a record of the sensed and stored data; programming means operable for controlling the sequence of operations of said apparatus according to a predetermined plan and including the selective activating and de-activating of said sensing means and said recording means, and said programming means comprising means operable at a predetermined time while each heading card is in sensing position to adjust said selecting means to its said first adjusted condition, means operable while each heading card is in sensing position and at a predetermined time after the operation of said last-named means to signify the condition of said first group of storage instrumentalities when no data is stored therein, and means operable while each heading card is in sensing position and after the operation of said last-named means for activating the first group of readout instrumentalities; means operable upon the activating of the last-named readout instrumentality of said first group, to adjust said selecting means to its said second adjusted condition; and means operable by said programming means for activating said second group of readout instrumentalities while the detail record cards are in sensing position.

70. In apparatus for preparing records from heading record cards containing designations in record columns thereof representing heading data and from detail record cards containing designations in record columns thereof relating to detail items, the combination of record sensing means operable, when activated, to sense successively the record columns of each card in sensing position and including feeding means operable to feed a new card into sensing position and to eject an old card from sensing position; data storage means comprising a first group of storage instrumentalities settable to represent data of a first class, a second group of storage instrumentalities settable to represent data of a second class, key operated entering means connectible to said first and second groups of instrumentalities and operable to store data therein, adjustable selecting means operable when in a first adjusted condition to connect said entering means to said first group of storage instrumentalities and operable when in a second adjusted condition to connect said entering means to said second group of instrumentalities, and first and second groups of readout instrumentalities corresponding, respectively, to said first and second groups of storage instrumentalities and each said readout instrumentality being controlled by its corresponding storage instrumentality and being operable, when activated, to produce a controlling effect representing the datum stored in its corresponding storage instrumentality; recording means operable, when activated, and in response to the sensing of data designations in said record cards and to the controlling effects produced by activated readout instrumentalities for preparing a record of the sensed and stored data; programming means operable for controlling the sequence of operations of said apparatus according to a predetermined plan and including the selective activating and de-activating of said sensing means and said recording means, and said programming means comprising means operable at a predetermined time while each heading card is in sensing position to adjust said selecting means to its said first adjusted condition, means operable while each heading card is in sensing position and at a predetermined time after the operation of said last-named means to signify the condition of said first group of storage instrumentalities when no data is stored therein, and means operable while each heading card is in sensing position and after the operation of said last-named means for activating the first group of readout instrumentalities; means operable upon the activating of the last readout instrumentality of said first group to be activated, to adjust said selecting means to its said second adjusted condition; means operable by said programming means for activating said second group of readout instrumentalities while each detail record card is in sensing position; and reset means operable by said programming means while each detail card is in sensing position and after the operation of said last-named means, to wipe out the data stored in said second group of storage instrumentalities.

71. In record controlled printing apparatus of the type wherein heading data is printed in a selected area of a copy sheet under the control of data designations in a heading source record sheet and wherein detail data is printed in succeeding areas of the copy sheet under the control of data designations in corresponding detail source record sheets, the combination of source record sensing means for sensing successively the record columns of the heading and detail source record sheets, and including sheet feeding means operable to feed a new record sheet into initial sensing position and to eject an old record sheet from sensing position; printing means comprising a positionable carriage for holding a copy sheet in printing position and selectively actuatable members operable to print data on the copy sheet and to position said carriage in different printing positions; means responsive to the sensing of data designations in the source record sheets for actuating said members to print the data in the different areas of the copy sheet provided therefor; item count mechanism settable to a home position and effective to advance one item position from its home position for each actuation thereof; means operable to set said item count mechanism to its said home position upon said sheet feeding means being operated to feed a new heading record sheet into initial sensing position; means operable to actuate said count mechanism to advance the latter one item position each time said sheet feeding means is operated to feed a new detail record sheet into initial sensing position; and means operated by said item count mechanism upon the latter being advanced a preselected number of item positions, to signify such condition of the item count mechanism in a predetermined manner.

72. In record controlled printing apparatus of the type wherein heading data is printed in a selected area of a copy sheet under the control of data designations in a heading source record sheet and wherein detail data is printed in succeeding areas of the copy sheet under the control of data designations in corresponding detail source record sheets, the combination of source record sensing means operable, when activated, to sense successively the record columns of the heading and detail source record sheets, and including sheet feeding means operable to feed a new record sheet into initial sensing position and to eject an old record sheet from sensing position; printing means operable, when activated, to print the sensed data on the copy sheet and comprising a positionable carriage for holding a copy sheet in printing position and selectively actuatable members operable to effect data printing operations and to position said carriage in different printing positions; means responsive to the sensing of data designations in the source record sheets for actuating said members to print the data in the different areas of the copy sheet provided therefor; programming means for controlling the sequence of operations according to a predetermined plan and including the activating and deactivating of said sensing means and said printing means; item count mechanism settable to a home position and effective to advance one item position from the home position for each actuation thereof; means operable to set said item count mechanism to its said home position upon said feeding means being operated to feed a new heading record sheet into initial sensing position; means operated by said programming means after the completion of sensing the record columns of each detail record sheet, to operate said sheet feeding means to feed a new detail record sheet to its initial sensing position; means operable to actuate said count mechanism to advance the latter one item position each time said feeding means is operated to feed a new detail record sheet into initial sensing position; and means operated by said item count mechanism when the latter has been advanced a predetermined number of item positions to prevent said programming means from operating said sheet feeding means to feed a new detail record sheet.

73. In apparatus for recording data under control of designations representing data of a first class in a first source record and of designations representing data of a second class in a second source record and of designations in the source records signifying the class of data recorded therein, the combination of record holding means adapted to receive said first and second source records one at a time, and operable to hold each received record in a position to be sensed; source record sensing means operable, when activated, to sense successively the designations of each source record while it is held in position to be sensed; recording means operable, when activated, and in response to the sensing of said data-representing designations to record the two classes of data in a selective manner; programming means for controlling the sequence of operations of said apparatus and including the selective activating and deactivating of said source record sensing means and of said recording means so as to control the operation of said apparatus according to a predetermined plan; said programming means including a first group of instrumentalities for controlling the sequence of operations of the apparatus while said first source record is in position to be sensed and a second group of instrumentalities for controlling the sequence of operations of the apparatus while said second source record is in position to be sensed; means responsive to the sensing of the class-signifying designation in said first source record for effecting program control by said first group of instrumentalities while said first source record is in position to be sensed; and means responsive to the sensing of the class-signifying designation in said second source record for effecting program control by said second group of instrumentalities while said second source record is in position to be sensed.

74. In apparatus for handling record cards bearing data designations in successive record columns thereof, the combination of guide means providing a main card feeding passage having an inlet and an outlet end; normal card feeding means adjustable to an operative and to a non-operative condition and effective when in its operative condition to coact with opposite faces of a card for the purpose of feeding such card along said main passage and past a sensing station where the record columns are adapted to be sensed successively and said feeding means being effective when in its non-operative condition to permit a card to be moved by other means into said main passage without interference; an adjustable card stop normally occupying a non-operative adjusted position where a card is free to move through said passage without interference from said stop and effective when in an operative adjusted position to intercept a card moving in said main passage and to stop such card with the first column thereof to be sensed at the sensing station; initial card feeding means operable to feed a card into the inlet end of said main passage and against said stop when the latter is in its operative adjusted position; a power source including a constantly running device and drive mechanism connectible to said device and effective when so connected to provide an initial operating cycle; means operated by said drive mechanism for operating said initial card feeding means; means operated by said drive mechanism for adjusting said normal card feeding means first to its non-operative condition and then for adjusting said normal card feeding means back to its operative condition, and the timing of the adjustments being such that the normal card feeding means is adjusted to its non-operative condition before the card entering said main passage can coact therewith and is adjusted back to its operative condition after sufficient time has elapsed for the entering card to reach its first column sensing position; and means operated by said drive mechanism for adjusting said stop to its operative adjusted position and then for returning said stop to its non-operative adjusted position, and the timing of the operation being such that the stop is moved to its operative position before the entering card can reach said stop and is returned to its non-operative position after said initial card feeding means operates to feed the card against said stop.

FRANCIS E. HAMILTON.
MAXWELL F. HAYES.
JOHN D. WOLFE.

REFERENCES CITED

The following references are of record in the file of this patent:

UNITED STATES PATENTS

| Number | Name | Date |
| --- | --- | --- |
| 888,808 | Hutches, Jr. | May 26, 1908 |
| 1,519,054 | Reynolds | Dec. 9, 1924 |
| 1,520,478 | More | Dec. 23, 1924 |
| 2,018,420 | Robinson | Oct. 22, 1935 |
| 2,046,082 | Mills | June 30, 1936 |
| 2,101,437 | Lemmon et al. | Dec. 7, 1937 |
| 2,255,011 | Lake et al. | Sept. 2, 1941 |